US010789601B2

(12) United States Patent
Pacotto et al.

(10) Patent No.: US 10,789,601 B2
(45) Date of Patent: Sep. 29, 2020

(54) SYSTEM AND METHOD FOR GUARANTEEING AUTHENTICITY OF BRANDED GOODS

(71) Applicant: TESI S.p.A., Bra (IT)

(72) Inventors: Giuseppe Pacotto, Bra (IT); Marcella Pacotto Brizio, Bra (IT); Dario Pacotto, Bra (IT); Stefania Luisa Pacotto, Bra (IT)

(73) Assignee: Tesi S.p.A., Bra (IT)

(*) Notice: Subject to any disclaimer, the term of this patent is extended or adjusted under 35 U.S.C. 154(b) by 387 days.

(21) Appl. No.: 14/940,986

(22) Filed: Nov. 13, 2015

(65) Prior Publication Data

US 2016/0140574 A1 May 19, 2016

Related U.S. Application Data

(60) Provisional application No. 62/081,749, filed on Nov. 19, 2014.

(51) Int. Cl.
*G06Q 30/00* (2012.01)
*G09F 3/00* (2006.01)

(52) U.S. Cl.
CPC .......... *G06Q 30/0185* (2013.01); *G09F 3/00* (2013.01)

(58) Field of Classification Search
None
See application file for complete search history.

(56) References Cited

U.S. PATENT DOCUMENTS

| | | | | |
|---|---|---|---|---|
| 7,992,772 | B2 | 8/2011 | Grant et al. | |
| 8,542,871 | B2 | 9/2013 | Voloshynovskiy et al. | |
| 2001/0047340 | A1* | 11/2001 | Snow | G06Q 30/06 705/58 |

(Continued)

FOREIGN PATENT DOCUMENTS

| | | | | |
|---|---|---|---|---|
| CN | 102722824 | A | 10/2012 | |
| WO | 2013165028 | A2 | 11/2013 | |
| WO | WO-2013165028 | A2 * | 11/2013 | G06Q 30/018 |

OTHER PUBLICATIONS

S. Corbellini, F. Ferraris and M. Parvis, "A Cryptographic System for Brand Authentication and Material Traceability in the Textile Industry," 2006 IEEE Instrumentation and Measurement Technology Conference Proceedings, Sorrento, 2006, pp. 1331-1335, doi: 10.1109/IMTC.2006.328556. (Year: 2006).*

(Continued)

*Primary Examiner* — Andrew B Whitaker
(74) *Attorney, Agent, or Firm* — Panitch Schwarze Belisario & Nadel LLP

(57) ABSTRACT

Ownership of physical article are electronically registered in a database upon purchase of the physical articles from merchants. A merchant gives a uniquely numbered card to a customer with each purchased physical article. The numbered cards are not initially associated with a particular physical article. Each physical article has a label with a unique identifier code attached to the article or to the packaging of the article. The registration process involves associating the numbered card with the article's label. Registration is only permitted if the numbered card and the label's identifier code are not associated with a previously sold article. This process thwarts the potential sale of counterfeit articles to purchasers.

5 Claims, 136 Drawing Sheets

(56) References Cited

U.S. PATENT DOCUMENTS

| | | | | | |
|---|---|---|---|---|---|
| 2002/0133703 | A1* | 9/2002 | Morgan | G06Q 30/02 | 713/170 |
| 2007/0180248 | A1* | 8/2007 | Gorostidi | G07F 7/122 | 713/173 |

OTHER PUBLICATIONS

YottaMark: Our Solution: How It Works, printout from web page: <http://yottamark.com/solution/how/htm>, printout date: Sep. 11, 2004, 1 page.

Communication Pursuant to Rules 161(1) and 162 EPC in EP15813909.7 dated Jun. 27, 2017.

Response to "Communication pursuant to Rules 161(1) and 162 EPC" filed on Dec. 19, 2017 in EP 15813909.7.

PCT Written Opinion of the ISA, PCT International Search Report, and Information on Search Strategy for PCT/IB2015/058871, dated Feb. 15, 2016, 9 pages.

Office Action dated Nov. 26, 2019 in EP Application No. 15813909.7.

Office Action dated Mar. 16, 2020 in CN Application No. 201580063113.9.

* cited by examiner

Labelling of the items

Universal World Wide Code (UWID)

- Labels UWID whose unique numbering is handled by PYB
- Each item is combined with a label UWID Login Menu Registration certificate Check Item

Entity List

| Name Entity | Decription |
|---|---|
| PYB Master | |
| Agreement PYB/Company | Agreement PYB / Company on logical data distribution on the data base |
| Company | Master data company participant in pyb |
| Brand Friend | Master data of persons belonging to PYB, can be owners of items of Company or the users of auditing services for the originality of the articles |
| Company On General | Master data company participant in pyb duplicated on Data Base General |
| Brand Friend On General | Master data of persons belonging to PYB duplicated on Data Base Genera |
| Associative Company Brand Friend | Associative entity between the Company and demographic Brand Friend |
| Privacy and Public Data | Choises Privacy and list of the information that the Brand Friend want to make public and accessible via internet |
| Brand | Company brands master data |
| Line Production | Company lines production master data |
| Internal/External factory | Master Data of the laboratories inside or outside of the Company |
| Printer UWID Label | Printer of the labels UWID |
| Printer BPC Card | Printer of printing BPC Cards |
| Warehouse | Company warehouses master data |
| Distributors | Company distributors master data |
| Point Of Sales | Company point of sales master data |
| Master Item | Comany item master data |
| Job Order | Job orders items |
| Order UWID label | Order labels UWID |
| Row UWID Order | Order labels UWID (detail item) |

Figure 108

Entity List

| Name Entity | Decription |
|---|---|
| UWID Label | Company Labels UWID master data |
| UWID Label Log | Historical events of the labels UWID |
| SN WM to Network | Shipping Notes from Warehouse to network |
| SNDoc to distributors | Shipping Notes from Warehouse to network (at level of head) |
| SN Doc to distributors Item | Shipping Notes from Warehouse to network (detail item) |
| SN Distributors to PoS | Shipping Notes from Distributors to PoS (at level of head) |
| SN Distributors to PoS item | Shipping Notes from Distributors to PoS (detail item) |
| Forecast | Stream containing the sales forecast items (received from company) |
| Request Order BPC | Request of BPC Cards (received from PoS) |
| Order BPC Cards | Order BPC Cards (at level of head) |
| Range of BPC Cards Order | Order BPC Cards (at level of range) |
| BPC Cards Order | Order BPC Cards (at level of card) |
| Range of BPC Cards | Range of belonging to a tile BPC from the moment of arrival at the warehouse |
| BPC Cards | Company BPC cards master data |
| BPC Cards LOG | Historical events of the BPC Cards |
| Associative BPC/Brand Friend | Associative entity between the BPC and Brand Friend |
| SN BPC WM to Network | Shipping Notes BPC Cards from Warehouse to Network |
| SN BPC distributors to PoS | Shipping Notes BPC Cards from Distributors to PoS |
| Cards Point | Cards point |

Figure 109

Entity PYB Master

| Name Field | Key | Type | Length |
|---|---|---|---|
| Code PYB Master | Primary | Numeric | 3 |
| Status | | Varchar | 2 |
| Date last update | | Time stamp | 8 |

Entity Agreement PYB/Company

| Name Field | Key | Type | Length |
|---|---|---|---|
| Code PYB Master | Primary | Numeric | 3 |
| Code company | Primary | Numeric | 4 |
| Status | | Varchar | 2 |
| Data Base private Y/N | | Varchar | 1 |
| Date last update | | Time stamp | 8 |

Figure 110

| Entity Company | | | |
|---|---|---|---|
| **Name Field** | **Key** | **Type** | **Length** |
| Code company | Primary | Numeric | 4 |
| Description company | | Varchar | 40 |
| Status | | Varchar | 2 |
| Address | | Varchar | 40 |
| Zip code | | Varchar | 5 |
| Country | | Varchar | 40 |
| VAT | | Numeric | 13 |
| Telephone | | Numeric | 20 |
| email | | Varchar | 30 |
| skype | | Varchar | 30 |
| Date last update | | Time stamp | 8 |

Figure 111

| Entity Brand Friend | | | |
|---|---|---|---|
| **Name Field** | **Key** | **Type** | **Length** |
| Code Brand Friend | Primary | Numeric | 6 |
| Status | | Varchar | 2 |
| Name | | Varchar | 40 |
| Surname | | Varchar | 40 |
| Gender | | Varchar | 1 |
| Birth date | | Date | 8 |
| Birth City | | Varchar | 40 |
| Birth Country | | Varchar | 40 |
| Address | | Varchar | 40 |
| Zip code | | Varchar | 5 |
| Country | | Varchar | 40 |
| Telephone | | Numeric | 20 |
| email | | Varchar | 30 |
| Date last update | | Time stamp | 8 |

Figure 112

| Entity Company On General | | | |
|---|---|---|---|
| **Name Field** | **Key** | **Type** | **Length** |
| Code company | Primary | Numeric | 4 |
| Description company | | Varchar | 40 |
| Status | | Varchar | 2 |
| Address | | Varchar | 40 |
| Zip code | | Varchar | 5 |
| Country | | Varchar | 40 |
| VAT | | Numeric | 13 |
| Telephone | | Numeric | 20 |
| email | | Varchar | 30 |
| skype | | Varchar | 30 |
| Date last update | | Time stamp | 8 |

Figure 113

Entity Brand Friend On General

| Name Field | Key | Type | Length |
|---|---|---|---|
| Code Brand Friend | Primary | Numeric | 6 |
| Code company | Foreign | Numeric | 4 |
| Status | | Varchar | 2 |
| Name | | Varchar | 40 |
| Surname | | Varchar | 40 |
| Gender | | Varchar | 1 |
| Birth date | | Date | 8 |
| Birth City | | Varchar | 40 |
| Birth Country | | Varchar | 40 |
| Address | | Varchar | 40 |
| Zip code | | Varchar | 5 |
| Country | | Varchar | 40 |
| Telephone | | Numeric | 20 |
| email | | Varchar | 30 |
| Date last update | | Time stamp | 8 |

Entity Associative Company Brand Friend

| Name Field | Key | Type | Length |
|---|---|---|---|
| Code Brand Friend | Primary | Numeric | 6 |
| Code company | Foreign | Numeric | 4 |
| Status | | Varchar | 2 |
| Date last update | | Time stamp | 8 |

Entity Privacy and Public Data

| Name Field | Key | Type | Length |
|---|---|---|---|
| Code Brand Friend | Primary | Numeric | 6 |
| Status | | Varchar | 2 |
| Accept.Privacy | | Varchar | 1 |
| Accept.Privacy2 | | Varchar | 1 |
| Accept.Privacy3 | | Varchar | 1 |
| Personal data public Y/N | | Varchar | 1 |
| Pos data public Y/N | | Varchar | 1 |
| Date last update | | Time stamp | 8 |

Figure 114

Entity Brand

| Name Field | Key | Type | Length |
|---|---|---|---|
| Code Brand | Primary | Numeric | 3 |
| Code company | Foreign | Numeric | 4 |
| Status | | Varchar | 2 |
| Description brand | | Varchar | 40 |
| Date last update | | Time stamp | 8 |

Entity Line production

| Name Field | Key | Type | Length |
|---|---|---|---|
| Code Line | Primary | Numeric | 3 |
| Code company | Foreign | Numeric | 4 |
| Status | | Varchar | 2 |
| Description line | | Varchar | 40 |
| Date last update | | Time stamp | 8 |

Entity Internal/External factory

| Name Field | Key | Type | Length |
|---|---|---|---|
| Code Factory | Primary | Numeric | 3 |
| Code Line | Foreign | Numeric | 3 |
| Status | | Varchar | 2 |
| Description Factory | | Varchar | 40 |
| Flag internal external | | Varchar | 1 |
| Address | | Varchar | 40 |
| Zip code | | Varchar | 5 |
| Country | | Varchar | 40 |
| Telephone | | Numeric | 20 |
| email | | Varchar | 30 |
| skype | | Varchar | 30 |
| Date last update | | Time stamp | 8 |

Figure 115

| Entity Printer UWID Label | | | |
|---|---|---|---|
| **Name Field** | **Key** | **Type** | **Length** |
| Code Printer UWID | Primary | Numeric | 3 |
| Code Line | Foreign | Numeric | 3 |
| Status | | Varchar | 2 |
| Description printer | | Varchar | 40 |
| Address | | Varchar | 40 |
| Zip code | | Varchar | 5 |
| Country | | Varchar | 40 |
| Telephone | | Numeric | 20 |
| email | | Varchar | 30 |
| skype | | Varchar | 30 |
| Date last update | | Time stamp | 8 |

| Entity Printer BPC Card | | | |
|---|---|---|---|
| **Name Field** | **Key** | **Type** | **Length** |
| Code Printer BPC | Primary | Numeric | 3 |
| Code company | Foreign | Numeric | 4 |
| Status | | Varchar | 2 |
| Description printer | | Varchar | 40 |
| Address | | Varchar | 40 |
| Zip code | | Varchar | 5 |
| Country | | Varchar | 40 |
| Telephone | | Numeric | 20 |
| email | | Varchar | 30 |
| skype | | Varchar | 30 |
| Date last update | | Time stamp | 8 |

| Entity Warehouse | | | |
|---|---|---|---|
| **Name Field** | **Key** | **Type** | **Length** |
| Code warehouse | Primary | Numeric | 3 |
| Code company | Foreign | Numeric | 4 |
| Status | | Varchar | 2 |
| Description warehouse | | Varchar | 40 |
| Address | | Varchar | 40 |
| Zip code | | Varchar | 5 |
| Country | | Varchar | 40 |
| Telephone | | Numeric | 20 |
| email | | Varchar | 30 |
| skype | | Varchar | 30 |
| Date last update | | Time stamp | 8 |

Figure 116

Entity Distributors

| Name Field | Key | Type | Length |
|---|---|---|---|
| Code Distributors | Primary | Numeric | 3 |
| Code company | Foreign | Numeric | 4 |
| Status | | Varchar | 2 |
| Description Distributors | | Varchar | 40 |
| Address | | Varchar | 40 |
| Zip code | | Varchar | 5 |
| Country | | Varchar | 40 |
| Telephone | | Numeric | 20 |
| email | | Varchar | 30 |
| skype | | Varchar | 30 |
| Date last update | | Time stamp | 8 |

Entity Point Of Sales

| Name Field | Key | Type | Length |
|---|---|---|---|
| Code PoS | Primary | Numeric | 4 |
| Code company | Foreign | Numeric | 4 |
| Code Distributors | Foreign | Numeric | 3 |
| Status | | Varchar | 2 |
| Description PoS | | Varchar | 40 |
| Address | | Varchar | 40 |
| Zip code | | Varchar | 5 |
| Country | | Varchar | 40 |
| Telephone | | Numeric | 20 |
| email | | Varchar | 30 |
| skype | | Varchar | 30 |
| Date last update | | Time stamp | 8 |

Figure 117

Entity Master Item

| Name Field | Key | Type | Length |
|---|---|---|---|
| Item Code | Primary | Numeric | 9 |
| Code company | Foreign | Numeric | 4 |
| Status | | Varchar | 2 |
| Code Brand | | Numeric | 3 |
| Item Description local | | Varchar | 40 |
| Item Description english | | Varchar | 40 |
| Barcode Y/N | | Varchar | 1 |
| QR code Y/N | | Varchar | 1 |
| RFI code Y/N | | Varchar | 1 |
| Date last update | | Time stamp | 8 |

Entity Job Order

Notes: The extent of Job is a flow cut off (at the item level) received from the customer's ERP system, is detailed below the header data of the flow

| Name Field | Key | Type | Length |
|---|---|---|---|
| Job order code | Primary | Numeric | 5 |
| Code company | Foreign | Numeric | 4 |
| Code Brand | | Numeric | 3 |
| Status | | Varchar | 2 |
| Requesting office | | Numeric | 3 |
| Job Order data | | Numeric | 8 |
| Languace code | | Numeric | 8 |
| Date last update | | Time stamp | 8 |

Figure 118

| Entity Order UWID Label | | | |
|---|---|---|---|
| **Name Field** | **Key** | **Type** | **Length** |
| Number Order Uwid | Primary | Numeric | 5 |
| Code company | Foreign | Numeric | 4 |
| Code Brand | | Numeric | 3 |
| Status | | Varchar | 2 |
| Requesting office | | Numeric | 3 |
| Order UWID data | | Numeric | 8 |
| Job order code | Foreign | Numeric | 5 |
| Job Order data | | Numeric | 8 |
| Cod Printer UWID | | Numeric | 5 |
| Language code | | Numeric | 8 |
| Date last update | | Time stamp | 8 |

| Entity Row UWID Order | | | |
|---|---|---|---|
| **Name Field** | **Key** | **Type** | **Length** |
| Number Order Uwid | Primary | Numeric | 5 |
| Item Code | Foreign | Numeric | 9 |
| Status | | Varchar | 2 |
| Item Description local | | Varchar | 40 |
| Item Description english | | Varchar | 40 |
| Barcode Y/N | | Varchar | 1 |
| QR code Y/N | | Varchar | 1 |
| RFI code Y/N | | Varchar | 1 |
| Number item to produce | | Numeric | 5 |
| First progressive label | | Numeric | 9 |
| Date last update | | Time stamp | 8 |

Figure 119

| Entity UWID Label | | | |
|---|---|---|---|
| **Name Field** | **Key** | **Type** | **Length** |
| Code UWID Label | Primary | Numeric | 9 |
| Item Code | Foreign | Numeric | 9 |
| Code company | Foreign | Numeric | 4 |
| Code BPC | Foreign | Numeric | 13 |
| Code Customer | Foreign | Numeric | 6 |
| Code Brand Friend | Foreign | Numeric | 6 |
| Code Brand | | Numeric | 3 |
| Status | | Varchar | 2 |
| Number Order Uwid | | Numeric | 5 |
| Job order code | | Numeric | 5 |
| Item Description local | | Varchar | 40 |
| Item Description english | | Varchar | 40 |
| Barcode Y/N | | Varchar | 1 |
| QR code Y/N | | Varchar | 1 |
| RFI code Y/N | | Varchar | 1 |
| Code Factory | | Numeric | 3 |
| Code warehouse | | Numeric | 3 |
| Code Distributors | | Numeric | 3 |
| Code PoS | | Numeric | 4 |
| Num SN Distrubtors to PoS | | Numeric | 5 |
| Num SN WM to Network | | Numeric | 5 |
| Date last update | | Time stamp | 8 |

Figure 120

| Entity UWID Label Log | | | |
|---|---|---|---|
| **Name Field** | **Key** | **Type** | **Length** |
| Code UWID Label | Primary | Numeric | 9 |
| Item Code | Foreign | Numeric | 9 |
| Code company | Foreign | Numeric | 4 |
| Code BPC | Foreign | Numeric | 13 |
| Code Customer | Foreign | Numeric | 6 |
| Code Brand Friend | Foreign | Numeric | 6 |
| Code Brand | | Numeric | 3 |
| Status | | Varchar | 2 |
| Number Order Uwid | | Numeric | 5 |
| Job order code | | Numeric | 5 |
| Item Description local | | Varchar | 40 |
| Item Description english | | Varchar | 40 |
| Barcode Y/N | | Varchar | 1 |
| QR code Y/N | | Varchar | 1 |
| RFI code Y/N | | Varchar | 1 |
| Code Factory | | Numeric | 3 |
| Code warehouse | | Numeric | 3 |
| Code Distributors | | Numeric | 3 |
| Code PoS | | Numeric | 4 |
| Num SN Distrubtors to PoS | | Numeric | 5 |
| Num SN WM to Network | | Numeric | 5 |
| Date last update | | Time stamp | 8 |

Figure 121

| Entity SN WM to Network | | | |
|---|---|---|---|
| **Name Field** | **Key** | **Type** | **Length** |
| Num SN WM to Network | Primary | Numeric | 5 |
| Status | | Varchar | 2 |
| Code warehouse | | Numeric | 3 |
| Code Distributors | | Numeric | 3 |
| Code PoS | | Numeric | 4 |
| Date last update | | Time stamp | 8 |
| **Entity SN Doc to distributors** | | | |
| **Name Field** | **Key** | **Type** | **Length** |
| Code company | Primary | Numeric | 4 |
| Num SN Doc to Distributors | Primary | Numeric | 5 |
| Date SN Doc to Distributors | | Date | 8 |
| Code Distributors | Foreign | Numeric | 3 |
| Date last update | | Time stamp | 8 |
| **Entity SN Doc to distributors item** | | | |
| **Name Field** | **Key** | **Type** | **Length** |
| Num SN Doc to Distributors | Primary | Numeric | 5 |
| Item Code | Foreign | Numeric | 9 |
| Item Description local | | Varchar | 40 |
| Item Description english | | Varchar | 40 |
| Item Qta | | Numeric | 5 |
| Date last update | | Time stamp | 8 |

Figure 122

Entity SN Distributors to PoS

| Name Field | Key | Type | Length |
|---|---|---|---|
| Code Distributors | Primary | Numeric | 3 |
| Num SN Distributors to PoS | Primary | Numeric | 5 |
| Date SN Doc to Distributors | | Date | 8 |
| Code PoS | | Numeric | 4 |
| Date last update | | Time stamp | 8 |

Entity SN Doc to distributors item

| Name Field | Key | Type | Length |
|---|---|---|---|
| Num SN Distributors to PoS | Primary | Numeric | 5 |
| Item Code | Primary | Numeric | 9 |
| Item Description local | | Varchar | 40 |
| Item Description english | | Varchar | 40 |
| Item Qta | | Numeric | 5 |
| Num SN Doc to Distributors | Primary | Numeric | 5 |
| Date last update | | Time stamp | 8 |

Figure 123

| Entity Forecast | | | |
|---|---|---|---|
| **Name Field** | **Key** | **Type** | **Length** |
| Num Doc Forecast | Primary | Numeric | 5 |
| Code company | Foreign | Numeric | 4 |
| Date Doc Forecast | | Date | 8 |
| Status | | Varchar | 2 |
| Sender Office | | Numeric | 3 |
| Code PoS | | Numeric | 4 |
| BPC Qta Request | | Numeric | 5 |
| Qta Ordered | | Numeric | 5 |
| Num Order BPC | | Numeric | 5 |
| Date last update | | Time stamp | 8 |

| Entity Request Order BPC | | | |
|---|---|---|---|
| **Name Field** | **Key** | **Type** | **Length** |
| Num Request Order BPC | Primary | Numeric | 5 |
| Code PoS | Foreign | Numeric | 4 |
| Date Request Order BPC | | Date | 8 |
| Date Required Delivery | | Date | 8 |
| BPC Qta Request | | Numeric | 5 |
| Qta Ordered | | Numeric | 5 |
| Qta Ordered | | Numeric | 5 |
| Num Order BPC | | Numeric | 5 |
| Date last update | | Time stamp | 8 |

Figure 124

| Entity Order BPC Cards | | | |
| --- | --- | --- | --- |
| Name Field | Key | Type | Length |
| Number Order BPC | Primary | Numeric | 5 |
| Code company | Foreign | Numeric | 4 |
| Code Brand | | Numeric | 3 |
| Status | | Varchar | 2 |
| Code warehouse | | Numeric | 3 |
| Date Order BPC | | Date | 8 |
| Code Printer BPC | | Numeric | 3 |
| Type of packaging of the cards | | Numeric | 2 |
| Qta Ordered | | Numeric | 5 |
| Languace code | | Numeric | 8 |
| Date last update | | Time stamp | 8 |

| Entity Range of BPC Cards Order | | | |
| --- | --- | --- | --- |
| Name Field | Key | Type | Length |
| Number Order BPC | Primary | Numeric | 5 |
| Range Order Start | Foreign | Numeric | 13 |
| Range Order Finish | Foreign | Numeric | 13 |
| Status | | Varchar | 2 |
| Date last update | | Time stamp | 8 |

Figure 125

| BPC Cards Order | | | |
|---|---|---|---|
| Name Field | Key | Type | Length |
| Number Order BPC | Foreign | Numeric | 5 |
| Range Order Start | Foreign | Numeric | 13 |
| Range Order Finish | Foreign | Numeric | 13 |
| Code BPC | Primary | Numeric | 13 |
| BPC Hyde Code | | Numeric | 5 |
| Status | | Varchar | 2 |
| Site | | Varchar | 2 |
| Code Brand | | Numeric | 3 |
| Date last update | | Time stamp | 8 |

| Entity Range of BPC Cards | | | |
|---|---|---|---|
| Name Field | Key | Type | Length |
| Number Order BPC | Foreign | Numeric | 5 |
| Range Start | Foreign | Numeric | 13 |
| Range Finish | Foreign | Numeric | 13 |
| Code warehouse | | Numeric | 3 |
| Num SN BPC WM to Network | | Numeric | 5 |
| Code Distributors | | Numeric | 3 |
| Num SN BPC Distriutors to PoS | | Numeric | 5 |
| Code PoS | | Numeric | 4 |
| Site | | Varchar | 2 |
| Status | | Varchar | 2 |
| Date last update | | Time stamp | 8 |

Figure 126

| BPC Cards | | | |
|---|---|---|---|
| Name Field | Key | Type | Length |
| Code BPC | Primary | Numeric | 13 |
| BPC Hyde Code | | Numeric | 5 |
| Status | | Varchar | 2 |
| Number Order BPC | Foreign | Numeric | 5 |
| Range Start | Foreign | Numeric | 13 |
| Range Finish | Foreign | Numeric | 13 |
| Range Order Start | | Numeric | 13 |
| Range Order Finish | | Numeric | 13 |
| Code Brand Friend | | Numeric | 6 |
| BPC Brand Friend Notes | | Varchar | 60 |
| Site | | Varchar | 2 |
| Num SN BPC WM to Network | | Numeric | 5 |
| Num SN BPC Distributors to PoS | | Numeric | 5 |
| Code Brand | | Numeric | 3 |
| Code Customer | | Numeric | 6 |
| Code warehouse | | Numeric | 3 |
| Code Distributors | | Numeric | 3 |
| Code PoS | | Numeric | 4 |
| Code UWID Label | | Numeric | 9 |
| Date last update | | Time stamp | 8 |

| Associative BPC Cards/Brand Friend | | | |
|---|---|---|---|
| Name Field | Key | Type | Length |
| Code BPC | Primary | Numeric | 13 |
| Code Brand Friend | | Numeric | 6 |
| Status | | Varchar | 2 |
| Date last update | | Time stamp | 8 |

Figure 127

| BPC Cards LOG | | | |
|---|---|---|---|
| **Name Field** | **Key** | **Type** | **Length** |
| Code BPC | Primary | Numeric | 13 |
| BPC Hyde Code | | Numeric | 5 |
| Status | | Varchar | 2 |
| Number Order BPC | Foreign | Numeric | 5 |
| Range Start | Foreign | Numeric | 13 |
| Range Finish | Foreign | Numeric | 13 |
| Range Order Start | | Numeric | 13 |
| Range Order Finish | | Numeric | 13 |
| Code Brand Friend | | Numeric | 6 |
| BPC Brand Friend Notes | | Varchar | 60 |
| Site | | Varchar | 2 |
| Num SN BPC WM to Network | | Numeric | 5 |
| Num SN BPC Distributors to PoS | | Numeric | 5 |
| Code Brand | | Numeric | 3 |
| Code Customer | | Numeric | 6 |
| Code warehouse | | Numeric | 3 |
| Code Distributors | | Numeric | 3 |
| Code PoS | | Numeric | 4 |
| Code UWID Label | | Numeric | 9 |
| Date last update | | Time stamp | 8 |

Figure 128

| Entity SN BPC WM to network | | | |
|---|---|---|---|
| **Name Field** | **Key** | **Type** | **Length** |
| Code company | Foreign | Numeric | 4 |
| Num SN BPC WM to Network | Primary | Numeric | 5 |
| Date SN BPC WM to Network | | Date | 8 |
| Code warehouse | Foreign | Numeric | 3 |
| Code Distributors | | Numeric | 3 |
| Code PoS | | Numeric | 4 |
| Date last update | | Time stamp | 8 |

| Entity SN BPC distributors to PoS | | | |
|---|---|---|---|
| **Name Field** | **Key** | **Type** | **Length** |
| Code company | Foreign | Numeric | 4 |
| Num SN BPC Distributors to PoS | Primary | Numeric | 5 |
| Date SN BPC Distributors to PoS | | Date | 8 |
| Code Distributors | Foreign | Numeric | 3 |
| Code PoS | | Numeric | 4 |
| Date last update | | Time stamp | 8 |

| Entity Cards Point | | | |
|---|---|---|---|
| **Name Field** | **Key** | **Type** | **Length** |
| Code Brand Friend | Primary | Numeric | 6 |
| Point Balance | | Numeric | 5 |
| Status | | Varchar | 2 |
| Date last update | | Time stamp | 8 |

Figure 129

Processes of: Production, Printer UWID Label

| Processes | Production | Printer UWID label |
|---|---|---|
| Purcase UWID label | Yes | |
| Printing of UWID label | | Yes |
| Transmission Label to factories | | Yes |

Processes of: Warehouse and Printer BPC Cards

| Processes | Warehouse | Printer BPC |
|---|---|---|
| Entry of items at the warehouse with recording UWID label | Yes | |
| Shipping of item to the sales network | Yes | |
| Purcase BPC Cards | | |
| Confirmation of BPC Cards orders | | Yes |
| Transmission of BPC Cards to the Warehouse | | Yes |
| Testing, Reception Cards, Shippjng BPC to the network | Yes | |

Processes of: clients, brand friends and anyone who desires to query the database of pyb

| Process | Customer | Brand Friend | Anyone * |
|---|---|---|---|
| Registration login, My profile, change password | Partial from PoS | Yes | Yes |
| Registration certificate | | Yes | |
| Query | Yes | Yes | Yes |

Anyone can query on PYB through code label and verify the originality of the item and its owner

SYSTEM AND METHOD FOR GUARANTEEING AUTHENTICITY OF BRANDED GOODS

CROSS-REFERENCE TO RELATED APPLICATIONS

This application claims priority to U.S. Provisional Patent Application No. 62/081,749 filed Nov. 19, 2014, the disclosure of which is incorporated herein by reference.

BACKGROUND OF THE INVENTION

Counterfeiting of goods is a worldwide problem that has a significant negative financial impact on manufacturers of branded goods. Authorized sellers of luxury goods even find themselves inadvertently selling counterfeits of their own goods due to flaws in the chain of distribution of the goods from manufacturer to retailer. Counterfeiting extends beyond luxury goods, and even occurs in goods where safety issues may arise if the counterfeited goods are not made to the same quality specifications as the original, which is almost always the case. In some instances factories produce authentic, but unauthorized versions of a luxury good. Manufacturers have been waging a mostly unsuccessful (to date) campaign to thwart both counterfeiting and production of unauthorized goods.

Thus, there is still an unmet need for an improved process to combat counterfeiting which protects all parties involved in the sale of goods (i.e., manufacturers, distributors, retailers and consumers) and ensures that consumers receive authentic branded goods that the manufacturer intended to sell to the consumer. The present invention fulfills such a need by providing a system and process specifically developed to combat counterfeiting in the luxury retail market. The system and process supports luxury brand companies that own trademarks, designs, and intellectual property with an end-to-end supply chain solution designed to mitigate the financial loss caused by counterfeiting, as well as to ensure end customers that the products they have purchased are original and authentic retail items.

SUMMARY OF THE INVENTION

Ownership of physical article are electronically registered in a database upon purchase of the physical articles from merchants. A merchant gives a uniquely numbered card to a customer with each purchased physical article. The numbered cards are not initially associated with a particular physical article. Each physical article has a label with a unique identifier code attached to the article or to the packaging of the article. The registration process involves associating the numbered card with the article's label. Registration is only permitted if the numbered card and the label's identifier code are not associated with a previously sold article.

This process and system thwarts the potential sale of counterfeit articles to purchasers and includes the following steps:

1) Brands receive proprietary tags (UWID Labels) that are added to the retail items (articles) by the manufacturer. The UWID code is specified on a multi-purpose fabric label or tag in the form of a human readable code, two-dimensional barcode "QR code", or the like.
2) The retail item enters the supply chain. As it moves from the warehouse to the distribution center to the retail outlet, the luxury brand company knows where each specific item is at all times. At every checkpoint, the tag on each retail item is scanned, and specific location information is uploaded to the database. The BPC Cards also move through the supply chain on a separate path with specific processes and tracking by the solution.
3) In the retail store, the item, its UWID Label, and its BPC Card are all tracked in the solution. At this point the retailer takes control of the item and its point of sale information.
4) While in the retail store and before making a purchase, the consumer can verify the authenticity of the article with a query to the solution using the UWID Label.
5) When the product is sold to the consumer, the retailer provides the consumer with the BPC Card, which contains a unique code that is then paired with the article's unique identifier in the solution. This ensures both the brand and the consumer that a specific authentic article was sold to and is now owned by a specific person.
6) As the consumer takes delivery of the product, the retailer finalizes the registration and transfer of ownership, which has both physical and electronic components. The consumer now has a record of their purchase, proof of ownership, loss protection, and another item for their "virtual closet," which contains all of their luxury retail purchases.
7) After the sale, the consumer can prove the authenticity and ownership of the item with a query to the solution through the UWID Label. Likewise, anyone can query the solution with the same information in order to determine the authenticity of the item.
8) After the sale, the consumer can "share" his or her wardrobe of items via a query of the solution and/or via social media platforms.

BRIEF DESCRIPTION OF THE DRAWINGS

The foregoing summary as well as the following detailed description of preferred embodiments of the invention, will be better understood when read in conjunction with the appended drawings. For the purpose of illustrating the invention, the drawings show presently preferred embodiments. However, the invention is not limited to the precise arrangements and instrumentalities shown. In the drawings:

FIGS. 108-129 show data fields and data types regarding the entities in the ERDs of FIGS. 101-107.

DETAILED DESCRIPTION OF THE INVENTION

I. Overview

Figure 1:
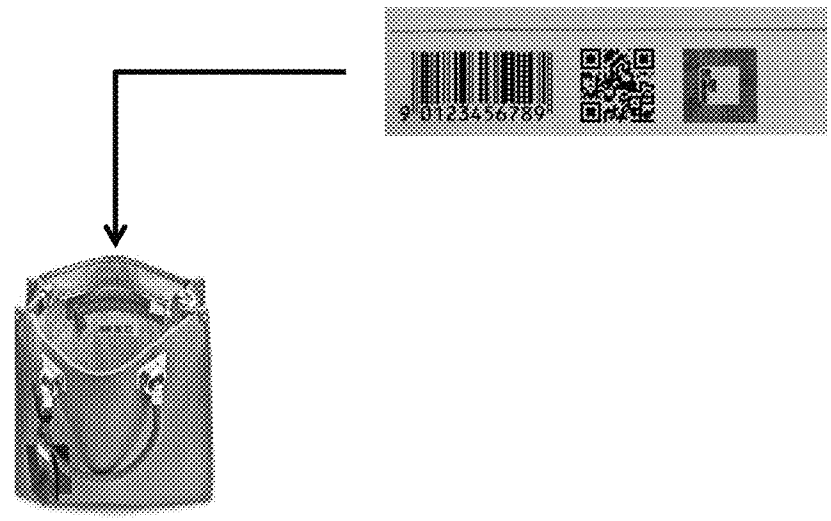
FIGS. 1 and 2 illustrate the overall process in accordance with preferred embodiments of the present invention.

Certain terminology is used herein for convenience only and is not to be taken as a limitation on the present invention.

Table of Contents

1 CONTEXT
1.1 OBJECTIVES
2 USER REQUIREMENTS
2.1 PRODUCER REQUIREMENTS
2.1.1 Production
2.1.2 Warehouse management
2.1.3 Sales network
2.1.4 Returns and transfers
2.2 END CUSTOMER REQUIREMENTS
2.2.1 End customer certification
2.2.2 Item search
2.3 GENERAL AND TECHNOLOGY REQUIREMENTS
2.3.1 General requirements
2.3.2 Technology requirements 1 Context The present invention is broadly referred by the initials "PYB" which stands for "Protect Your Brand." PYB helps its customers combat counterfeiting. PYB is designed to be used by companies that own trademarks and intend to mitigate the risks of counterfeiting as well as to ensure end customers that the products delivered are original goods.

The target customers for PYB are production companies (producers) and end customers that have acquired goods from the producers.

1.1 Objectives

Producers:

1. Fight against the counterfeiting of branded goods.
2. Protection of end customers with regard to the guarantee of authenticity of the purchased item.
3. Possibility to get to know the relevant customers and to execute the marketing initiatives deemed more appropriate (targeted promotions, fidelity cards, game shows).

End Customers:

1. Guarantee of authenticity of the purchased goods.
2. Availability of certificates of authenticity of the purchased products.
3. Availability of targeted offerings.

According to the defined target customers (producers and end customers), the disclosure below outlines topics which are customer-specific.

2 User Requirements

The assumed model is based on the possibility of uniquely identifying the item. In this regard, a label known as UWID Label has been identified and is attached to the item (e.g., to articles and items that enable to physically combine the UWID label with the item) or to the packaging (e.g., for shoes). The articles and items are also collectively referred to herein as "articles" or "physical articles."

The adoption of a solution based on the use of cards known as BPCs (Brand Property Cards) and combined with the UWID label upon sales (activity performed by the Point of Sale operator) serves as another element providing a guarantee of authenticity of the item. The BPCs are also referred to herein as "numbered cards."

2.1 Producer Requirements

The requirements of production companies have been divided into the following areas: Production, Warehouse Management, Point of Sale, Returns and Transfers, Marketing.

2.1.1 Production

When issuing the production order, both in the case of a purchase and job order, UWID codes are generated for each single item. At the IT level, in order not to complicate the production process, each UWID code is combined with the relevant item number and not with any color/size-related features. This is required to avoid too high of an impact on the production or storage process. If the technical label features color/size data, operators must know this data while they are working on the item in order to use the correct label. If the label does not feature this data, there are no particular instructions to be followed during the production process. The label must however be combined with the adequate color/size when the item enters the warehouse.)

For clarity, each label has a UWID code assigned to it. The UWID or UWID code is also referred to herein interchangeably as a "unique ID code." The UWID is placed on, affixed to, or is part of the label, which is affixed (attached) to the article or to the packaging of the article. Accordingly, the label is also interchangeably referred to herein as a UWID label.

The UWID code is specified on a multi-purpose fabric label (e.g., human readable code, two-dimensional barcode "QR code", tag). In addition to the above-mentioned information, labels can also provide, at the discretion of the production company, information about the brand name, the fabric composition and the washing instructions (e.g., print media must withstand washing, ironing operations).

It is necessary to create a centralized label printing workstation in order to print and activate the code on the selected media; otherwise, it is possible to print UWID labels at an external vendor.

If possible, labels are sewn into items (e.g., garments, handbags, scarfs); otherwise, labels accompany items in their packaging (case/bag/box/ . . . , for shoes, waists, . . . ).

As a code is generated for each produced item, in case of a production volume exceeding the planned one, it is required to generate new UWID codes and new labels according to the above specifications. In case of a production volume lower than the planned one, the exceeding codes must be removed. The subsequent phase (entry at the warehouse) deals with this problem.

2.1.2 Warehouse Management 2.1.2.1 UWID Labels

All of the information concerning the quantity of produced items is managed in the PYB system and must be confirmed starting from the entry of the finished product at the warehouse (gateway-based reading, check the possibility/opportunity of an optical PDA-based reading). Once the inventory of the goods received has been completed, the non-used labels are removed. This step is very important because, only after this confirmation, the codes are available in the distribution system and the status of items changes from "In production" to "In logistics".

In case all the items stored in the warehouse have UWID labels that can be read with high-tech tools, it is very easy to increase the number of physical inventories while facilitating the relevant operations.

After having met the above mentioned requirements and aiming at impacting as least as possible on the producer's processes, the model has been designed so that the sophistication and control level to be deployed can be customized according to the specific producer needs.

2.1.2.2 BPC Brand Property (Protection/Security) Card

In one preferred embodiment, this card is made up of cardboard (also plastic-coated) in the "credit/fidelity card" format and can be very elegant. In addition to the information concerning the company and the Brand (it can be more than one), this card features a unique code (human readable code and, optionally, NFC technology) and another (different) hidden code as the one used in phone top-up cards. The combination of both codes is known to the system. These cards are produced at the printing-house in order to have the required quality and, above all, the possibility of the hidden code. Of course, the printing-house must implement from the central system the codes to be used in the printing process.

The unique code is also interchangeably referred to herein as a "unique number."

It is necessary to organize the logistic flow so that, in addition to goods, an adequate number of BPC cards slightly higher than the number of the items sent is shipped for solving return and incident problems potentially occurring during sales.

In order to better control the purchasing process of items, it is possible to execute a reading process of outbound UWID codes when items are leaving the warehouse. In this manner, items change their status from "In logistics" to "In travel".

2.1.3 Sales Network 2.1.3.1 Items and BPC Cards

The model to be realized must manage production companies with either a direct or an indirect sales network; in both cases, distributors providing goods to a PoS must be present.

In case of a PoS owned by both suppliers and third parties, the PoS manager shall play an important role in the management of the item certification of authenticity.

Each single item with its UWID label is delivered to the PoS or to the distribution center, importer or sales branch.

Upon the entry of items and BPC cards at the PoS, it is required to confirm their receipt by reading the codes of the UWID label (entry of items) and/or of BPC cards using the most appropriate technology. The central system data is populated with the PoS data and the item status changes from "In logistics/In travel" to "In sales".

It is possible to increase the number of inventories at the warehouse as well as at the PoS by using the technology present in UWID labels.

2.1.3.2 Sales to End Customers

An important phase in the process is the sales phase during which the combination of the item's UWID label with the BPC card is performed by the Point of Sale. At this time, the data concerning the item with the UWID label is populated in the central system (also referred to herein as an "administration computer") with the place and date of sale.

This is a key event of the whole process. At this time, the sale of an UWID code is made unique. If a sale has already been performed, it is not possible to combine the UWID label with the BPC card.

The Retailer must combine the human readable code of the BPC card with the UWID code of the item. In the central system, the item is populated (associated) with the two codes related to the BPC card (the status changes from "In sales" to "Sold").

In this manner, Retailers make electronic registration requests to the central system from their respective remotely located merchant terminals.

The data stored up to now is part of an "extended" warranty that can become "extremely accurate" provided that the consumer, while using the services of the Retailer, enters the registration code obtained upon his or her first login to the project portal. In this case, the item is populated with the information about the buyer (e.g., name, surname, age, sex, location).

The Retailer who sells an article to a customer at a PoS is also interchangeably referred to as a "merchant." A retailer/merchant may have a physical and/or virtual presence. A store is an example of a physical presence. An e-commerce (eCommerce) site is an example of a virtual presence. While the process described above is similar, the location of certain events differs in the e-commerce environment. For example, certain information regarding the article and the associated BPC card will be entered at a warehouse fulfillment center in the e-commerce environment, instead of at a terminal located in a physical store. Likewise, the entity responsible for certain tasks within the sales network may differ for an e-commerce environment. An e-commerce channel for article sales is described in detail below. The scope of the present invention includes both embodiments (i.e., physical and virtual).

2.1.3.3 Returns from Customers

The system is designed to manage the returns from customers:

i. Returns of items with or without the BPC card ii. The return of BPC cards without the return of the combined item may occur, but that process is not described herein.

Preferably, each BPC card that is returned is destroyed, such as by card cutting.

In one embodiment, if goods are returned to the PoS with a still intact and undamaged BPC card, the previous sale may be deleted, and the status of the goods may be changed back from "Sold" to "In sales" and the card is placed back into the drawer.

2.1.4 Returns and Transfers

It is possible to transfer items and BPC cards among different PoS locations. Analogously, it is possible to return them to the distributor or to the warehouse.

2.2 End customer requirements 2.2.1 End customer certification

The project Web portal allows the end customer to access the system within a defined time frame. After the relevant registration with a user ID and a password (registration required only upon the first login) and by specifying the relevant master data as well as other information (e.g., hobbies, preferences), the end customer is allowed to populate (associate) the data provided to the system by the Retailer with the relevant master data and the "secret" BPC code. The system already knows this code because the POS already owns this information. Therefore, if everything matches, a positive message can be sent to the customer while populating the master data with "fidelity" points.

2.2.2 Item Search 2.2.2.1 Query of UWID Codes

Anyone having an UWID code may access the system to check the information concerning the item/brand/supplier/place of sale/buyer. The access to this information is free for everybody.

2.2.2.2 Communications/Requests for Explanation to the Producer

Everyone accessing the system not only to perform searches, but also to report unclear situations must perform a controlled access with a user ID and a password received during the registration process.

The information about the originality of the item, the status, where it was sold, on what date it was sold, and so on is the one relevant to the whole production and logistic process. The information concerning the buyer results from his or her availability to provide detailed information.

2.3 General and Technology Requirements

The general and technology requirements that must be considered in the development of the IT solution to be implemented are specified below.

2.3.1 General Requirements

The statuses of UWID labels and BPC cards must be traced in the PYB system on the relevant date. The operation of users must be traced in systems on the relevant date.

2.3.2 Technology Requirements

It is required to adopt the correct data access and storage methods typical of the applications dealing with large quantities of information (usage of Big Data, where deemed necessary).

Several processes entail the multi-channel system and the usage of multi-devices, including mobile devices.

In the preferred embodiment, each BPC card has a unique number, in the same manner that each UWID is unique. As discussed above, the unique numbers of the BPC cards are not initially associated with a particular physical article. As also discussed above, each BPC card has a hidden code. In one embodiment, the hidden code is a short number, such as a four digit PIN, that is not unique for each BPC. In another embodiment, the hidden code may be unique for each BPC. This would require a much longer number of alphanumeric characters. The hidden code may be randomly generated for each BPC with no repeats allowed if the hidden code will be unique. In one embodiment, the hidden code is hidden from plain view using a scratch-off opaque layer.

II. Detailed Disclosure

Table of Contents

1. PILLAR OF PYB
1.1 Pillar of PYB
2. ASSUMED SOLUTION—PRODUCERS
2.1 General process
2.2 Production
2.2.1 Purchase of UWID labels
2.2.2 Combination of UWID labels with items
2.2.3 Shipping of items to the warehouse
2.3 Warehouse
2.3.1 Management of items
2.3.2 Management of BPC cards
2.1 Sales network
2.4.1 Management of BPC cards in the sales network
2.4.2 Management of items in the sales network
2.4.3 Sale of items
2.4.4 Returns from customers
2.5 Returns and transfers
2.5.1 Transfers from PoS
2.5.2 Transfers from logistic distributors
3. ASSUMED SOLUTION—CUSTOMER
3.1 General process customer
3.2 Service functions
3.2.1 Registration Login
3.2.2 My profile
3.2.3 Change password
3.3 Registration certificate
3.3.1 Registration certificate of title 3.4 Query 3.4.1 Query wardrobe item 3.4.2 Query single item 1. Pillar of PYB 1.1 Pillar of PYB FIG. 1 illustrates how a Universal World Wide Code (UWID) is associated with, and affixed to an item, here a pocketbook.

Figure 2:
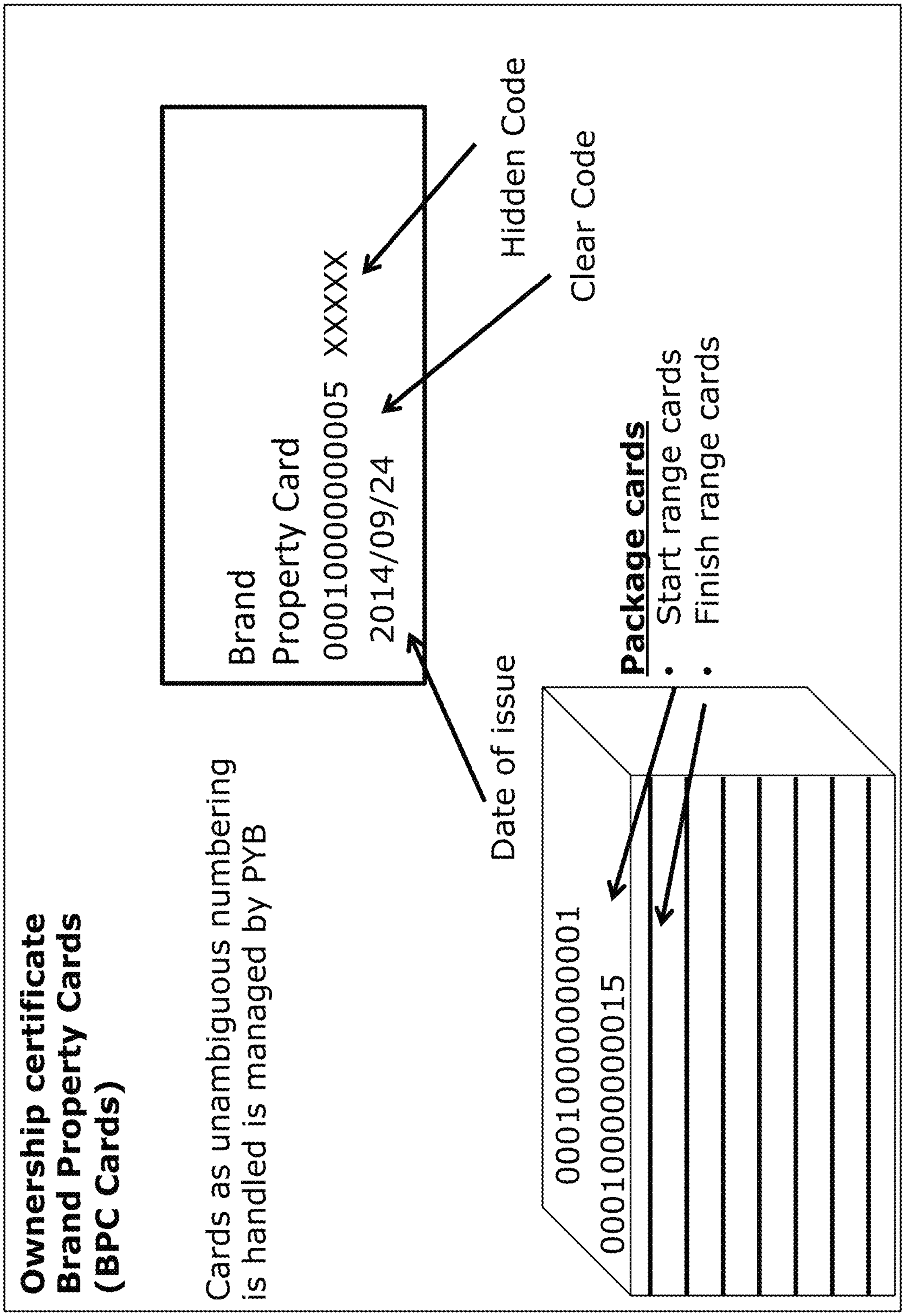

FIG. 2 illustrates Ownership Certificate Brand Property Cards (BPC Cards) in accordance with one preferred embodiment.

Figure 3:
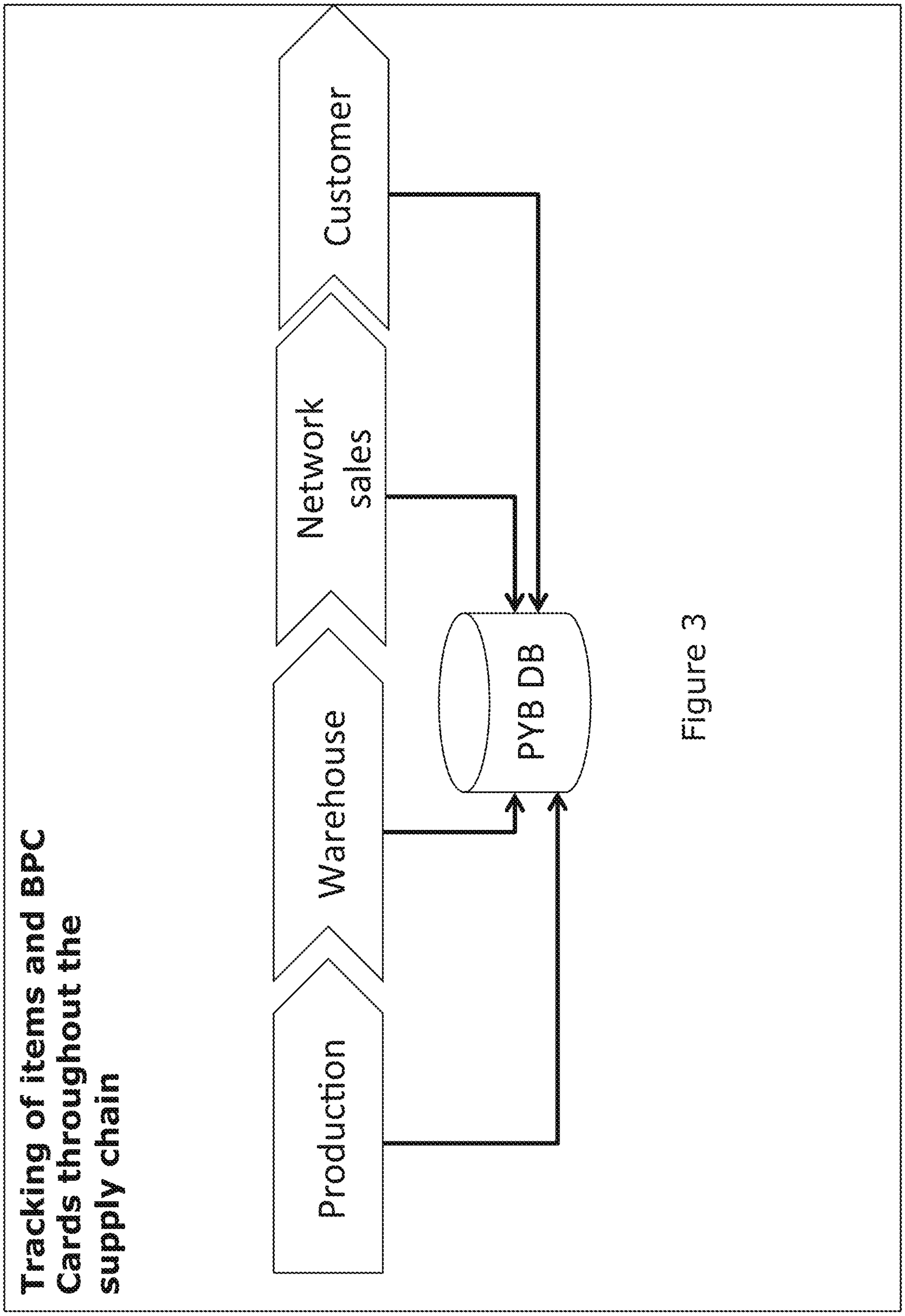
FIG. 3 is a process flow diagram in accordance with a preferred embodiment of the present invention.

FIG. 3 illustrates the process for tracking of items and BPC Cards throughout the supply chain in accordance with one preferred embodiment.

Figure 4:
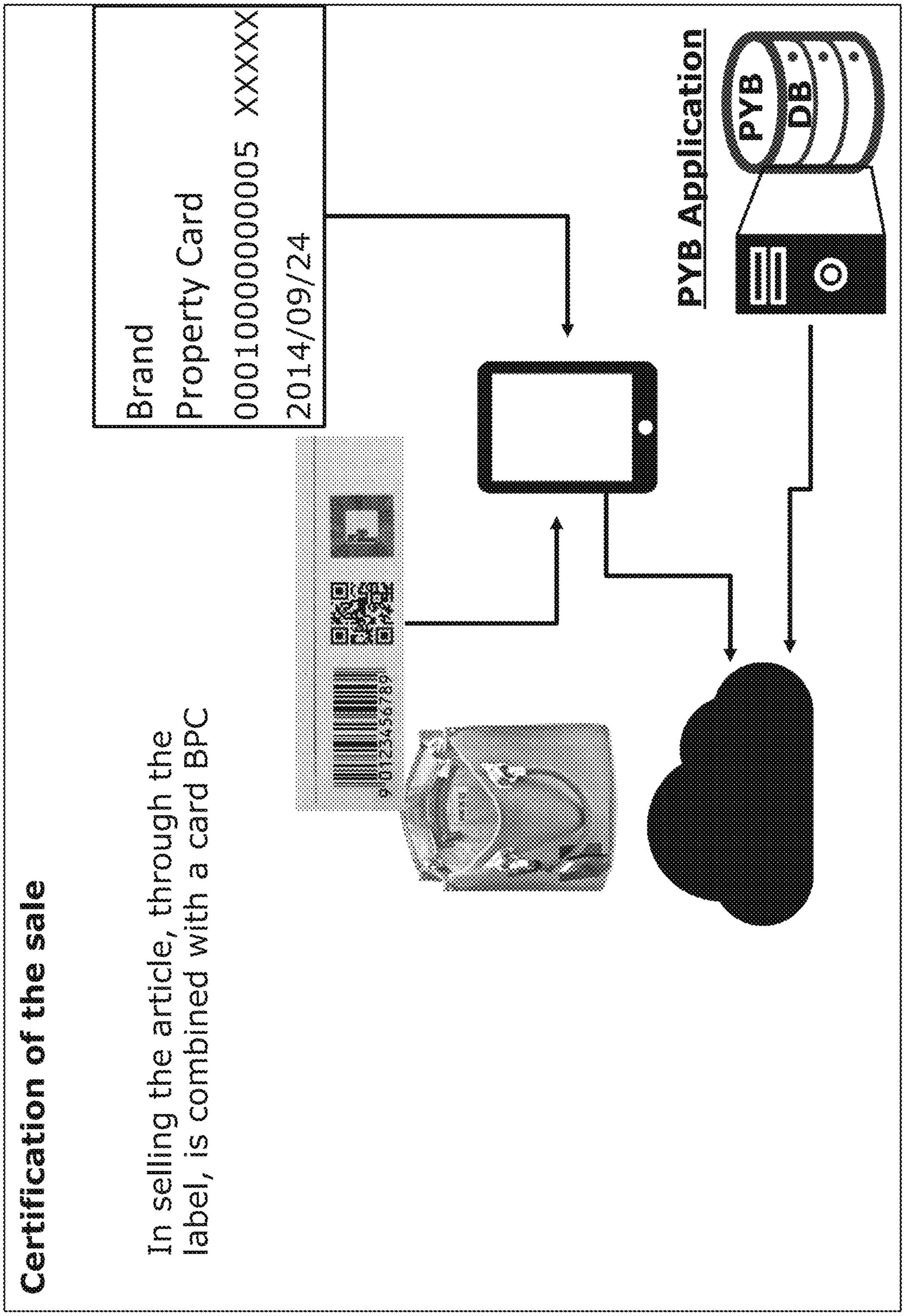
FIGS. 4-6 further illustrate the overall process in accordance with preferred embodiments of the present invention.

FIG. 4 illustrates certification of a sale wherein the label's UWID affixed to an article becomes associated with a BPC card.

Figure 5:
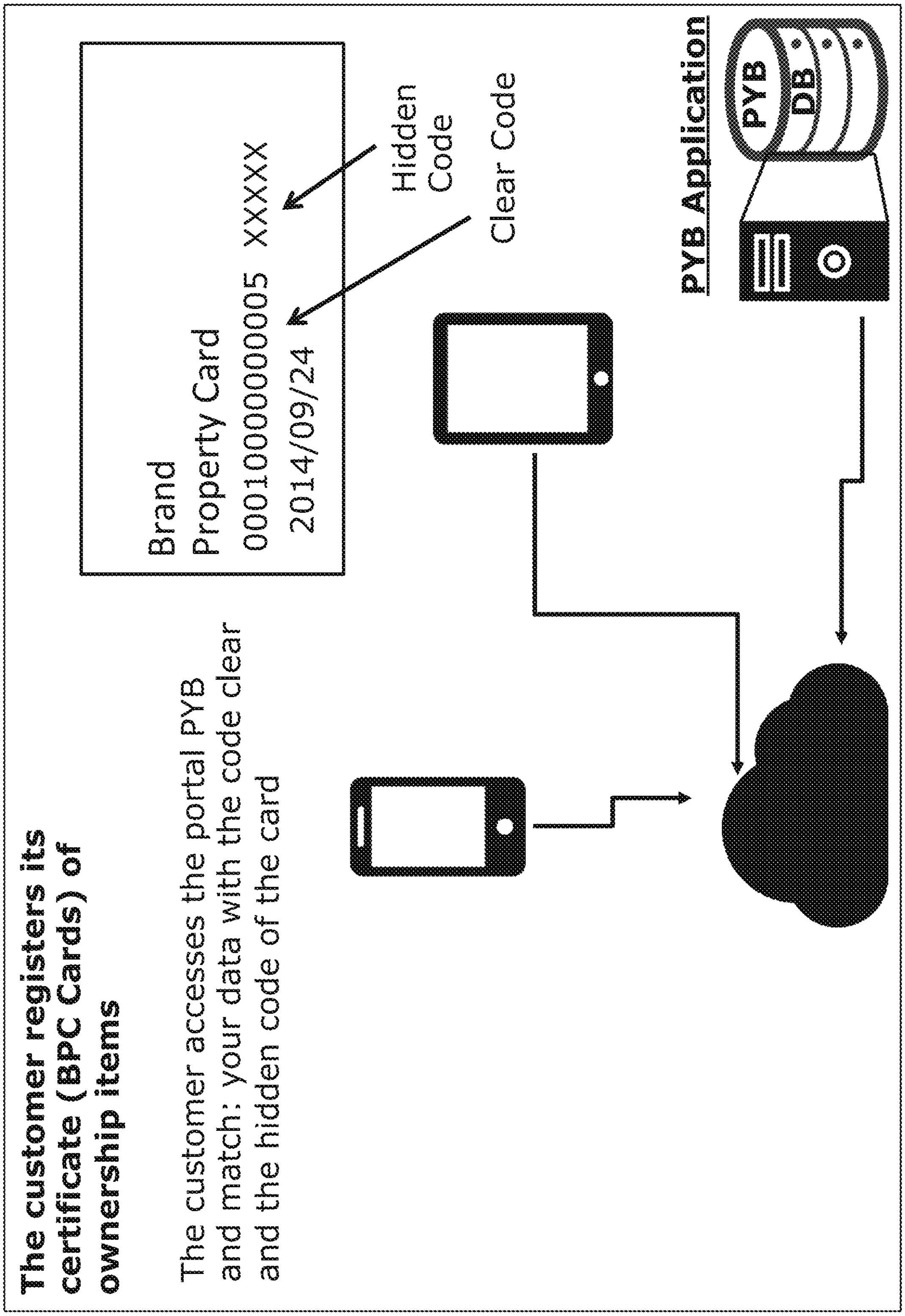

FIG. 5 illustrates how the customer registers its certificates (BPC Cards) of ownership items.

Figure 6:
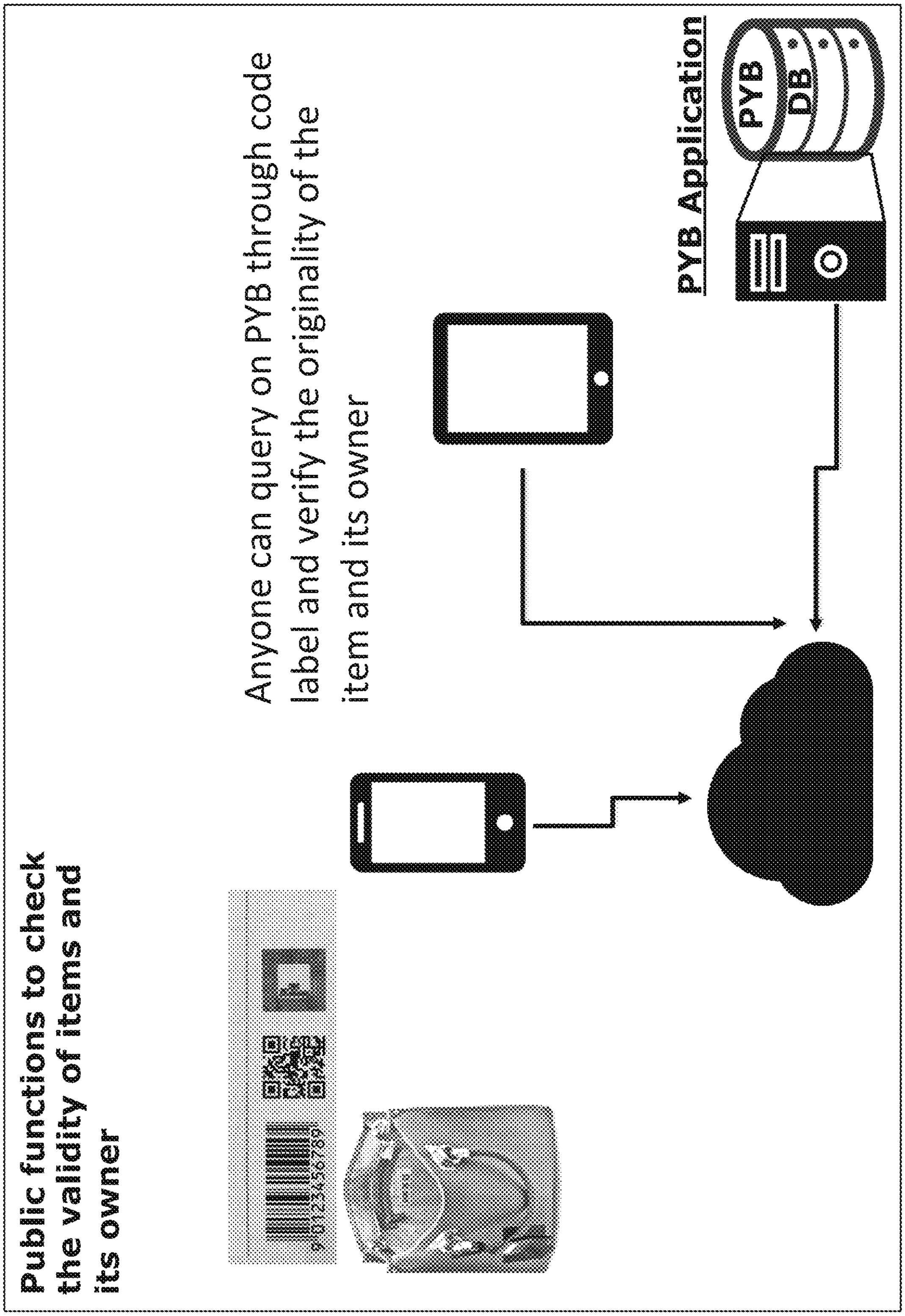

FIG. 6 illustrates how a member of the public checks the validity of items and its owner.

2. Assumed Solution—Producers

This section describes the solution assumed for producers.

Figure 7:
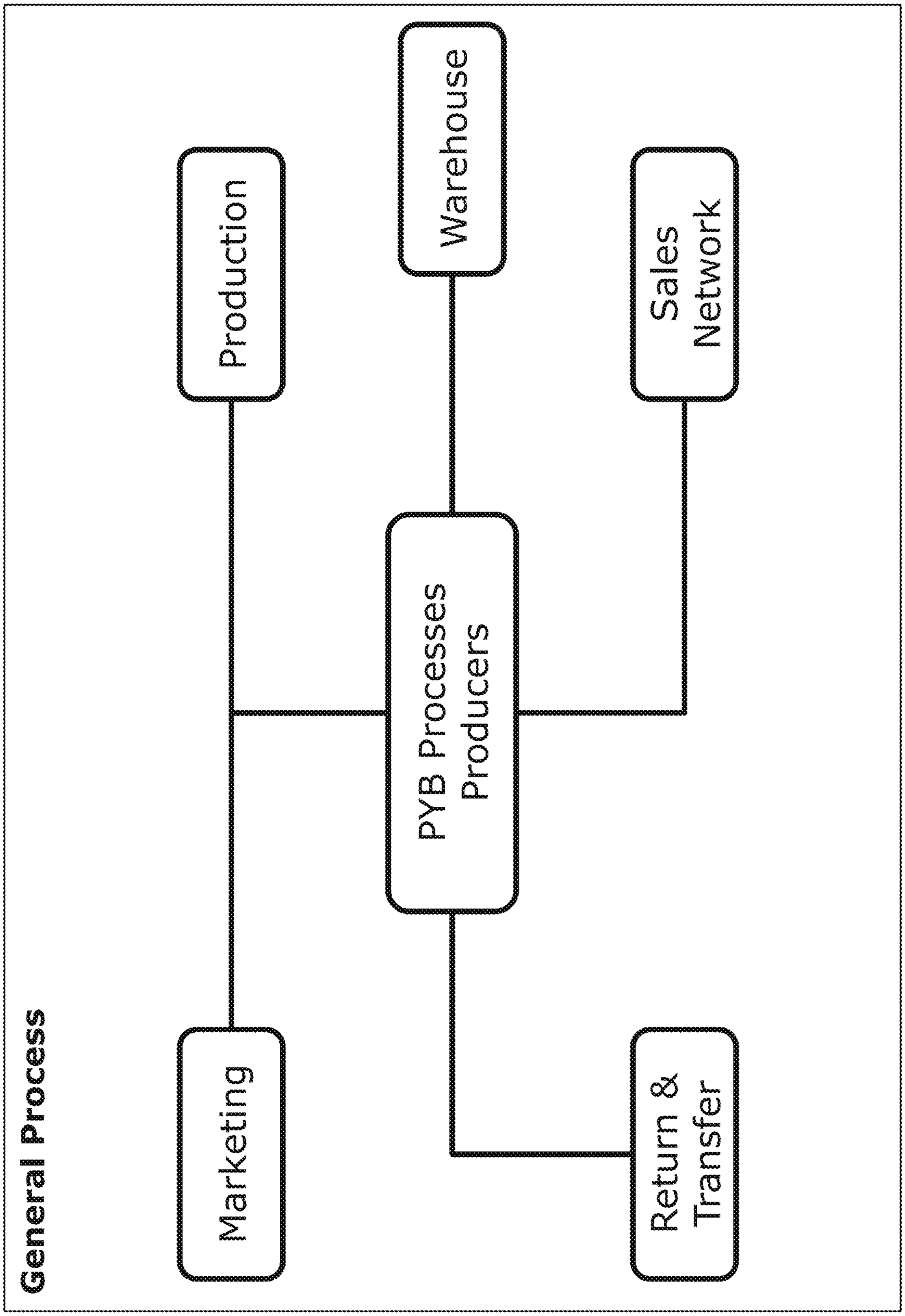
FIGS. 7 and 8 are additional process flow diagrams in accordance with preferred embodiments of the present invention.

2.1 General Process (FIG. 7)

The producer processes have been divided into the following areas: Production, Warehouse, Sales network, Returns and transfers and Marketing.

The paragraphs below of this section outline in order for each area the processes in graphic form (where deemed necessary) and in descriptive form, the master data (e.g., the organizational structure master data, customer master data, store master data) and the main data required to support the process.

The processes supported through IT functions have been marked with ** in the name of the process.

Figure 8:
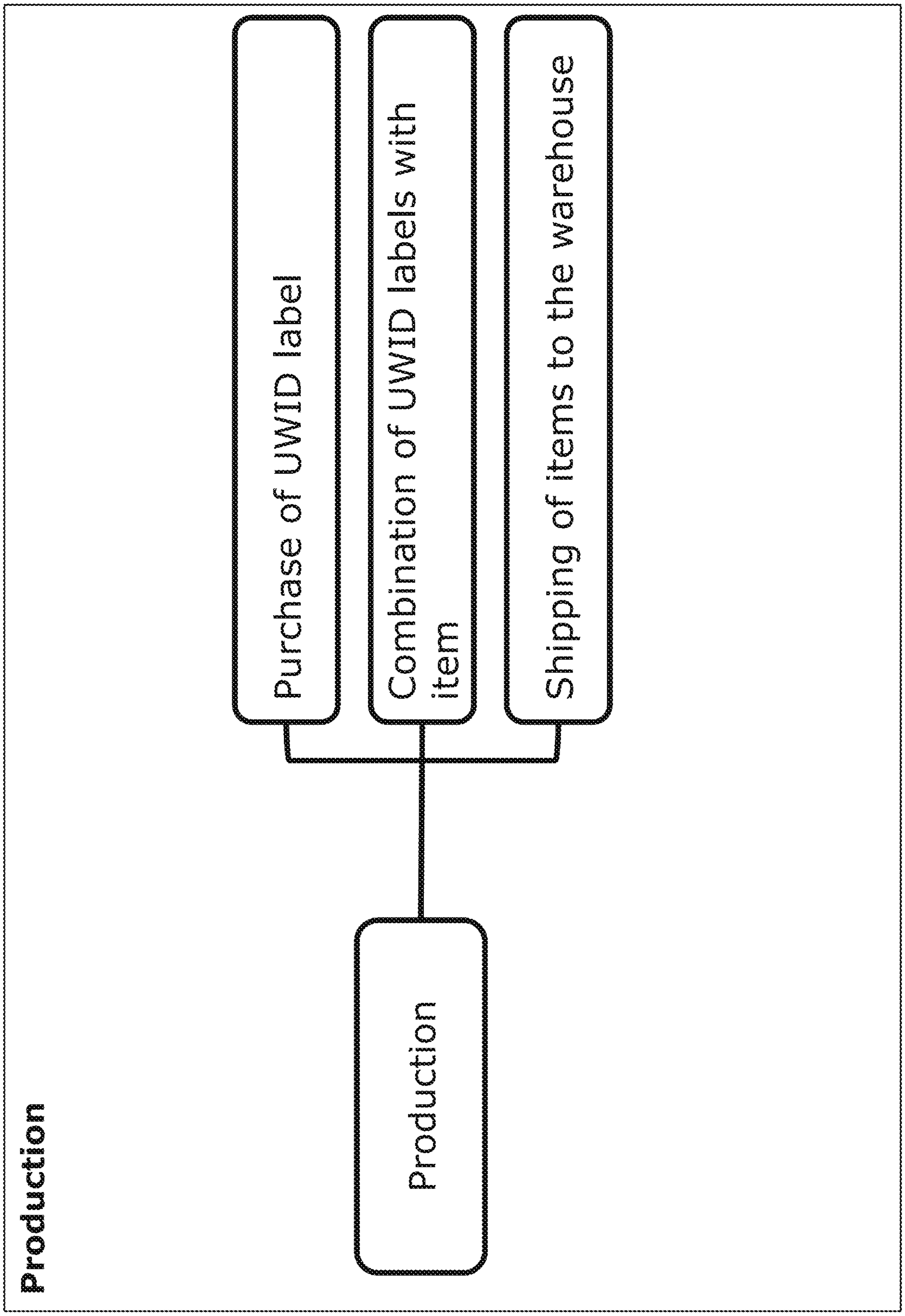

2.2 Production (FIG. 8)

Macro-scheme of the Production area processes.

Figure 9:
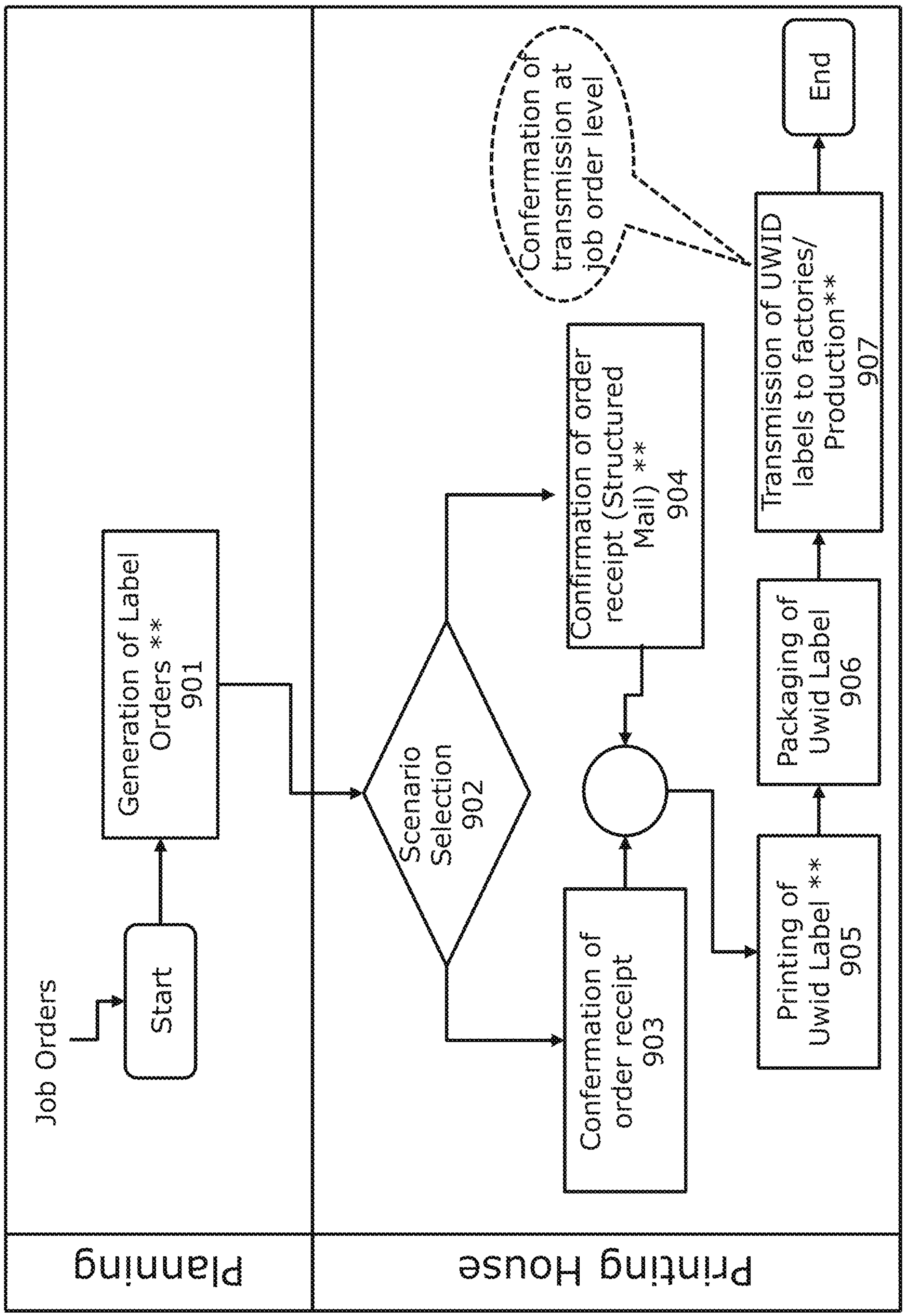
FIGS. 9-15 show a process for purchase of labels in accordance with a preferred embodiment of the present invention.

2.2.1 Purchase of UWID Labels (FIG. 9)

Process design: Purchase of labels

Figure 10:
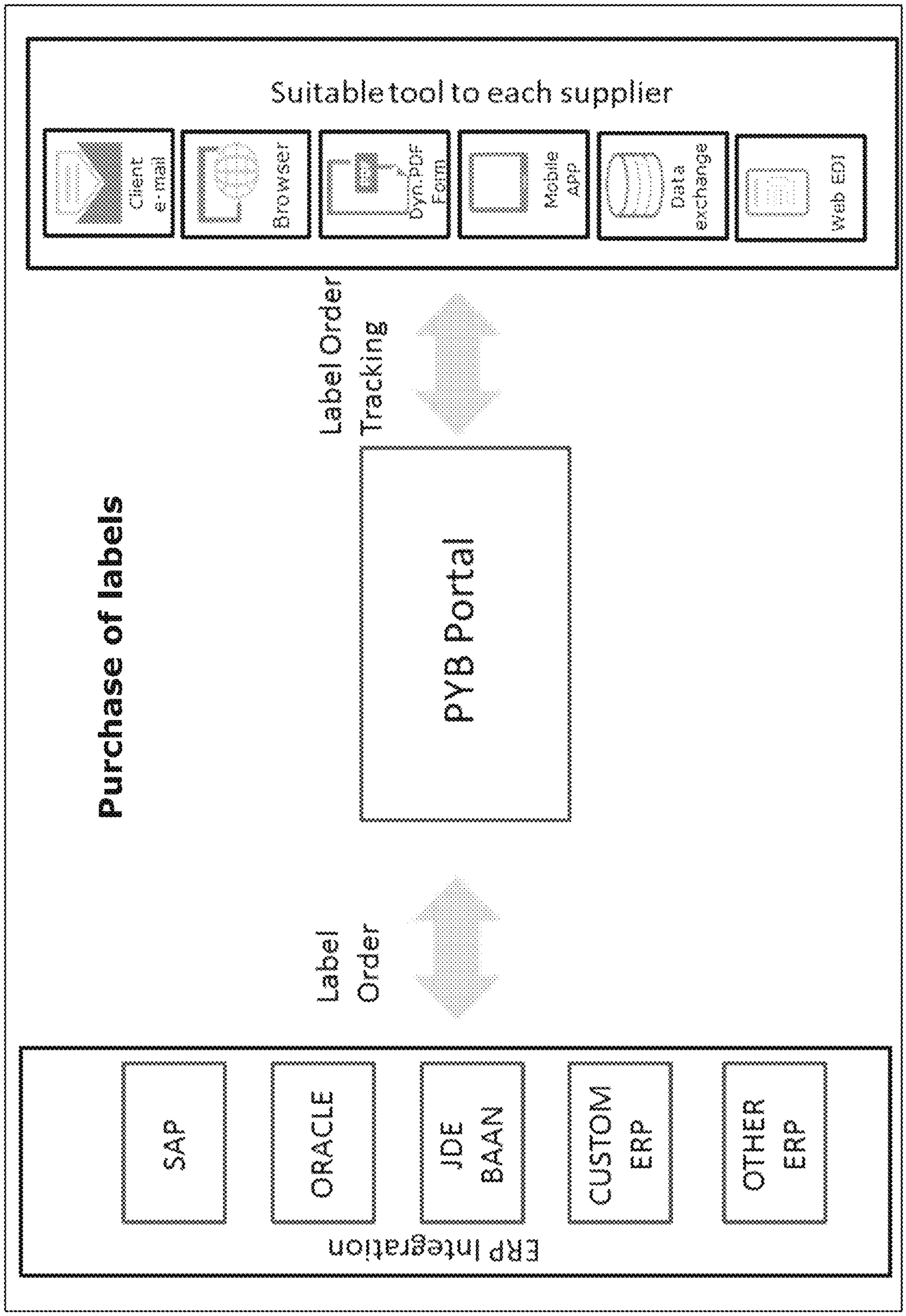

FIG. 10 shows the interface between the ERP systems of the client and the portal PYB.

Figure 11:
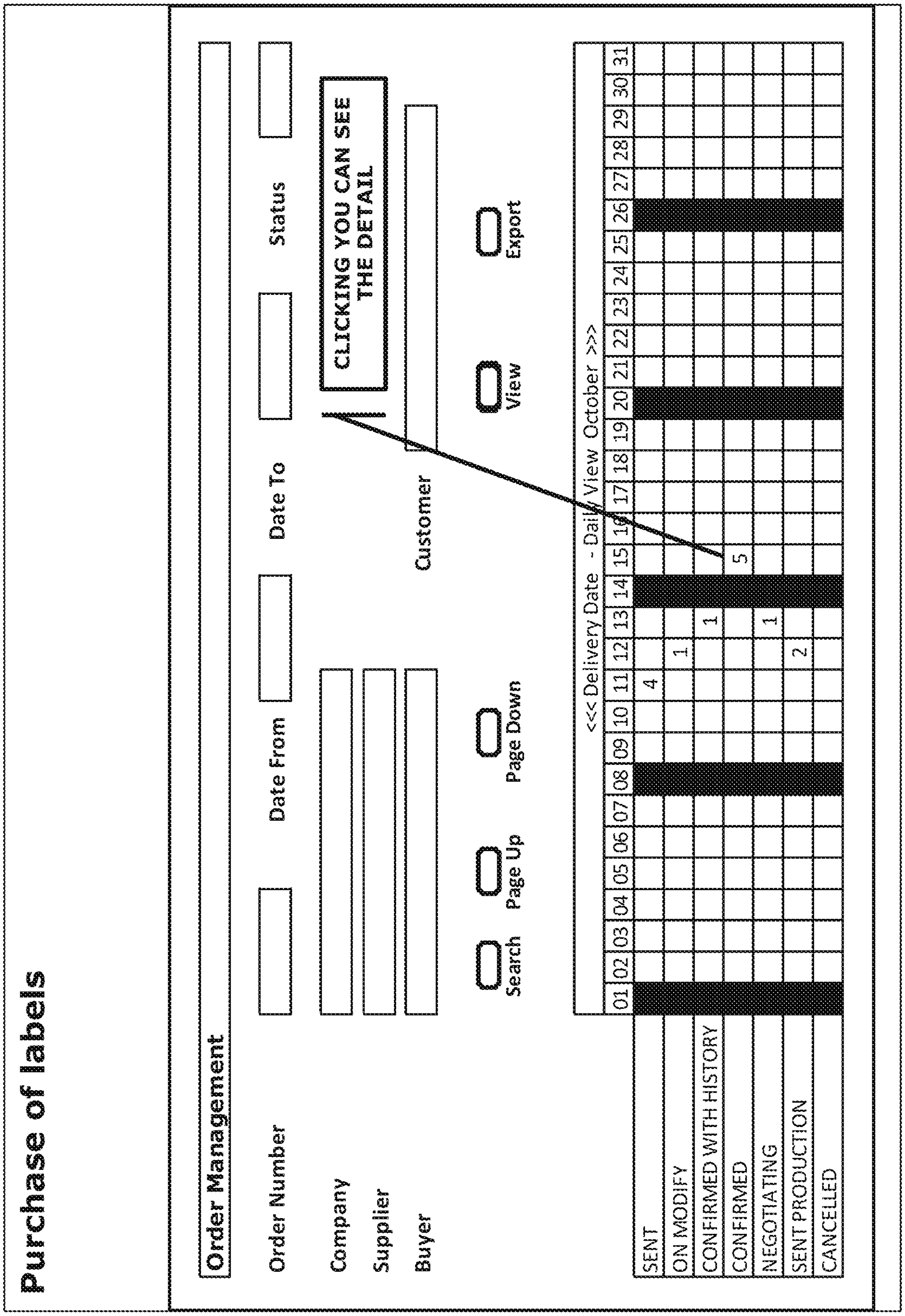

FIG. 11 shows the progress of the order on the dashboard portal PYB.

Process Description Purchase of UWID Labels

1. The macro-process shows a link between the job order and the printing of UWID labels: The job order contains the following information:
   - a. Company code
   - b. Brand
   - c. Requesting office
   - d. Producer language code
   - e. Job order code
   - f. Number of the vendor, i.e., the receiver of label print orders (only one supplier for each job order)
   - g. Description of the supplier/company's name
   - h. Item data:
     - i. Item/model
     - ii. Item description (producer language)
     - iii. Item description in English
     - iv. Label types (they can be more than one for each job order):
       - Bar code (mandatory)
       - QRCode (optional)
       - RFID (optional)
     - v. Number of items to be produced
     - vi. Mark-up %
2. Main steps of the macro-process "Purchase of UWID labels".

Generation of UWID label orders
   - a. The Planning Department places the print order of UWID labels and sends it to the printing-house (often external to the company).
   - b. The order is issued by email and sent to the printing-house and to an internal body; otherwise, it is assumed to use a portal from which the printing-house can perform the download of the order. The download from the portal can also be performed more than once. During the download process, an email is sent to the order sender.
   - c. According to another assumption, UWID label orders are generated during a batch phase.
   - d. Attributes of UWID label orders:
     - i. Company code
     - ii. Brand
     - iii. Requesting office
     - iv. Producer language code
     - v. Job order code
     - vi. Number of the vendor, i.e., the receiver of label print orders (only one supplier for each job order).
     - vii. Item data (it can be more than one for each job order)
       - A. Item/model
       - B. Description of the supplier/company's name
       - C. Item description (producer language)
       - D. Item description in English
       - E. Label types:
         - Bar code (mandatory)
         - QRCode (optional)
         - RFID (optional)
       - F. Number of items to be produced
       - G. First progressive character of labels.
   - e. Numbering system of UWID labels UWID label key agreed:
     - i. Company code (4 numeric characters)
     - ii. Company progressive char. (9 numeric characters)
     - iii. It is assumed to use a 128 code (that is not an EAN code).
3. The order is generated on the ERP system of the Company, posted on the portal PYB (the order is in Sent status) and sent to the supplier via email structured.

The production office through the portal PYB can control the evolution of the orders of labels UWIB.

The status of orders placed on the portal PYB can be the following value:

| Status order | Description |
|---|---|
| Sent | Sent to supplier, the orders is in response from the supplier |
| On Modify | The supplier is changing the order |
| Negotiating | Orders in negotiation |
| Confirmed with modify | Order modified and confirmed by supplier |
| Confirmed | Order confirmed by supplier |
| Sent production | The supplier has sent the label to the production |
| Cancelled | Orders cancelled |

Figure 12:
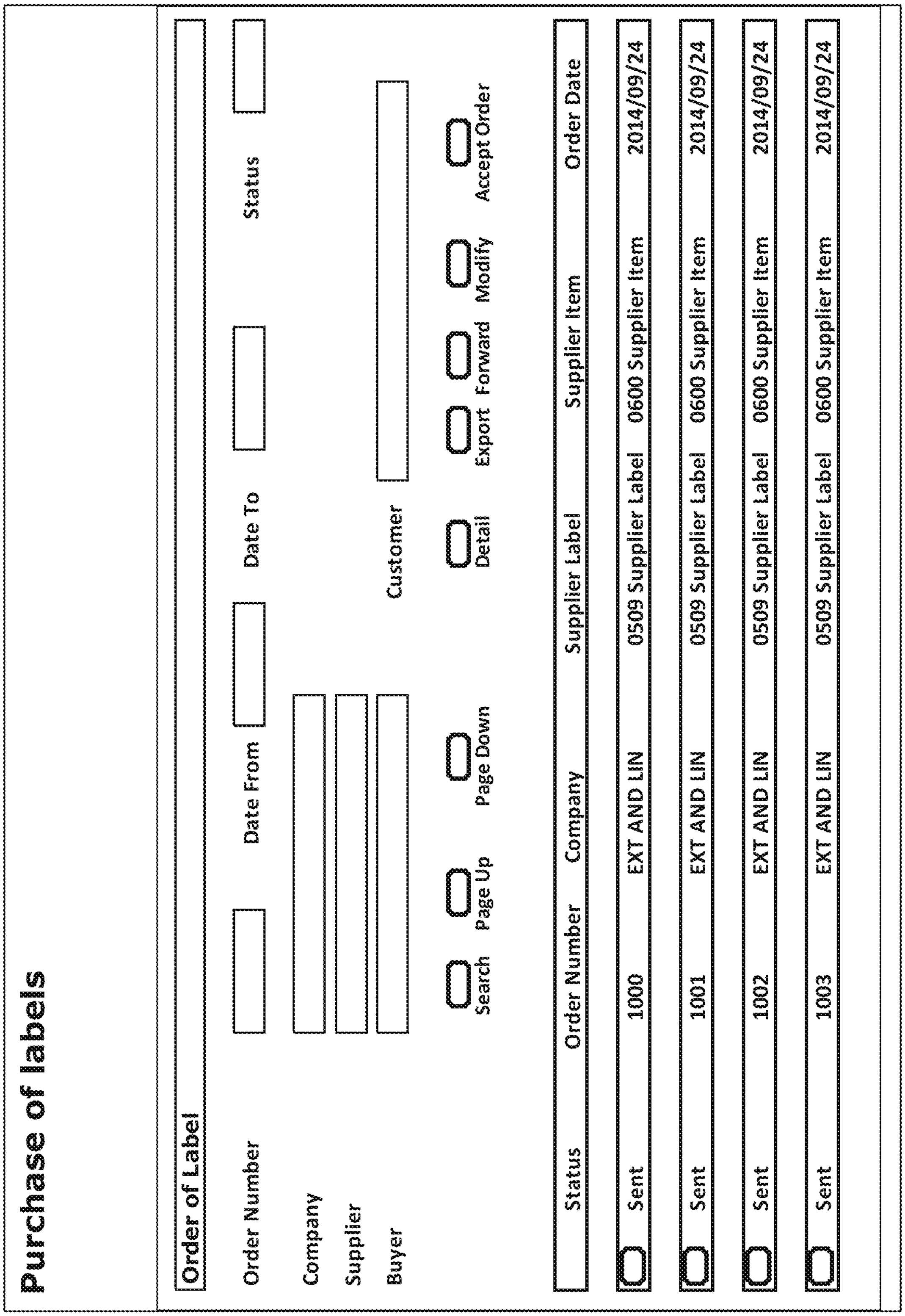

FIG. 12: The operator of the company can see the list of orders, and see their evolution.

Confirmation of Receipt of UWID Label Orders

Figure 13:
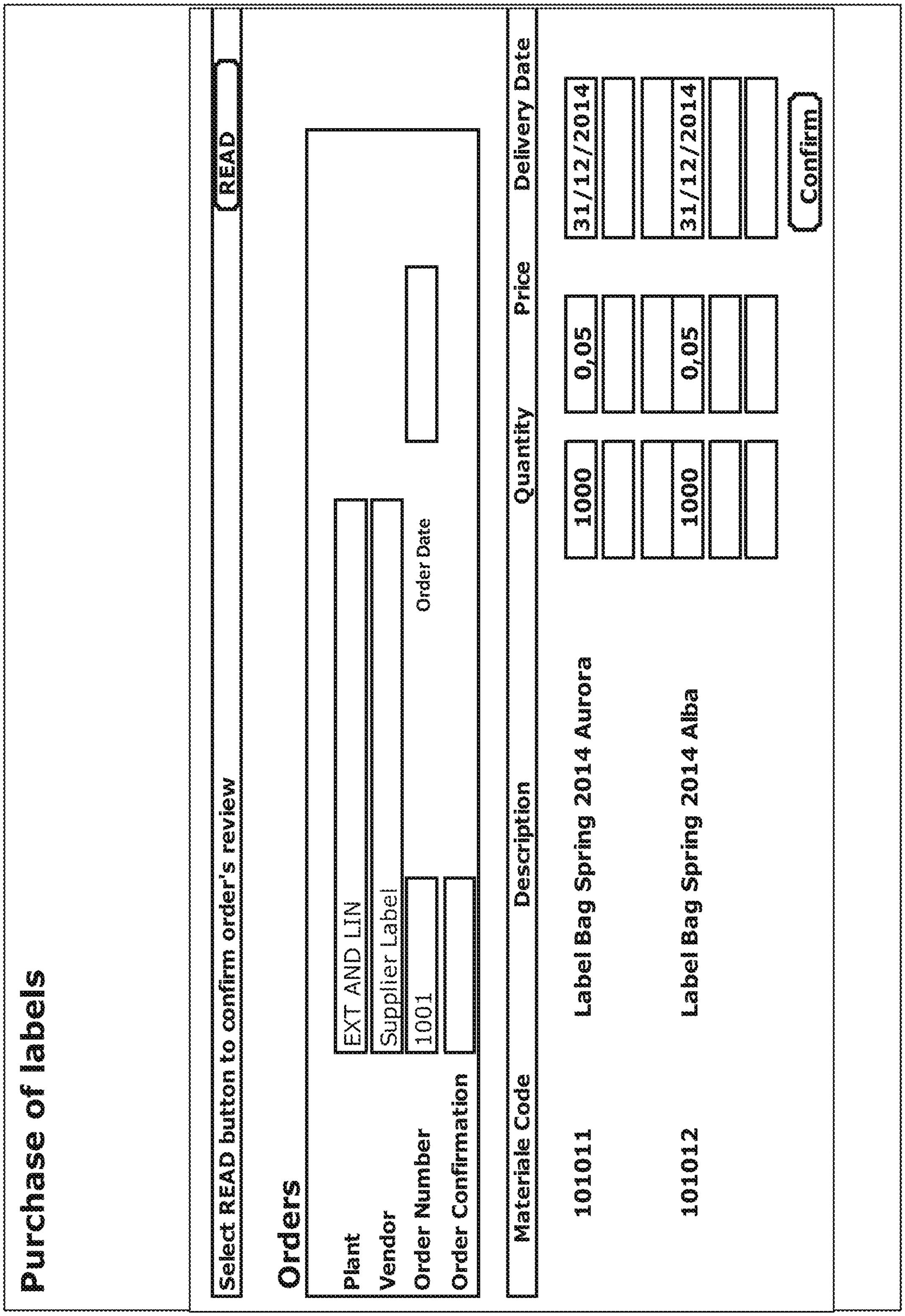

1. The process related to the confirmation of order receipt by the printing-house can be performed by accessing a portal or through a structured email.
2. The functions of the portal are the same ones used by the company specially shaped for the supplier.
3. FIG. 13 is an example of the email structured that the vendor can use to accept orders received from the company.

Figure 14:
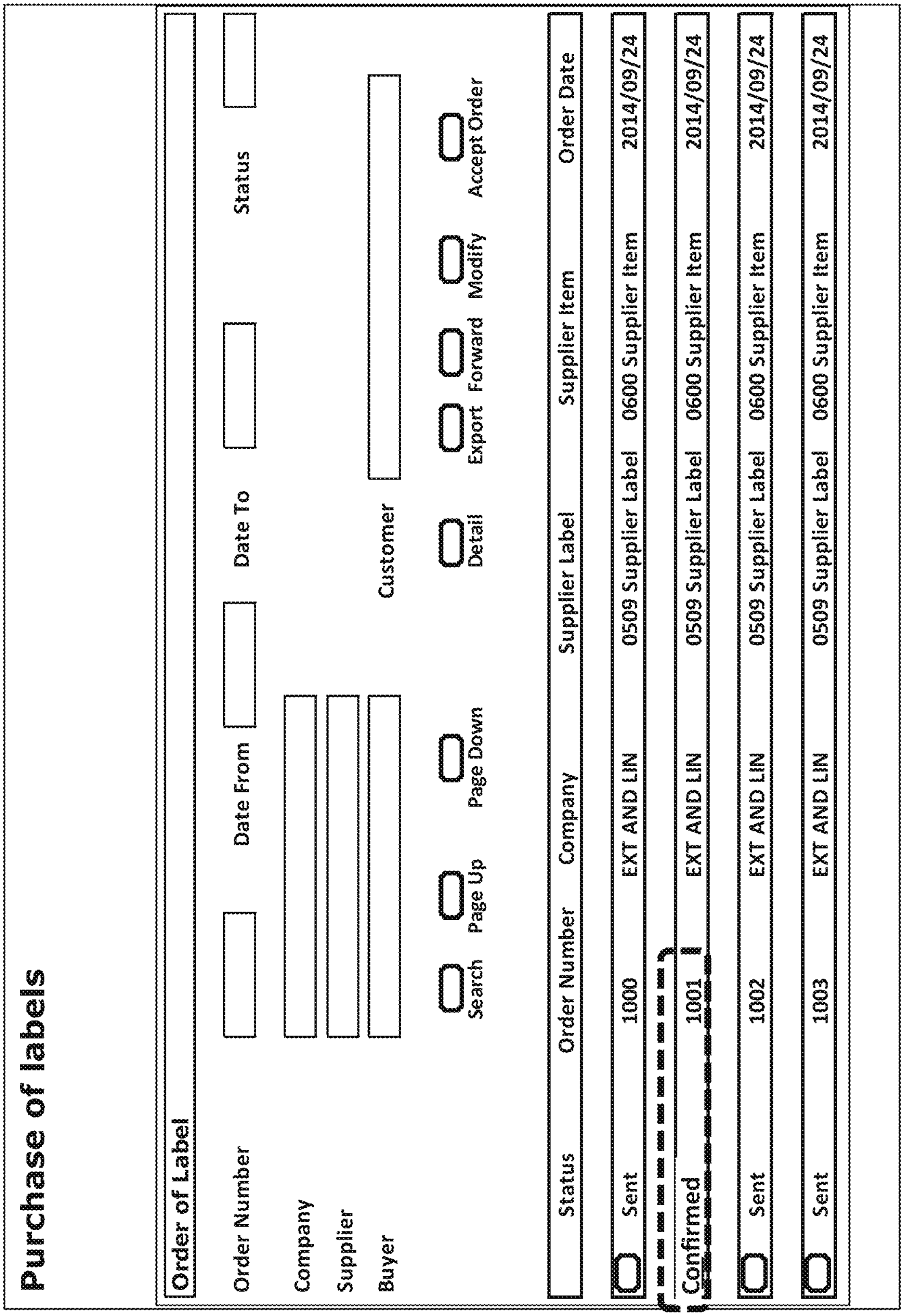

FIG. 14: On the PYB Portal the order has status "Confirmed".

Printing of UWID Labels

1. The printing-house prints the labels according to the instructions received in the order.
2. The printing of labels is supported through a PYB function (that can be used only by users internal to the producer), the function produces a flow of labels to be printed.

Packaging of UWID Labels

1. The packaging of labels is performed according to the instructions received in the order.
2. The packaging of UWID labels is not supported through any PYB function.

Transmission of UWID Labels to Factories

Figure 15:
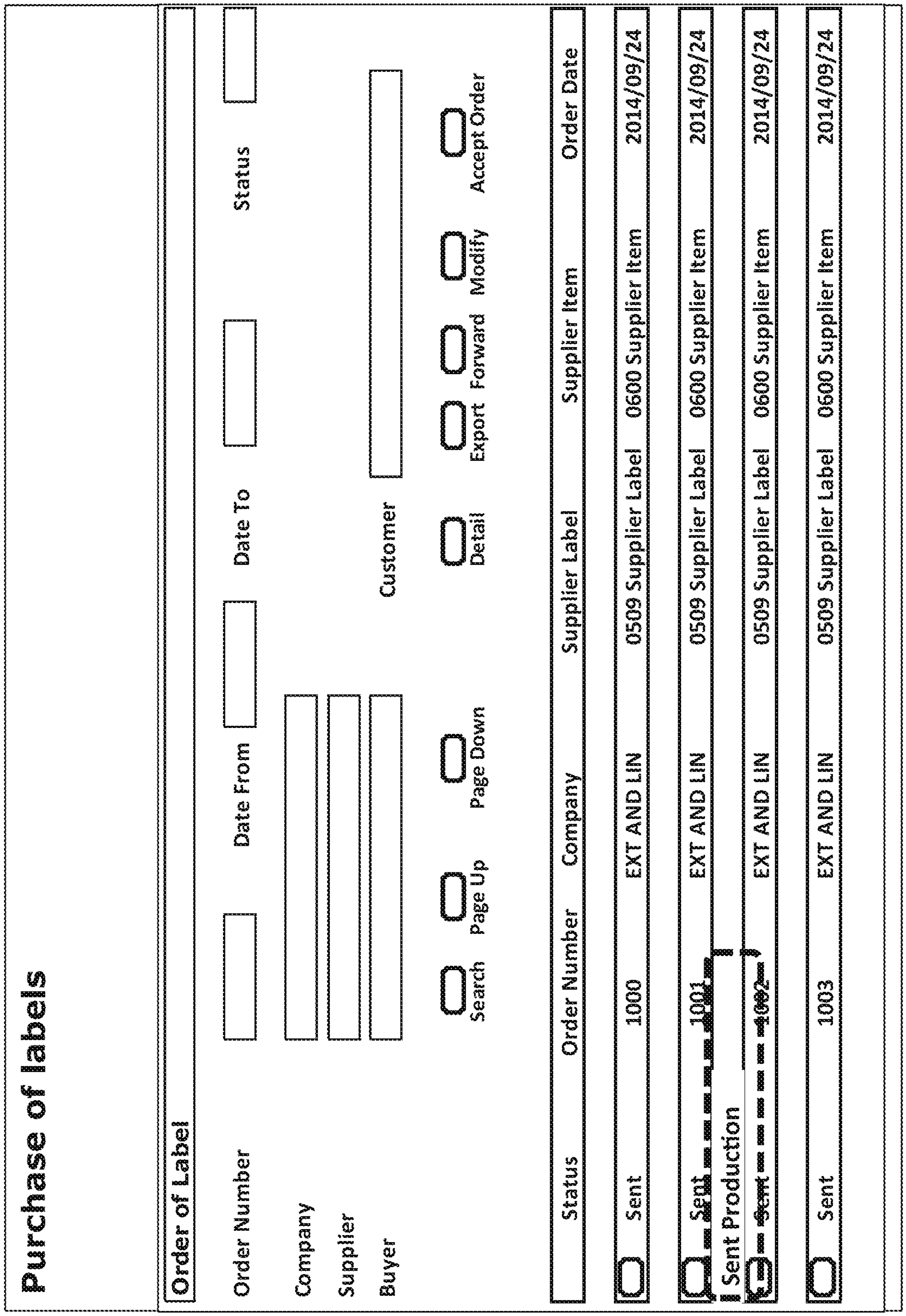

1. The transmission of UWID labels to factories (internal or external to the producer) is performed according to the instructions received in the order.
2. It is assumed to use an online PYB function (portal), from which the printing-house can notify the producer of the transmission of labels to factories (the order has status equal "Sent production" as showed in FIG. 15).

UWID labels are not traced during the transfer from the printing-house to the Production; they are traced only upon the arrival of the item at the warehouse or at the PoS (according to the configuration parameters defined in the PYB system).

Referring to FIG. 9, the above-described process for purchase of UWID labels is illustrated in the following steps:

Step 901: Generation of label orders
Step 902: Scenario selection
Step 902: Confirmation of order receipt
Step 904: Confirmation of order receipt (structured mail)
Step 905: Printing of UWID Label
Step 906: Packaging of UWID Label
Step 907: Transmission of UWID labels to factories/production (confirmation of transmission at job order level)

2.2.2 Combination of UWID Labels with Items

Figure 16:
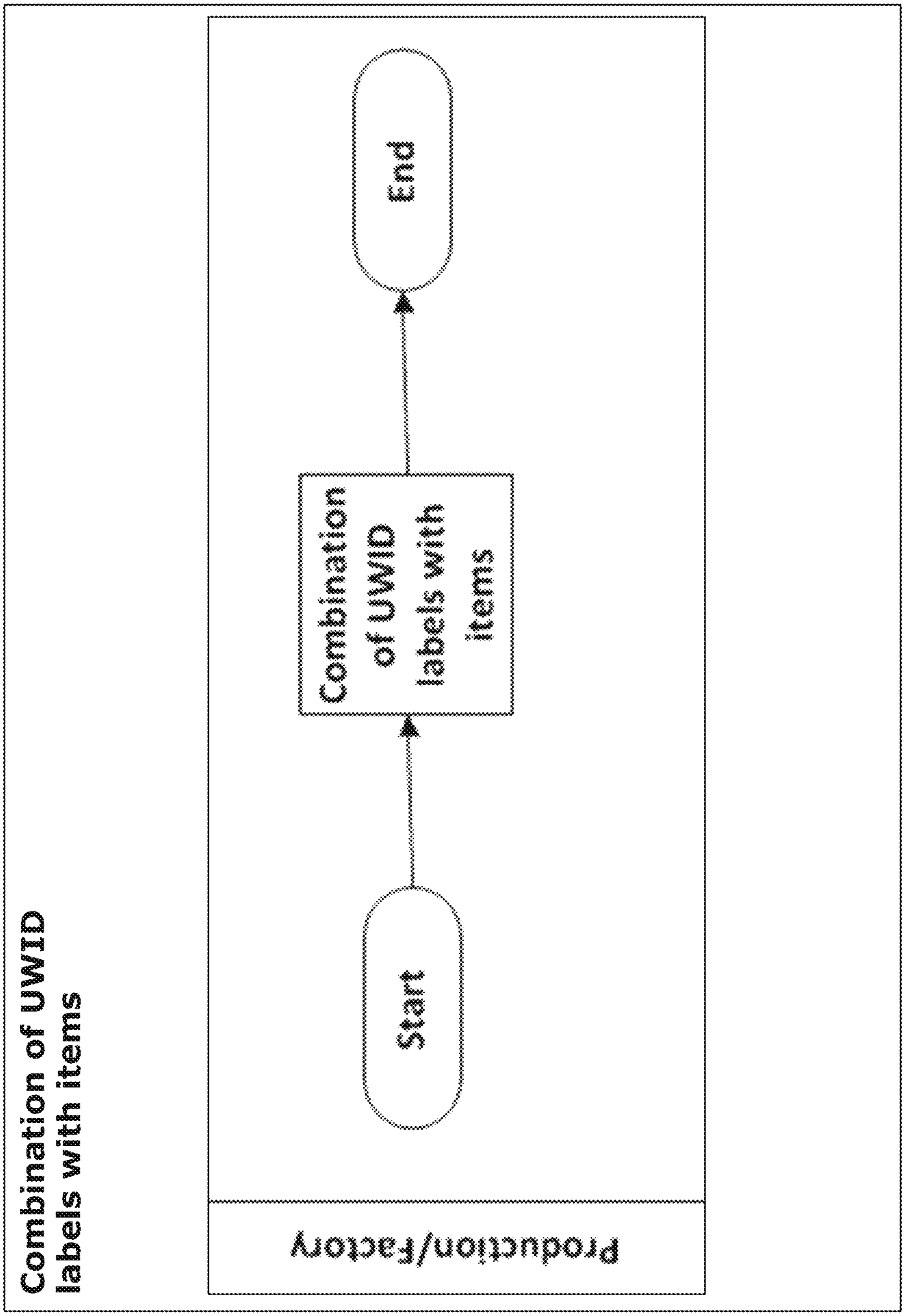
FIGS. 16-18 are additional process flow diagrams in accordance with preferred embodiments of the present invention.

FIG. 16: Process design: Combination of UWID labels with items.

The process related to the combination of UWID labels with items is not supported through any PYB function.

2.2.3 Shipping of Items to the Warehouse

Figure 17:
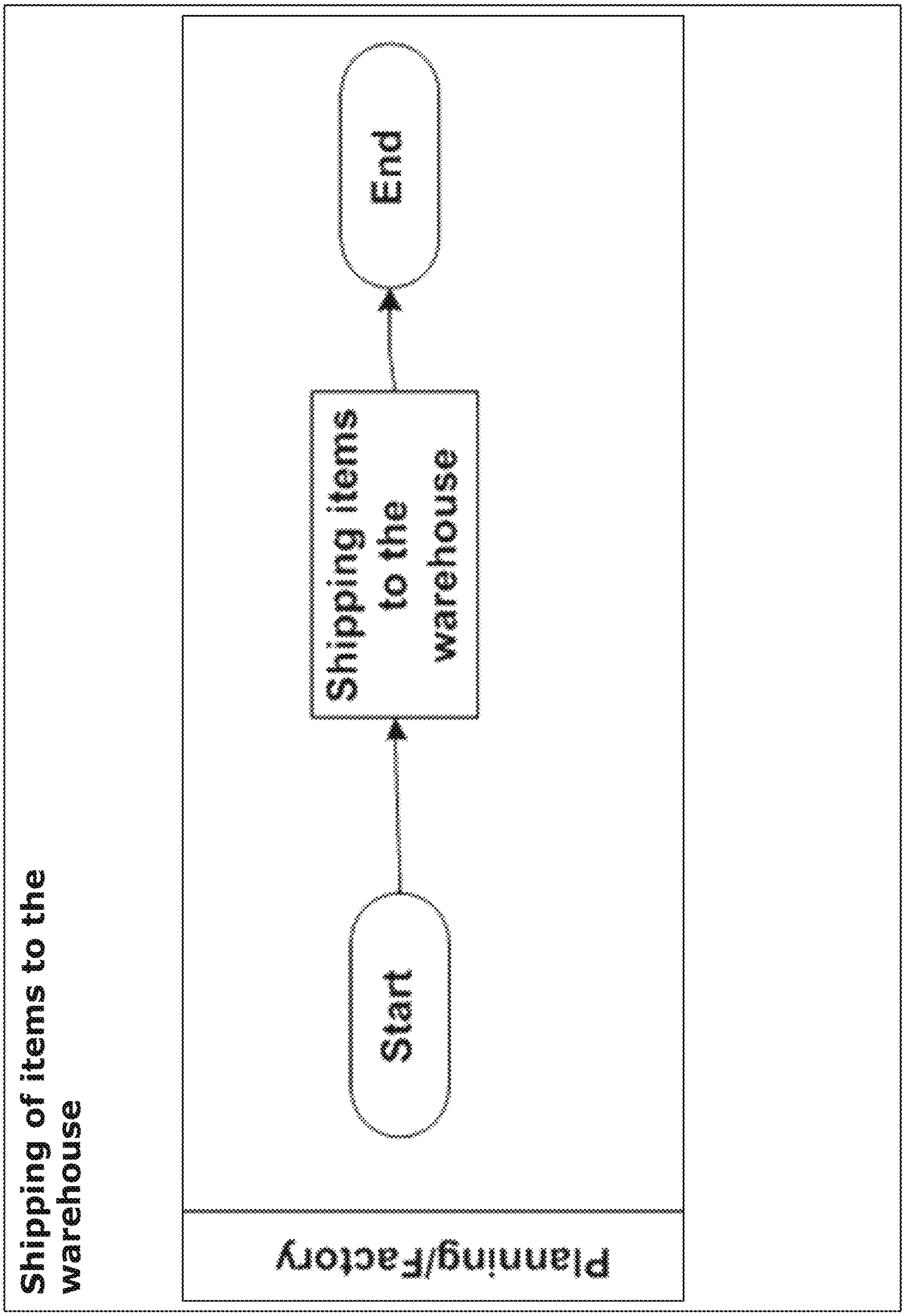

FIG. 17: Process design: Shipping of items to the warehouse.

The process related to the shipping of items to the warehouse is not supported through any PYB function.

Figure 18:
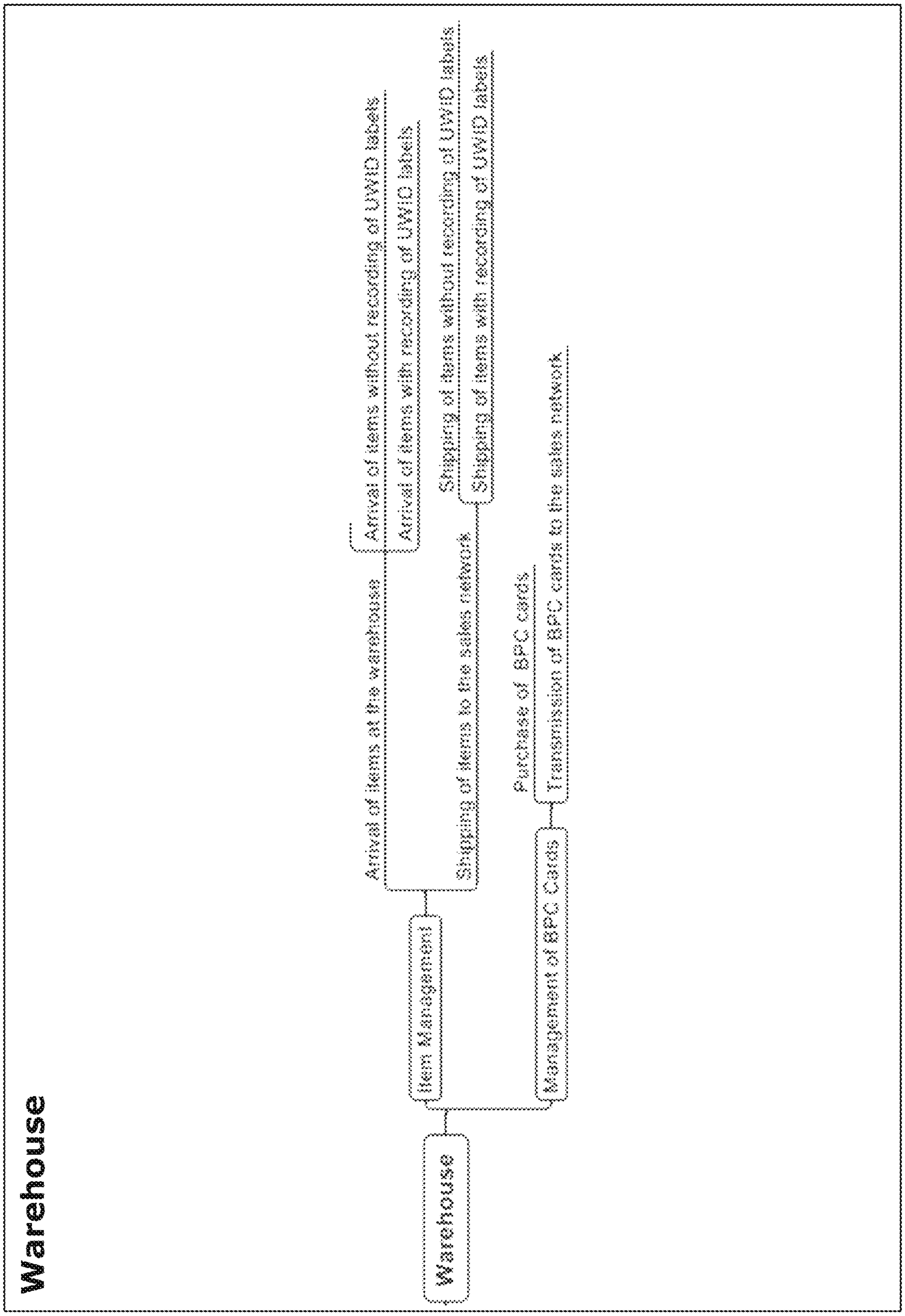

2.3 Warehouse (FIG. 18)

Macro-scheme of the Warehouse area processes 2.3.1 Management of Items

The paragraph "Management of items" deals with the entry of items at the warehouse and with the relevant shipping to the sales network. The processes related to the management of items within the warehouse are out of the scope of the PYB project.

2.3.1.1 Entry of Items at the Warehouse

PYB is integrated in the process of quality control (it can be carried out on a sample basis or more at mass level) or of counting of the goods received. The item receipt is managed in the pre-warehouse.

The tracing of UWID labels in the warehouse is an optional process; if the recording of the UWID label is not performed upon the arrival of the item at the warehouse, the first recording of the UWID label occurs at the PoS upon the item receipt.

2.3.1.1.1 Entry of Items at the Warehouse without Recording of UWID Labels

Figure 19:
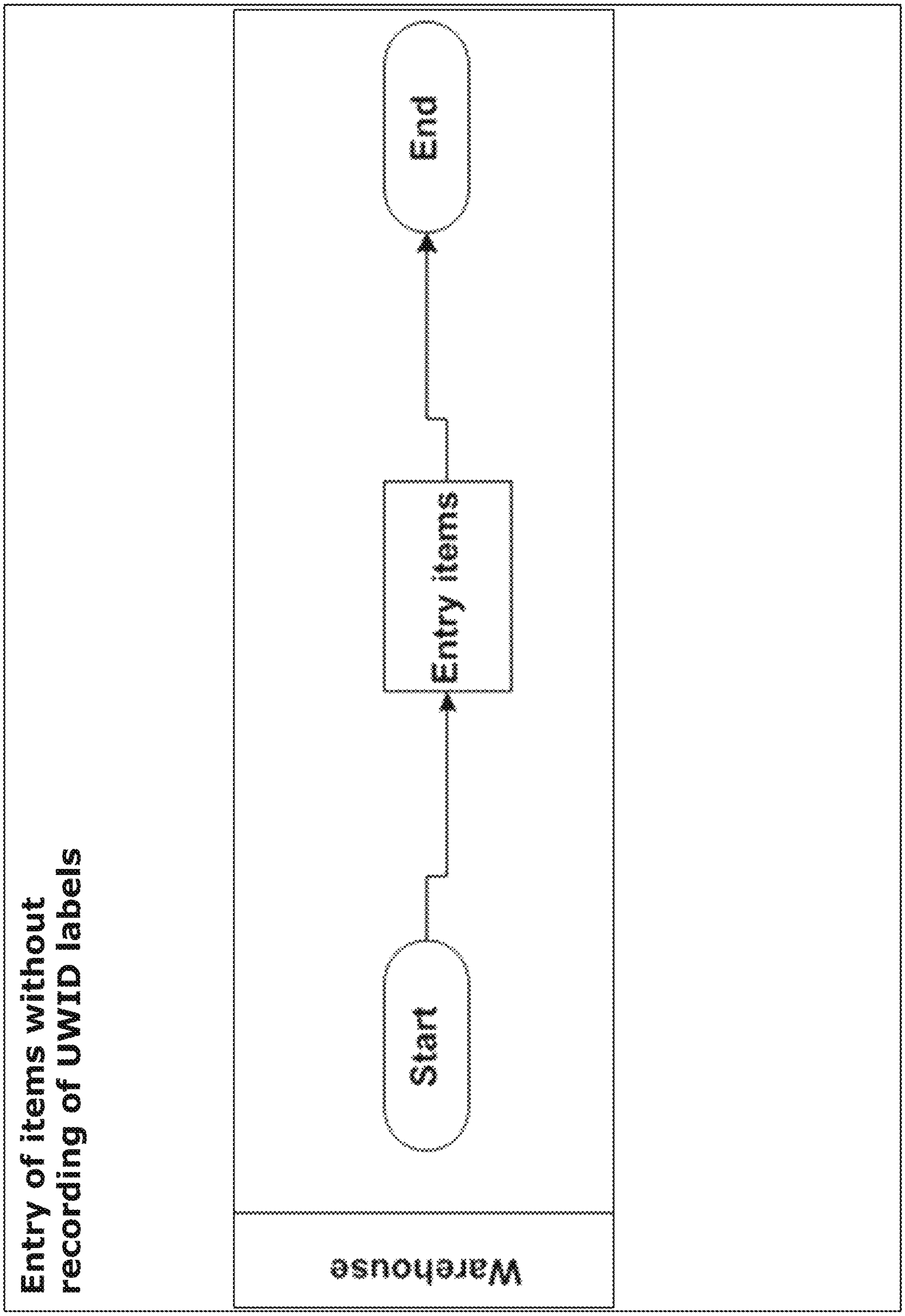
FIGS. 19-25 show a process for entry of items at a warehouse in accordance with preferred embodiments of the present invention.

FIG. 19: Process design

The process related to the entry of items without recording of UWID labels is not supported through any PYB function.

2.3.1.1.2 Entry of Items at the Warehouse with Recording of UWID Labels

Figure 20:
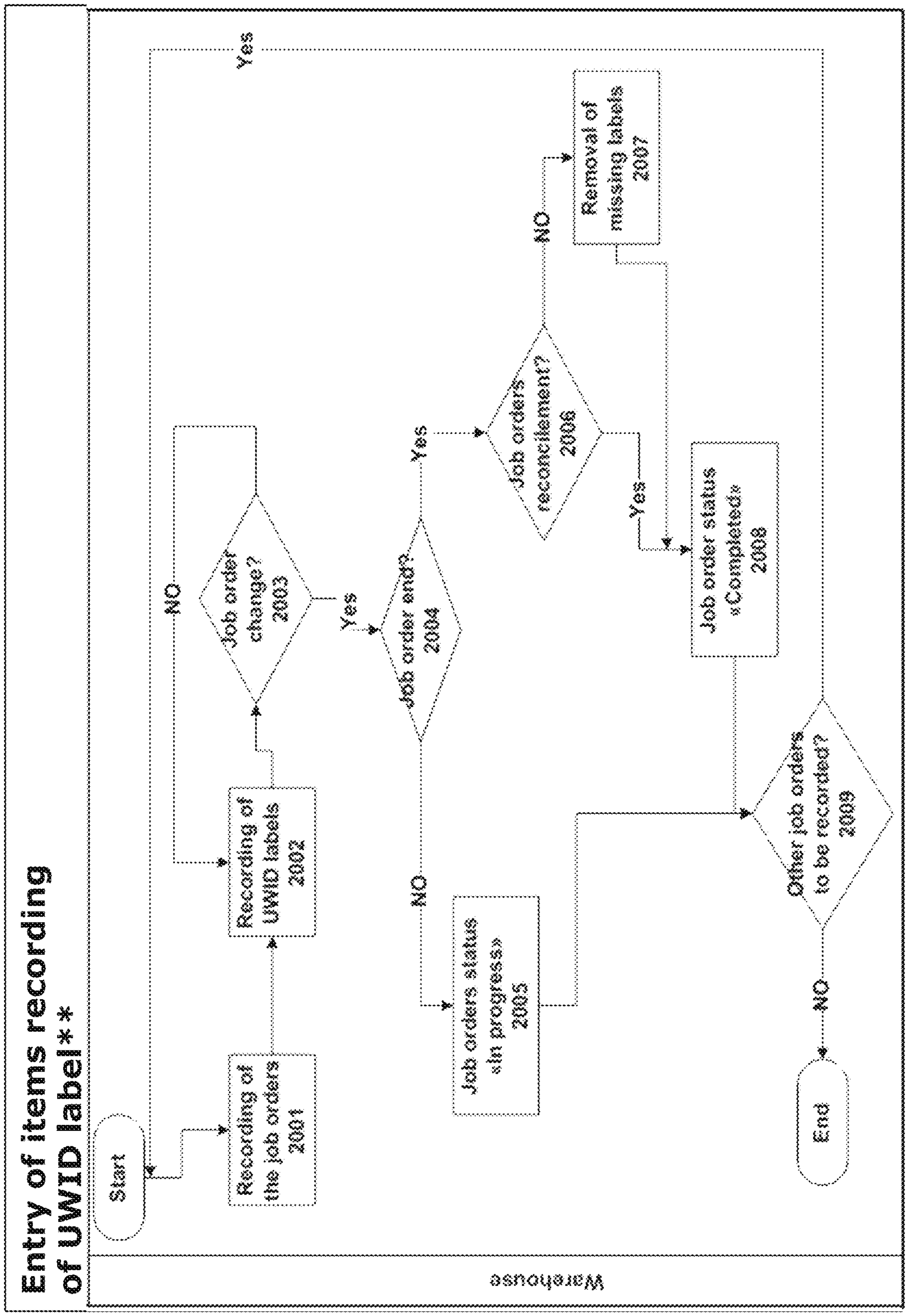
Figure 21:
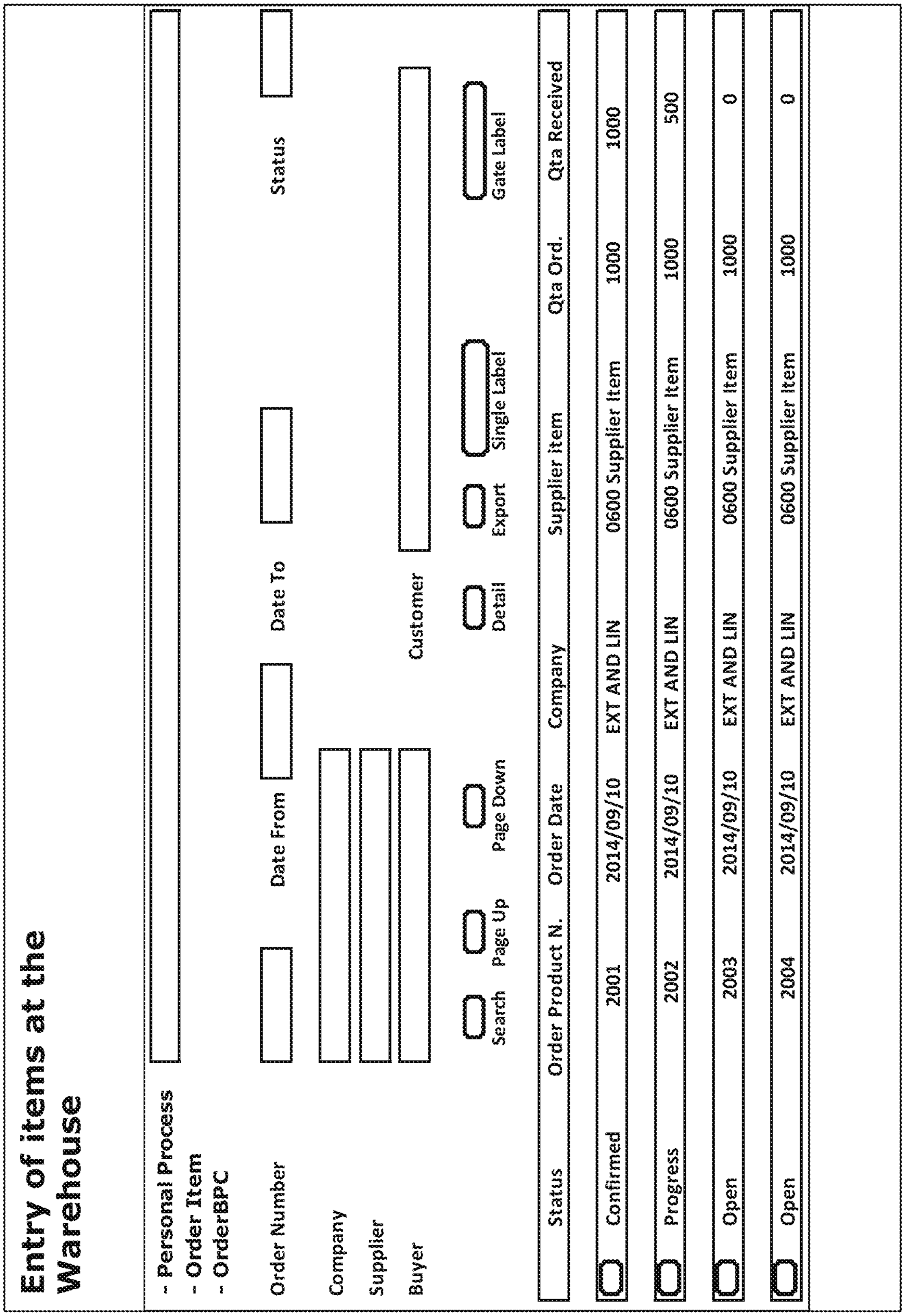

FIG. 20: Process design:

FIG. 21: The recording of UWID labels in the warehouse is combined with the management of the job order. For each of them, it is possible to distinguish the following:

1. Management related to the receipt of down payments on the job order (they can be more than one)
2. Balance of the job order
3. Final reconcilement of the job order
4. Upon the balance of the job order, any UWID labels not received are traced with the status: "Not received"

Entry article registration into the warehouse may be made by checking each single label (e.g., FIGS. 22 and 23), or by making massive control with appropriate registration equipment. (e.g., FIGS. 24 and 25).

Figure 22:
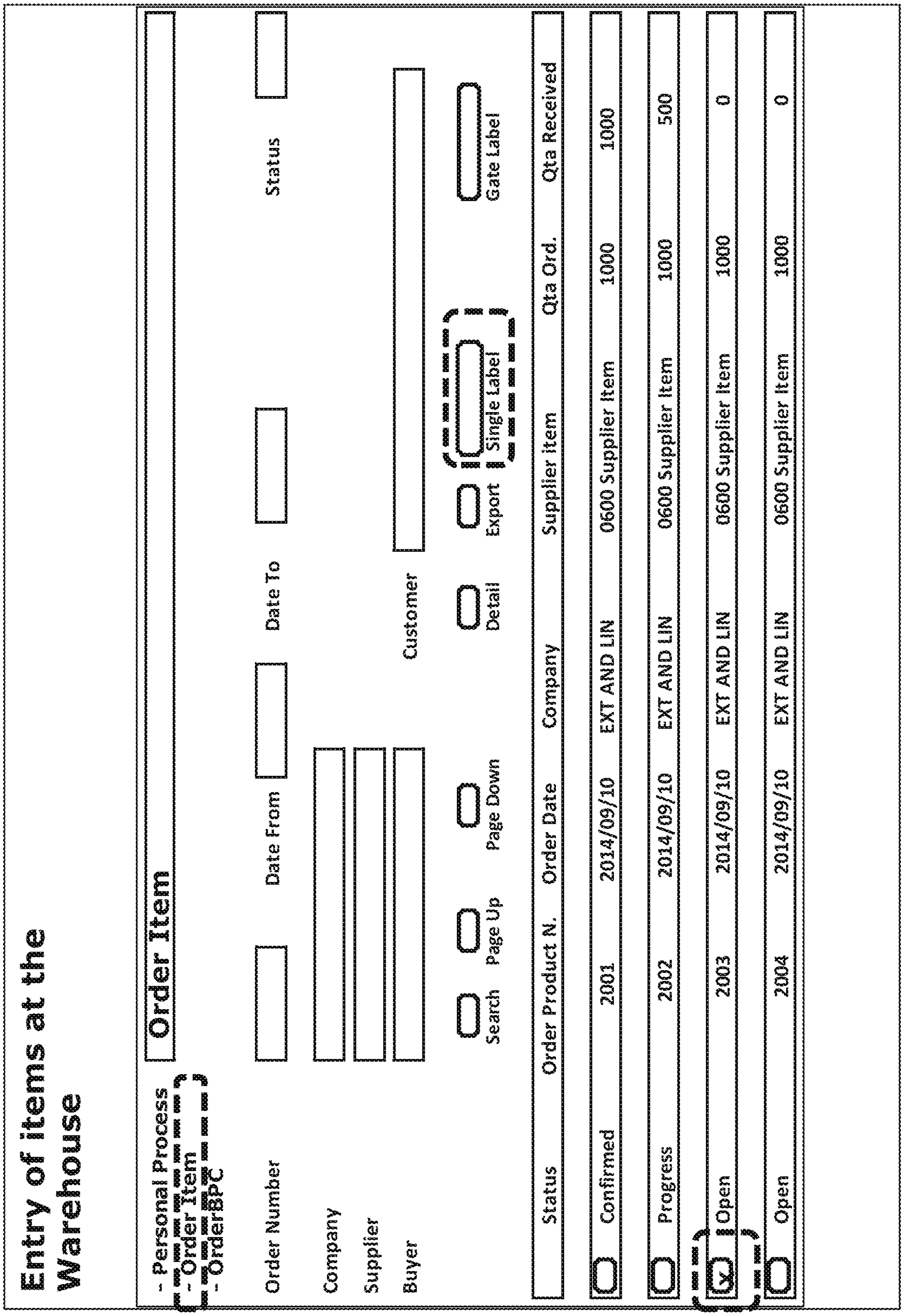
Figure 23:
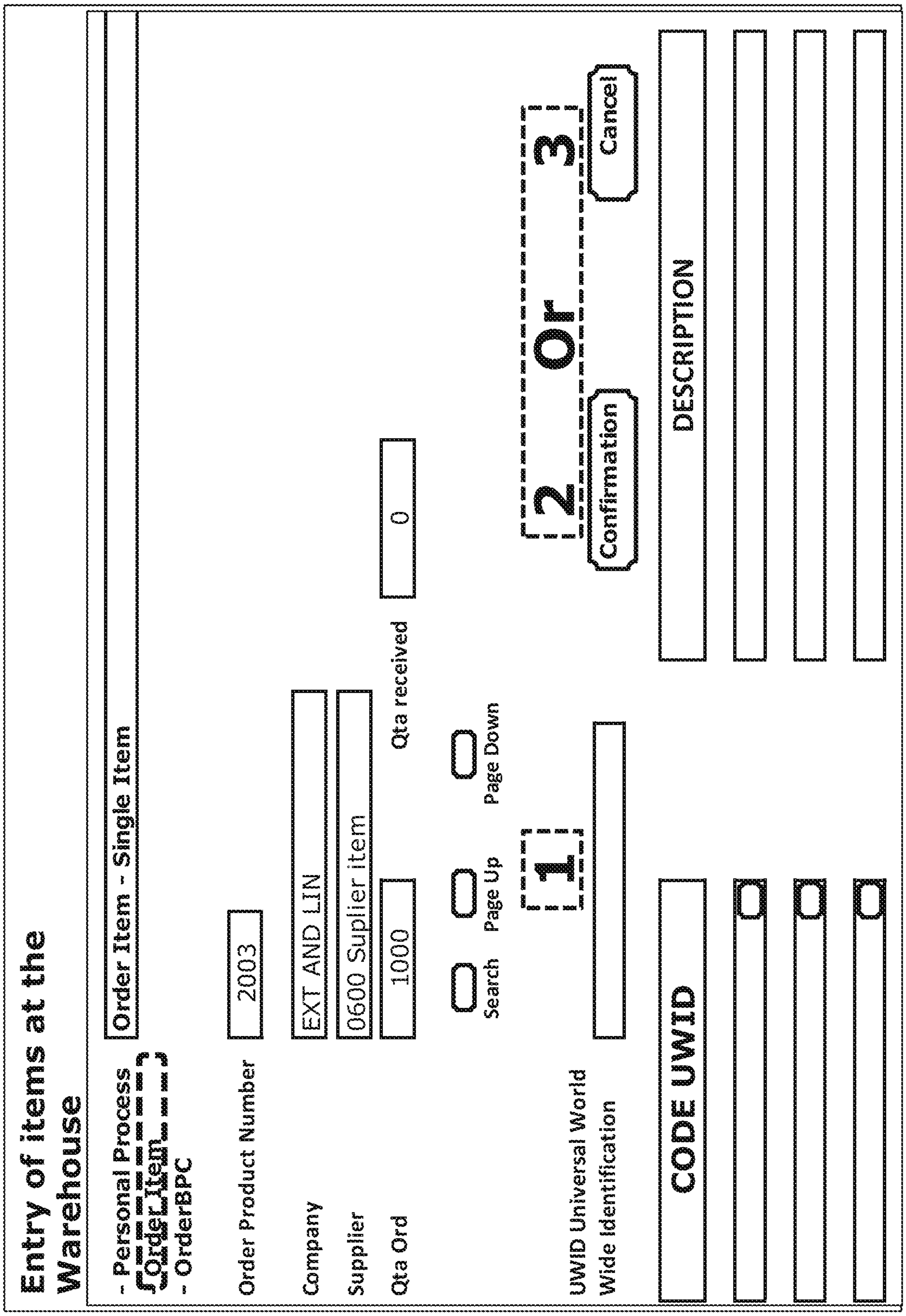

FIGS. 22 and 23: Registration single label

Figure 24:
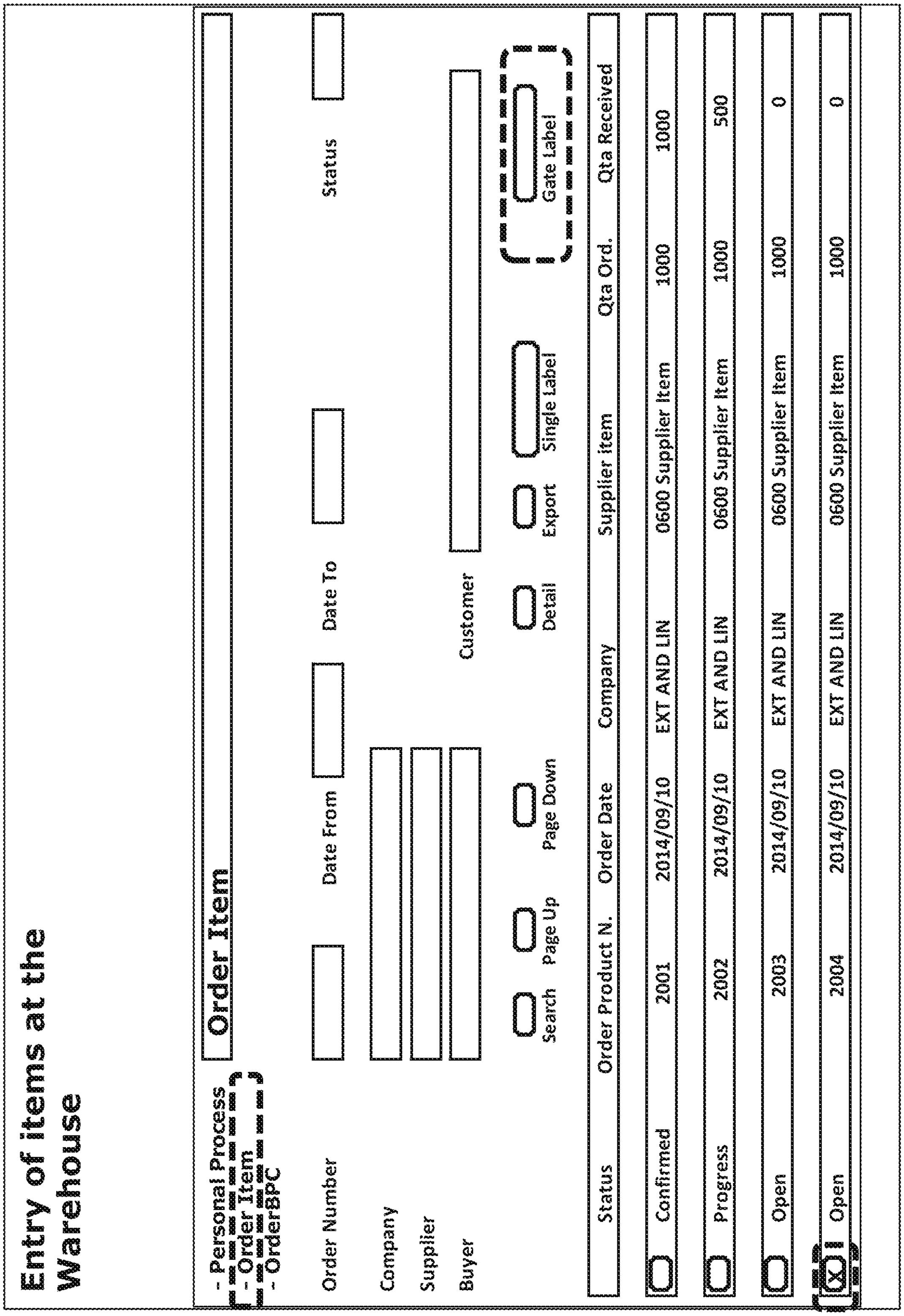
Figure 25:
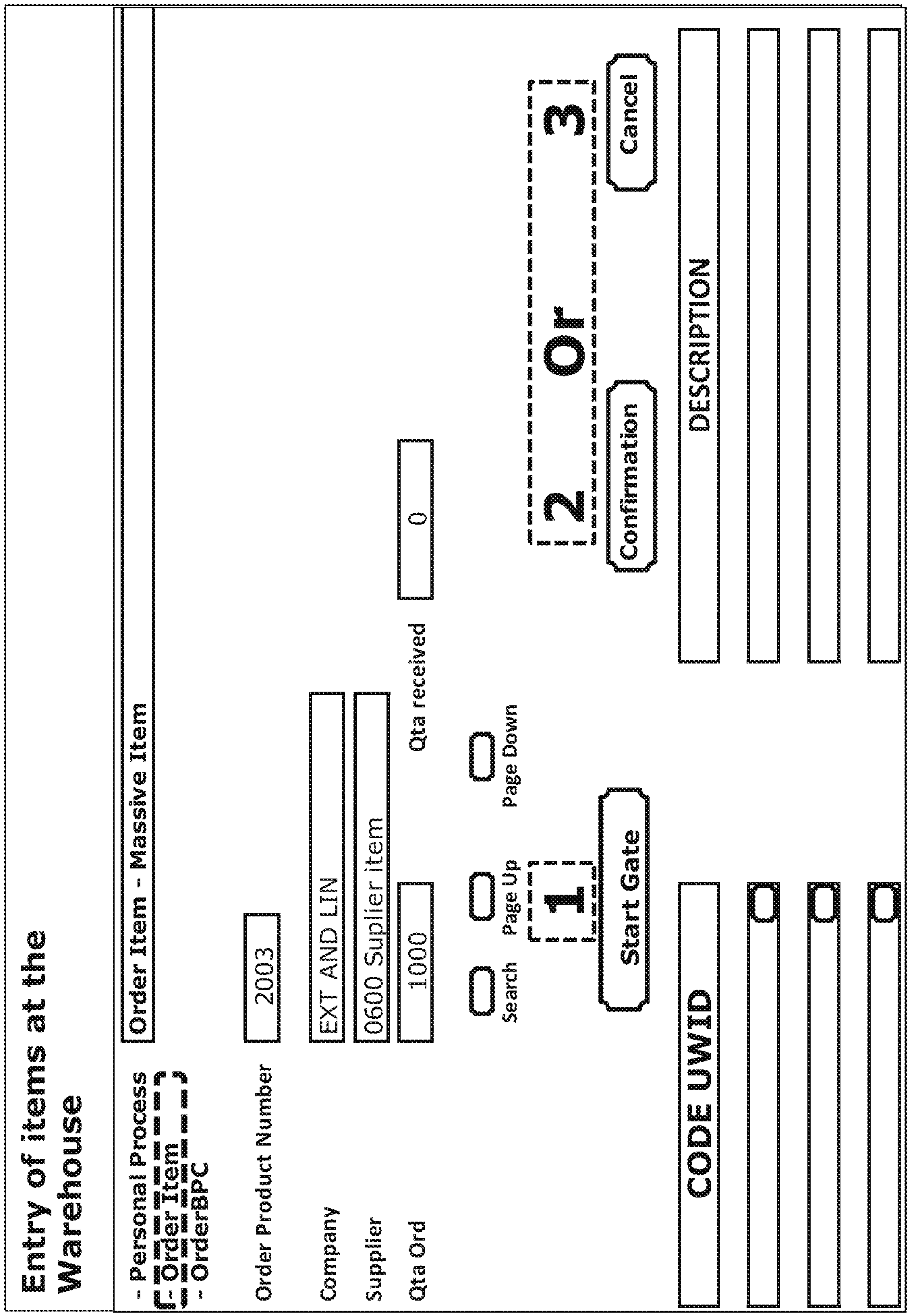

The operator selects the job number to which they are matched labels you want to record the entry into stock and then continues with the registration of the articles one at a time FIGS. 24 and 25: Registration using Gate RFID (Gate labels)

The operator selects the job number to which they are matched labels you want to record the entry into stock and then continues with the registration of the articles (most articles for each recording). Reading labels will be carried out through Gate RFID.

FIG. 24, 25

Referring to FIG. 20, the above-described process for entry of items recording of UWID labels is illustrated in the following steps:

Step 2001: Recording of the job orders
Step 2002: Recording of UWID labels
Step 2003: Job order change?
Step 2004: Job order end?
Step 2005: Job orders status <<In progress>>
Step 2006: Job orders reconcilement?
Step 2007: Removal of missing labels
Step 2008: Job order status <<Completed>>
Step 2009: Other job orders to be recorded?

2.3.1.2 Shipping of Items to the Sales Network

As for the shipping of items to the sales network (distributors/PoS), the following two possibilities have been identified:

1. The first possibility is less likely than the second one and provides quantity-based information at item/model level only (see process Shipping of items without recording of the UWID code)

2. The second possibility is more detailed and entails the recording of the UWID codes sent (see process Shipping of items with recording of the UWID code)

The status of shipping notes placed on the portal PYB can be the following value:

| Status order | Description |
|---|---|
| Sent | Sent to distributors/PoS |
| By rec.label | By record label |
| Recording label | registration process labels in progress |
| In receipt | the receiving process is in progress |
| Receipt | Received |
| Receipt incomplete | Received there are differences between data sent and received data |
| Cancelled | Shipping notes cancelled |

Figure 26:
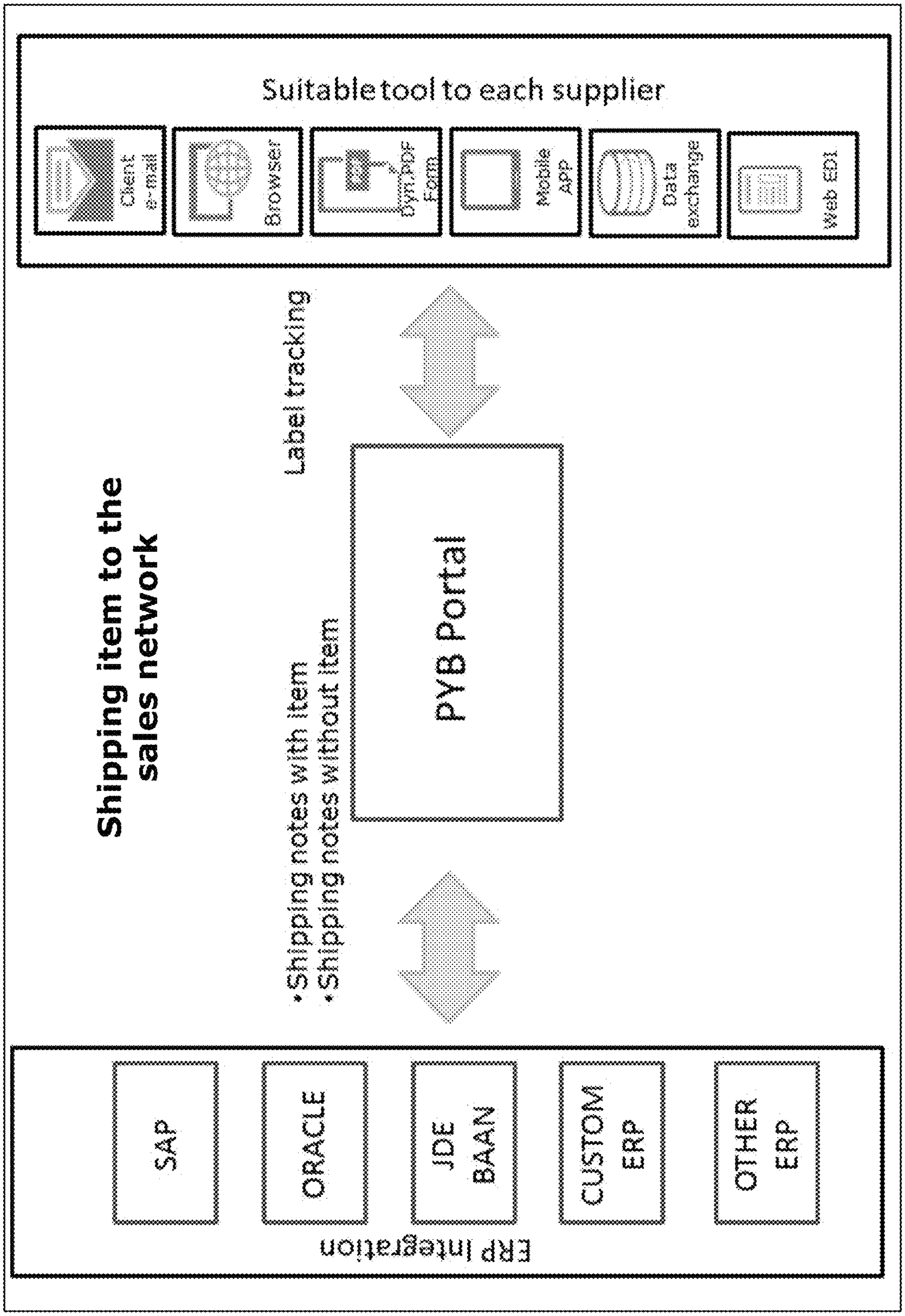
FIGS. 26-30 show a process for shipping items to a sales network in accordance with preferred embodiments of the present invention.

FIG. 26 shows the panel orders that the company sees when accessing the portal PYB.

2.3.1.2.1 Shipping of Items without Recording of UWID Labels

Figure 27:
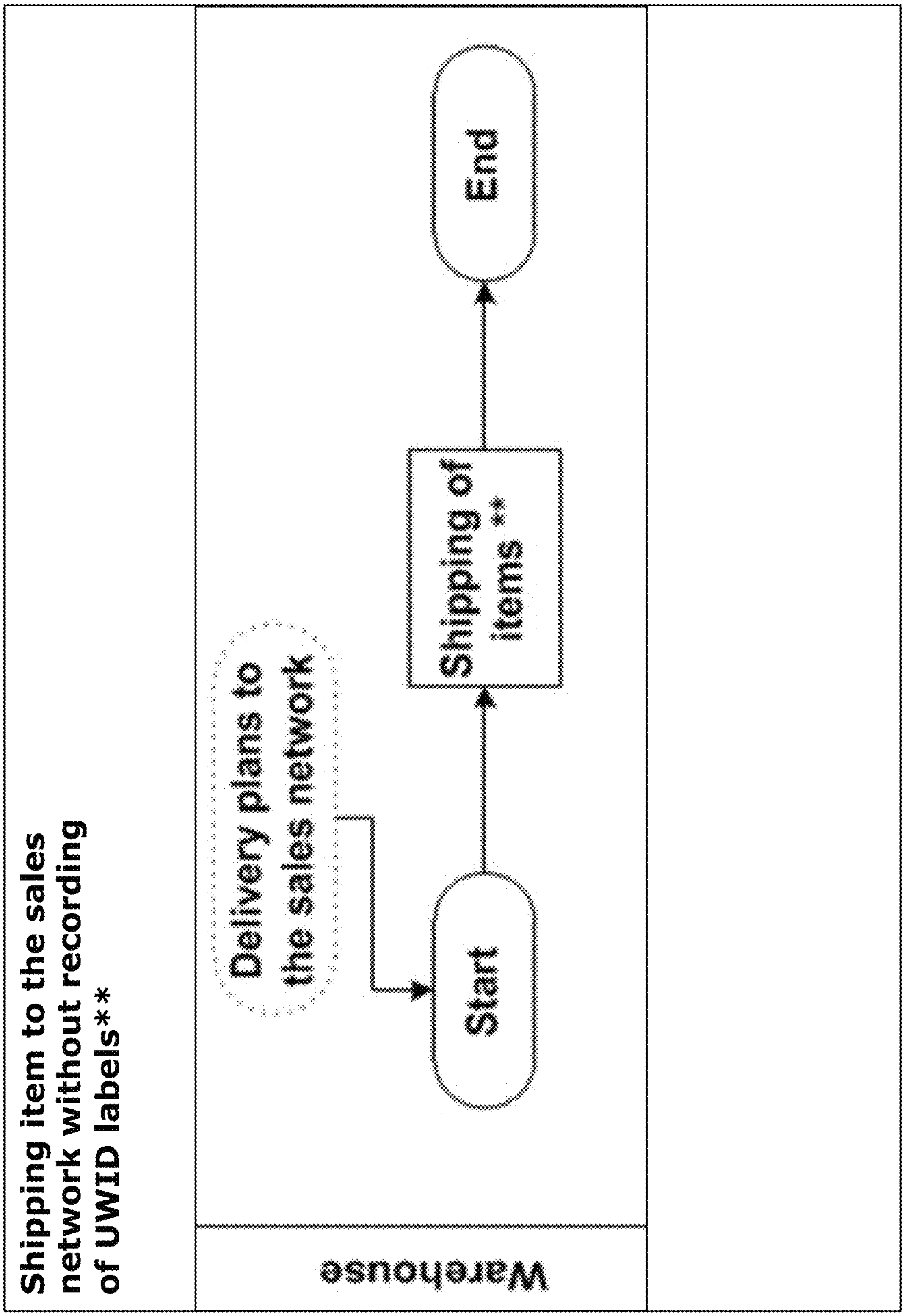

FIG. 27: Process design

For each PoS/logistic distributor, the information about shipped goods by item/model with the specification of a document number (transport document, packing list or others), the relevant date and number (Planning of shipping processes) is sent from the producer's central system to the PYB system. Such information is stored in a PYB archive to be accessed if queries are required.

2.3.1.2.2 Shipping of Items with Recording of UWID Labels

Figure 28:
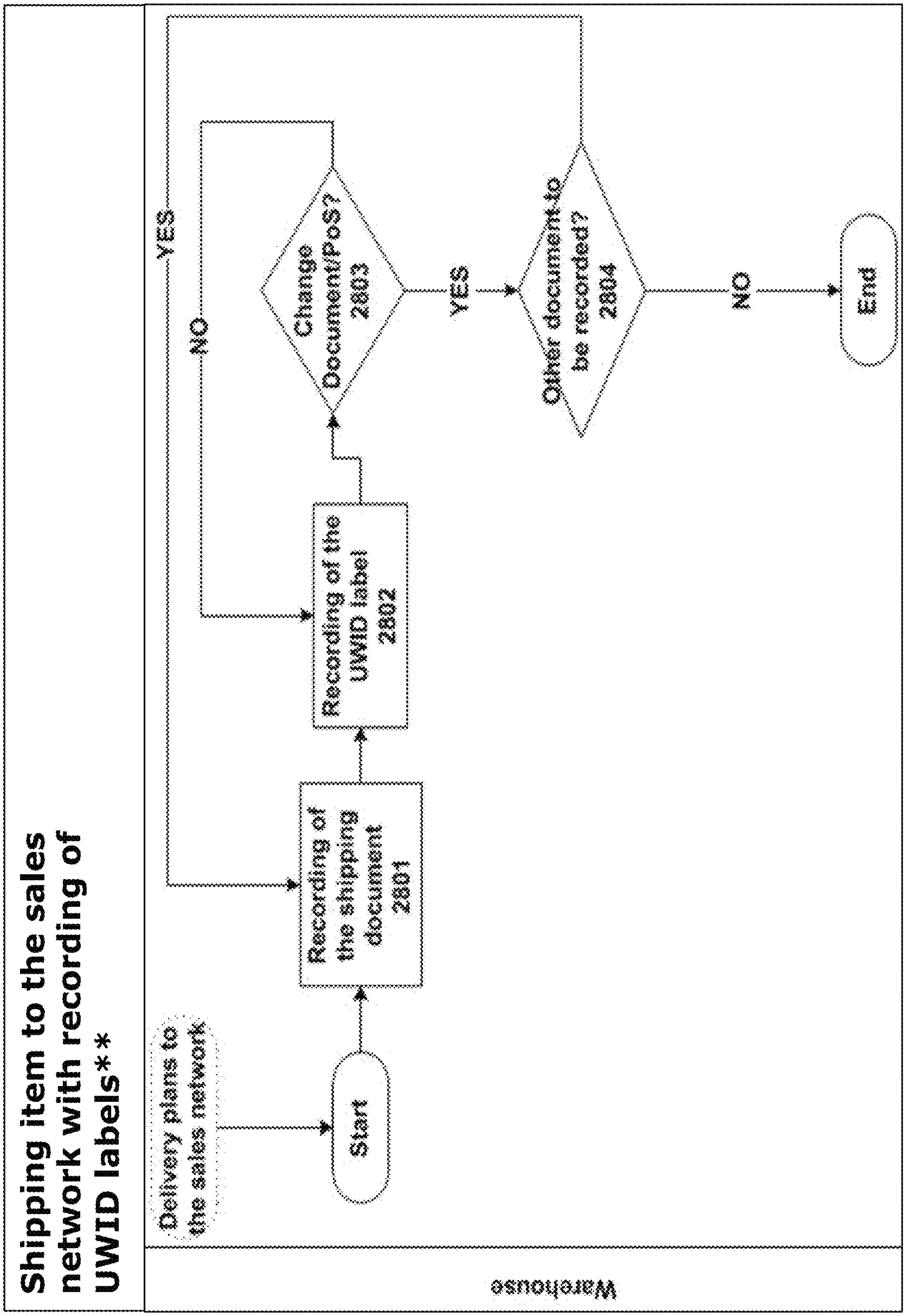

FIG. 28: Process design

The recording of UWID labels during shipping can be performed in warehouses that are manually managed, but not in automated warehouses.

Figure 29:
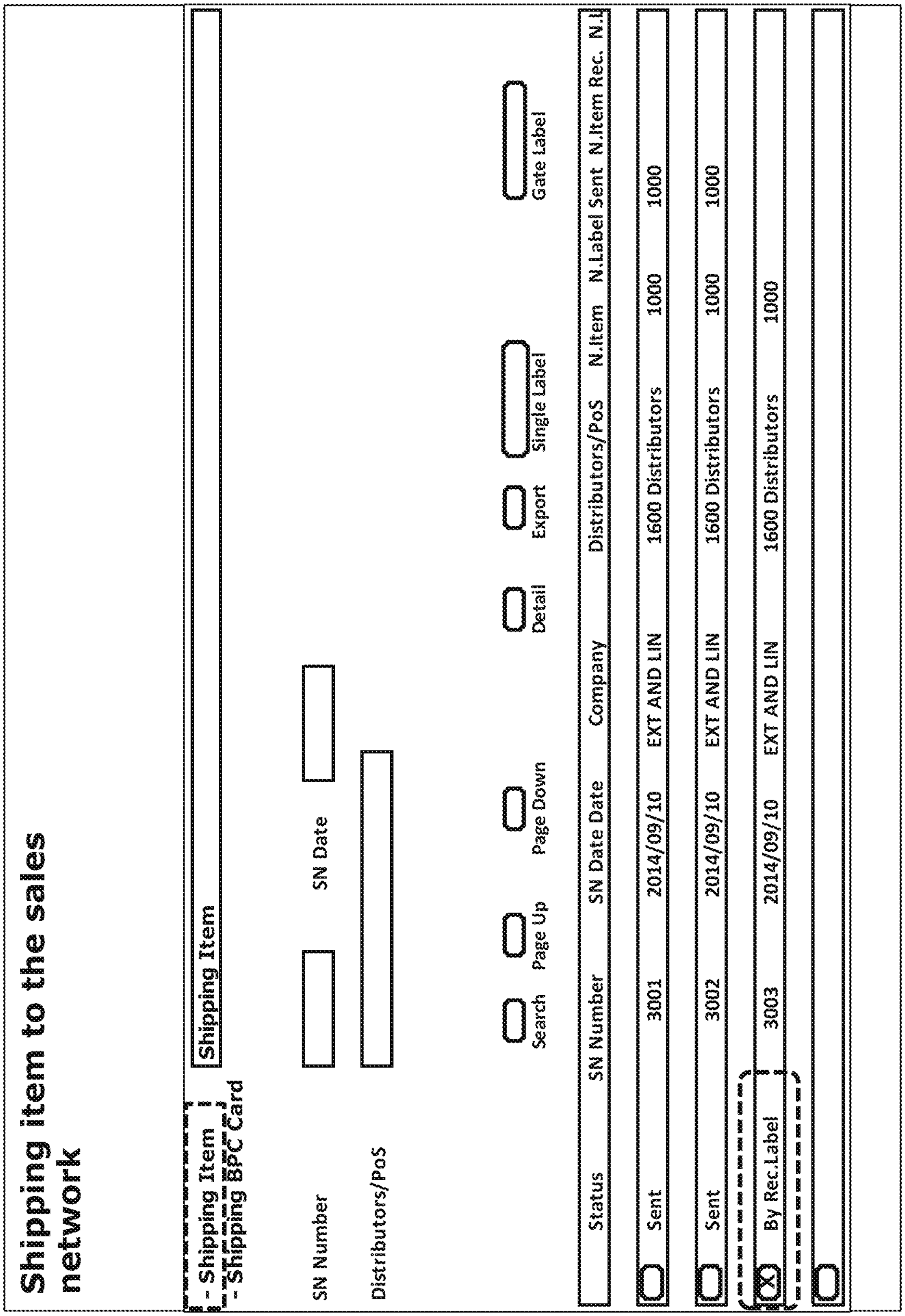
Figure 30:
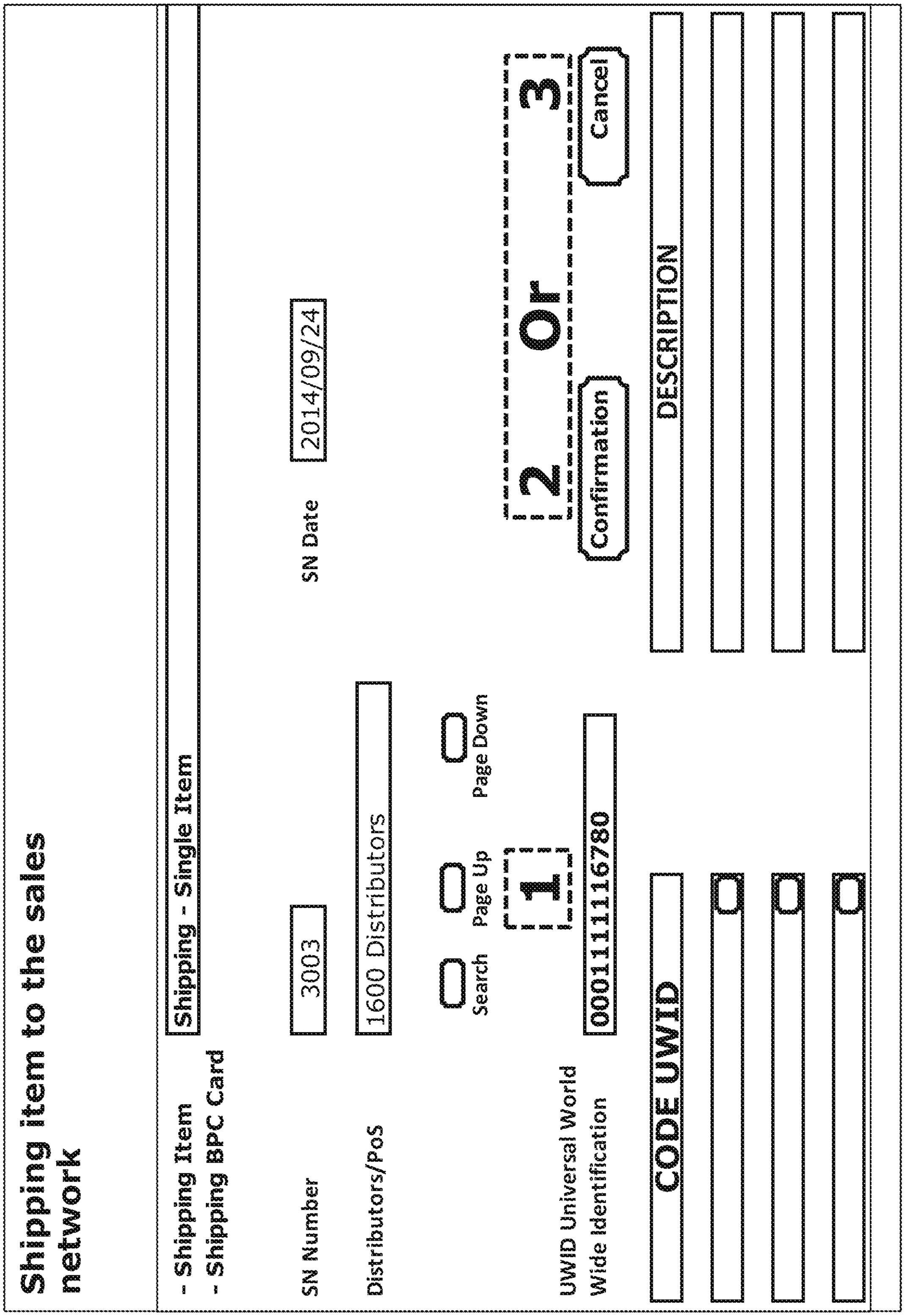

FIGS. 29, 30: UWID codes are recorded during the preparation of the shipping process from the warehouse to the sales network (during the packaging of the goods laid down in boxes or in a specific location (Gate RFID) for the goods hung upon the hooks).

2.3.2 Management of BPC Cards

This section describes the processes classified under "Management of BPC cards".

Referring to FIG. 28, the above-described process for shipping of items to the sales network with recording of UWID labels is illustrated in the following steps:

Step 2801: Recording of the shipping document

Step 2802: Recording of the UWID label

Step 2803: Change Document/PoS?

Step 2804: Other document to be recorded?

2.3.2.1 Purchase of BPC Cards

Figure 31:
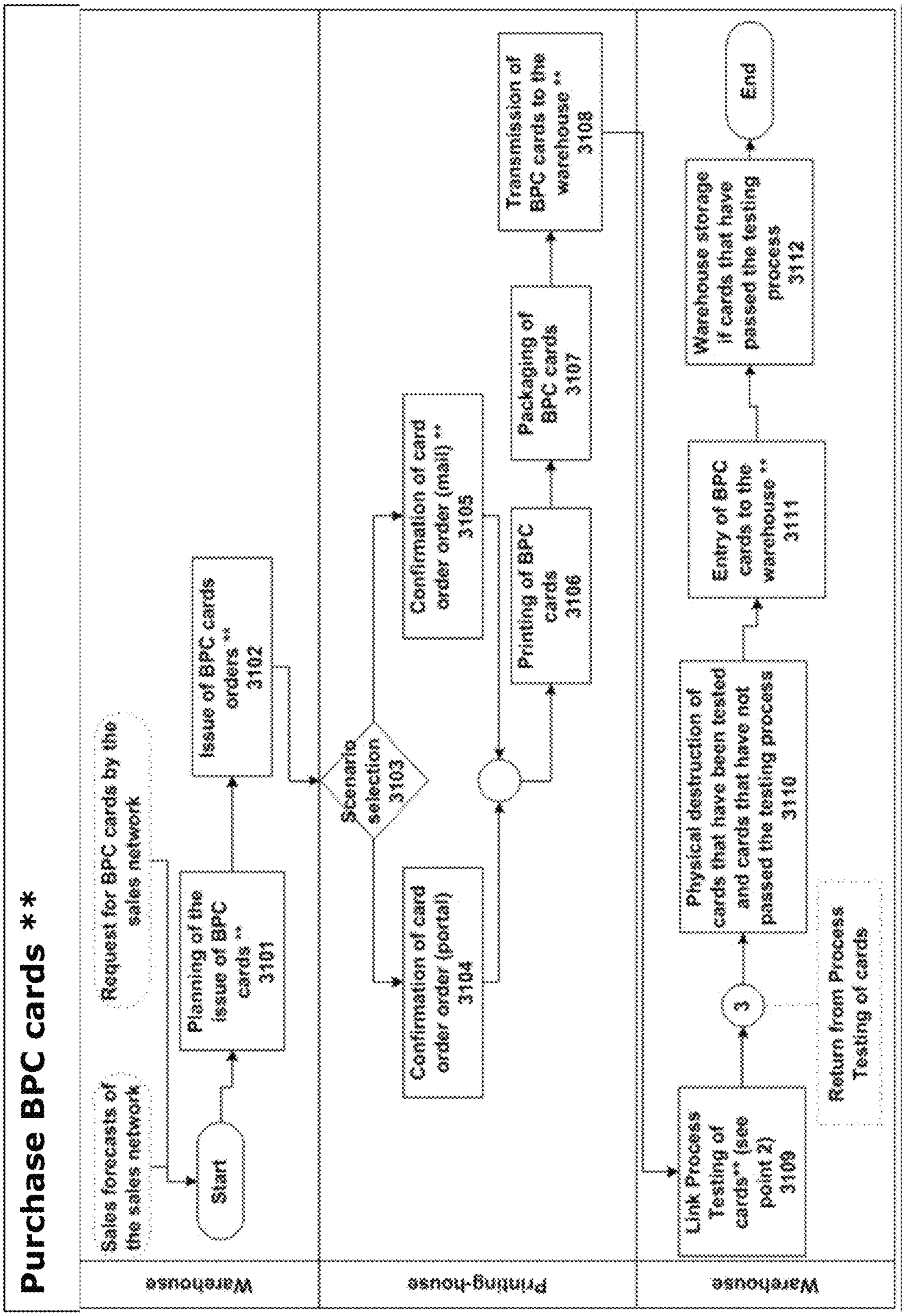
FIGS. 31-41 show a process for purchase of BPC cards in accordance with preferred embodiments of the present invention.

FIG. 31: Process design

1. Layout of BPC cards.
 a. Main information managed in BPC cards:
  i. Company
  ii. Brands (they can be more than one)
  iii. URL to access the company-specific PYB portal.
  iv. Human readable code: 4 company identification characters+9 company progressive characters
  v. Secret code: 5 alphanumeric characters (only capital letters and exclusion of letters "I" and "O").
 b. Packaging of BPC cards
 c. A structure has been defined at several packaging levels:
  i. Single BPC card
  ii. Box: Packaging made up of 100 BPC cards
  iii. Lot: Packaging made up of 10 boxes
  iv. The above mentioned quantities are examples, it is possible to customize them at company level.
  v. The printing-house prints on each box/lot the progressive character with the specification of the start and end ranges of the cards contained.
2. Archive of BPC cards
 a. Main keys
 Human readable code
  i. Company code: 4 alphanumeric characters (only capital letters and exclusion of letters "I" and "O")
  ii. Progressive char.: 9 numeric characters (progressive char. at company level)
 b. Attributes
  i. Hidden code (generic attribute)
   5 alphanumeric characters
  ii. Card status (approximate list whose values are still to be confirmed)
   A. Ordered
   B. In warehouse
   C. Sent to the sales network
   D. At distributor
   E. At PoS
   F. Combined with the UWID code
   G. Customer registration performed
   H. Destroyed (several destruction codes must be available, e.g.: Destroyed for testing in warehouse, other destruction cases)
  iii. Location
   A. Where
    In warehouse
    Sales network
    Customer
   B. Location code
    Warehouse code
    Distributor number
    PoS code
    Customer number
  iv. Customer notifications
   A. Transfer of the BPC card to others or any theft
   B. Generic notes
  v. Attributes for marketing purposes Process Description Purchase of BPC Cards The status of orders placed on the portal PYB can be the following value:

| Status order | Description |
|---|---|
| Work | The operator is composing the order |
| Release for approval | The order is waiting for approval (PYB Portal send the order to ERP Company) |
| Approved | Order approved (approved received from ERP Company) |
| Sent | Sent to supplier, the orders is in response from the supplier |
| On Modify | The supplier is changing the order |
| Negotiating | Orders in negotiation |
| Confirmed with modify | Order modified and confirmed by supplier |
| Confirmed | Order confirmed by supplier |
| Sent Warehouse | Sent by supplier to warehouse |
| In test | In test at warehouse |
| Tested | Teste passed favorably |
| Refused | Testing is not exceeded, too many discarded cards |
| Receipt progress | Reception in progress |
| Receipt complete | Reception complete |
| Cancelled | Ordes cancelled |

The following figure shows the panel orders that the company sees when accessing the portal PYB.

Planning of the Issue of the BPC Card

1. According to the sales forecasts of the sales network (data received by the producer's IT system), the relevant Department determines the number of BPC cards to be issued.
2. In addition to sales forecasts, it is also required to manage any orders of BPC cards directly received from the sales network.
3. The process is supported through a PYB function.

Figure 32:
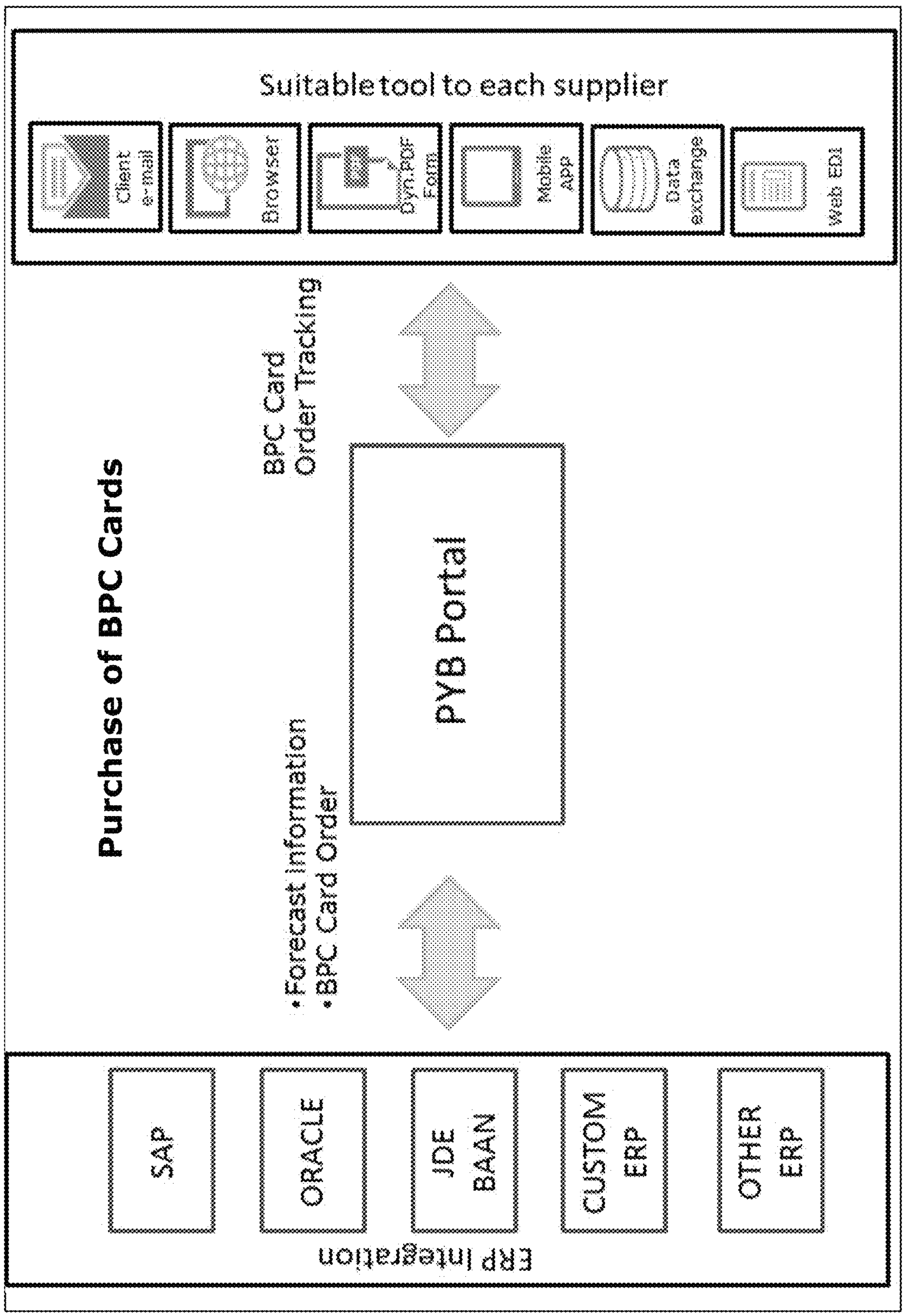

FIG. 32 shows the interface between the ERP systems of the client and the portal PYB.

Figure 33:
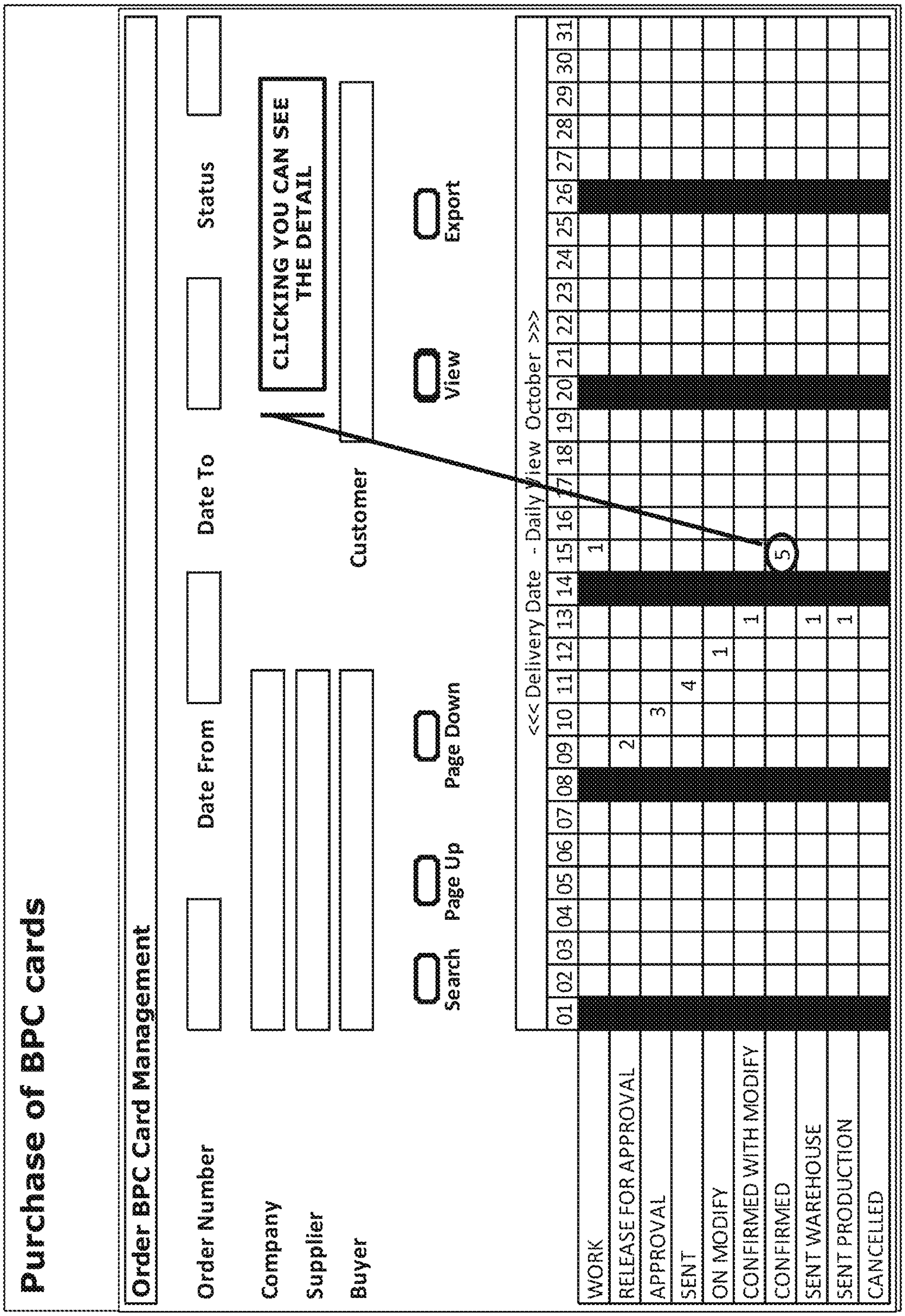

FIG. 33 shows the progress of the order on the dashboard portal PYB.

Issue of BPC Card Orders

Management of BPC Card Orders

1. The numbers of the cards to be printed by the printing-house are generated according to the quantity of BPC card orders.
2. A data flow containing the following information must be sent to the printing-house:
   a. Order reference data
   b. Information about packaging
   c. List of BPC cards to be printed; the hidden code is also specified for each of them.
3. The order of BPC cards may be placed in the ERP system and then sent to the PYB system, while the order detail is generated and managed in the PYB system.
4. The process is supported through a PYB function.

The operator composes the order starting from the forecast and requests received from retail outlets.

Figure 34:
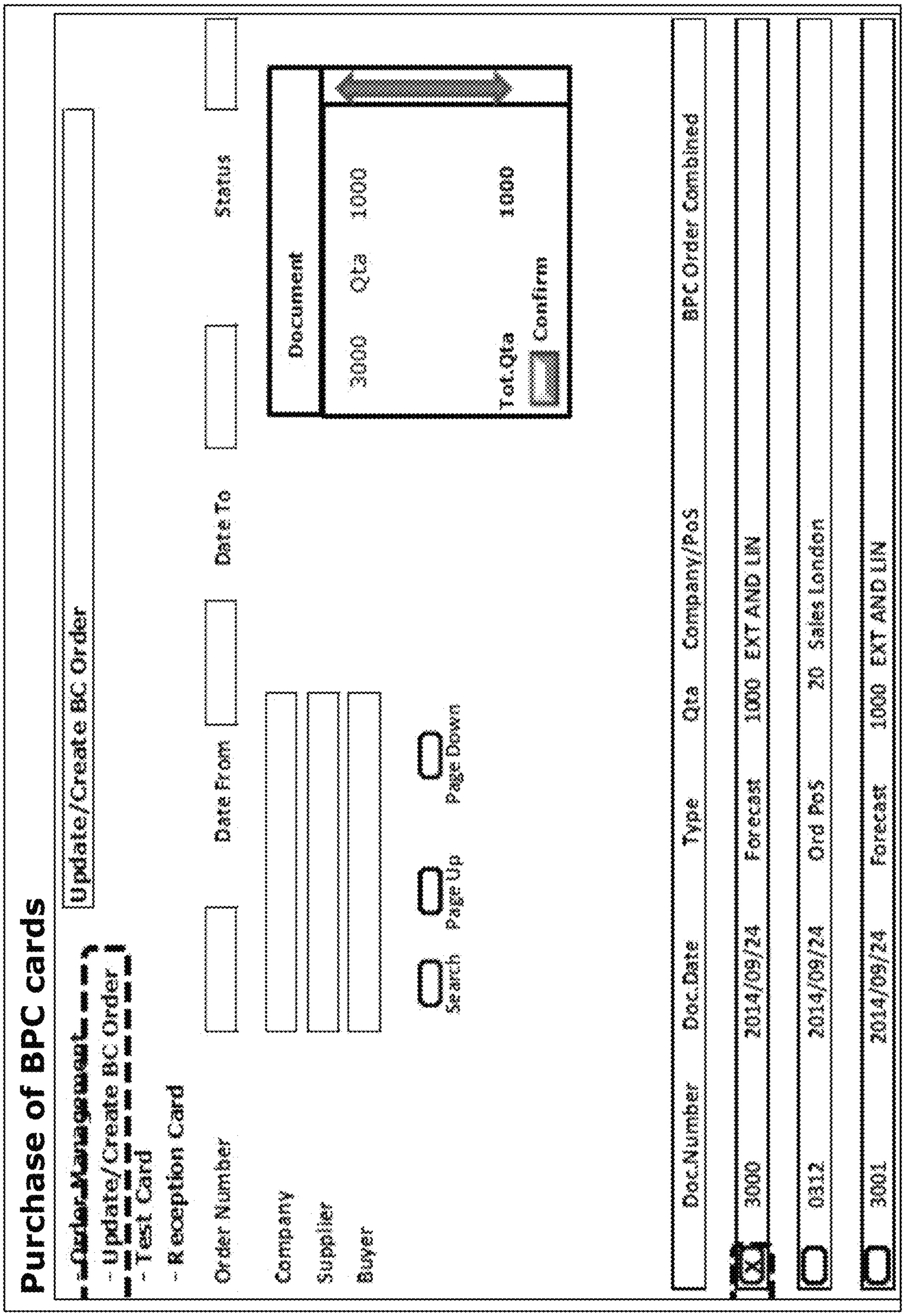

FIG. 34: This example chooses forecast (number 3000).

Figure 35:
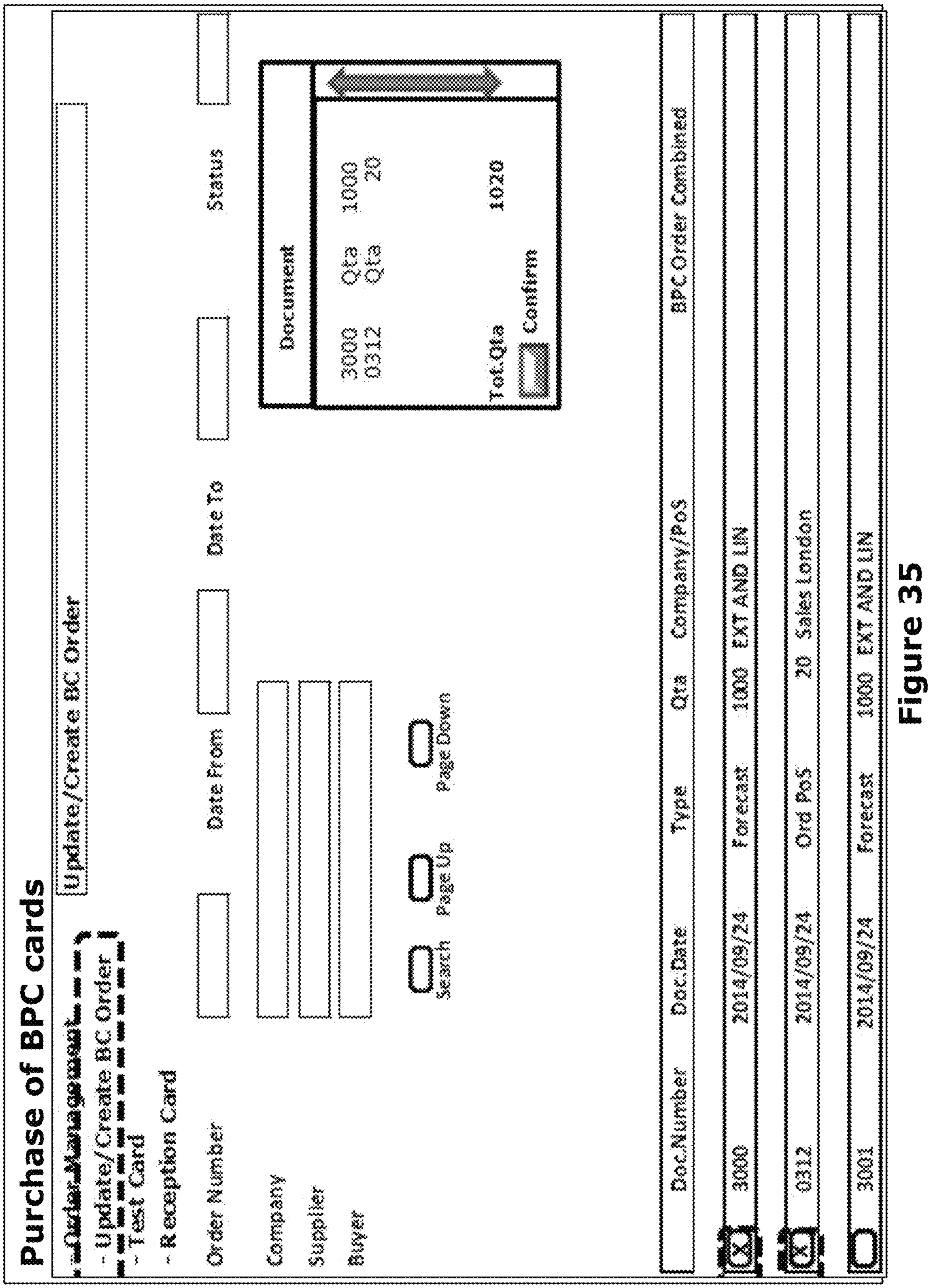
Figure 36:
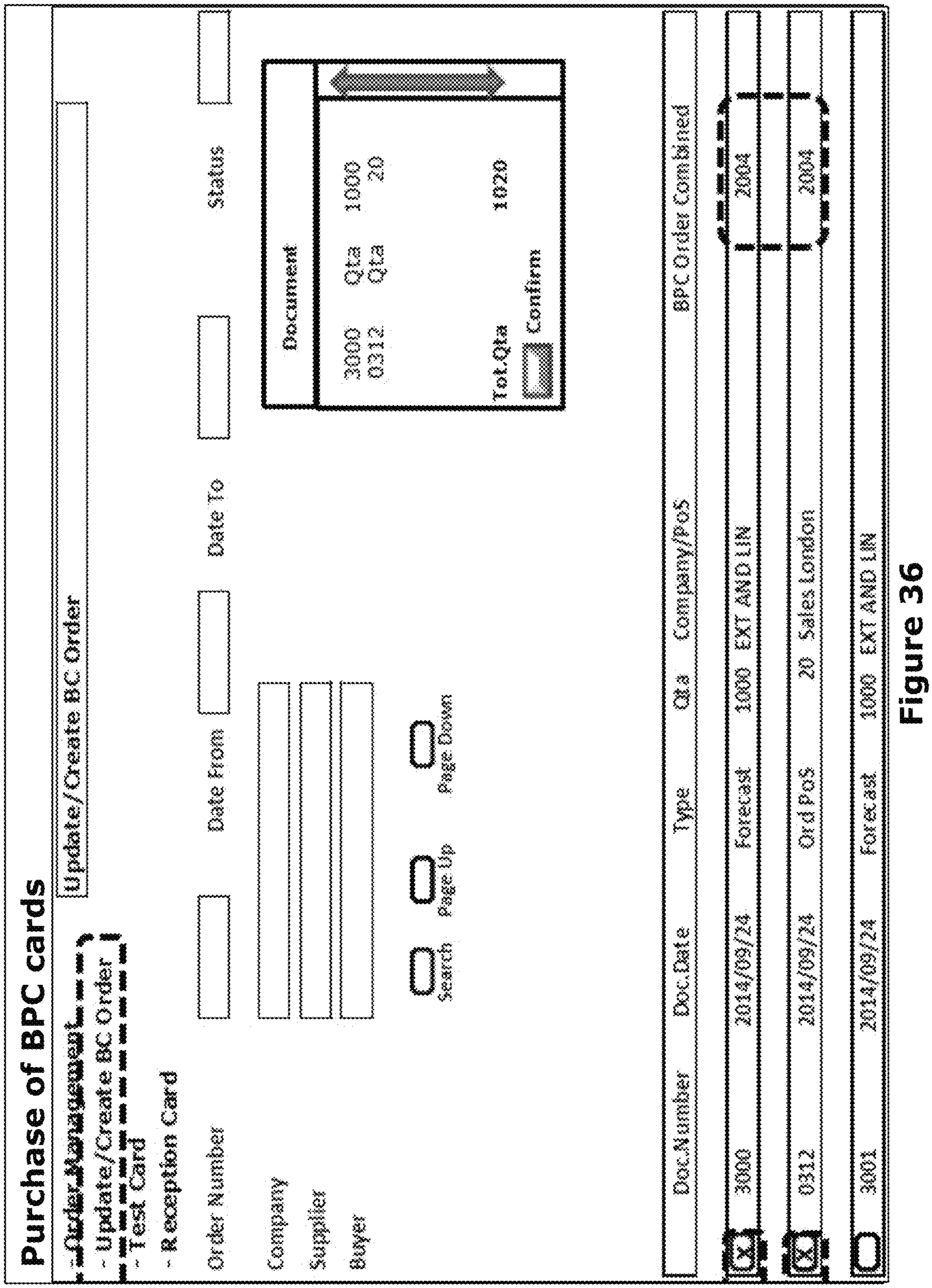

FIGS. 35, 36: This example chooses the order of the point of sale (number 0312).

Figure 37:
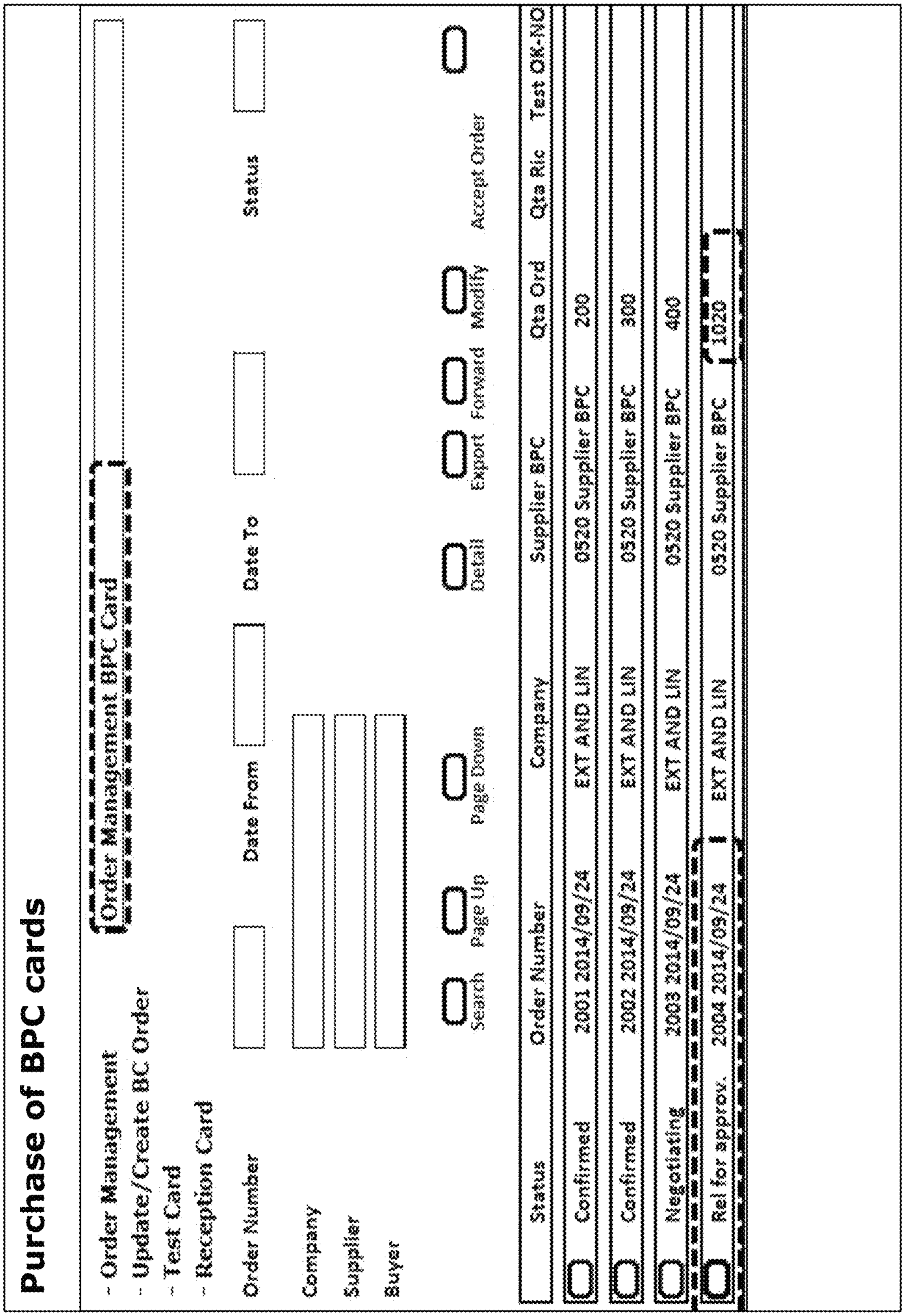

FIG. 37: At the end of the composition of the order, its state is "Released for approval"

Figure 38:
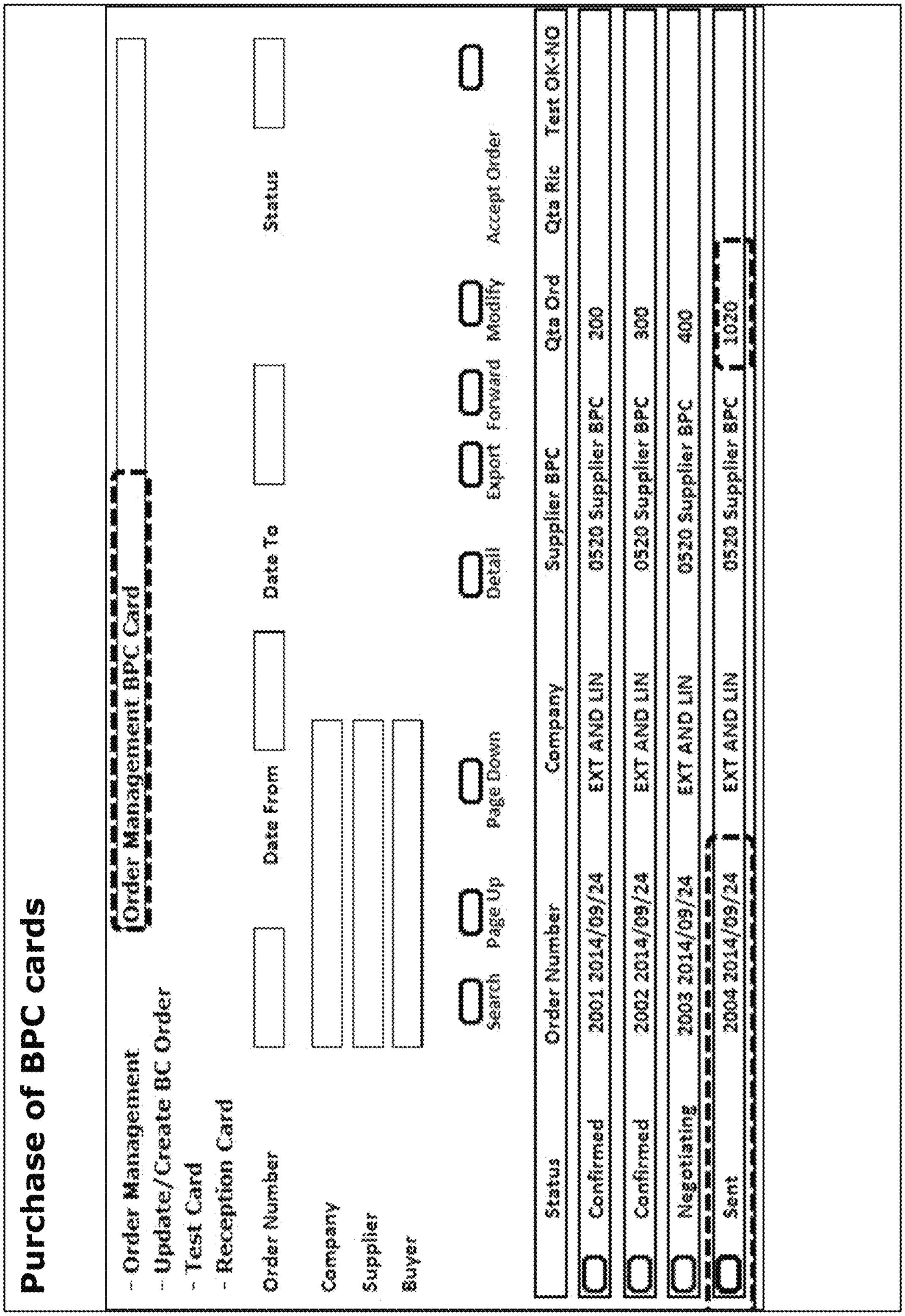

FIG. 38: After approval by the competent office order status is sent.

Confirmation of BPC Card Orders

The process related to the confirmation of order receipt by the printing-house can be performed by accessing a portal or through a structured email.

Figure 39:
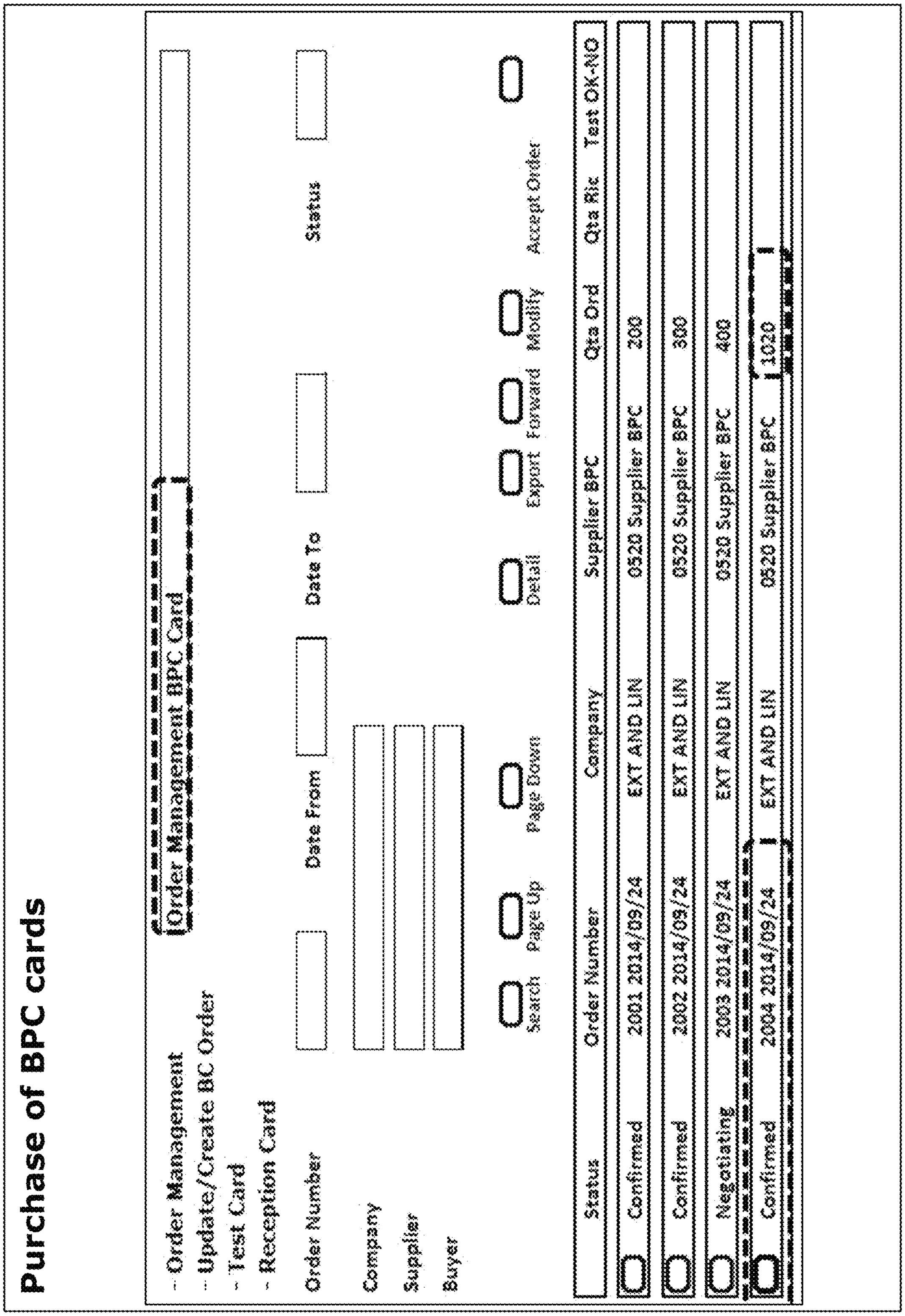

FIG. 39: Example of approval through the portal.

Figure 40:
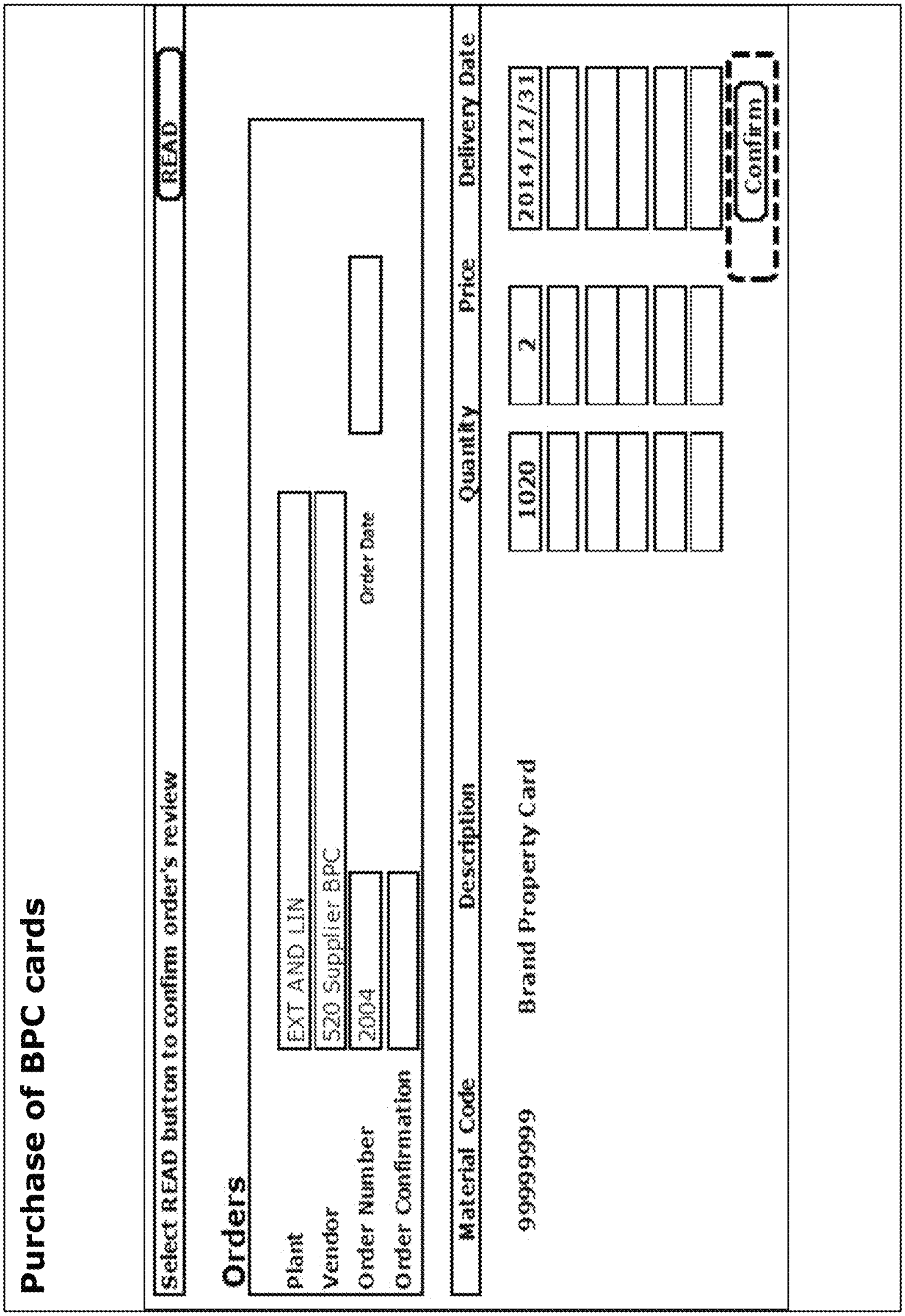

FIG. 40: Example of approval through the structured mail.

Printing of BPC Cards

1. The printing-house prints BPC cards according to the instructions received in the order.
2. This process is not supported through any PYB function, except for the information received in the order (layout, numbers to be printed).

Packaging of BPC Cards

1. Once the printing phase has been completed, the printing-house performs the packaging of the labels by following the instructions about the packaging composition received in the order.
2. A PYB function is developed, except for the information received in the order (packaging).

Figure 41:
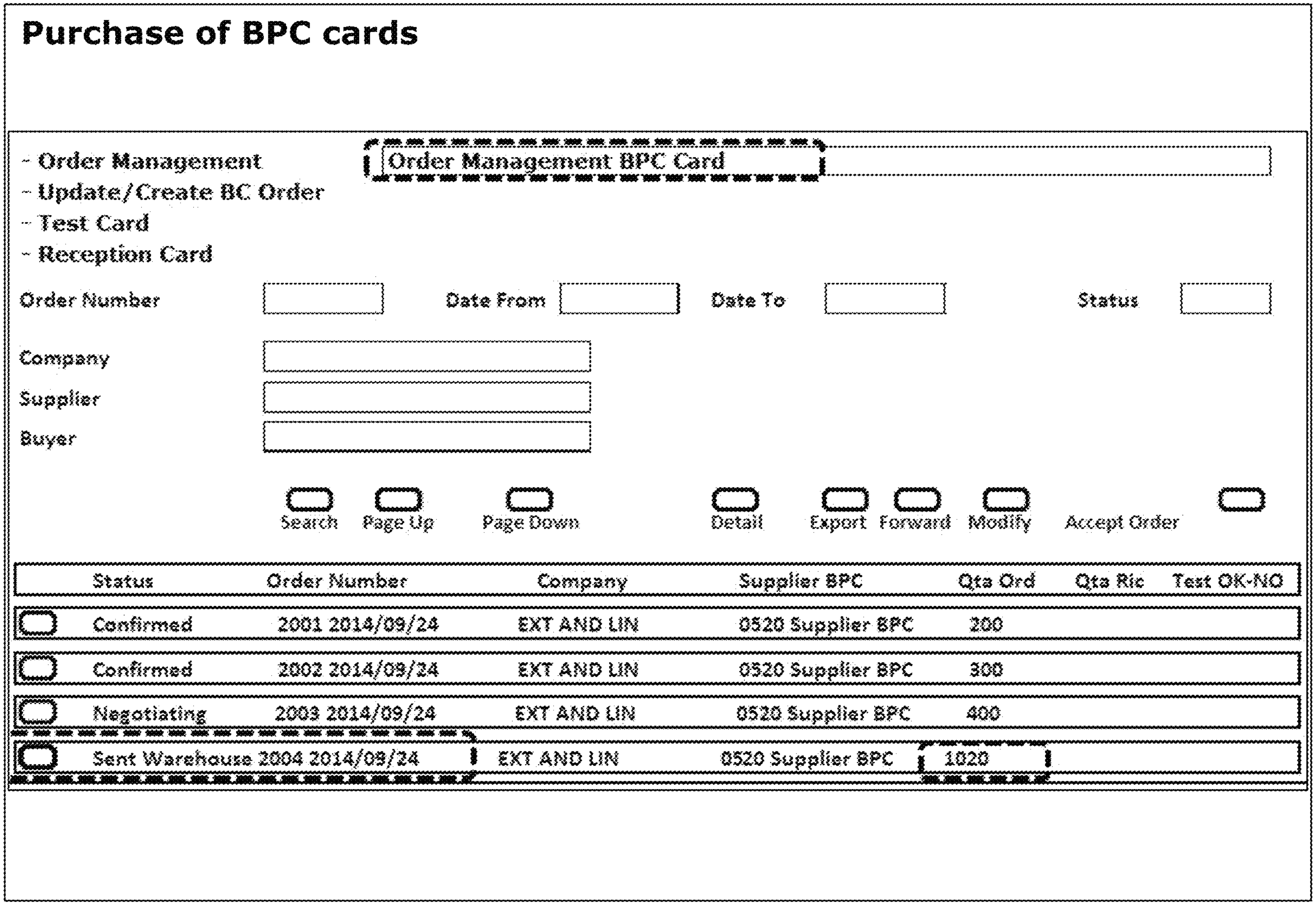

Transmission of BPC Cards to the Warehouse (FIG. 41)

1. The transmission of BPC cards to the warehouse is performed according to the instructions received in the order.
2. An online PYB function (portal) is developed. According to this function, the printing-house can notify the producer of the transmission of cards to the warehouse (specification of the start/end ranges of cards during the transmission process).

Referring to FIG. 31, the above-described process for purchase of BPC card is illustrated in the following steps:

Step 3101: Planning of the issue of BPC cards
Step 3102: Issue of BPC cards orders
Step 3103: Scenario selection
Step 3104: Confirmation of card order (by portal)
Step 3105: Confirmation of card order (by mail)
Step 3106: Printing of BPC cards
Step 3107: Packaging of BPC cards
Step 3108: Transmission of BPC cards to the warehouse
Step 3109: Link process testing of cards (see point 2)
Step 3110: Physical destruction of cards that have been tested and cards that have not passed the testing process
Step 3111: Entry of BPC cards to the warehouse
Step 3112: Warehouse storage of cards that have passed the testing process Testing of BPC Cards FIG. 42: Process design Testing Phases 1. At the beginning of the testing process, the order and the lot/box are indicated (through the specification of the start/end range of labels being checked), while at the end of the testing on an order, it is possible to decide whether to confirm the lot in the relevant remaining cards.
2. Opening of the packaging, check of card numbers (first of all, the number is entered and then the system specifies whether it is correct), the testing process may be performed by checking the first and the last card.
3. The testing process is performed by scratching the BPC card, tested cards are removed (both physically and logically in the PYB system).
4. All tested cards must be traced in the PYB system regardless of the testing outcome.
5. The testing process of BPC cards is supported through a PYB function.
6. If the outcome of the testing process is negative (e.g., an excessive number of cards that have not passed the testing process has been identified), it is assumed that the provision of BPC cards is rejected.

FIGS. 43-49 shown screens to manage the reporting of test carried out.

Figure 42:
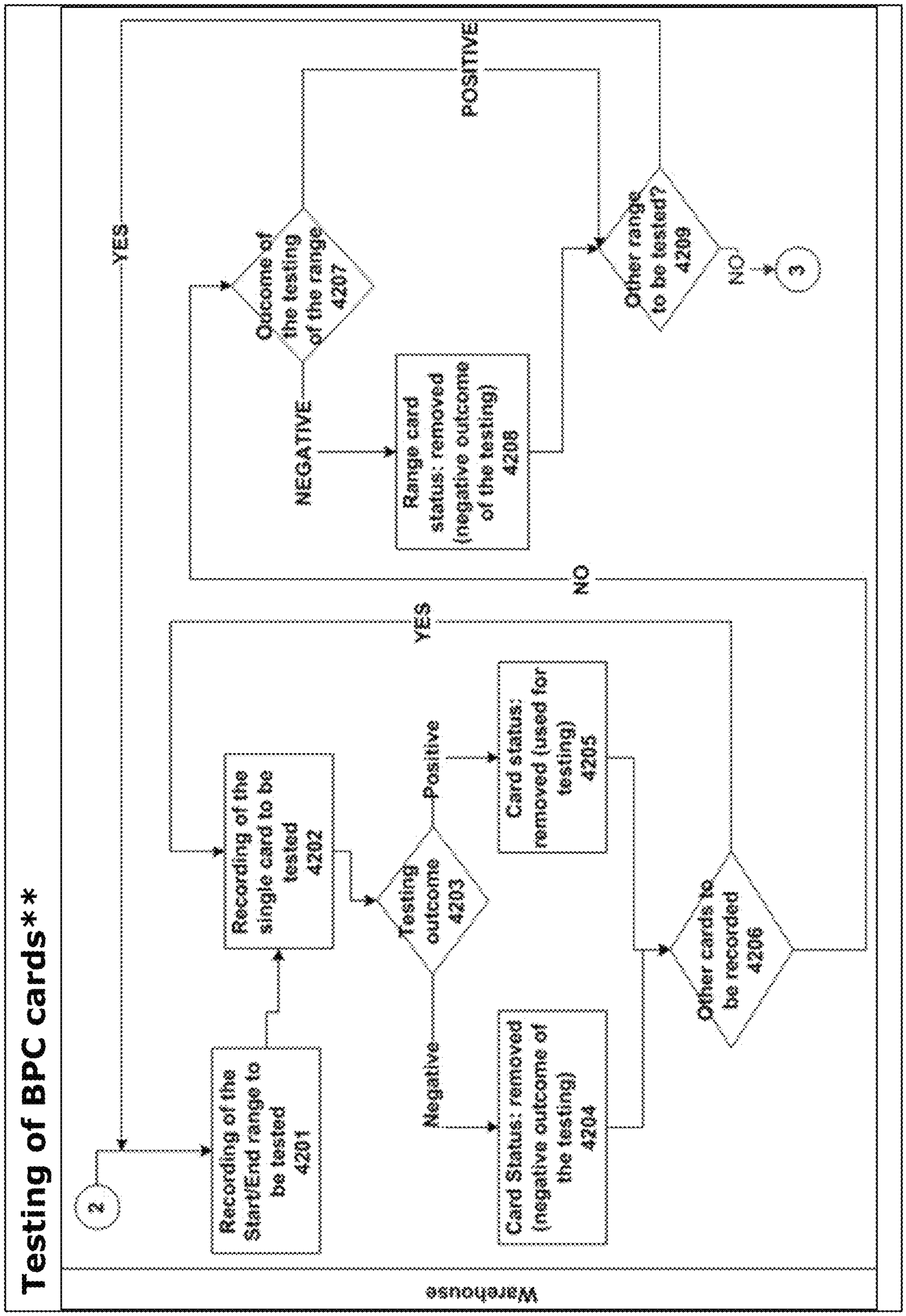
FIGS. 42-49 show a process for testing of BPC cards in accordance with preferred embodiments of the present invention.
Figure 43:
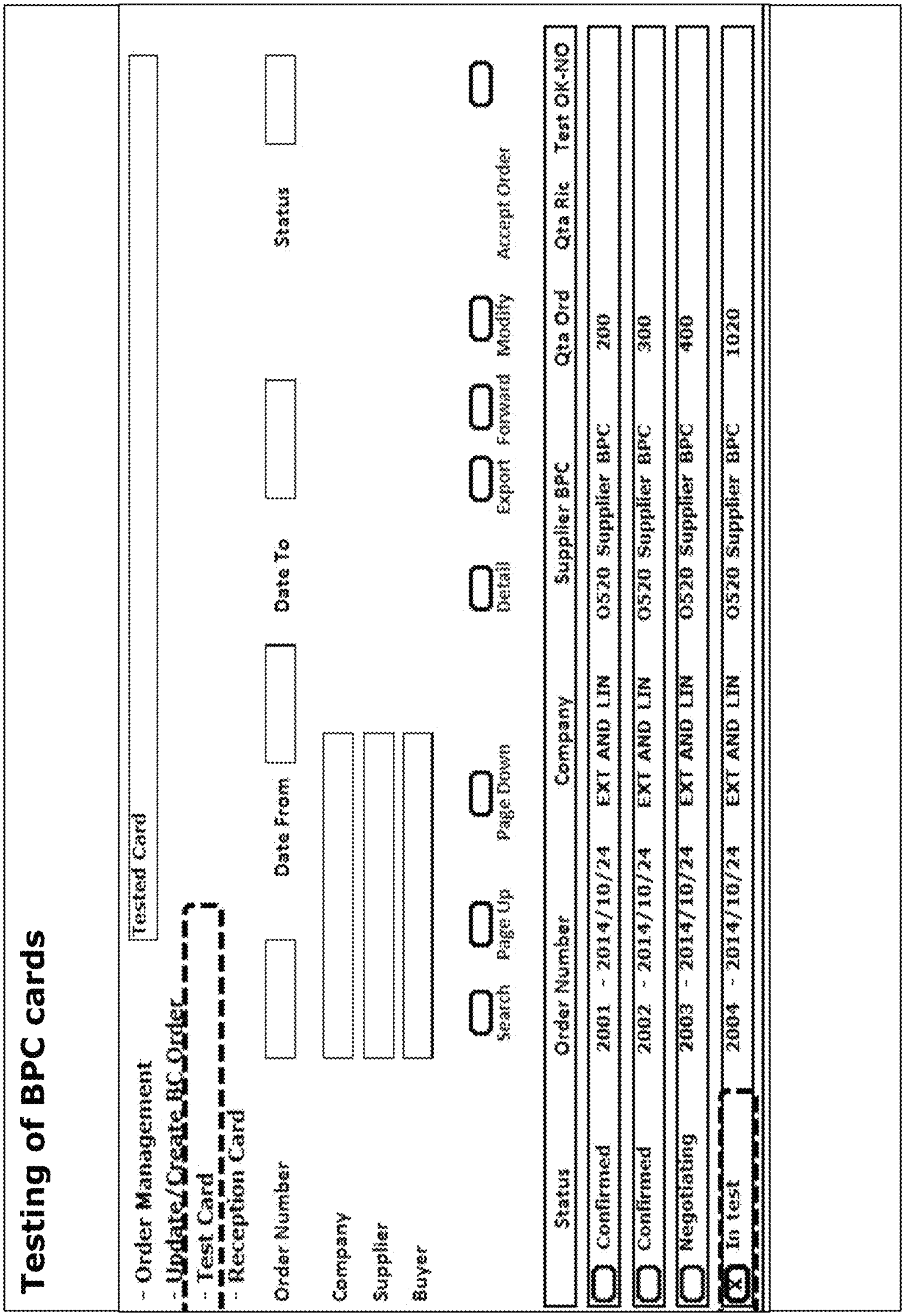
Figure 44:
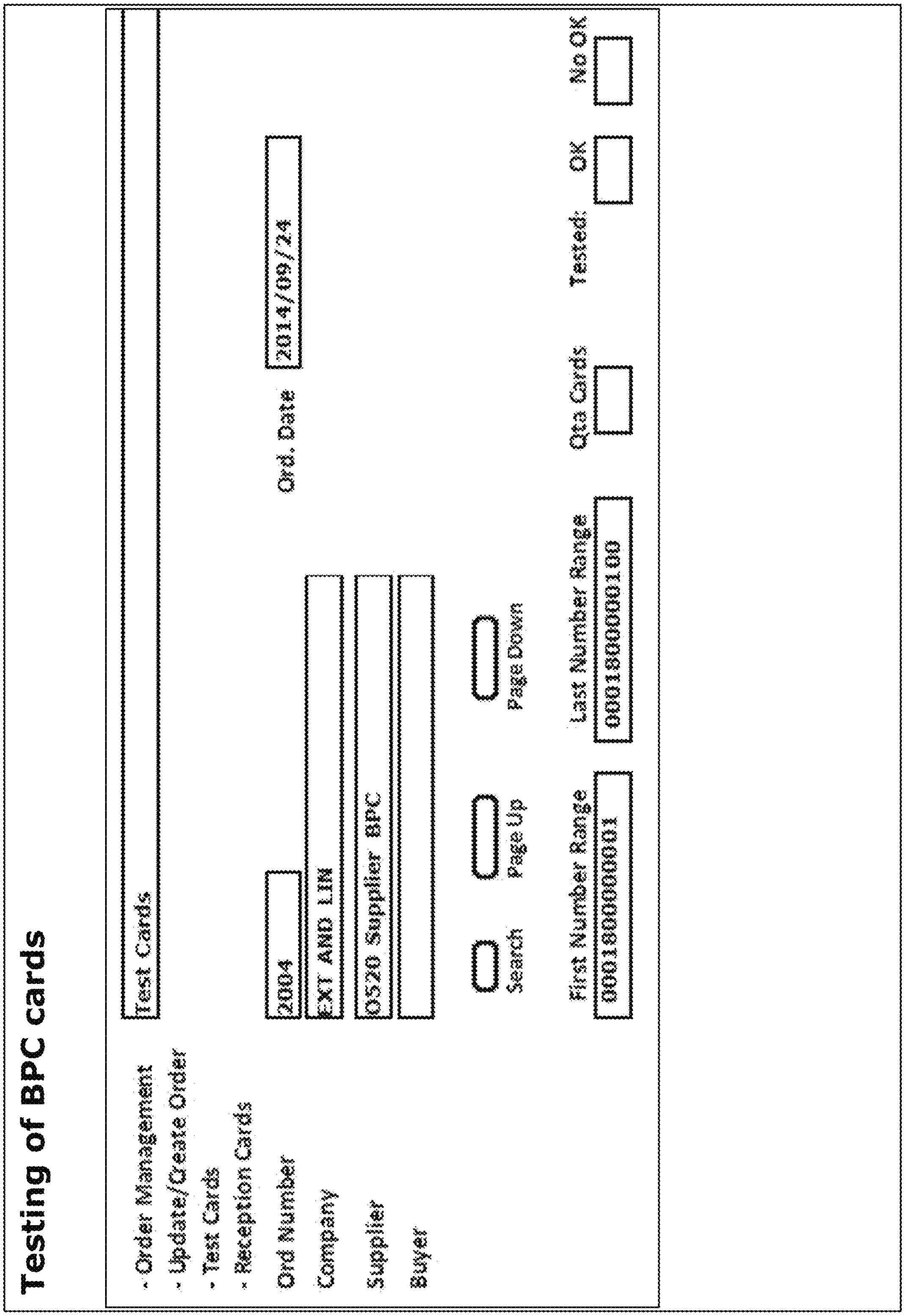
Figure 45:
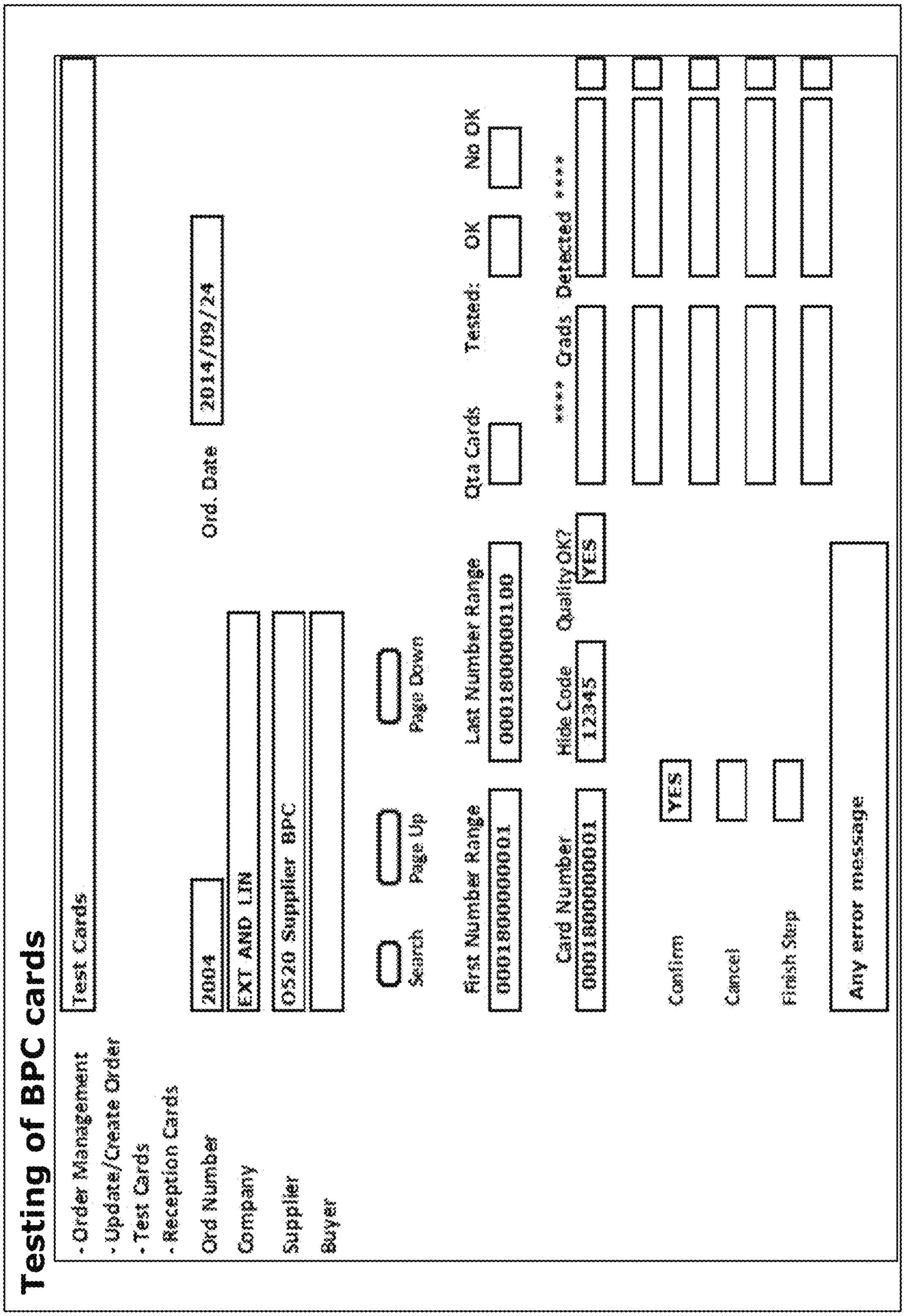
Figure 46:
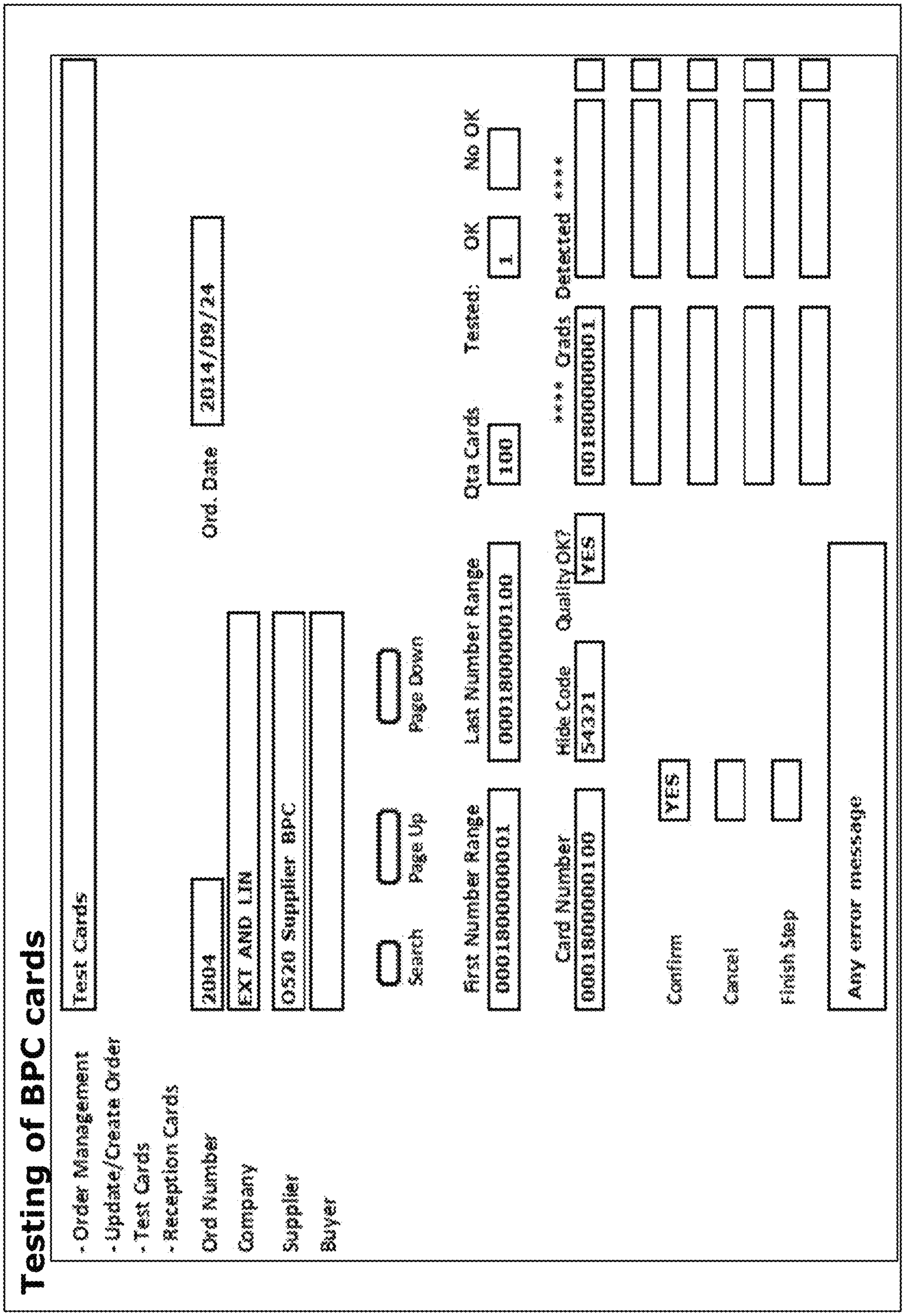
Figure 47:
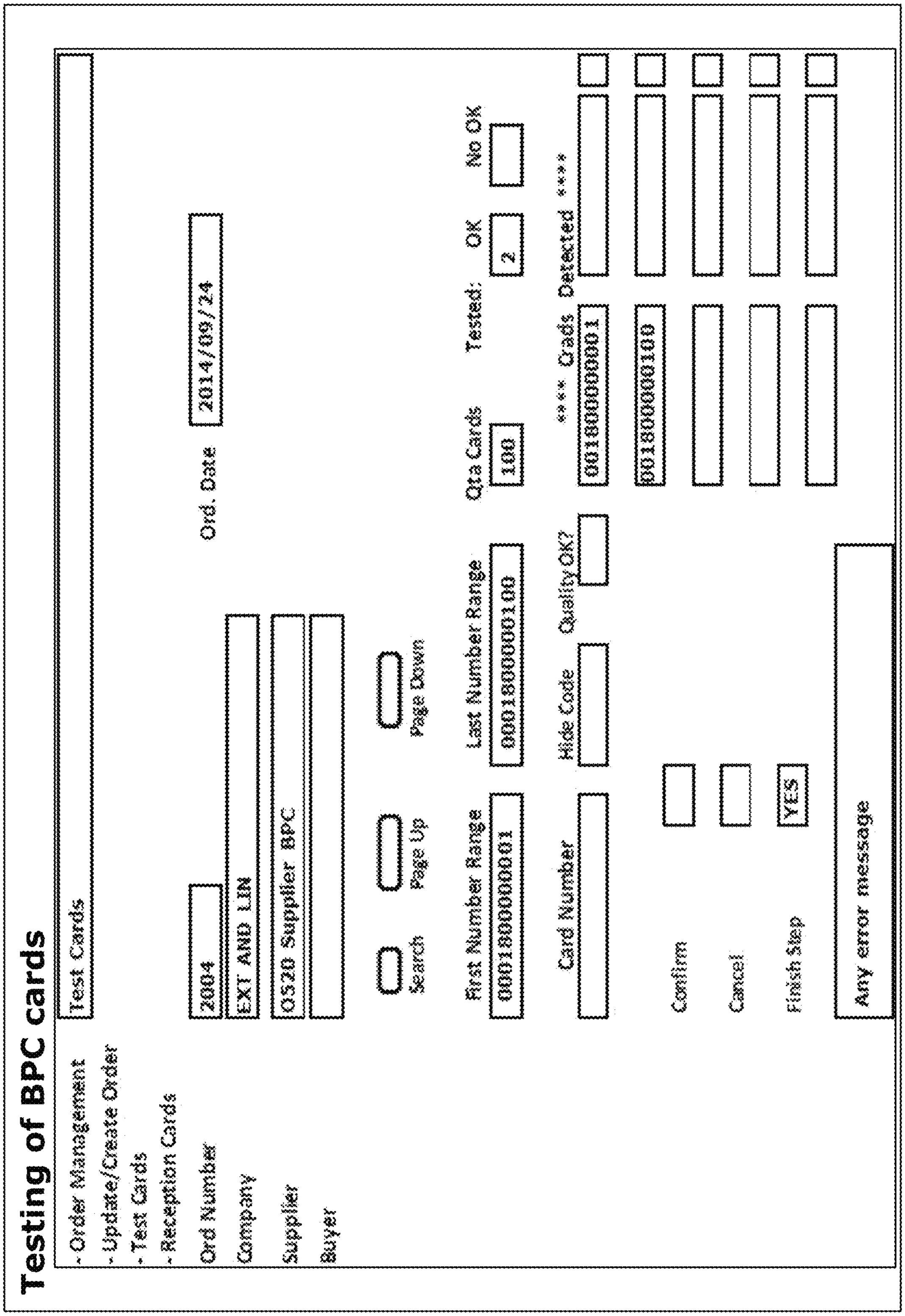
Figure 48:
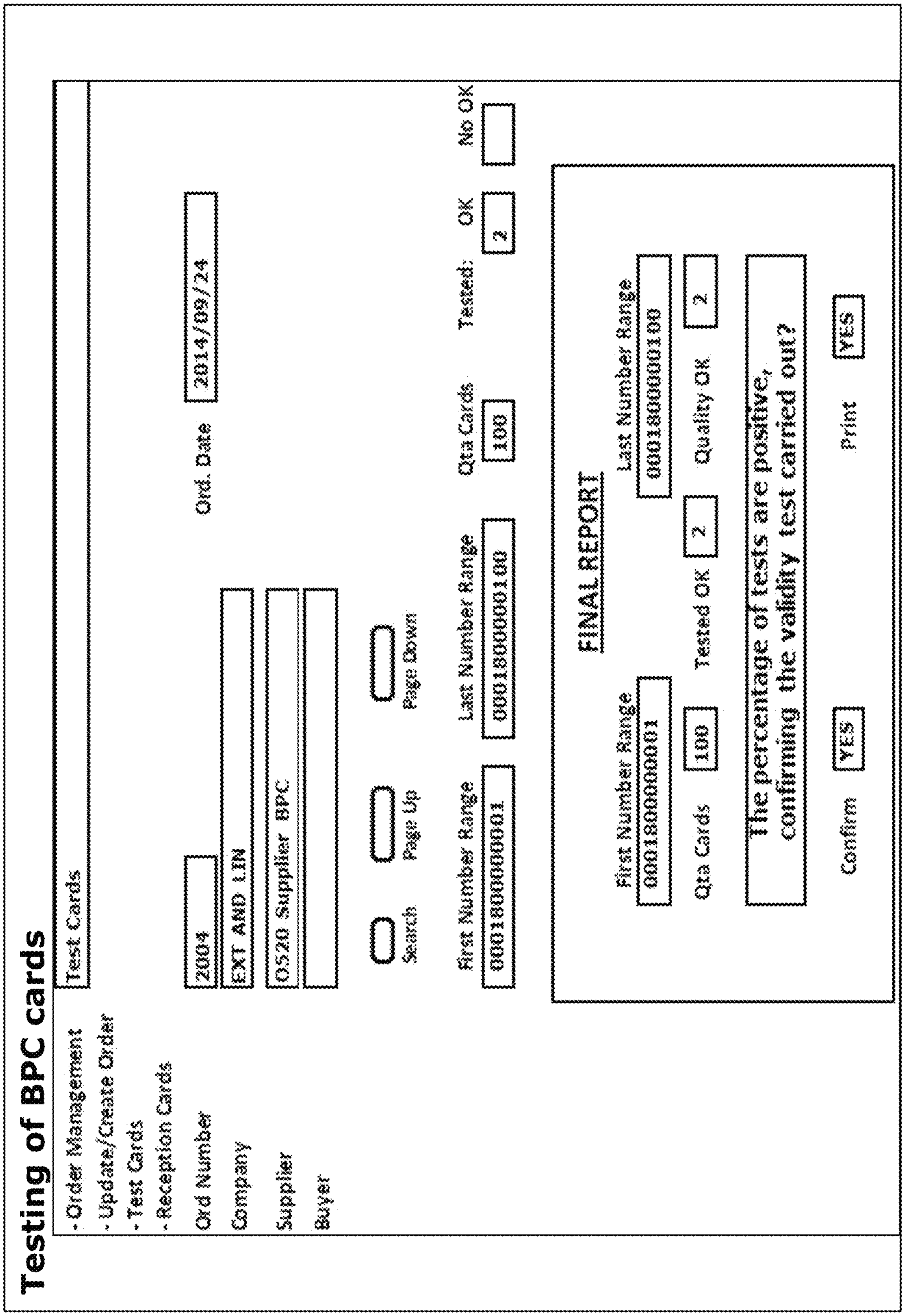
Figure 49:
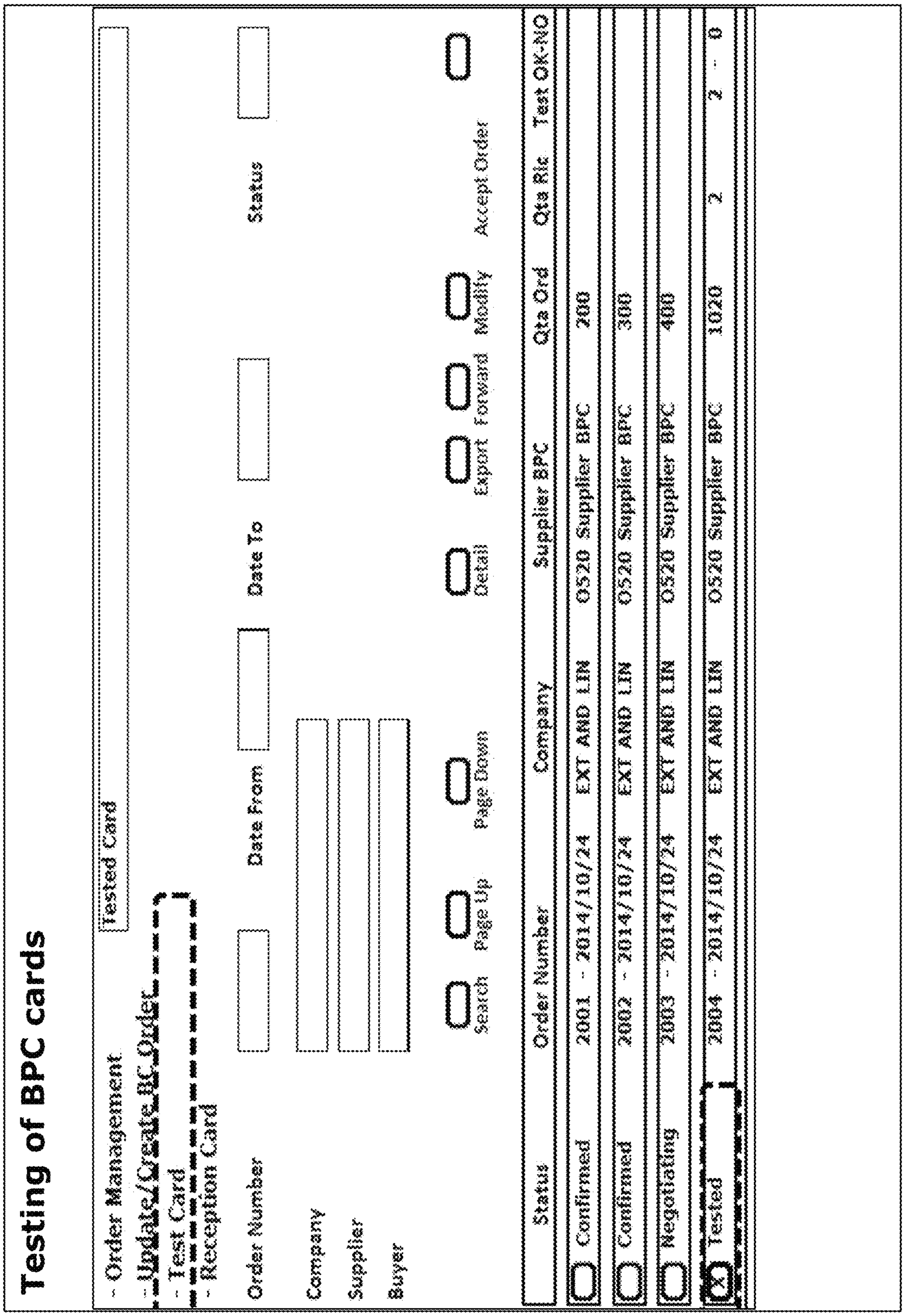
Figure 50:
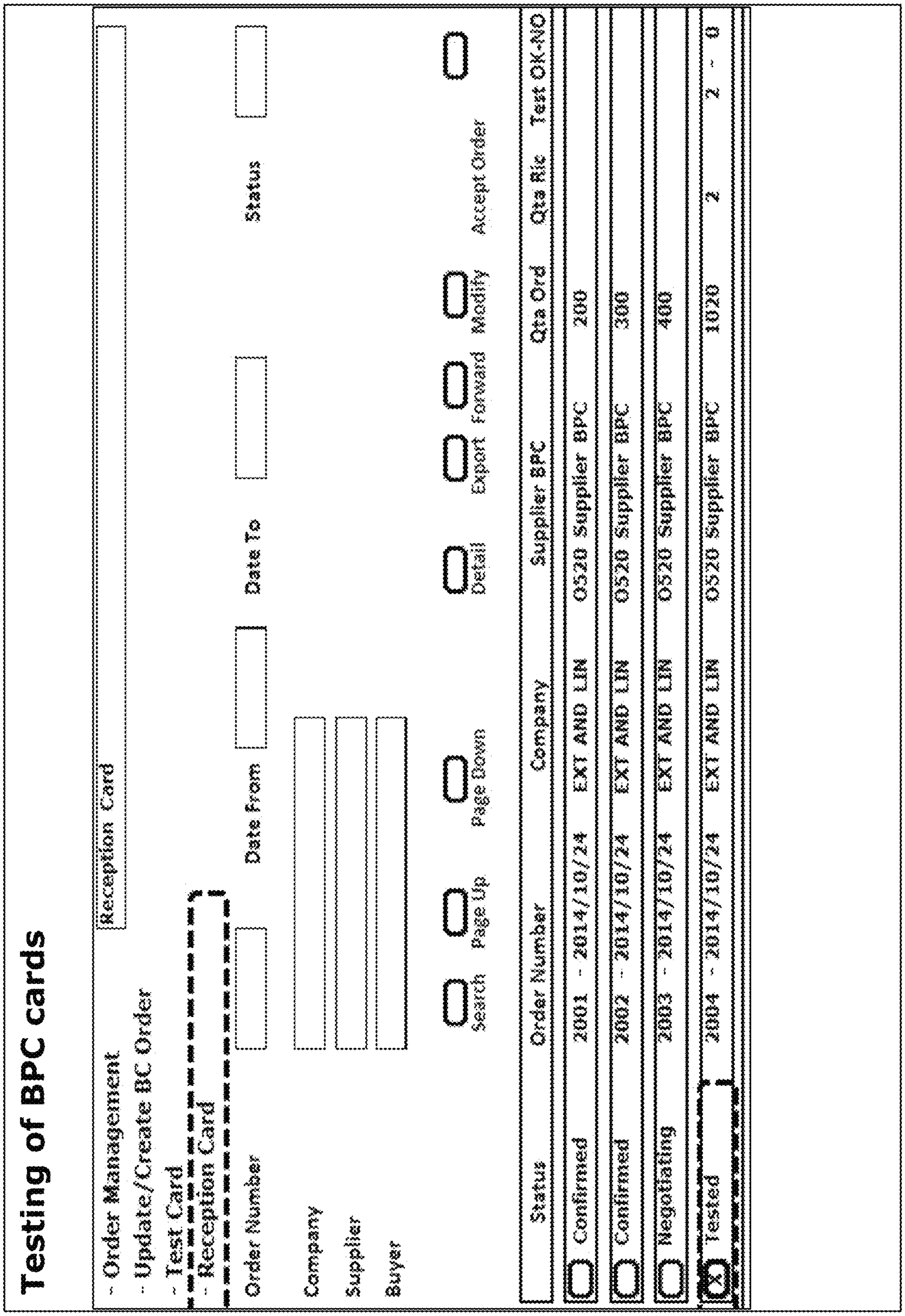
FIGS. 50-54 show a process for entry of BPC cards at a warehouse in accordance with preferred embodiments of the present invention.
Figure 51:
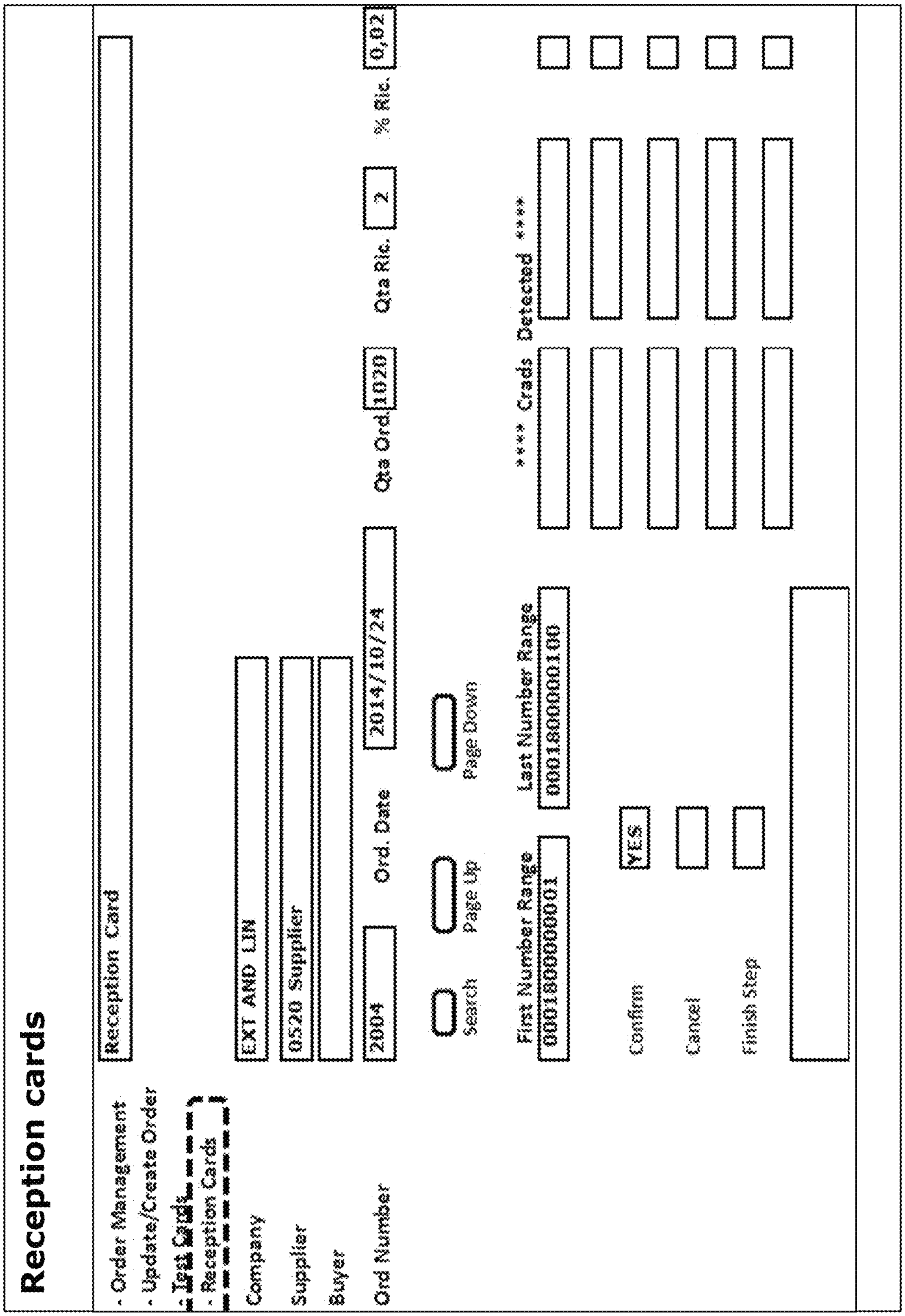
Figure 52:
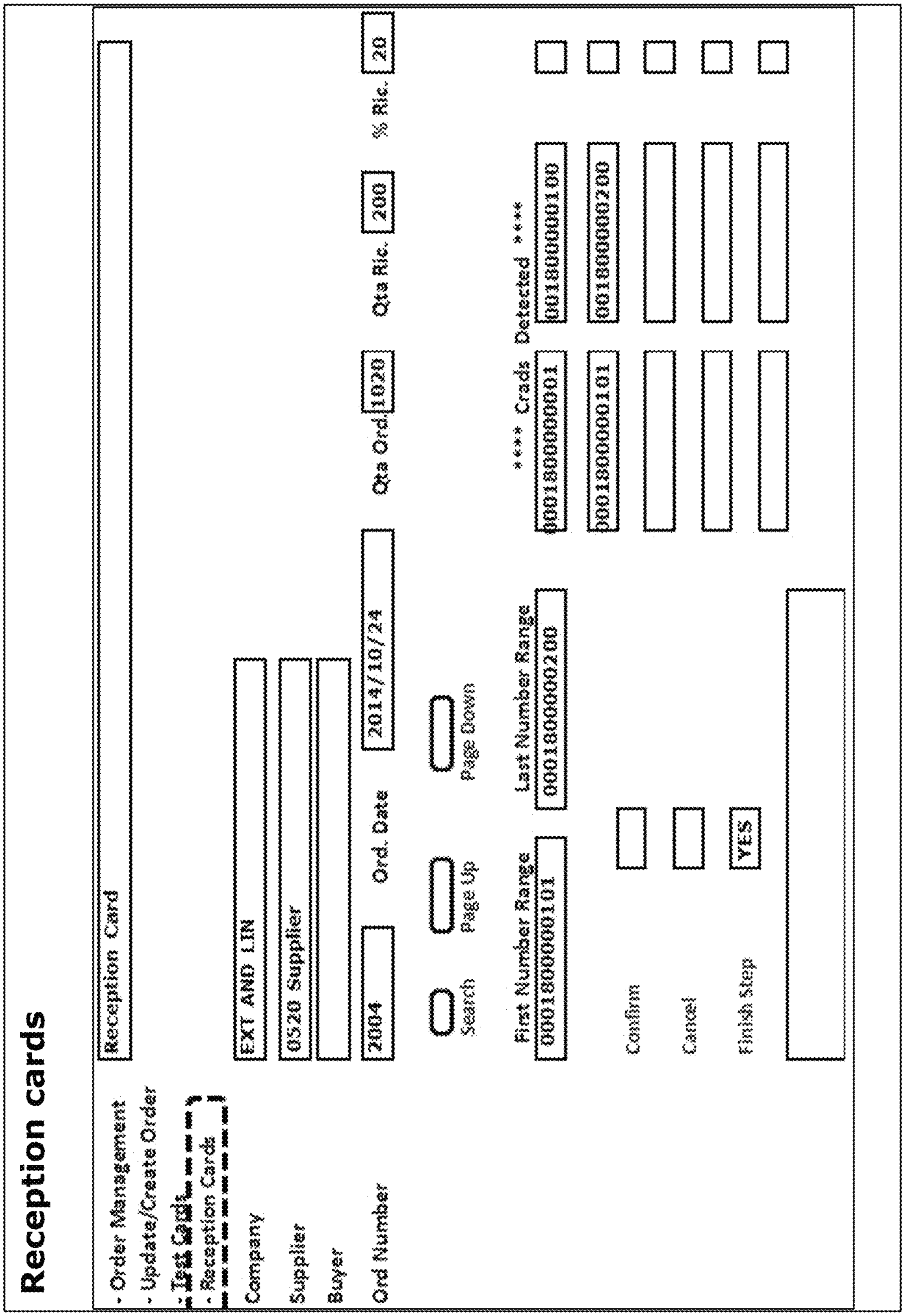
Figure 53:
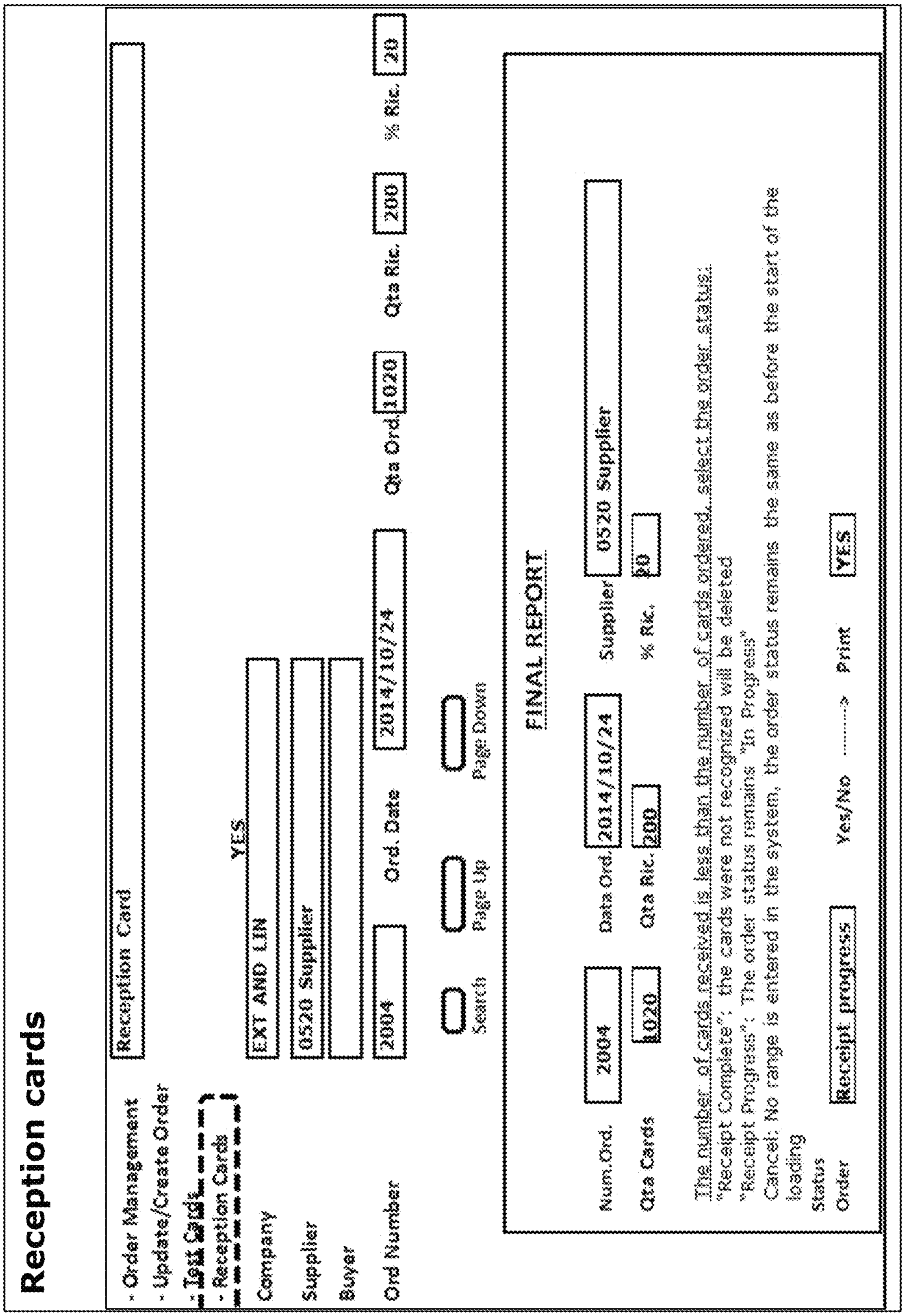
Figure 54:
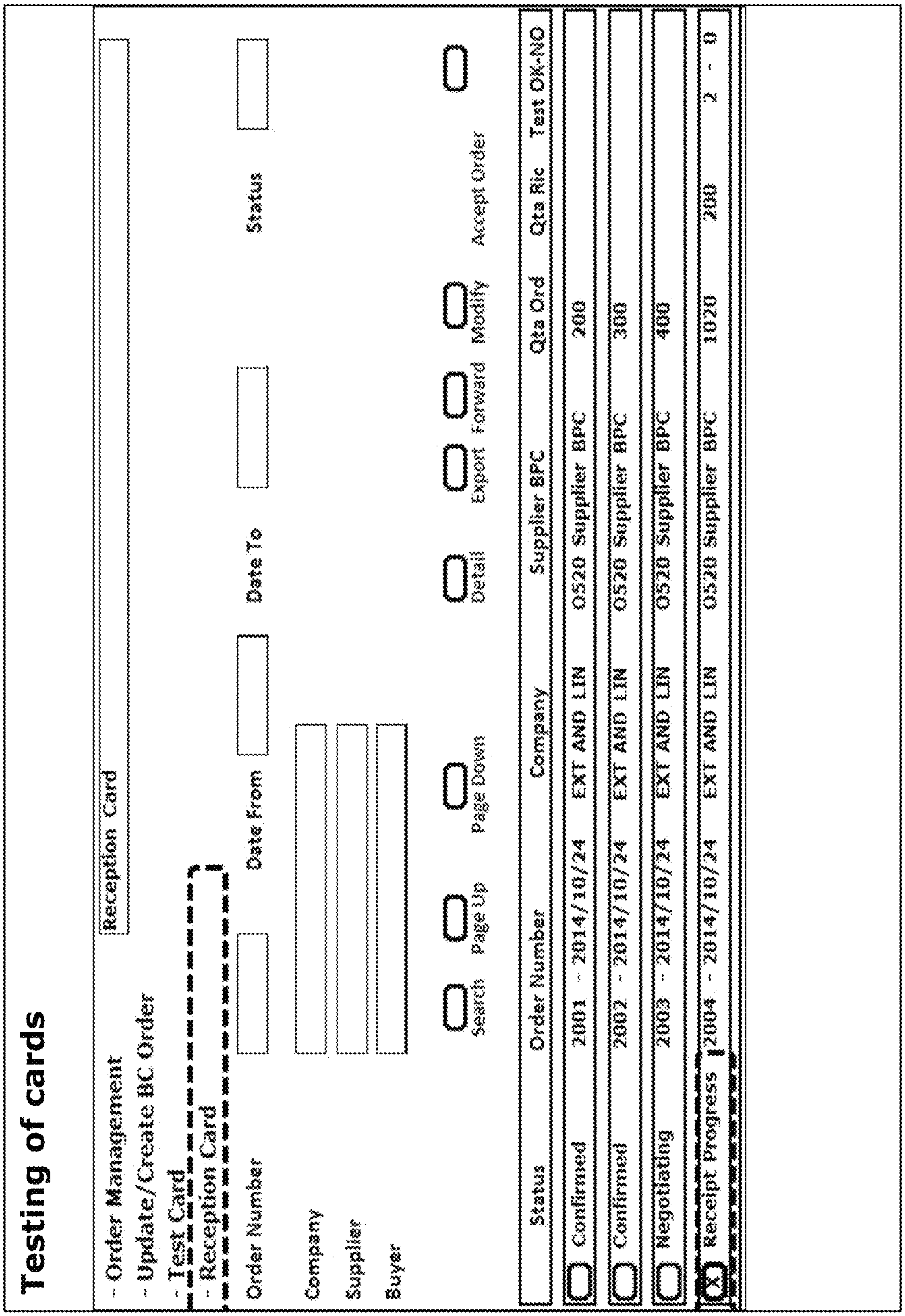

Referring to FIG. 42, the above-described process for testing of BPC card is illustrated in the following steps:

Step 4201: Recording of the start/End range to be tested
Step 4202: Recording of the single card to be tested
Step 4203: Testing outcome
Step 4204: Card Status: removed (negative outcome of the testing)
Step 4205: Card status: removed (used for testing)
Step 4206: Other cards to be recorded
Step 4207: Outcome of the testing of the range
Step 4208: Range card status: removed (negative outcome of the testing)
Step 4209: Other range to be tested?

Entry of BPC Cards at the Warehouse (FIGS. 50-54)

Upon the entry of BPC cards at the warehouse, a PYB function allows the operator to record the entry of BPC cards with the specification of the start/end ranges of the cards received by the printing-house at lot level (maximum packaging unit) or at box level (minimum packaging unit).

Physical Destruction of BPC Cards that have been Tested and of BPC Cards that have not Passed the Testing At the end of the testing phase, warehouse workers physically destroy the BPC cards that have been tested. The same applies to BPC cards that have not passed the testing process both as single cards and as number ranges. In the process of purchasing cards BPC is issued an order (example order number 2004) in which they are combined in detail the number of cards to be printed. In the system PYB there is the information which BPC cards are linked to a purchase order. During the test, the warehouse operator selects the number of orders (example order number 2004 previously sent to the printer of labels) and performs the test card receipts. At the end of the test, if the number of cards that have not been tested is greater than the quality parameters required by the company, all the matching cards to the order considered (e.g., order number 2004) are destroyed.

This process is not supported through any PYB function.

Storage of BPC Cards in the Warehouse

Once the testing phase has been completed, the operator performs the storage of the BPC cards that have been deemed valid in the warehouse; this process is not supported through any PYB function.

2.3.2.1 Shipping of BPC Cards to the Sales Network

The sophistication level related to the registration process of the issue of BPC cards from the warehouse can be customized at company level, including the possibility not to record the relevant issue. The greater the number of different card statuses (e.g., cards input in stock, output from the warehouse, distributor, points of sale), the more the company is able to ensure the validity of its control system. The greater or lesser sophistication of the monitoring system also has an impact in terms of cost and organization. Accordingly, each company can decide what it wants to make more or less strong in its control system.

Figure 55:
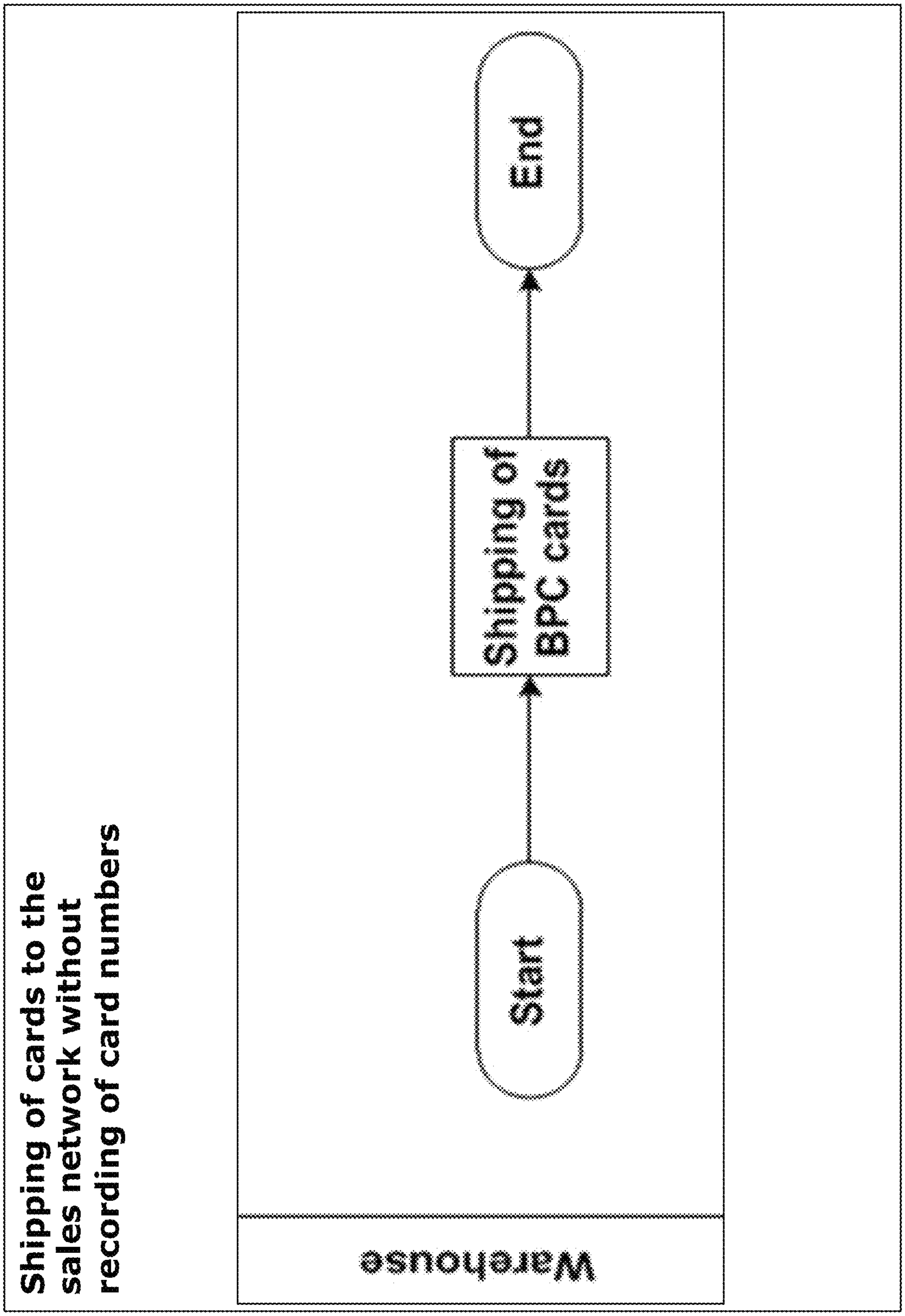
FIGS. 55-60 show a process for shipping of BPC cards in accordance with preferred embodiments of the present invention.
Figure 56:
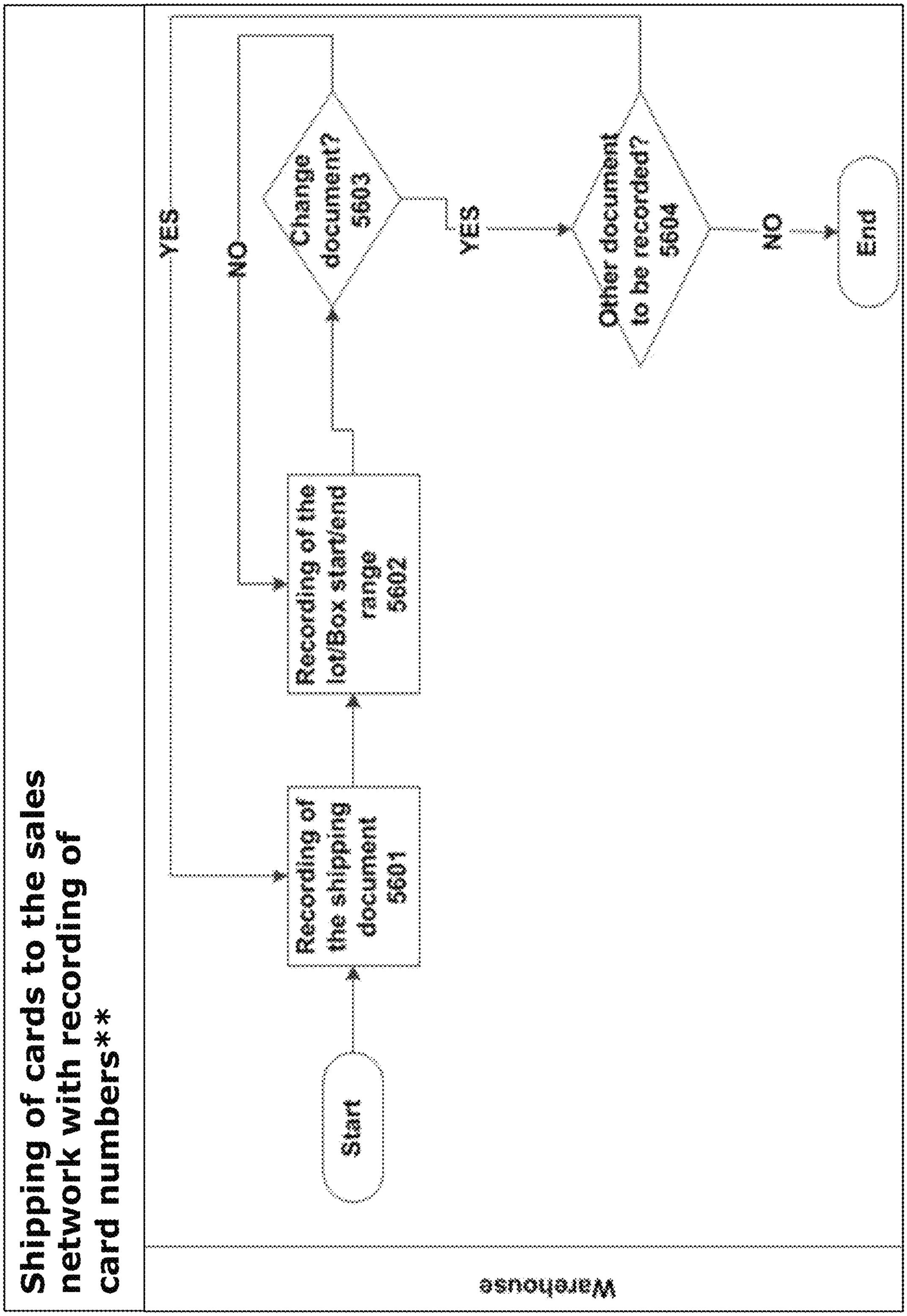
Figure 57:
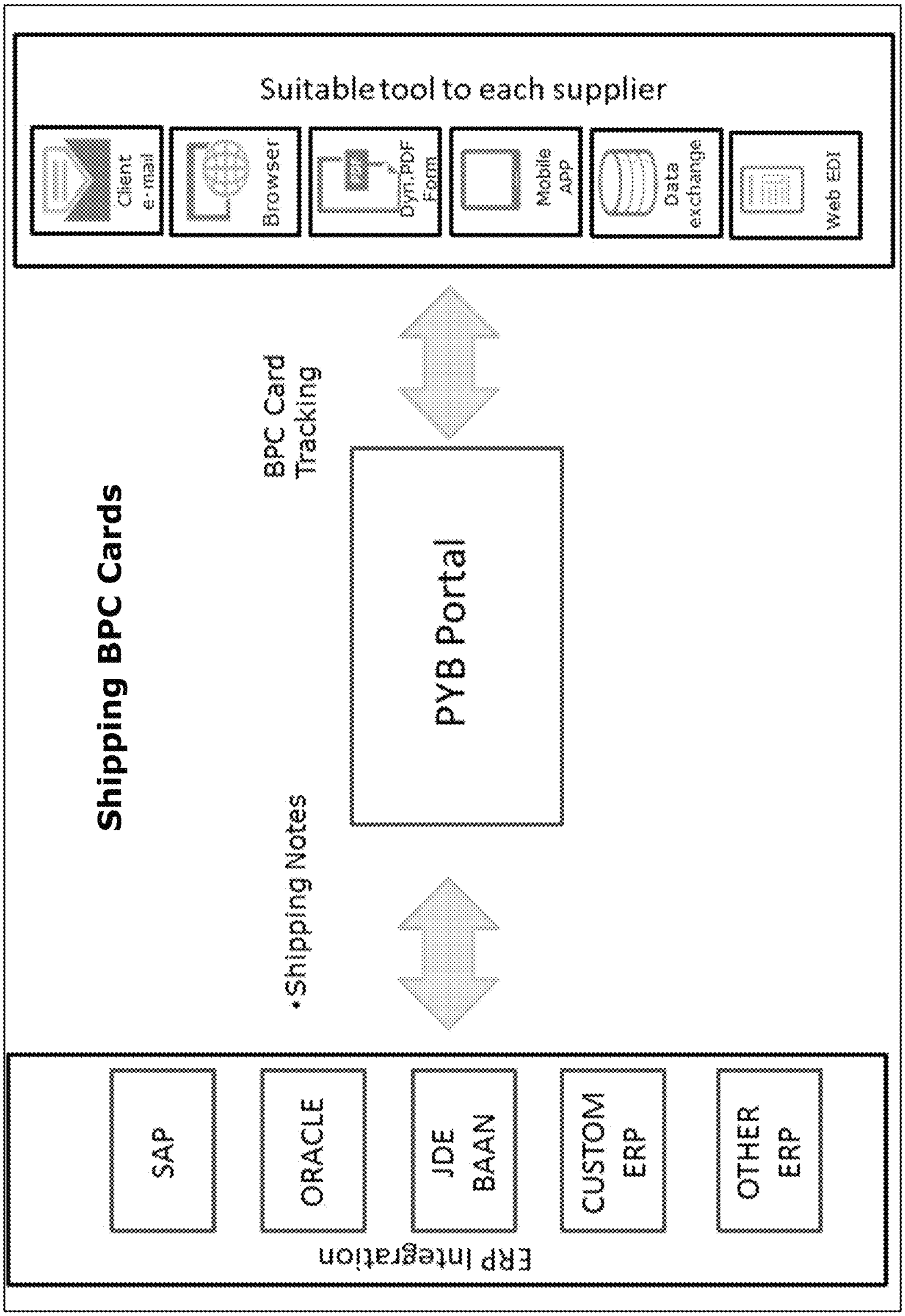
Figure 58:
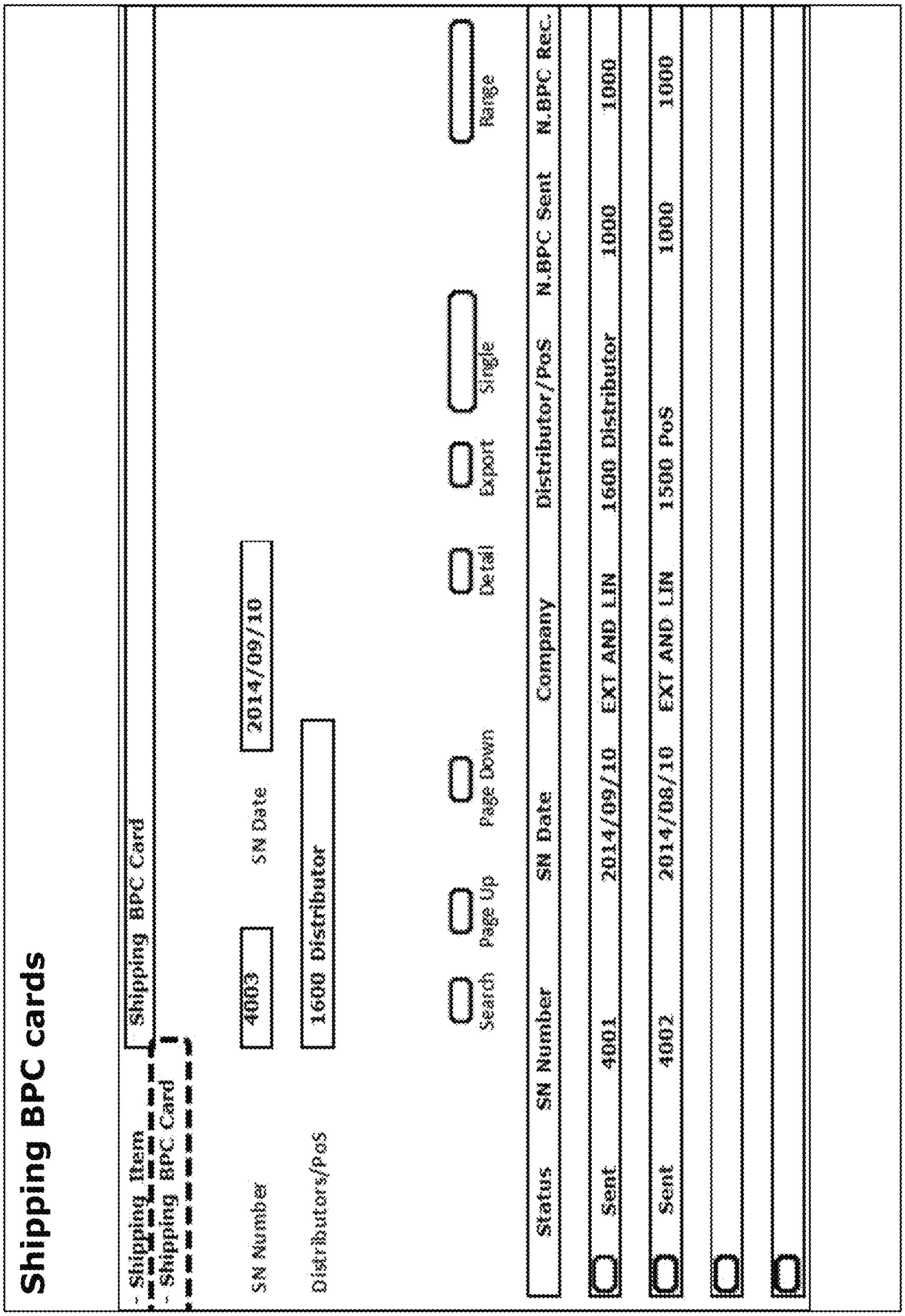
Figure 59:
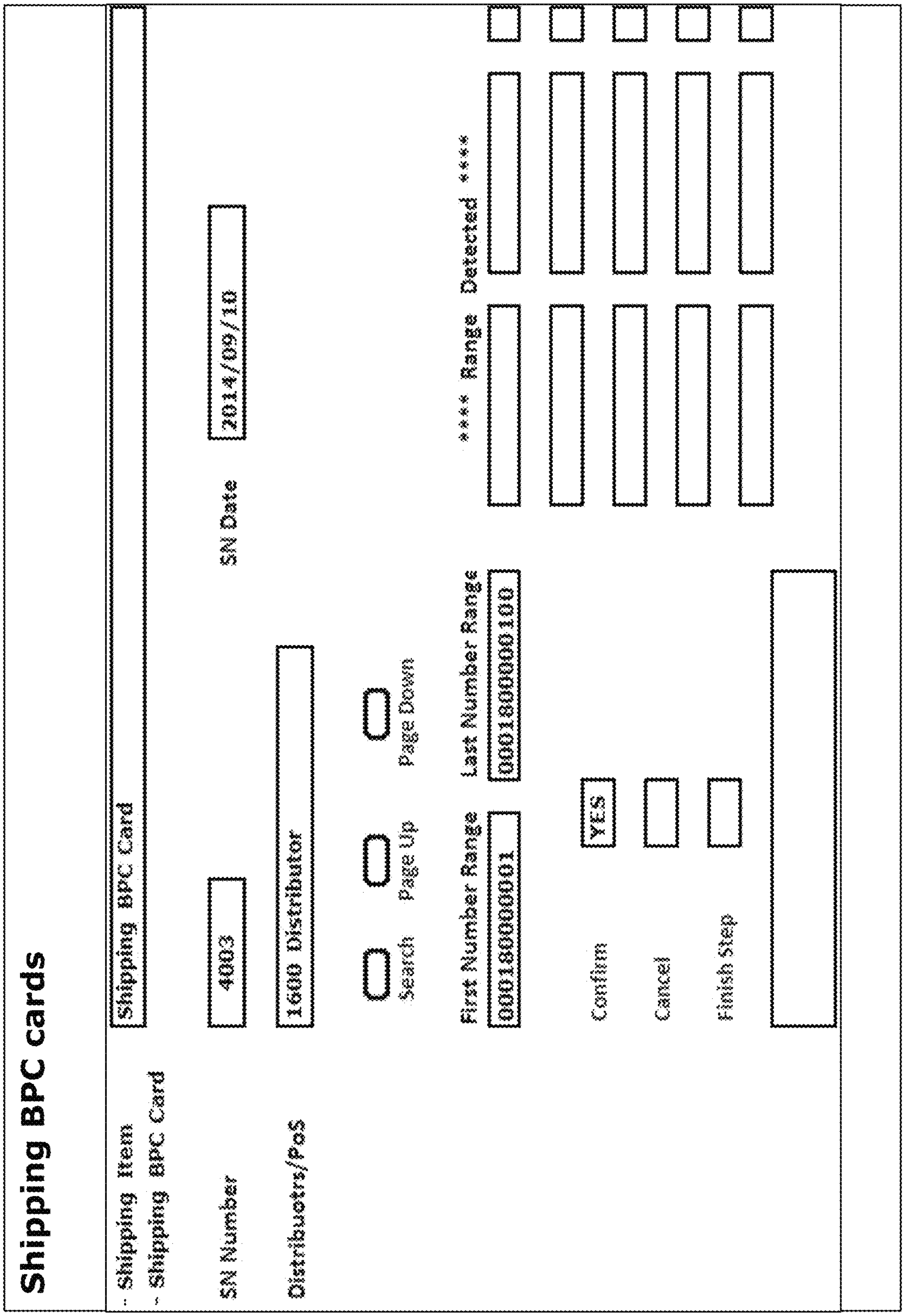
Figure 60:
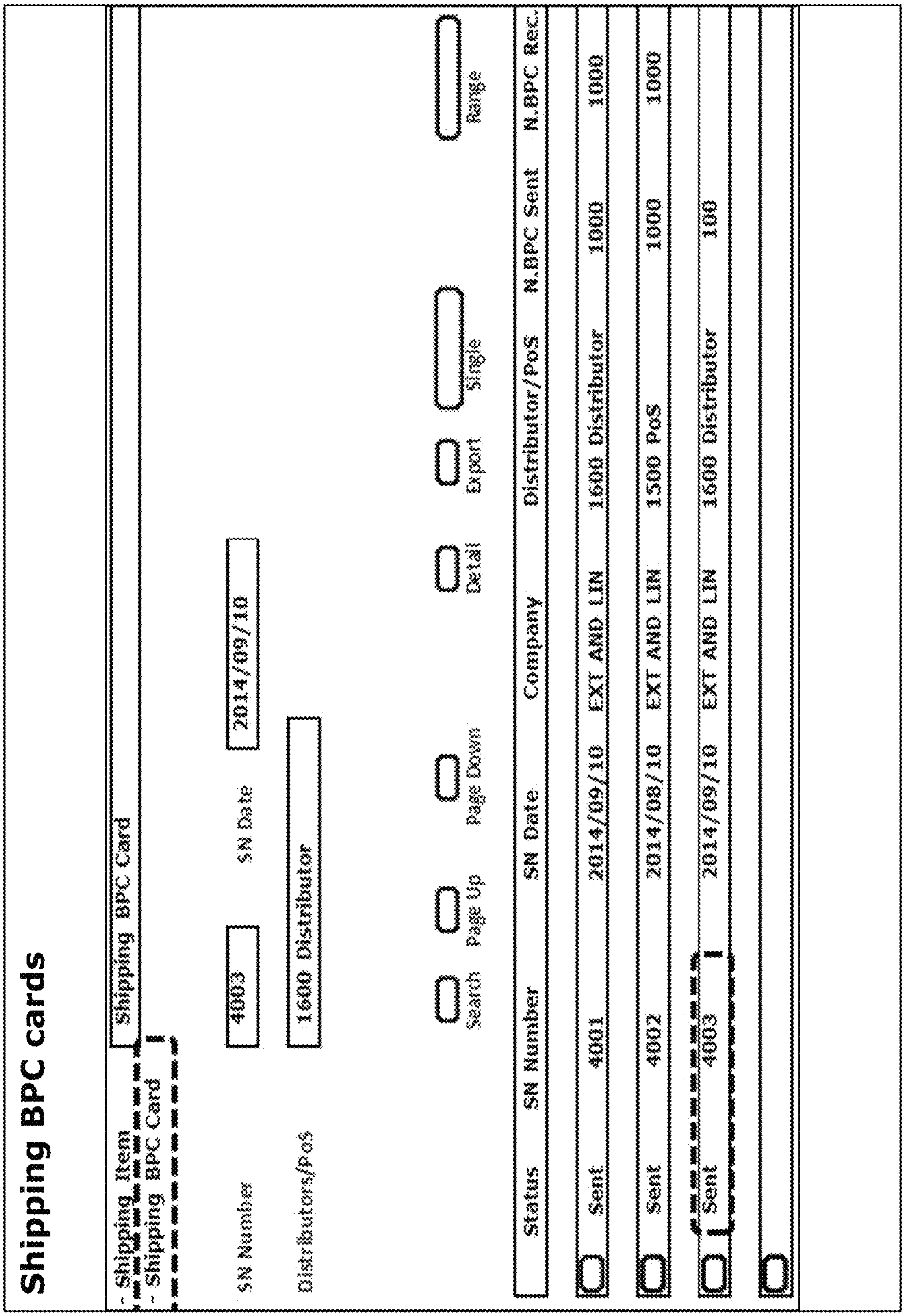

2.3.2.1.1 Shipping of BPC Cards to the Sales Network without Recording of Card Numbers FIG. 55: Process design:

The process is not supported through any function 2.3.2.1.2 Transmission of BPC Cards to the Sales Network with Recording of Card Numbers FIG. 56: Process design FIGS. 57-60: The reference data of the shipping document must be recorded in the PYB system, i.e., date, number, destination (other warehouse, distributor, PoS), start/end ranges of cards during shipping.

According to the company parameters chosen and to the current shipping, the ranges can be indicated at lot level or at box level.

Referring to FIG. 56, the above-described process for shipping of BPC cards to the sales network with recording of card numbers is illustrated in the following steps:

Step S601: Recording of the shipping document

Step S602: Recording of the lot/Box start/end range

Step S603: Change document?

Step S604: Other document to be recorded?

Figure 61:
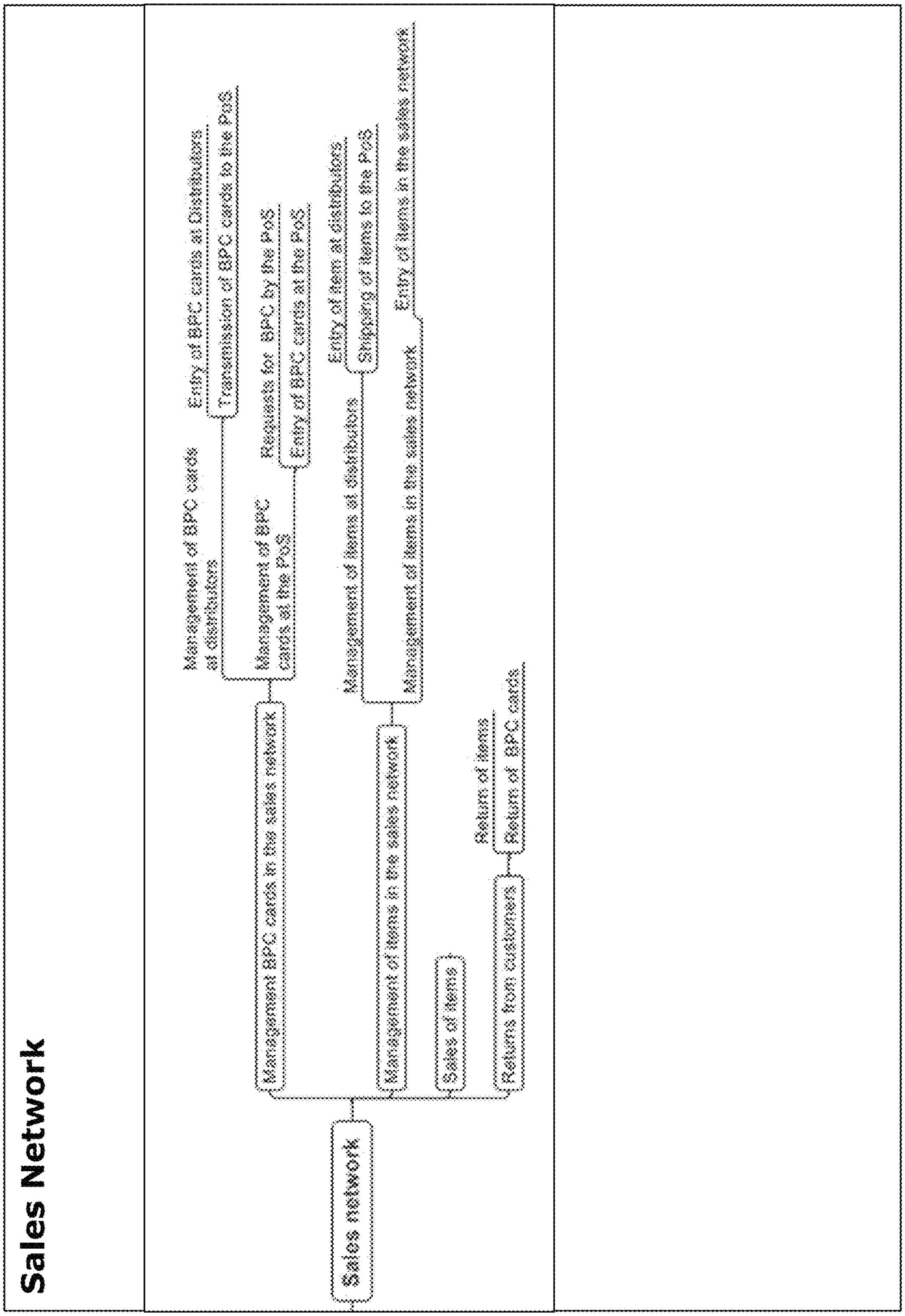
FIG. 61 is a sales network process flow diagram in accordance with a preferred embodiment of the present invention.

2.4 Sales Network (FIG. 61)

This section deals with topics and processes of which the sales network is in charge; sales can be made either through distributors or directly. The operation of distributors and the operation of the PoS are outlined in order below.

The described model does not depend on the presence of a network that is owned by the producer or that is externally managed (e.g.: franchising). A producer can be mono-brand or multi-brand; analogously, the sales network can also be mono-brand or multi-brand.

2.4.1 Management of BPC Cards in the Sales Network 2.4.1.1 Management of BPC Cards at Distributors The management of BPC cards at distributors refers to the entry of BPC cards at distributors and to the relevant transmission to the sales network. The processes related to the management of BPC cards at distributors are out of scope of the PYB project (e.g.: warehouse management).

Figure 63:
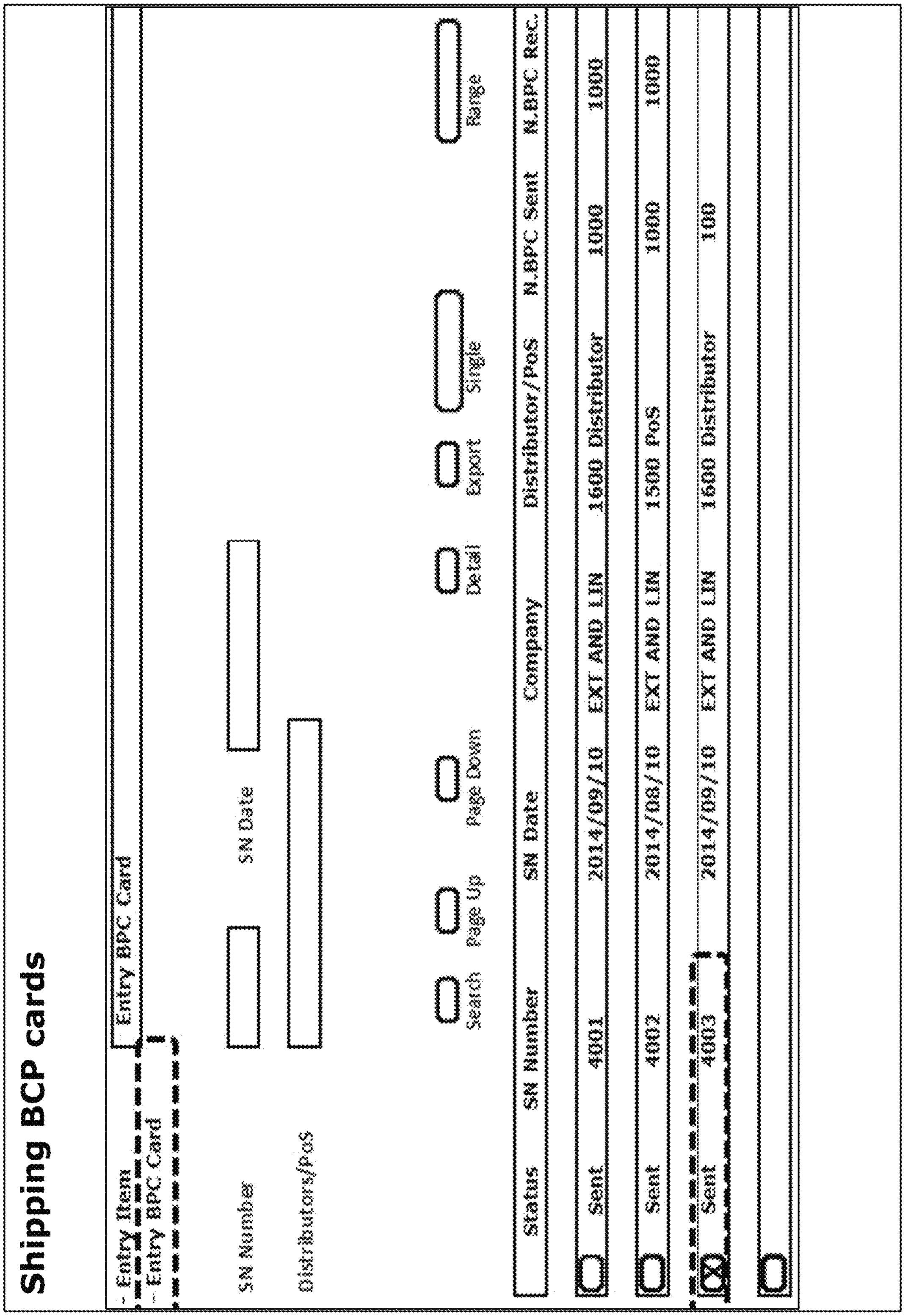
Figure 64:
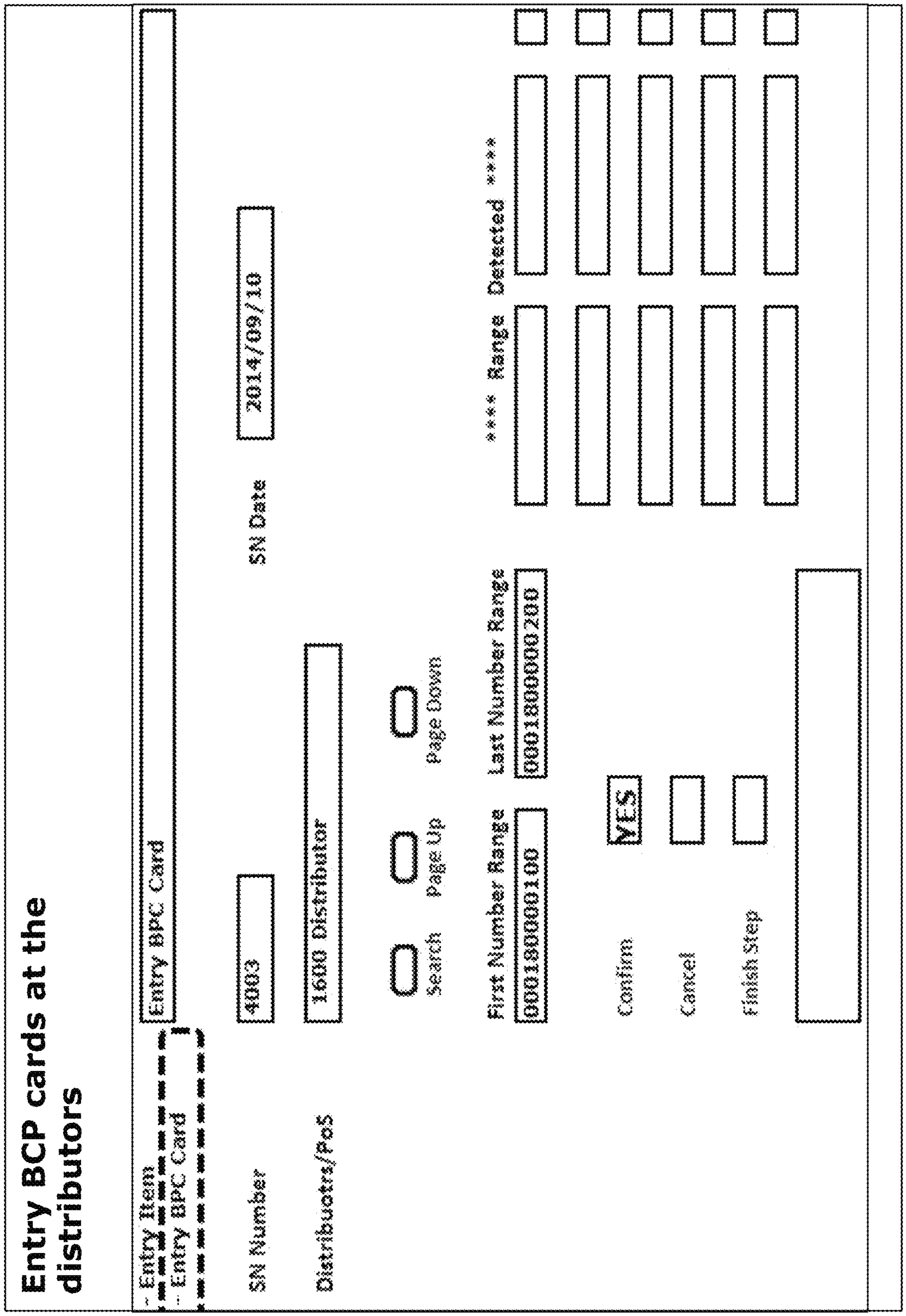

2.4.1.1.1 Entry of BPC Cards at Distributors (FIGS. 63, 64)

Figure 62:
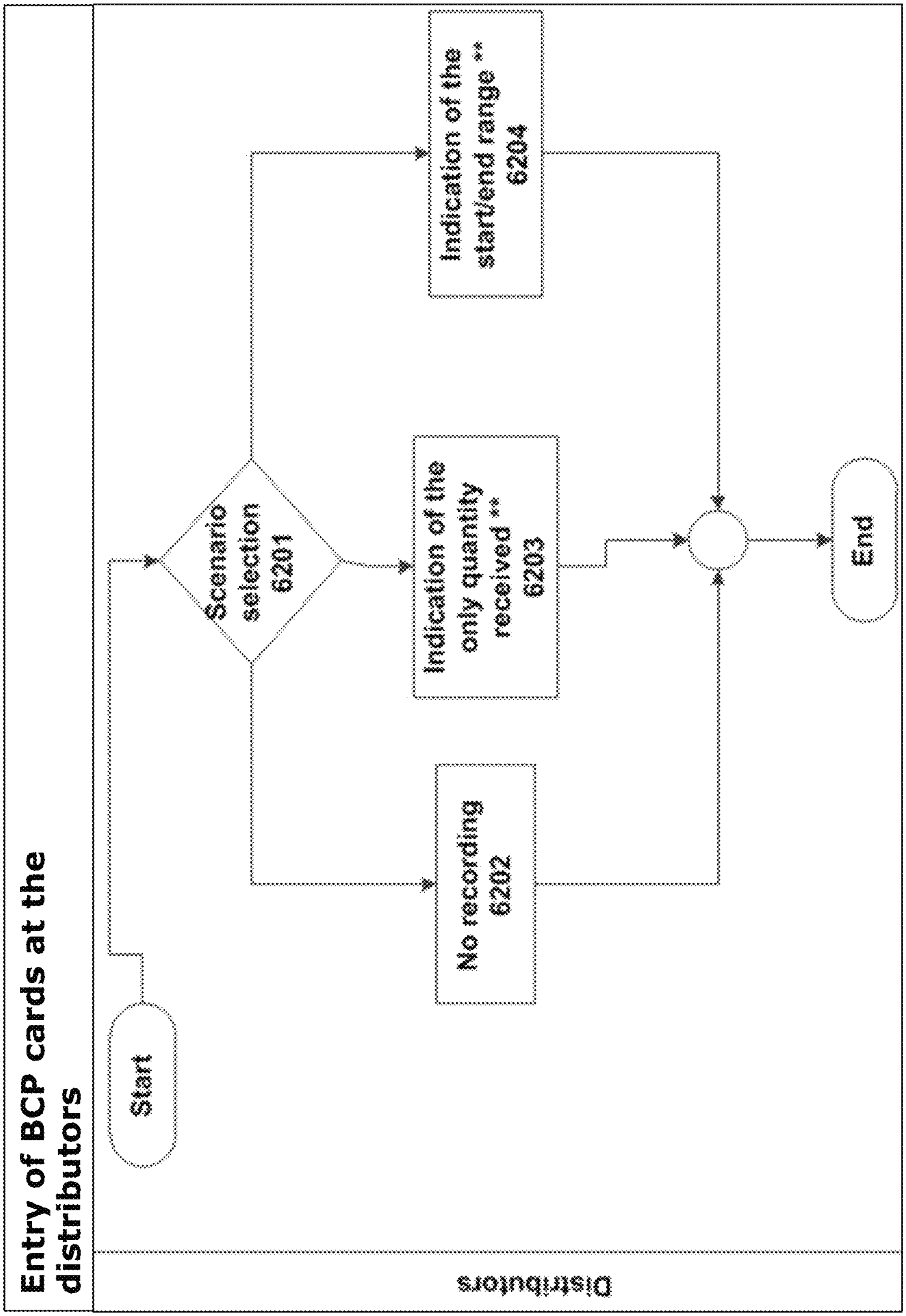
FIGS. 62-69 show processes related to shipping of BPC cards in accordance with preferred embodiments of the present invention.

FIG. 62: Process design

1. The sophistication level related to the registration process of the entry of BPC cards at distributors can be customized at company level, including the possibility not to record the entry of BPC cards at distributors.
2. If you want to record the entry of BPC cards, it is assumed that the operator enters in the system the start and end ranges of the cards received. According to the company parameters chosen, the ranges can be considered at lot or box level.
3. Another possibility may be to enter in the system only the quantity of the cards received.

Referring to FIG. 62, the above-described process for entry of BPC cards at the distributor is illustrated in the following steps:

Step 6201: Scenario selection

Step 6202: No recording

Step 6203: Indication of the only quantity received

Step 6204: Indication of the start/end range 2.4.1.1.2 Transmission of BPC Cards from Distributors to PoS (FIGS. 66-69)

Figure 65:
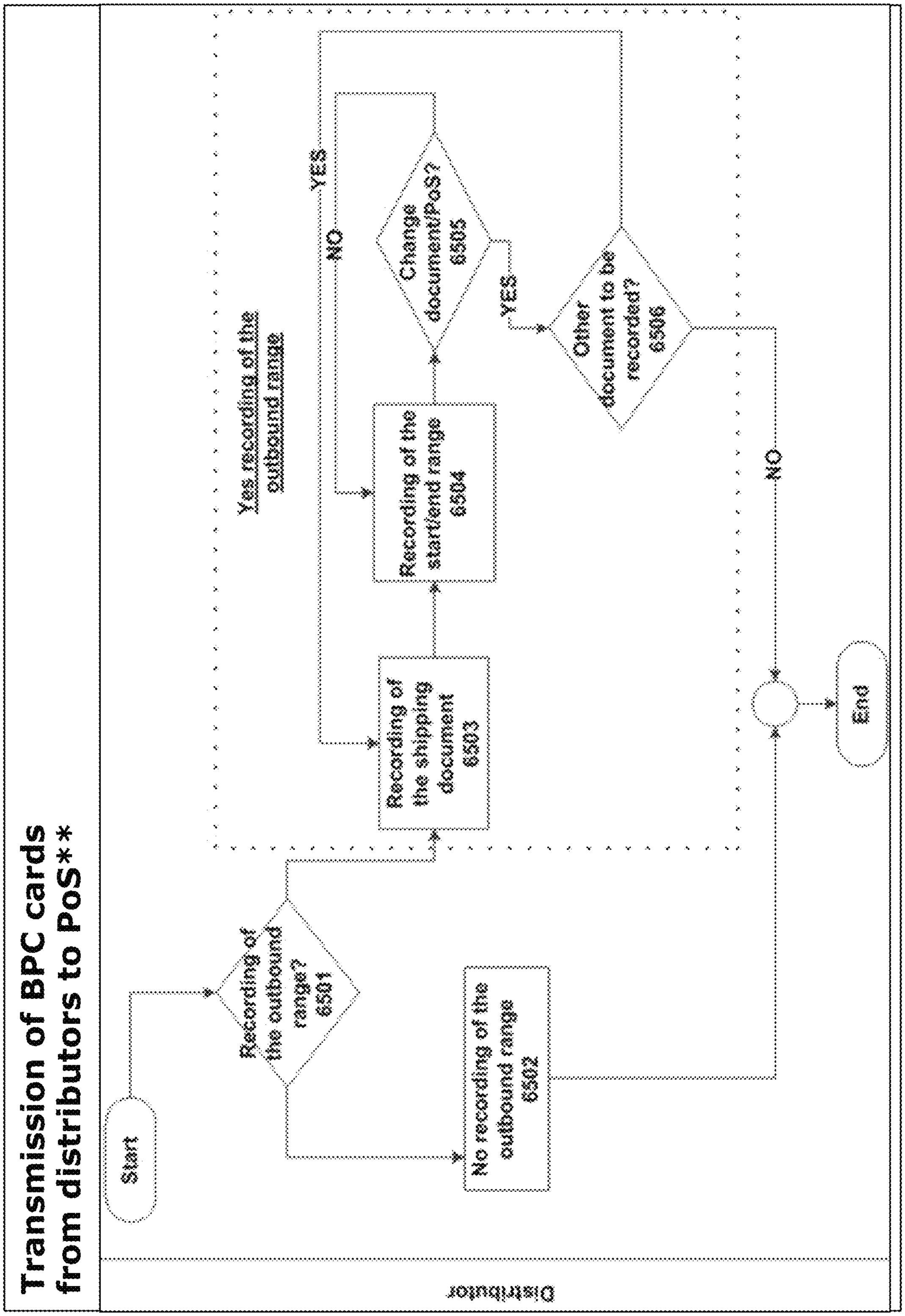
Figure 66:
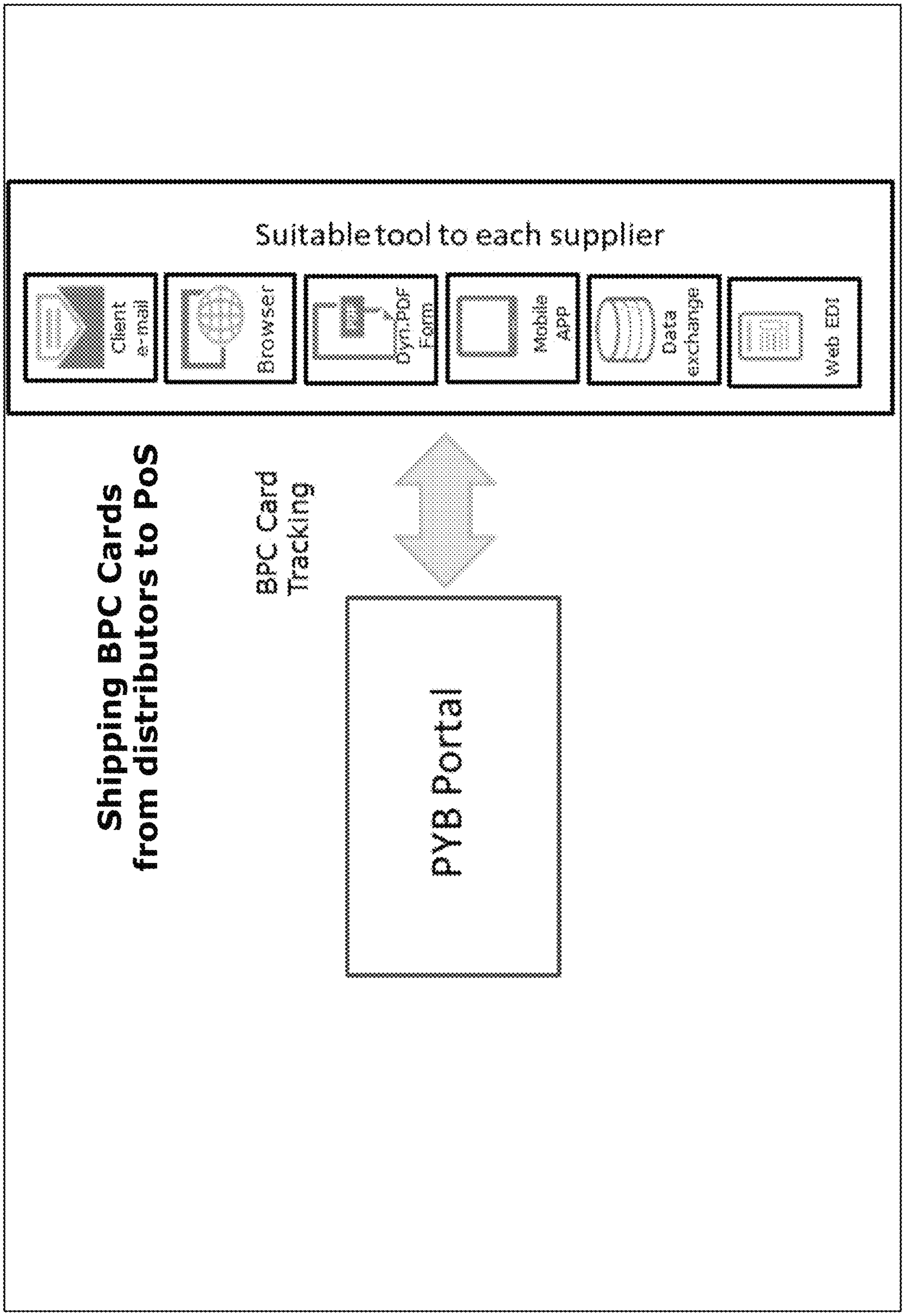
Figure 67:
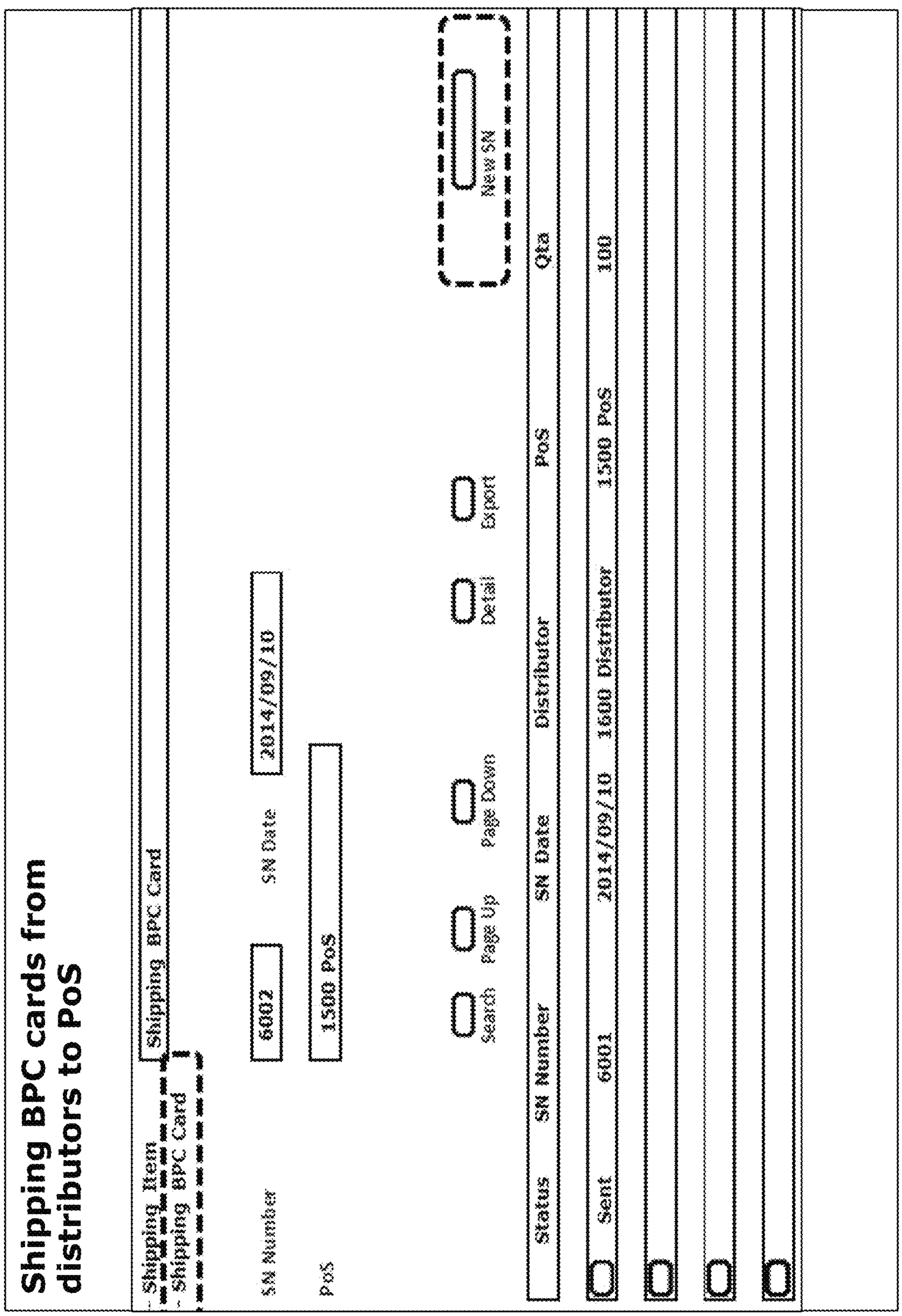
Figure 68:
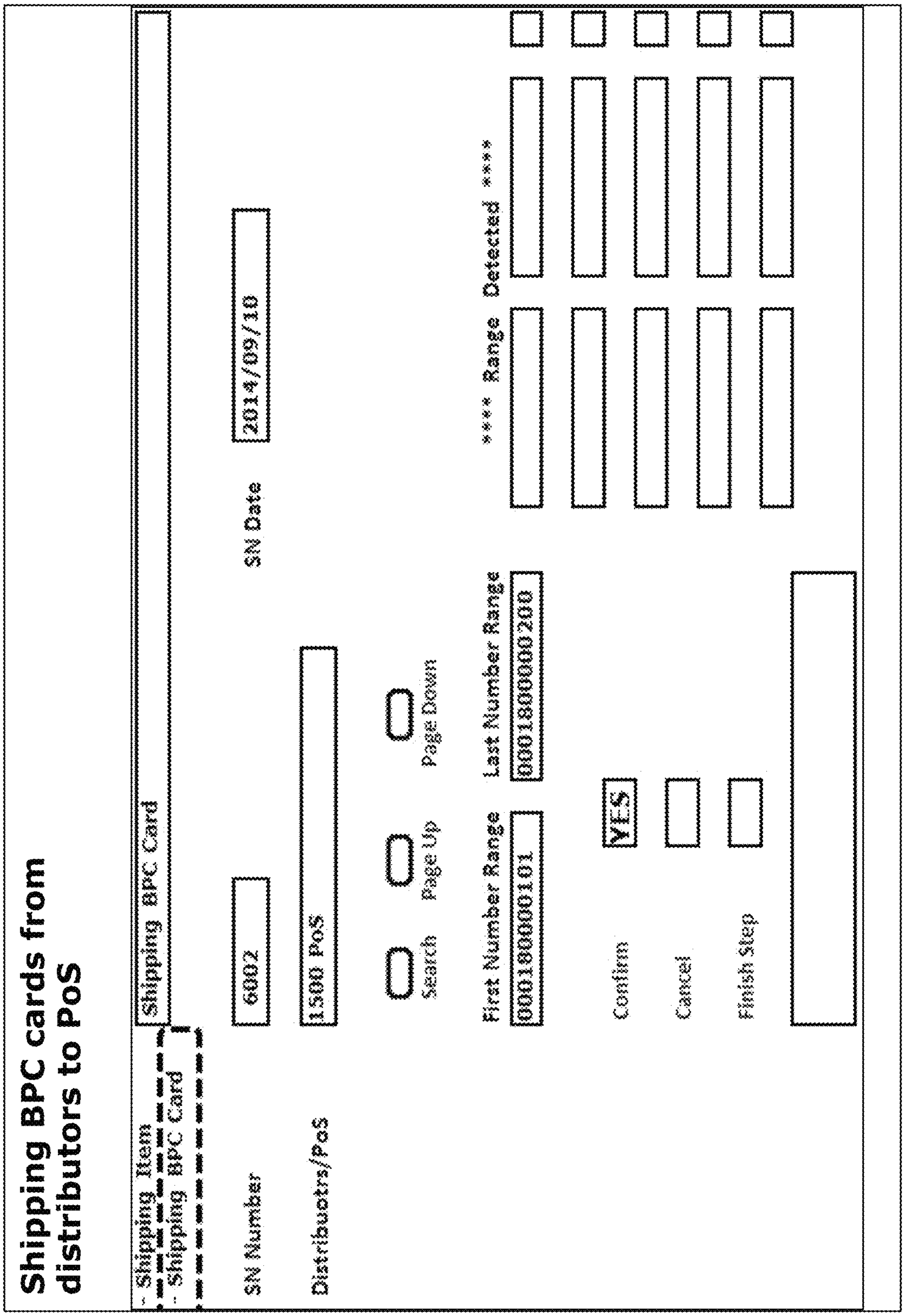
Figure 69:
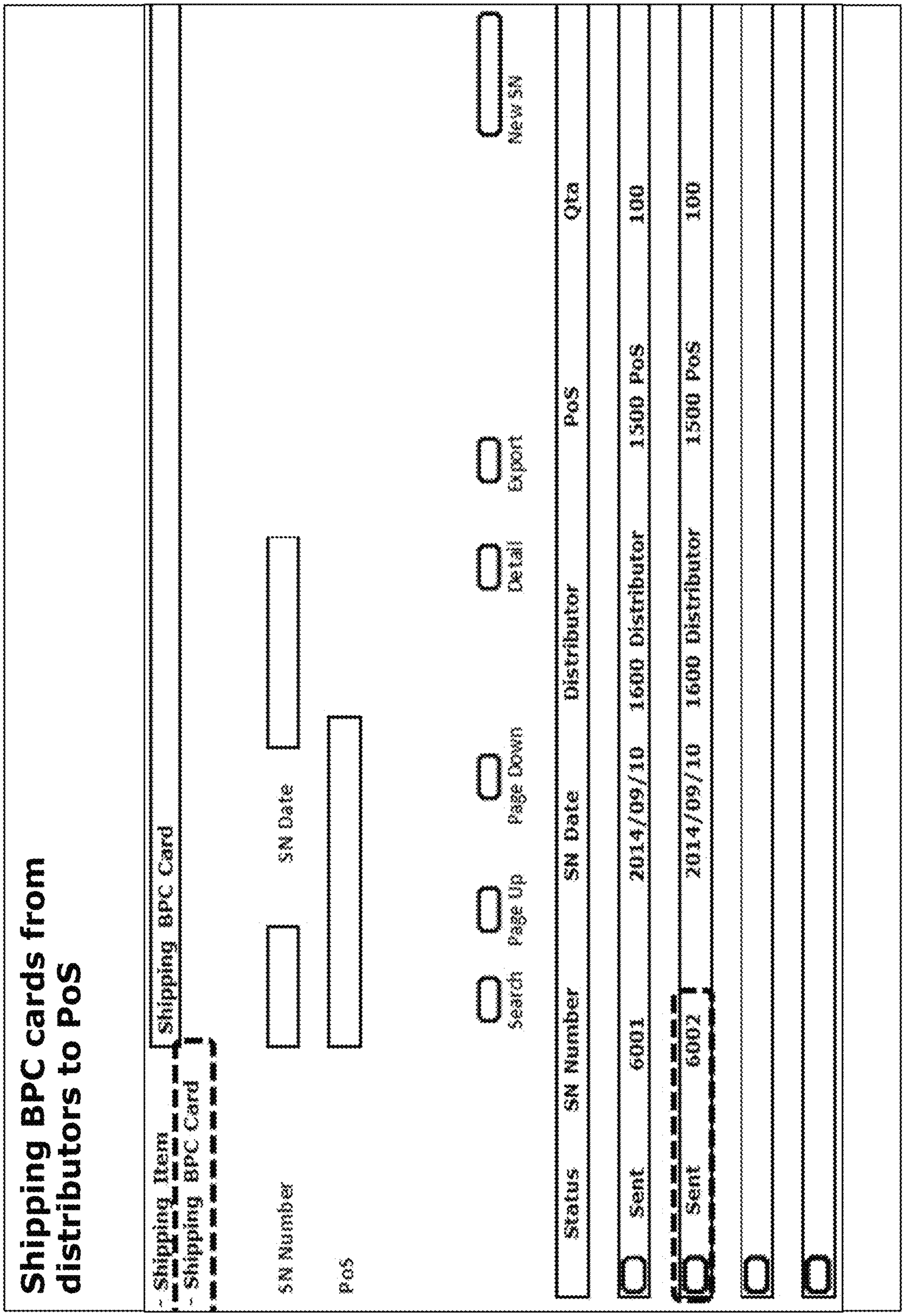

FIG. 65: Process design

1. The sophistication level related to the registration process of the transmission of BPC cards from the distributor to the sales network can be customized at company level, including the possibility not to record the issue of BPC cards from the distributor.
2. If you want to record the issue of cards from the distributor, it is assumed that the operator enters in the system the start and end ranges of outbound cards, the destination and the number of the goods accompanying document. According to the company parameters chosen, the ranges can be considered at lot or box level.

Referring to FIG. 65, the above-described process for transmission (shipping) of BPC cards from distributors to PoS is illustrated in the following steps:

Step 6501: Recording of the outbound range?

Step: 6502: No recording of the outbound range

Step 6503: Recording of the shipping document

Step 6504: Recording of the start/end range

Step 6505: Change document/PoS

Step 6506: Other document to be recorded?

Figure 71:
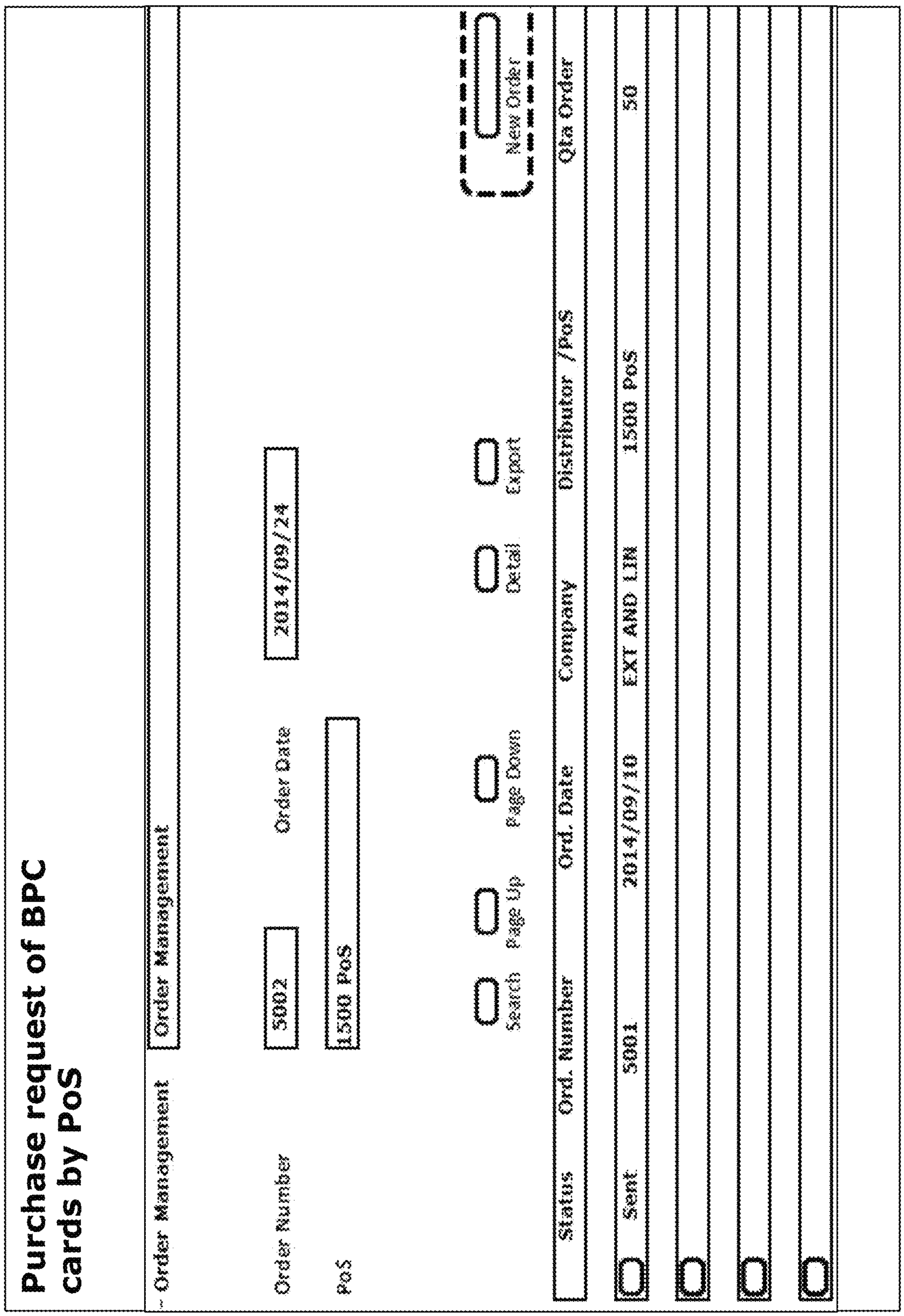
Figure 72:
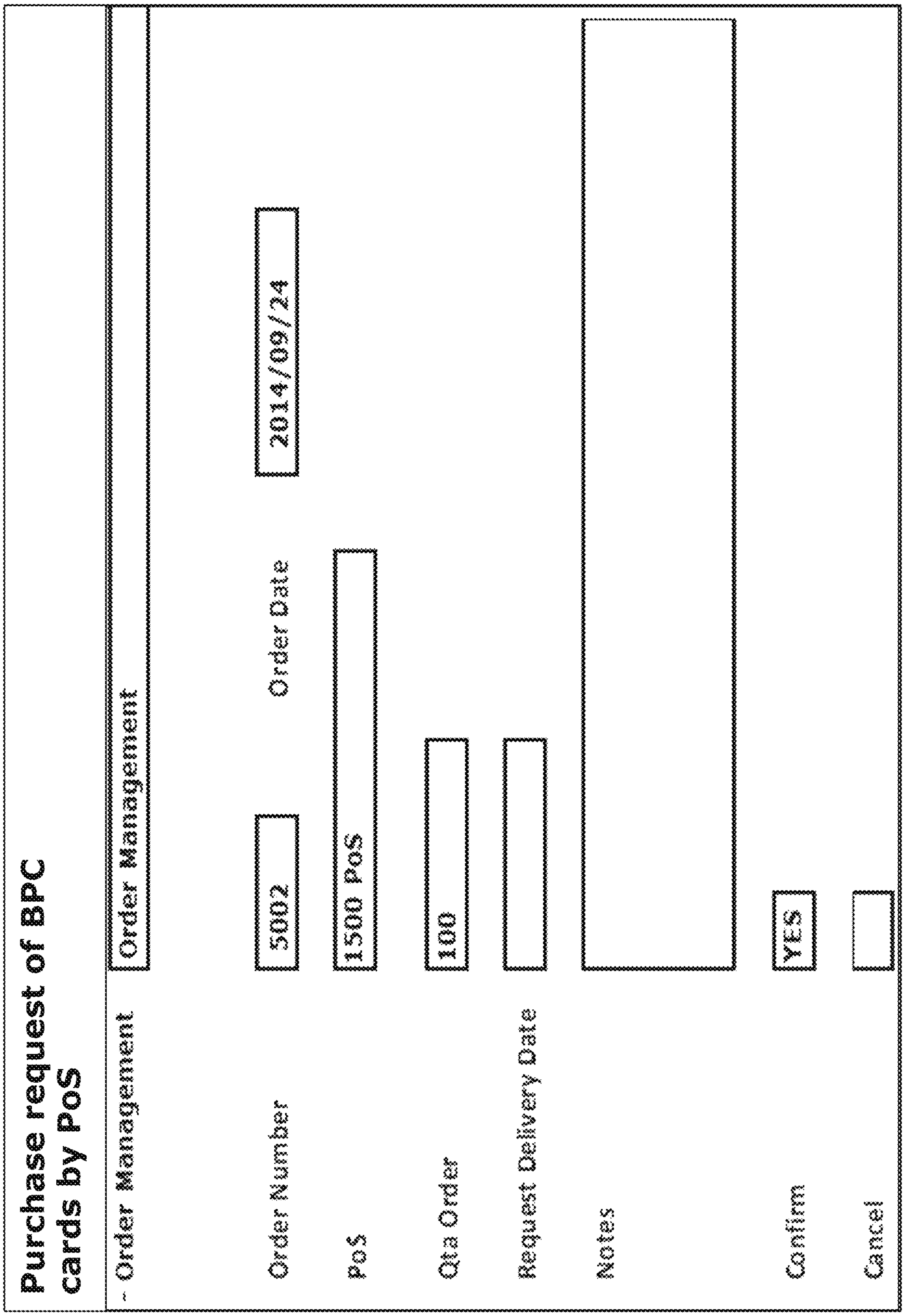
Figure 73:
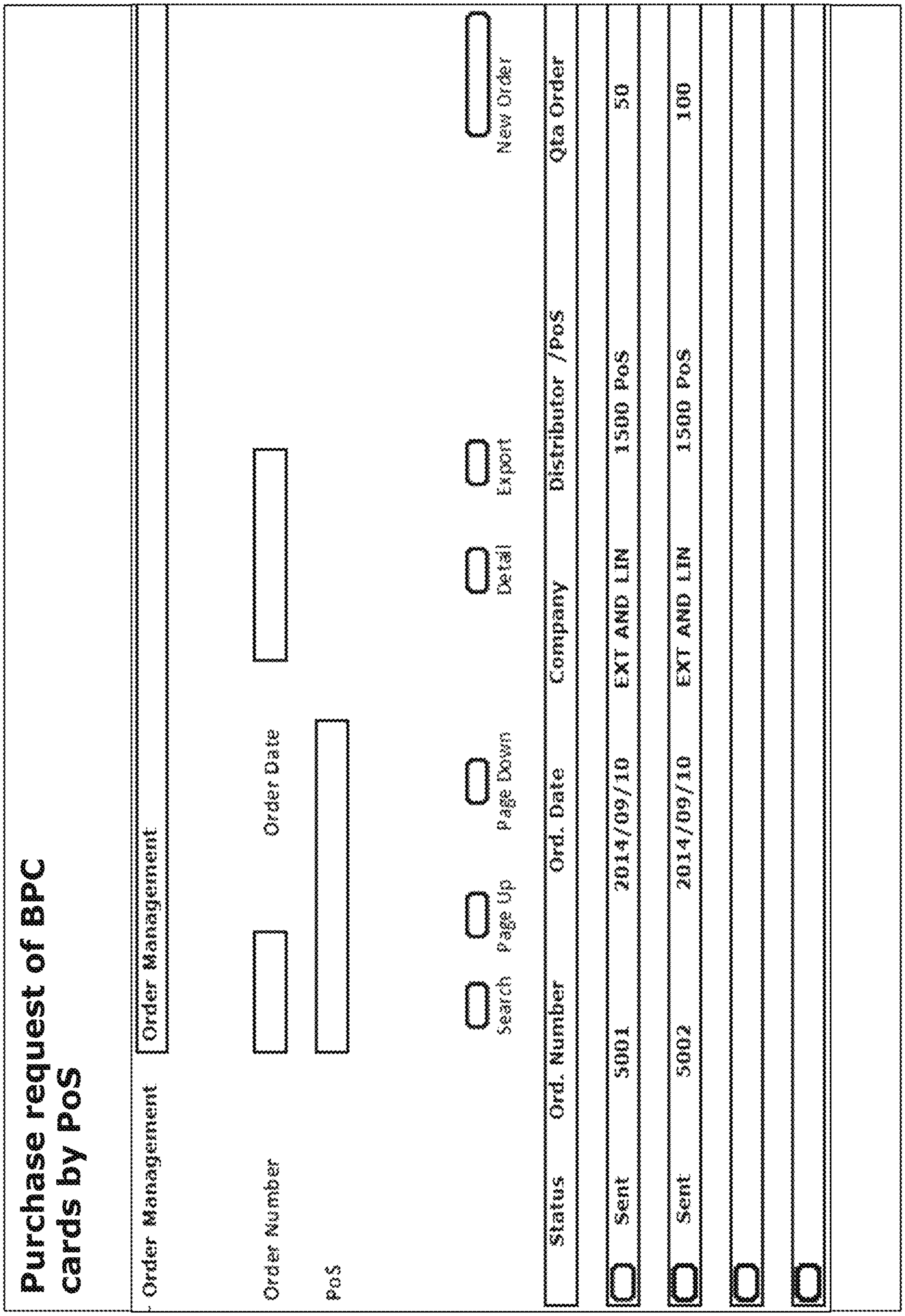

2.4.1.2 Management of BPC Cards at PoS 2.4.1.2.1 Purchase Requisitions of BPC Cards by PoS (FIGS. 71-73)

The point of sale will have the possibility to carry out the orders of tiles BPC to Company.

Figure 70:
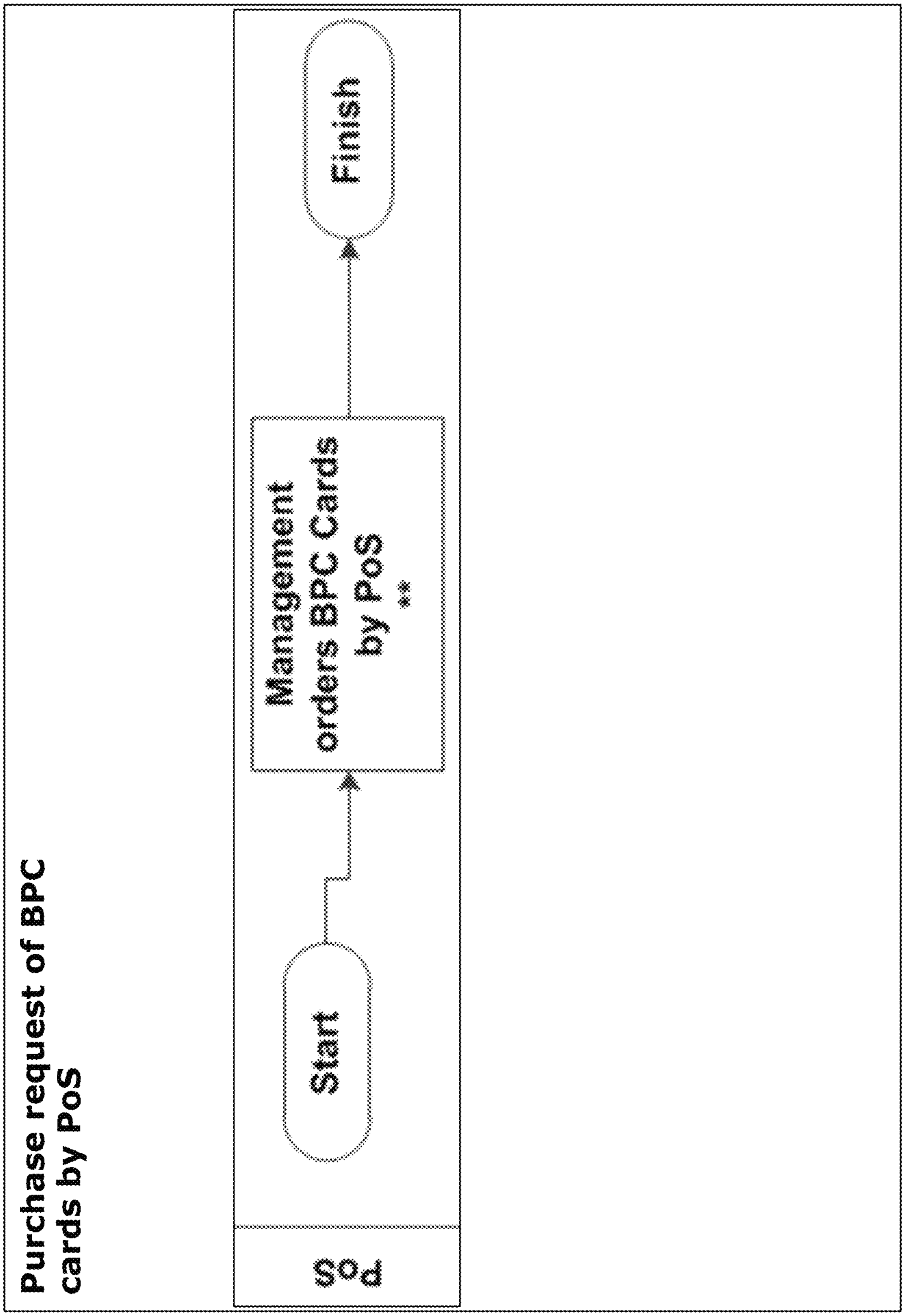
FIGS. 70-73 show a process for a purchase request of BPC cards by a PoS in accordance with preferred embodiments of the present invention.

FIG. 70: Process design.

The status of order placed on the portal PYB can be the following value:

| Status order | Description |
|---|---|
| Sent | Sent to distributors/PoS |
| By rec.label | By record label |
| Recording label | registration process labels in progress |
| In receipt | the receiving process is in progress |
| Receipt | Received |
| Receipt incomplete | Received there are differences between data sent and received data |
| Cancelled | Shipping notes cancelled |

Figure 75:
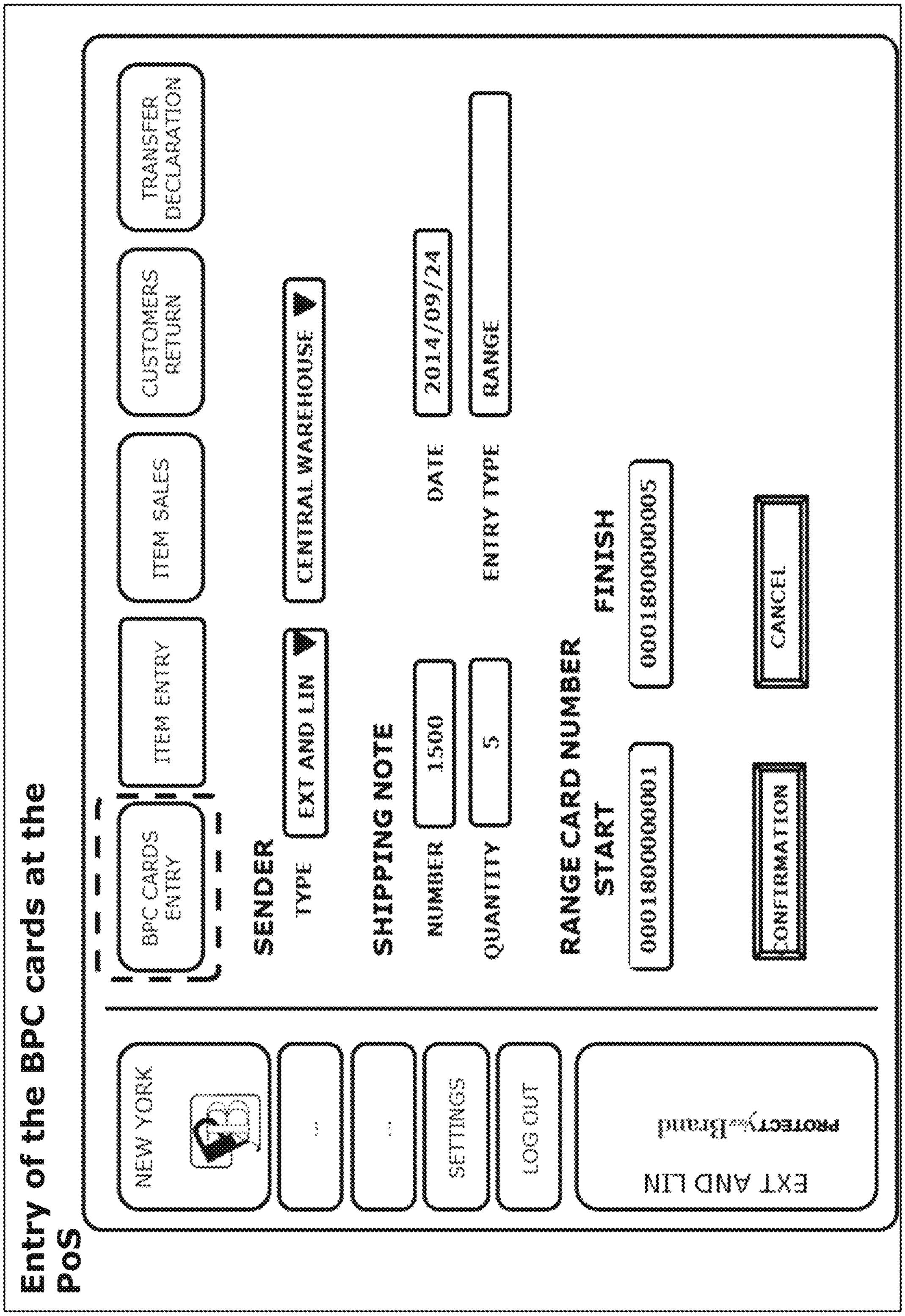

2.4.1.2.2 Entry of BPC Cards at PoS (FIG. 75)

Figure 74:
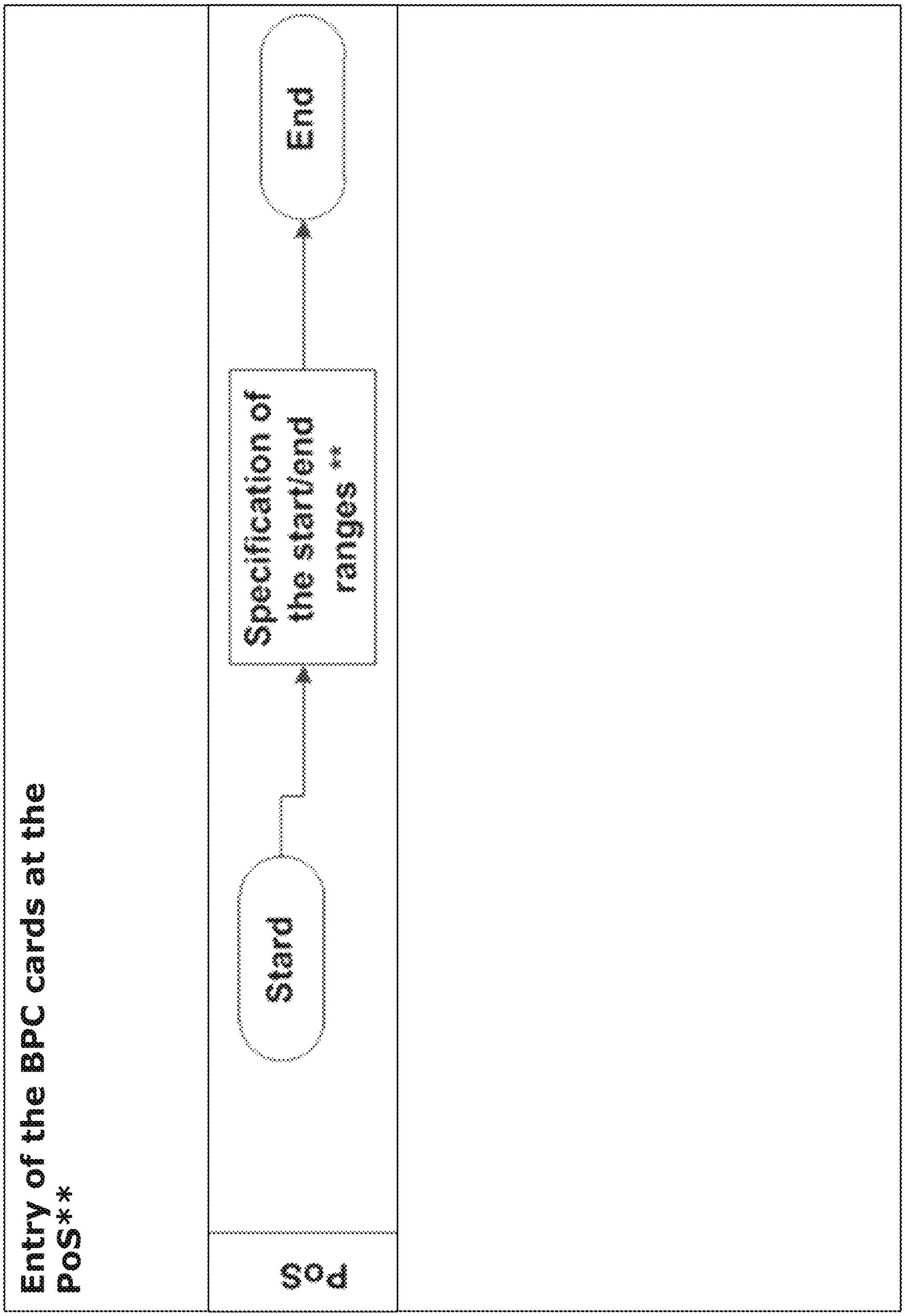
FIGS. 74-75 show a process for entry of BPC cards at a PoS in accordance with preferred embodiments of the present invention.

FIG. 74: Process design

Upon the entry of BPC cards at the PoS, it is assumed that the PoS operator enters in the PYB system the start and end ranges of the cards received. According to the company parameters chosen, the ranges can be considered at lot or box level.

2.4.2 Management of Items in the Sales Network

This paragraph deals with the item management performed by the sales network, the operation of distributors and the operation of the PoS are outlined in order.

Figure 76:
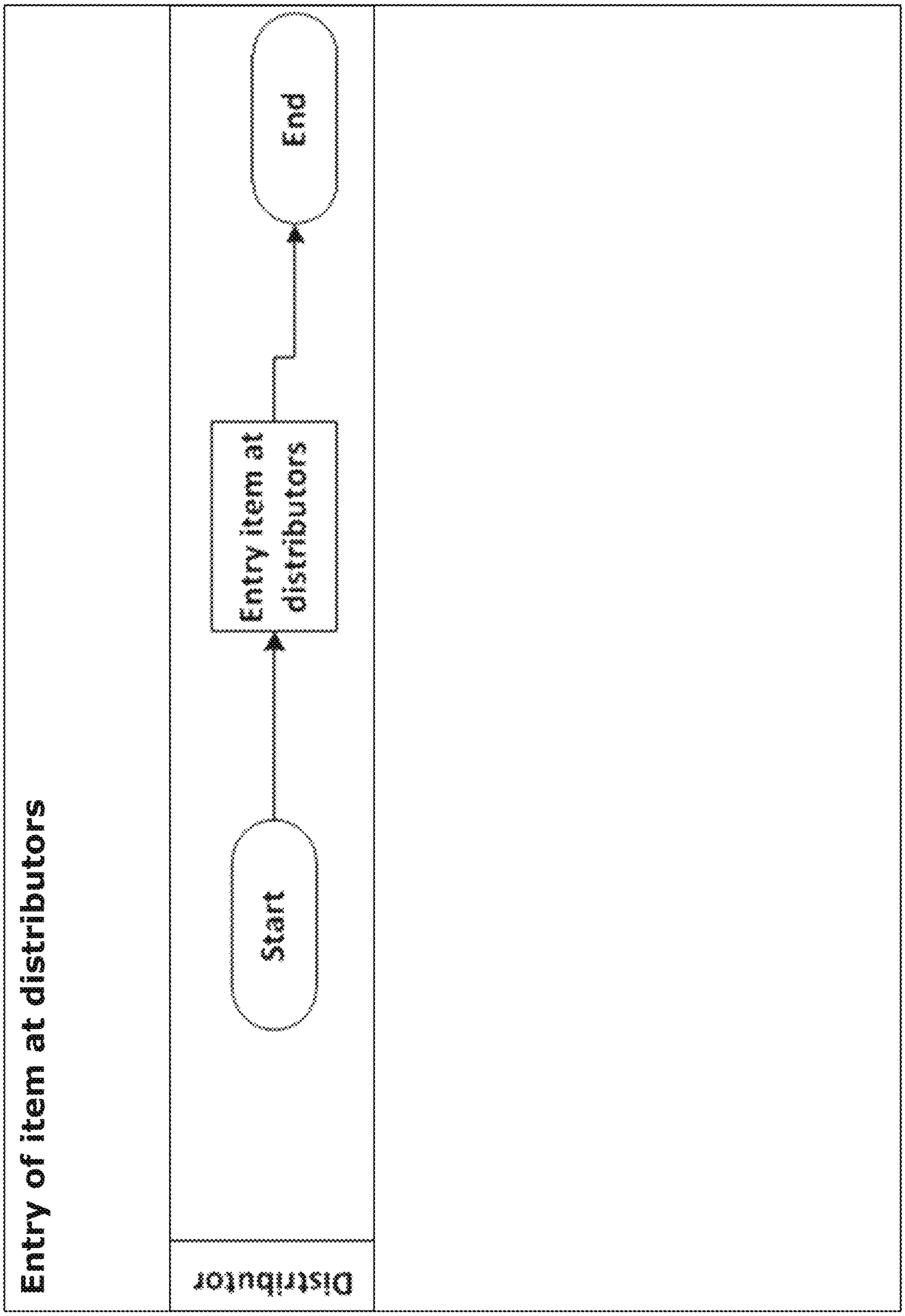
FIG. 76 is a process flow diagram for entry of items at distributors in accordance with a preferred embodiment of the present invention.

2.4.2.1 Management of Items at Distributors 2.4.2.1.1 Entry of Items at Distributors FIG. 76: Process scheme The recording related to the entry of items at distributors is not supported through any PYB function in order not to excessively impact on the distributor operations.

2.4.2.1.2 Shipping of Items to PoS

Figure 77:
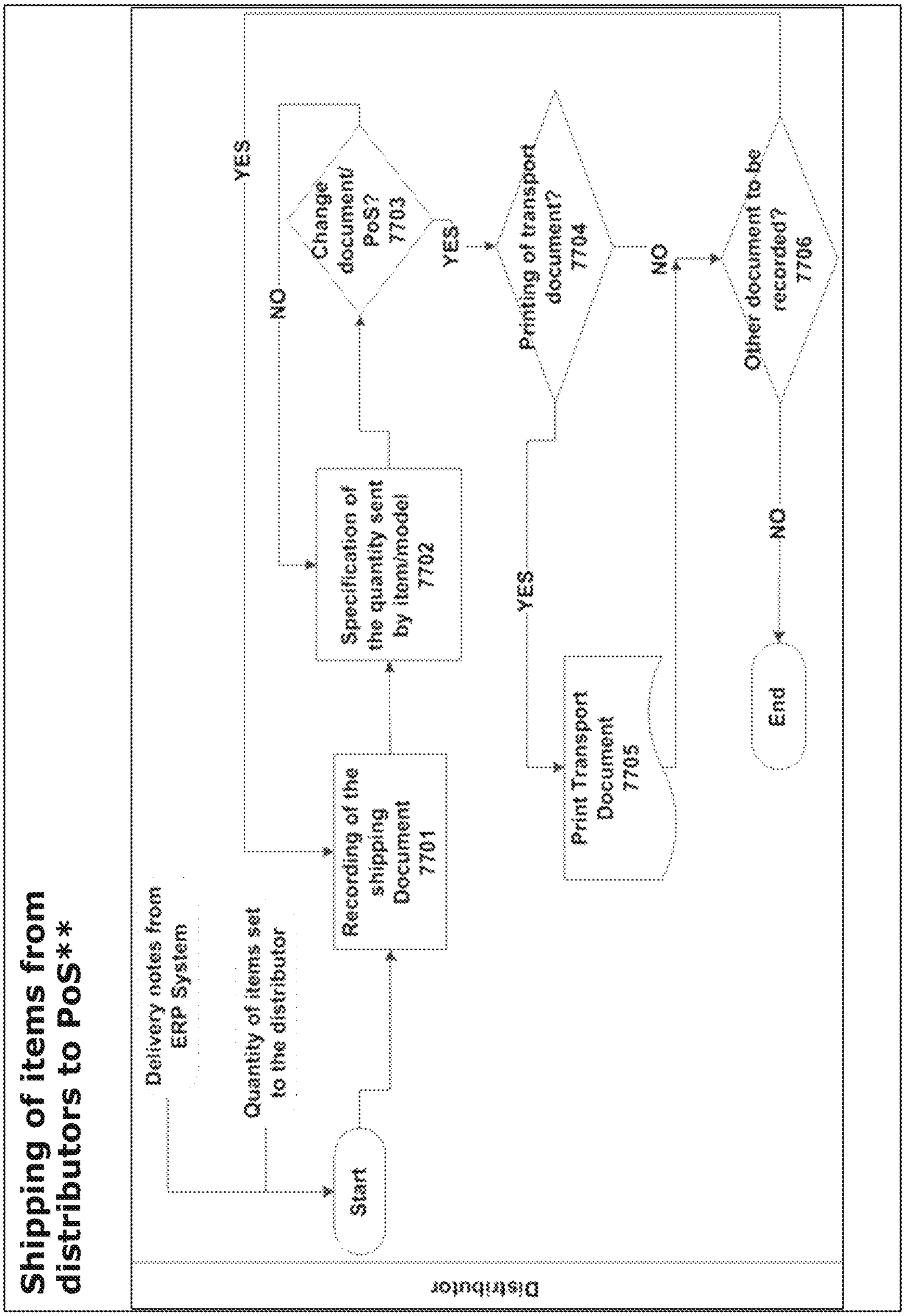
FIGS. 77-80 show a process for shipping an item from distributors to a PoS in accordance with preferred embodiments of the present invention.

FIG. 77: Process scheme

1. As seen in the process of transmission of the items to the sales network, the warehouse sent to the distributor items accompanied by a shipping document (e.g., shipping document number 1). On the PYB system there will be an online function that allows the distributor to select the shipping document received from the warehouse (e.g., shipping document number 1), create a new shipping document from the distributor to the PoS (e.g., shipping document number 2) indicate the PoS of destination, and indicate which items received from the warehouse (with the shipping document number 1) will be sent to the PoS.
2. Once a document has been chosen, the system displays the list of the items at the distributor with data about the quantity that has not been sorted yet. The quantity delivered to the chosen PoS must be specified for each item.
3. The reference data of the inbound documents at the Distributor and the reference data of the outbound documents from the distributor are entered in the system.
4. Upon the customer request (in particular, with regard to small customers), it is assumed to print transport documents from the PYB system. If the customer has a business software, a flow of the documents produced can be imported to the PYB system (batch phase).

The management of PYB items at the distributor is an optional process.

Set out below are the screens provided on the portal PYB.

Figure 78:
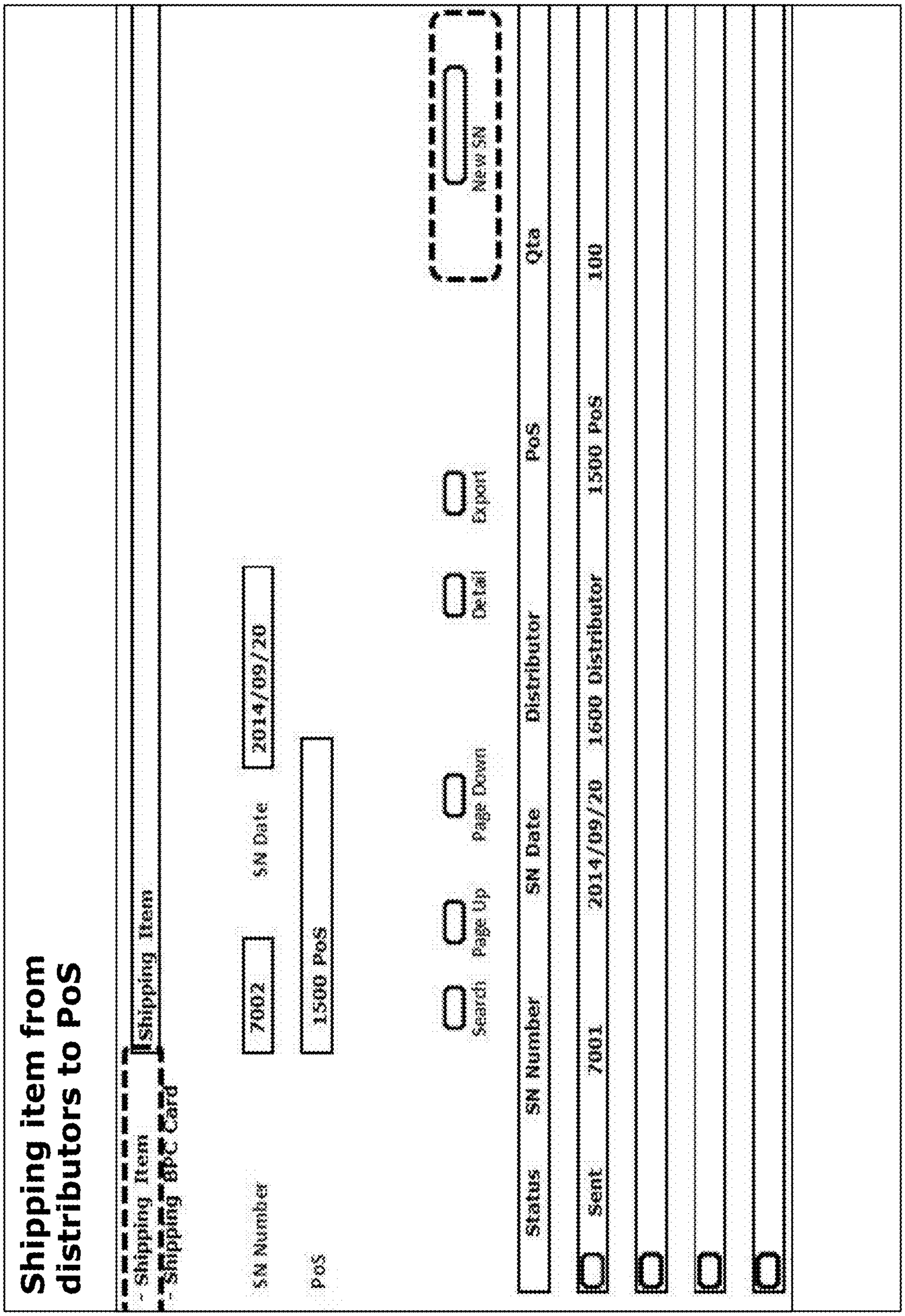

The first step is the creation of a document (named order) with which to associate the quantity of each items to be sent to the distributor or the point of sale. (FIG. 78)

Figure 79:
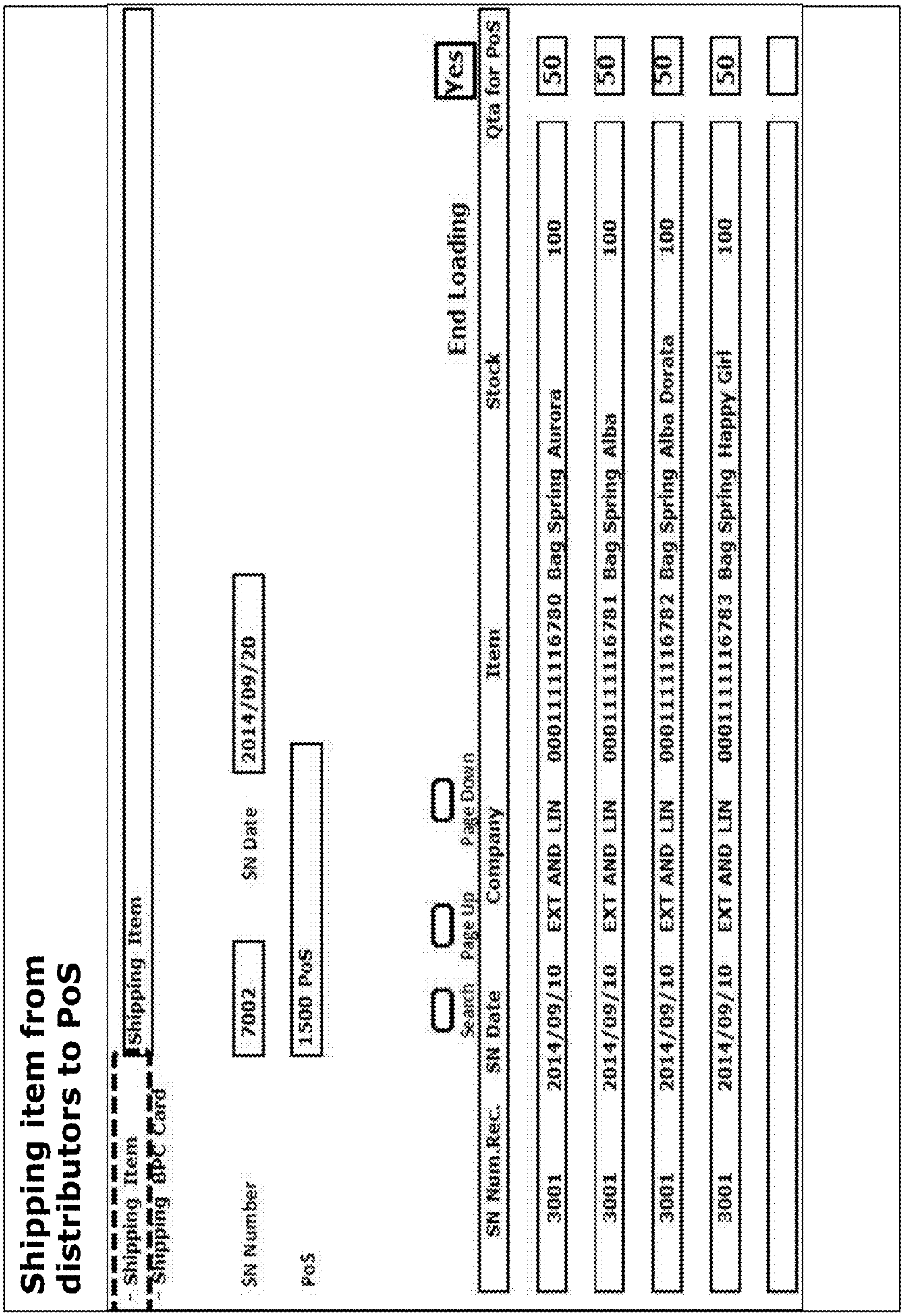

Once you have created the order are associated with the quantity of each item. (FIG. 79)

Figure 80:
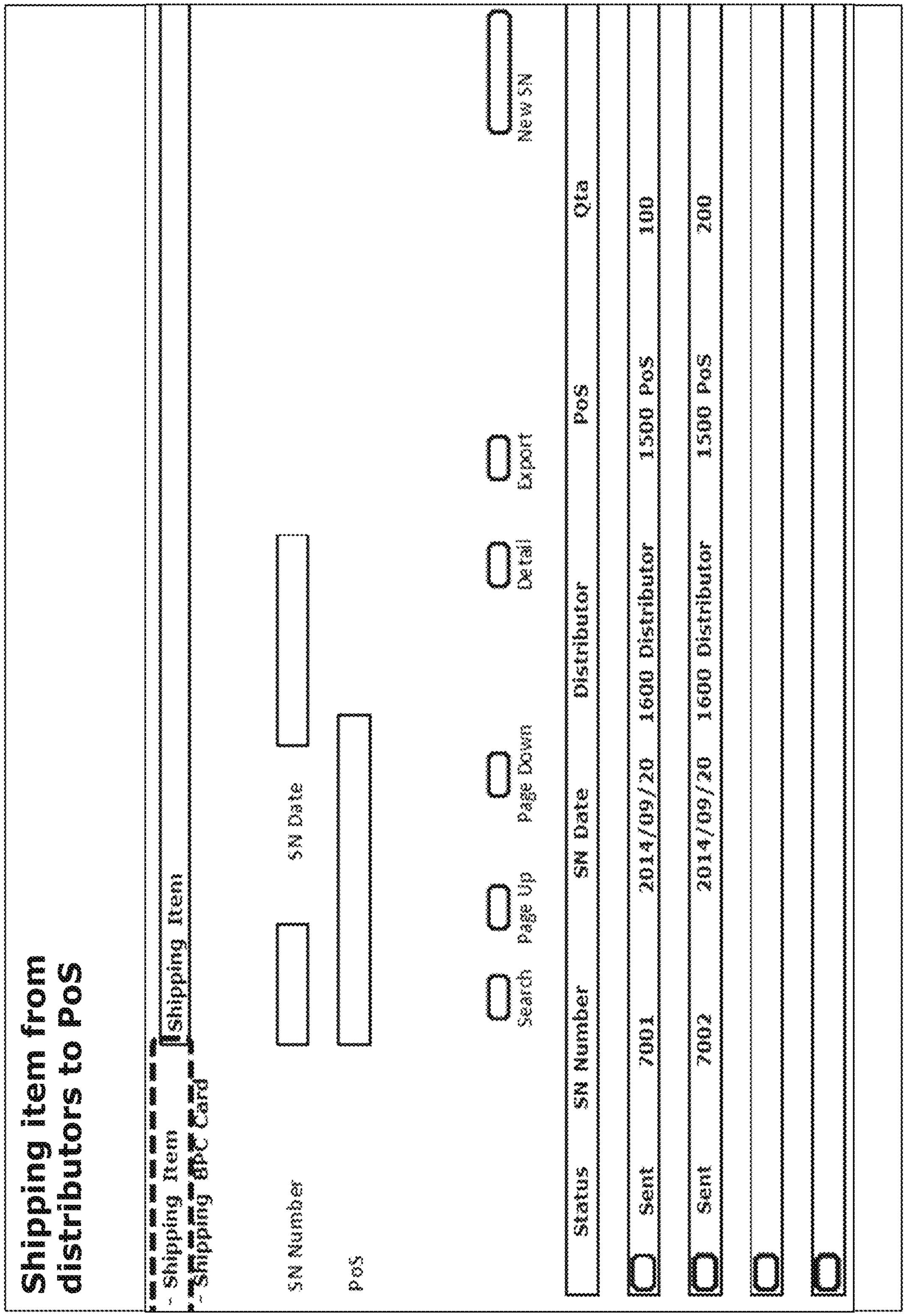

At the end of the completion of the order its status changes to "Sent". (FIG. 80)

Referring to FIG. 77, the above-described process for shipping of items from distributors to a PoS is illustrated in the following steps:

Step 7701: Recording of the shipping Document

Step 7702: Specification of the quantity sent by item/model

Step 7703: Change document/PoS?

Step 7704: Printing of transport document?

Step 7705: Print transport document

Step 7706: Other document to be recorded?

2.4.2.2 Management of Items at PoS 2.4.2.2.1 Entry of Items at PoS

Figure 81:
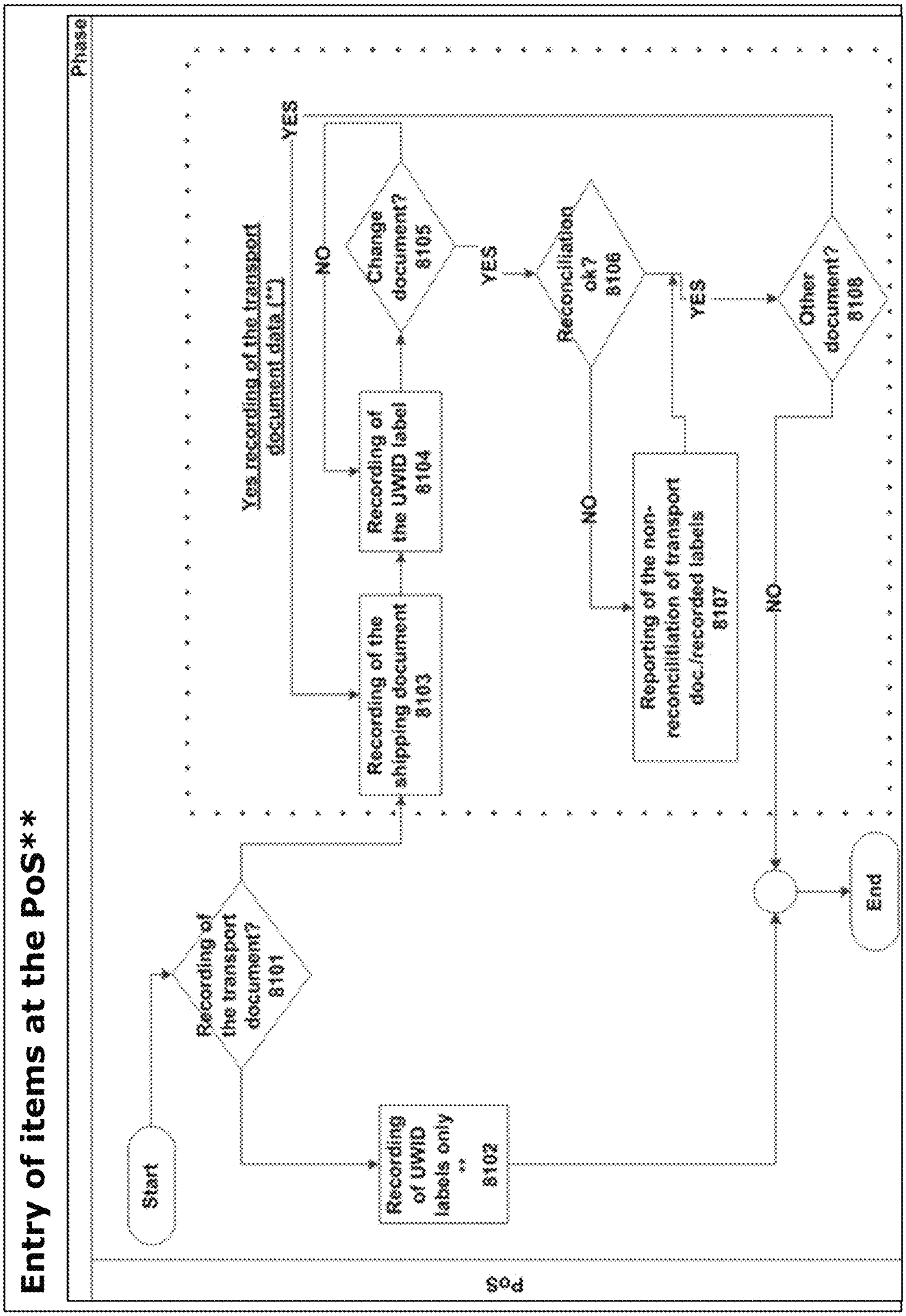
FIGS. 81-82 show a process for entry of items at a PoS in accordance with preferred embodiments of the present invention.

FIG. 81: Process scheme

1. It is assumed that it is possible to adopt two different methods aimed at recording items at the PoS. The first method is the "smart" one and entails that, after the login, the PoS contact person records the UWID codes of items without entering any link to the received accompanying document (the function is developed using mobile devices).
2. The second method is more structured and enables to enter in the PYB system the reference data of the inbound transport document (transport document, packing list or others), the recording of all UWID labels is performed and a reconcilement is made subsequently (the function is developed through a portal).
3. Both the above mentioned functions can run either with or without the Internet network.
4. An optical reader or a more advanced device may be used at the PoS.

Figure 82:
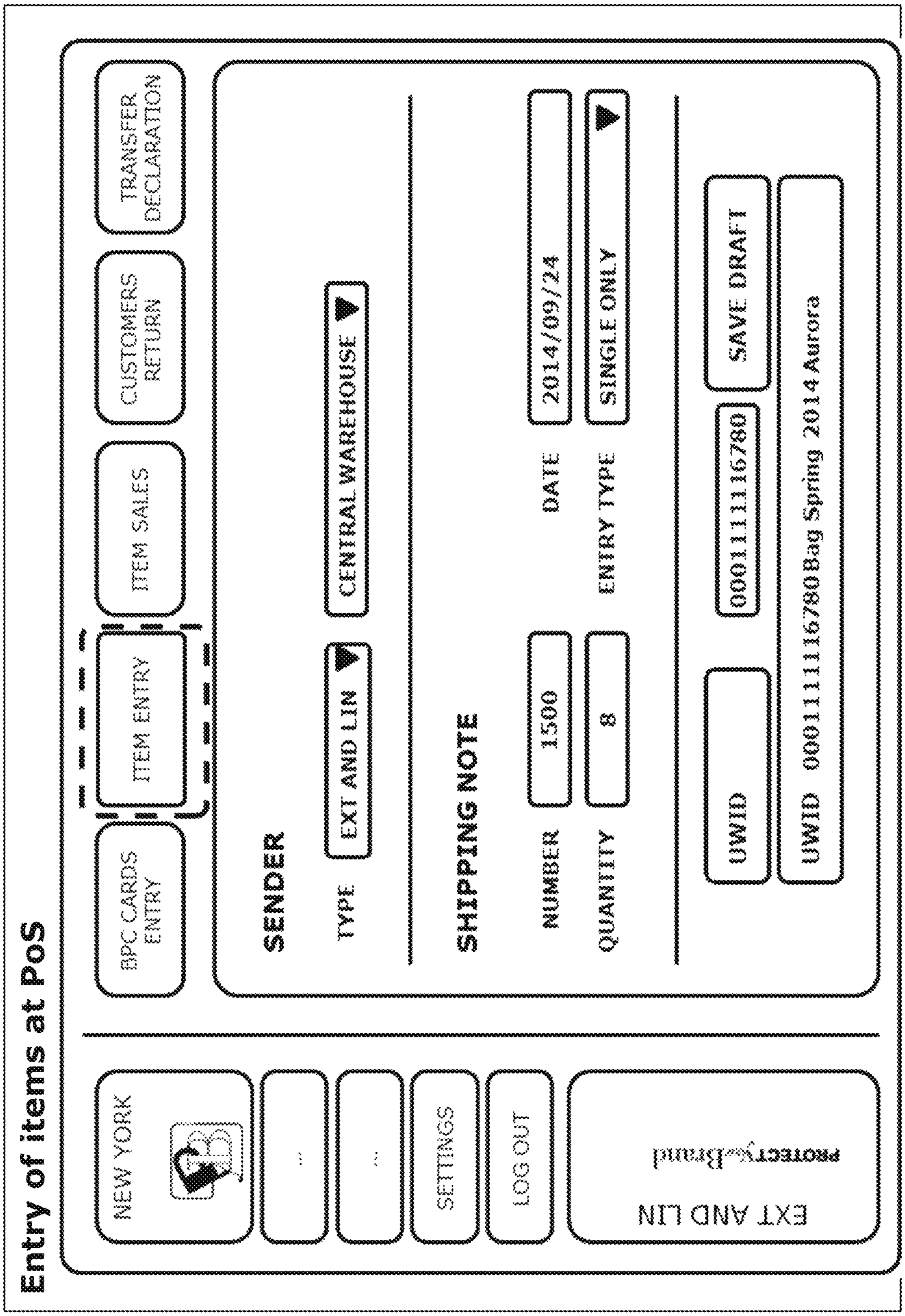

FIG. 82 shows a sample display screen.

Referring to FIG. 81, the above-described process for entry of items at a PoS is illustrated in the following steps:

Step 8101: Recording of the transport document?

Step 8102: Recording of UWID labels only

Step 8103: Recording of the shipping document

Step 8104: Recording of the UWID label

Step 8105: Change document?

Step 8106: Reconciliation ok?

Step 8107: Reporting of the non-reconciliation of transport doc./recorded labels Step 8108: Other document?

2.4.3 Sale of Items

Figure 83A:
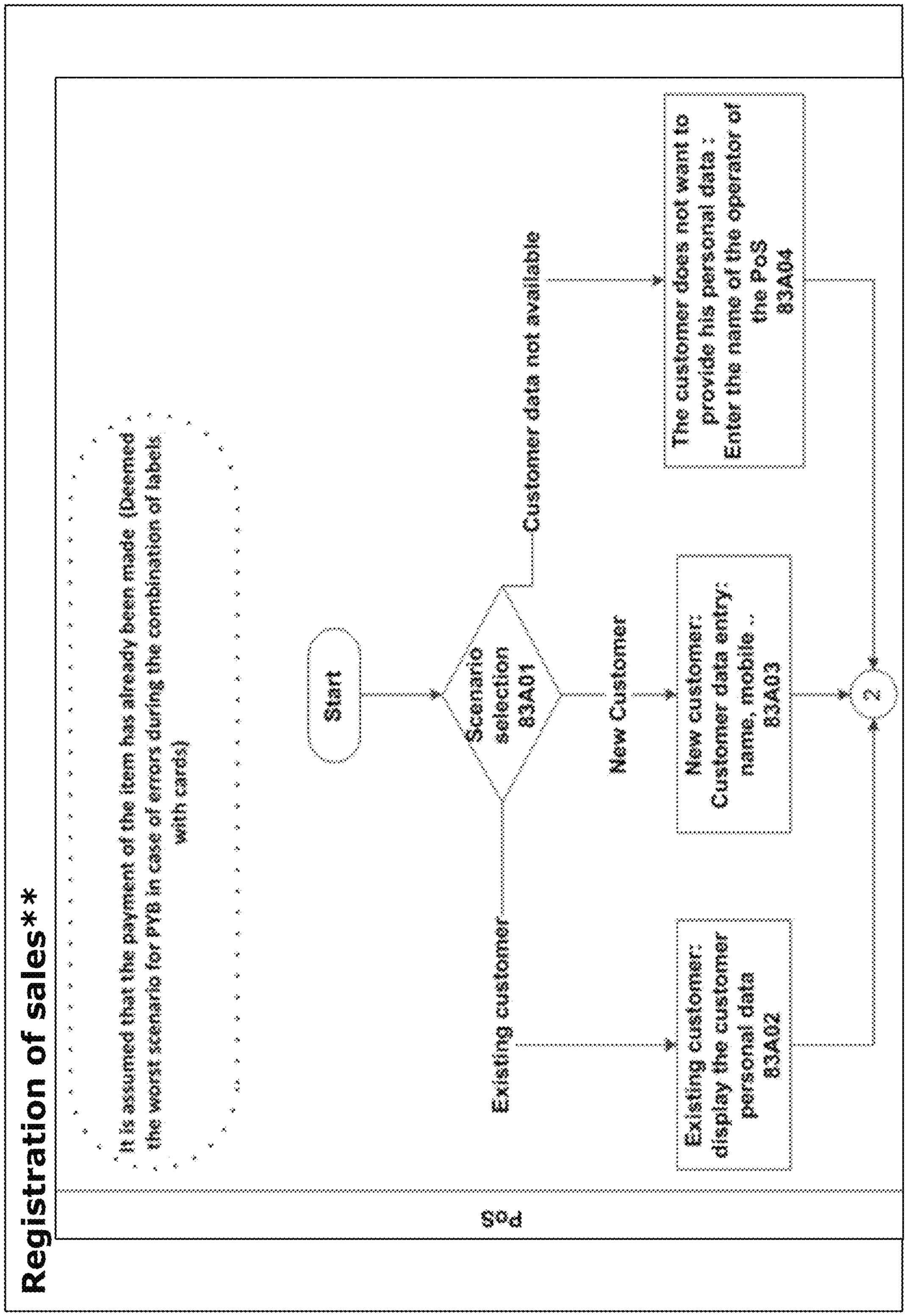
FIGS. 83A, 83B, and 84-87 show a process for registration of sales in accordance with preferred embodiments of the present invention.
Figure 83B:
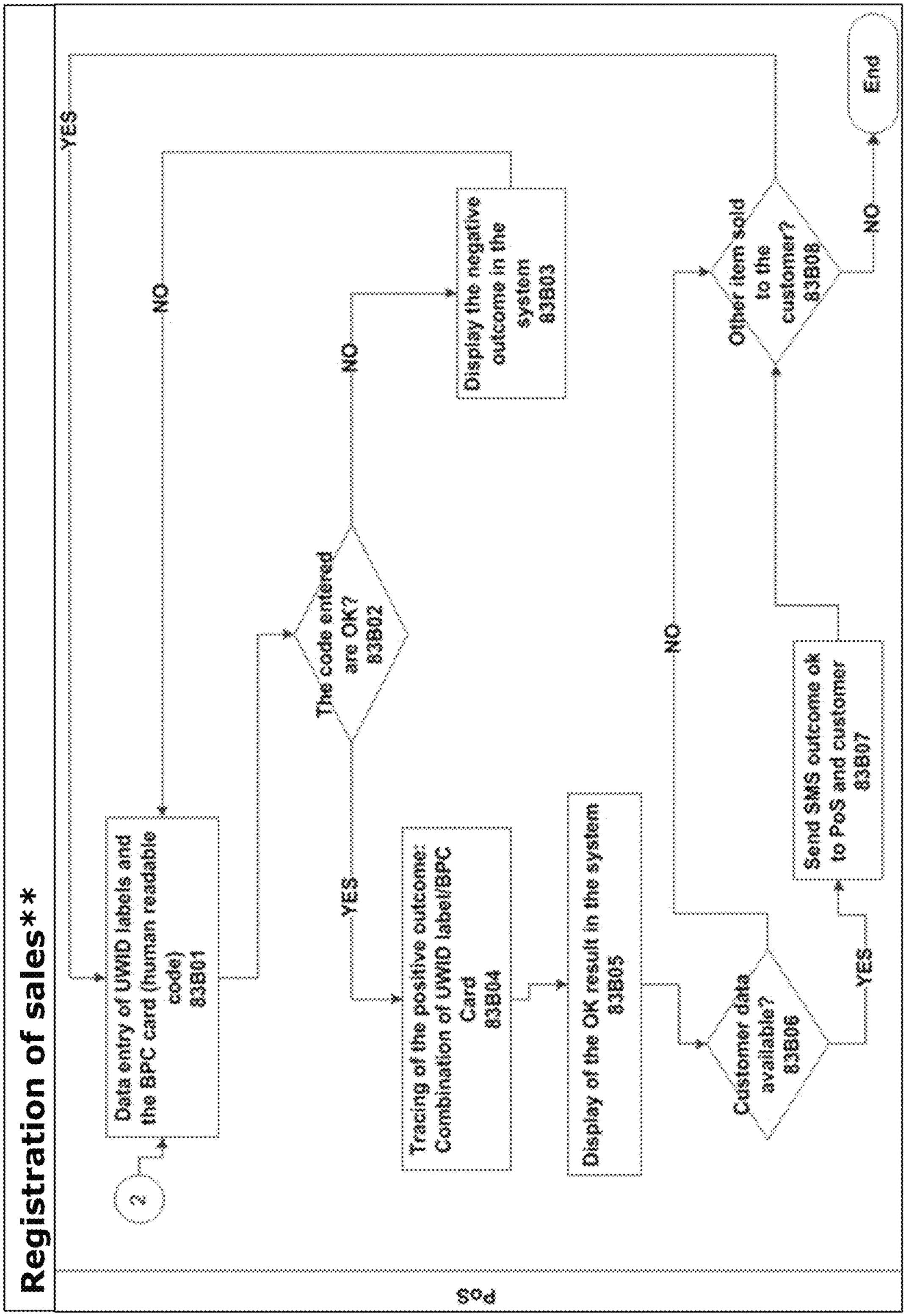

FIGS. 83A and 83B: Process scheme

When analyzing the tracing process of the sale, it is assumed that the payment has already been made by the customer when entering the sale of the item in the PYB system.

1. The operator can record customer data (if available), the UWID code and the human readable code of the BPC card.
2. The system performs checks on the recorded codes (e.g., already existing codes, codes of the PoS) and displays the outcome of the check carried out; moreover, it enables to recycle codes during data entry (for a maximum number of times defined at company level).
3. In case of non-blocking errors (the system envisages only UWID labels with a valid card code of which the PoS is not in charge), the operator is given the possibility of forcing the combination of the UWID label with the BPC card and of keeping tracking of the forcing process.
4. In case of the correctness of the received data, the operator is given a feedback in the system; analogously, it is assumed to provide the customer with a feedback by using sms messages, emails, or a mobile app according to the information delivered by the customer itself (mobile number, email address, customer number in the PYB system). If customer data is missing, an information report of the occurred recording may be sent to the PoS by using sms messages, emails, or a mobile app.
5. In case of errors found in the entered codes, the system does not enable to complete the data entry; it is assumed to provide the parent company with the queries about what happens at PoS upon sales. The data recorded in the sales process is traced, including any notifications of errors.
6. It is assumed that, against the inability of the Point of Sale to record the combination of the UWID code with the BPC card (missing line and/or systems), this process must be performed subsequently.

7. The completion of the BPC card entry in the portal by the customer cannot be performed, if the combination of the BPC card with the UWID label at the Point of Sale is not completed.

Example of Screen.

Figure 84:
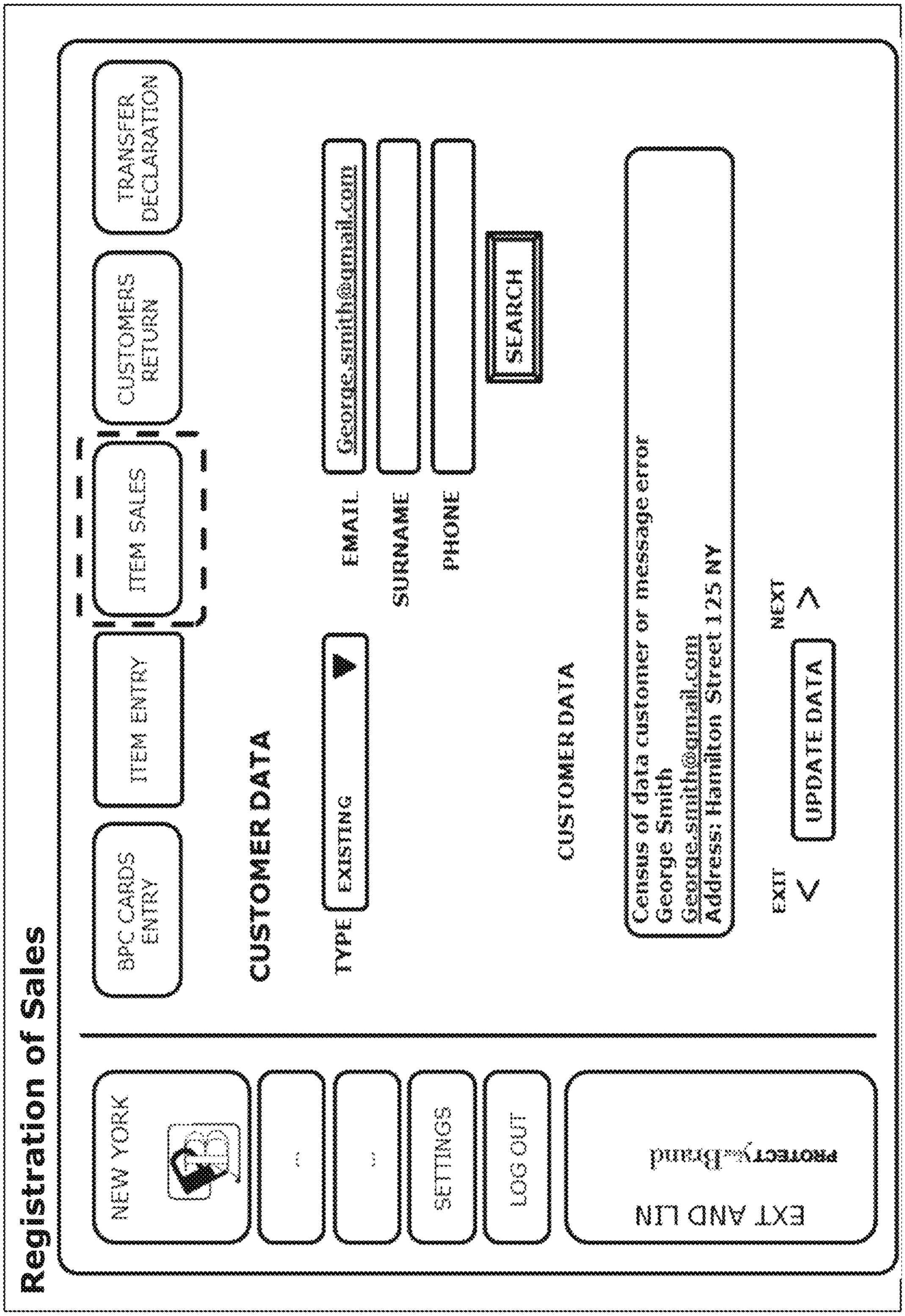

FIG. 84: Screen for the registration of a sale (existing customer)

Figure 85:
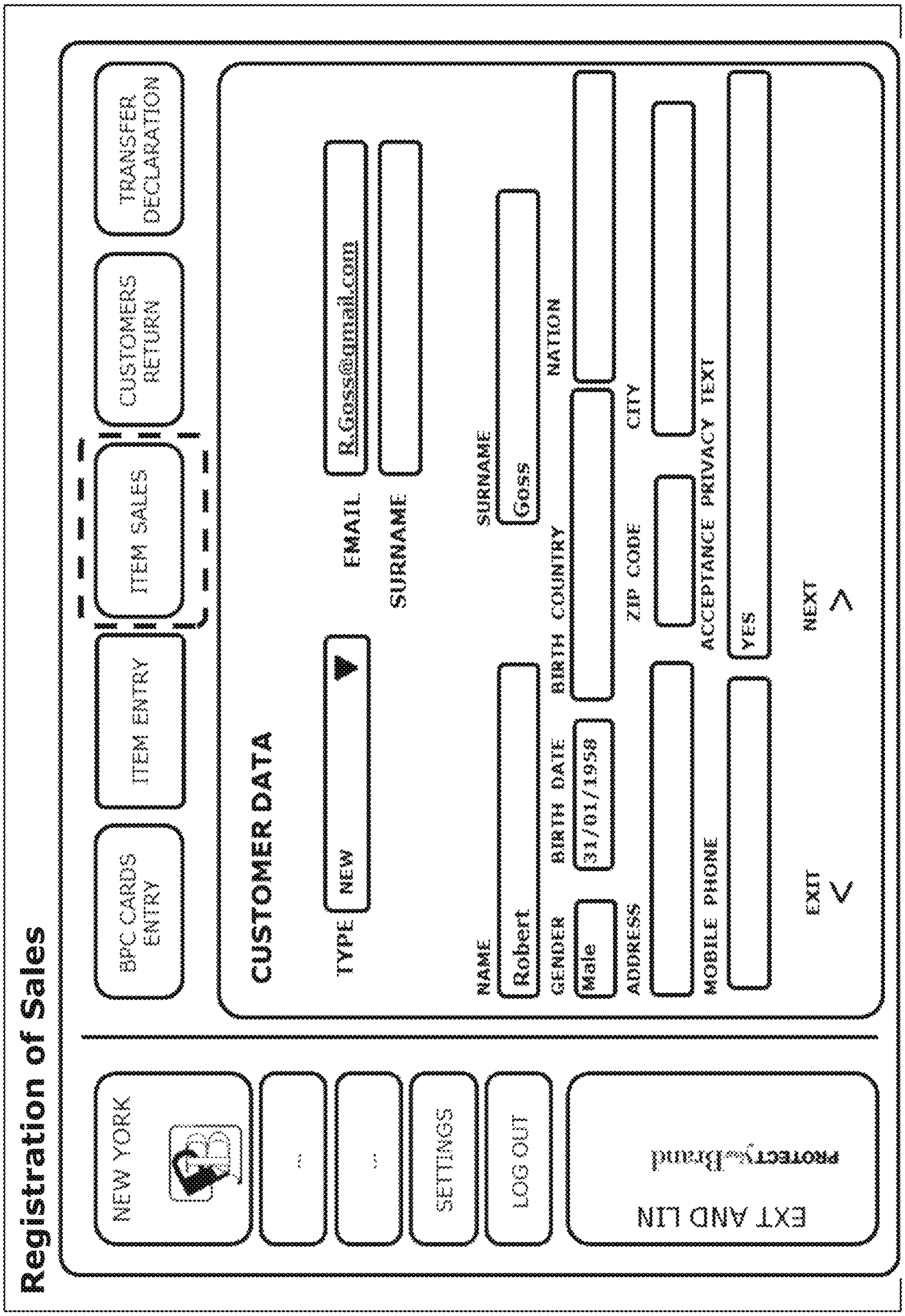

FIG. 85: Screen for the registration of a sale (new customer)

Figure 86:
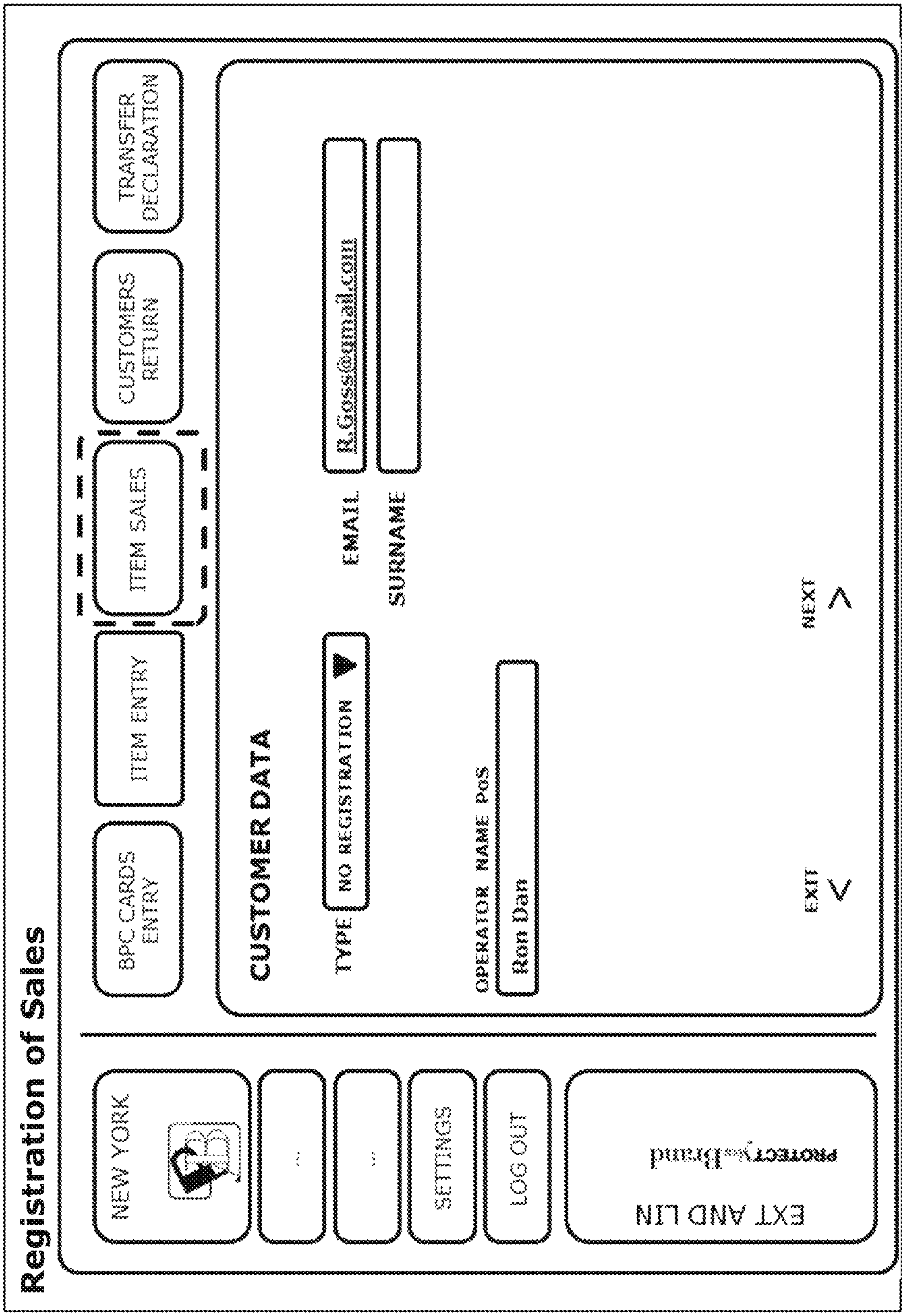

FIG. 86: Screen for the registration of a sale (the customer does not want to provide his personal details). If the customer does not want to give his personal details, the system asks the operator an indication of the point of sale.

Figure 87:
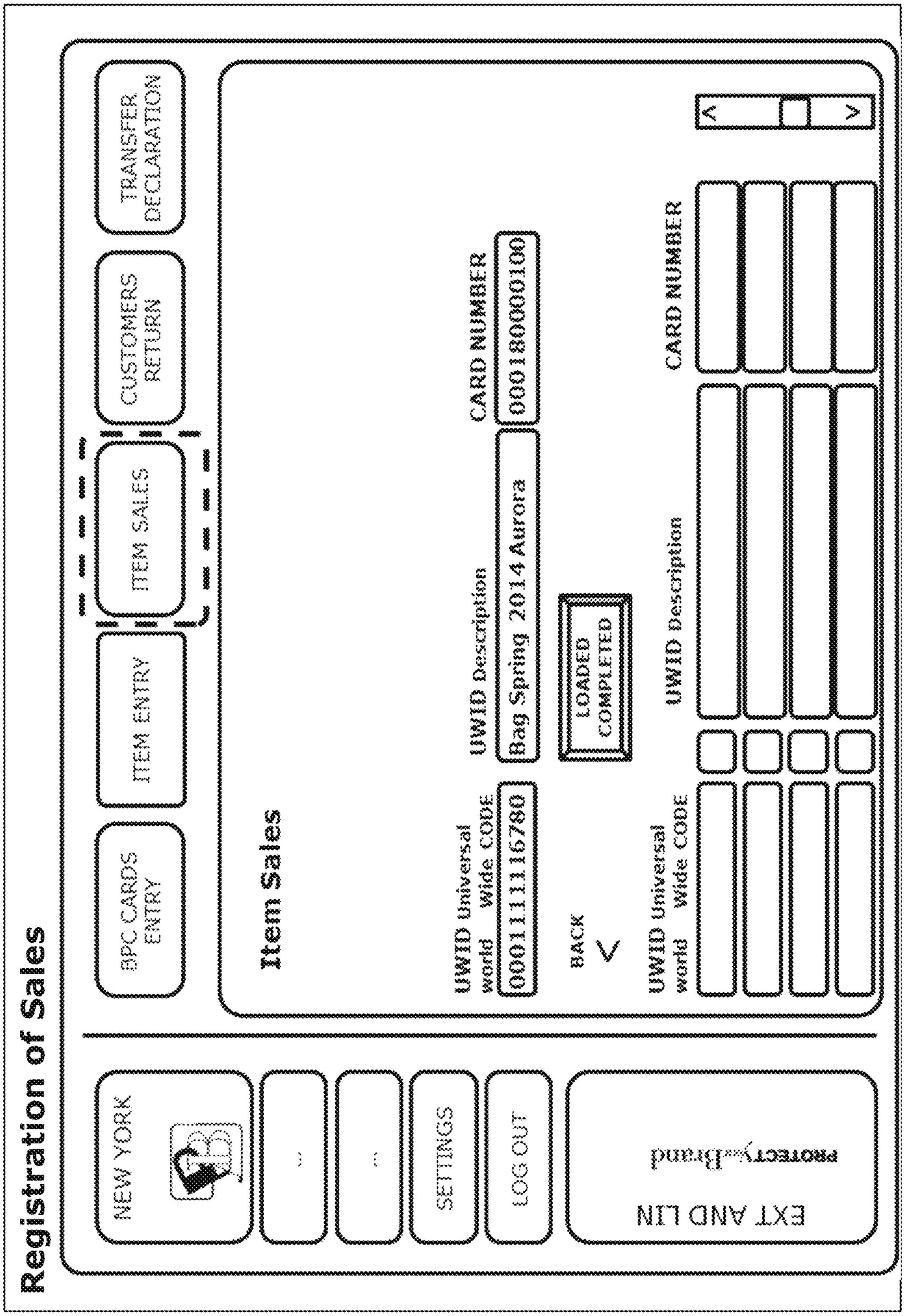

FIG. 87: At the time of sale are matched with the item code (ex: 0001111116780), and the code of the BPC (ex: 0001800000005).

Referring to FIGS. 83A and 83B, the above-described process for registration of sales is illustrated in the following steps:

Step 83A01: Scenario Selection

Step 83A02: Existing customer: display the customer personal data

Step 83A03: New customer: Customer data entry: name, mobile, etc.

Step 83A04: The customer does not want to provide his personal data:

Enter the name of the operator of the PoS

Step 83B01: Data entry of UWID labels and the BPC card (human readable code)

Step 83B02: The code entered are OK?

Step 83B03: Display the negative outcome in the system

Step 83B04: Tracing of the positive outcome: Combination of UWID label/BPC Card Step 83B05: Display of the OK result in the system Step 83B06: Customer data available?

Step 83B07: Send SMS outcome ok to PoS and customer

Step 83B08: Other item sold to the customer?

2.4.4 Returns from Customers

Figure 88:
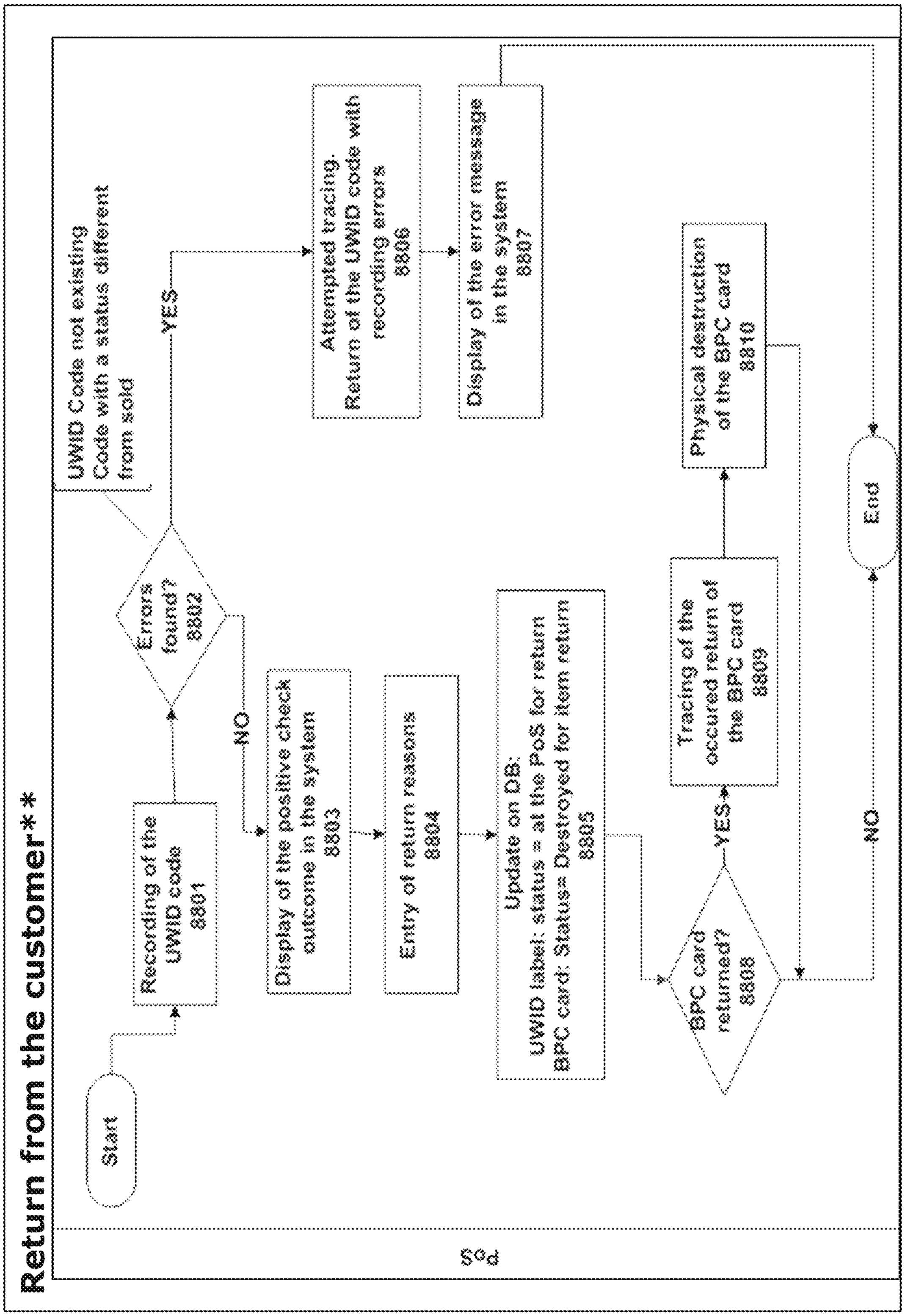
FIGS. 88-90 show processes for customer returns and transfers in accordance with preferred embodiments of the present invention.

FIG. 88: Process scheme.

1. Return of items
   a. The process enables to record the return of items from customers.
   b. According to the customer's organization model, the PYB system can be configured so that customers are required to provide the reference data of their identity documents.
   c. The item can be returned to the PoS that has sold it or even to another PoS.
   d. It is assumed to perform both the recording of the item (through the recording of the UWID code) and of the BPC card (if submitted by the customer).
   e. Recording of the item return (UWID code)
      i. A specific function allows the operator to record the UWID code on the returned item.
      ii. The system performs appropriate checks on the recorded code.
      iii. The system displays the following information:
         A. PoS in which the sale has been made
         B. Number of the BPC card combined with the UWID code
         C. Status of the BPC card
      iv. It is possible to specify return reasons
      v. Once the recording of the UWID code has been completed, the status of the BPC card is updated (status at the PoS), the BPC card is logically separated from the UWID code and its status changes to "destroyed for item return".
2. Return of the BPC card
   a. The case of a card return without the item is not permitted.
   b. Refer to the above mentioned information for the return of items.
   c. If the BPC card is returned, it is physically destroyed even if the secret code is still intact.

2.5 Returns and Transfers

Figure 89:
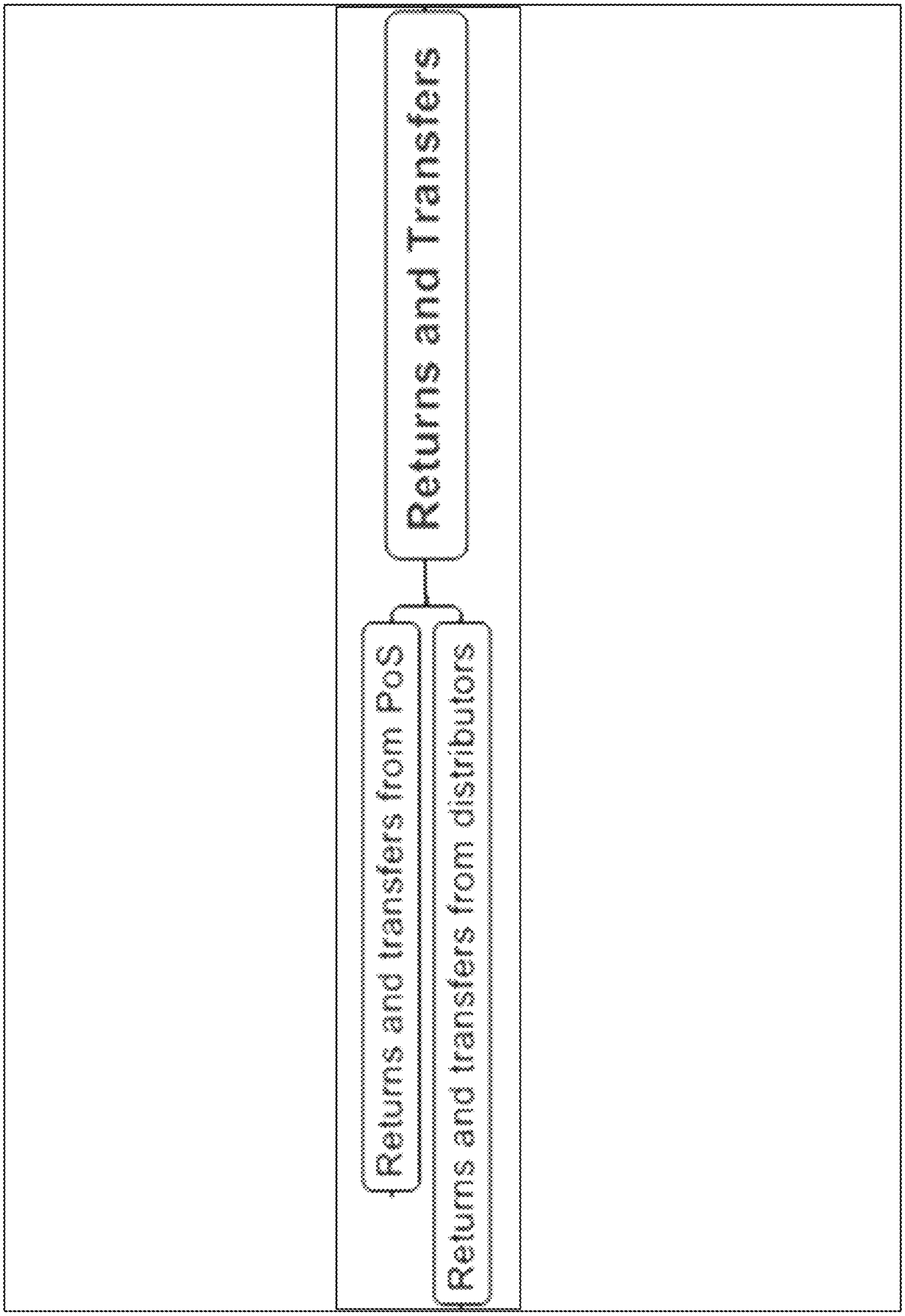

FIG. 89: Macro-scheme.

The transfer management includes:

1. Transfers to the sales network (PoS/Distributors)
2. Transfers to warehouses

It is possible to perform the transfer of both products and BPC cards.

Referring to FIG. 88, the above-described process for accepting a return from a customer is illustrated in the following steps:

Step 8801: Recording of the UWID code

Step 8802: Error found?

Step 8803: Display of the positive check outcome in the system

Step 8804: Entry of return reasons

Step 8805: Update on DB: UWID label: status=at the PoS for return

BPC card: Status=Destroyed for item return

Step 8806: Attempted tracing. Return of the UWID code with recording errors

Step 8807: Display of the error message in the system

Step 8808: BPC card returned?

Step 8809: Tracing of the occurred return of the BPC card

Step 8810: Physical destruction of the BPC card 2.5.1 Transfers from PoS

Figure 90:
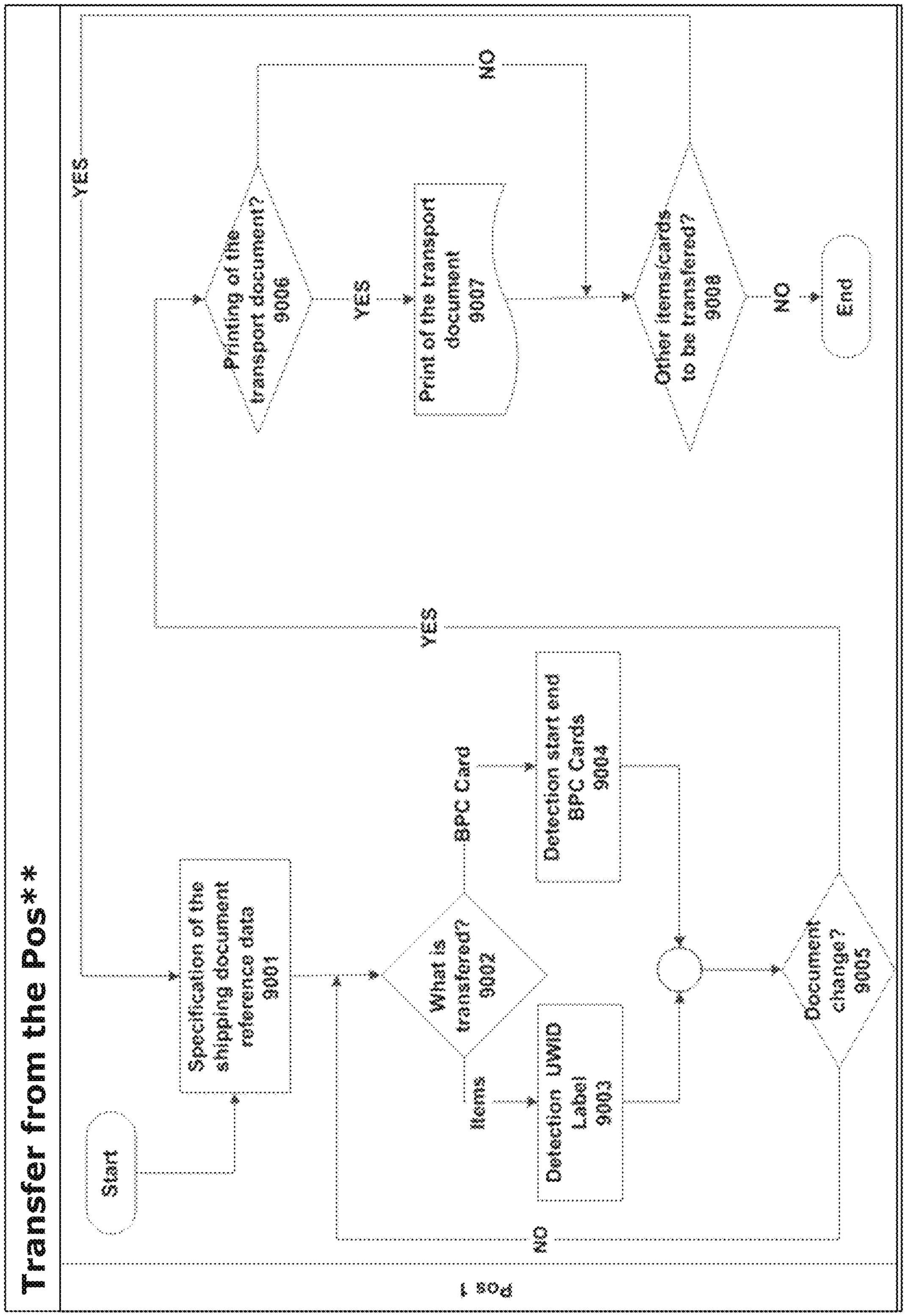

FIG. 90: Process scheme.

Transfer of Products from PoS

1. The transferred products must be recorded one by one through a specification of the UWID code.
2. The system enables to:
   a. Record the UWID code
   b. Specify the item destination (Parent company, Distributor, other PoS)
   c. Specify the transfer reason
   d. Enter any notes
3. At the end of the recording of the UWID code, the status changes to "In Travel" (if required, by specifying the PoS destination, Warehouse, Distributor)

Transfer of BPC Cards

1. The ranges of the transferred BPC cards must be recorded at parcel or box level, according to the rules defined at company level and/or to what is transferred, i.e., parcel or box).
2. The entry of transferred goods at the PoS (Item, BPC Card) is considered as a standard entry at the PoS.
3. The entry of the transferred goods at the distributor allows the distributor to keep goods stored at the distributor's location, to send them to another PoS, to return them to the parent company.

Referring to FIG. 90, the above-described process for transfer of products from a PoS is illustrated in the following steps:

Step 9001: Specification of the shipping document reference data

Step 9002: Specification of the shipping document reference data

Step 9003: What is transferred?

Step 9004: Detection UWID Label

Step 9005: Detection start end BPC Cards

Step 9006: Document change?

Step 9007: Printing of the transport document?

Step 9008: Print of the transport document

Step 9009: Other items/cards to be transferred 2.5.2 Transfers from Logistic Distributors The transfer management includes:

1. Transfers to the sales network (PoS/Distributors)
2. Transfers to warehouses

It is possible to perform the transfer of both products and BPC cards; from the conceptual point of view, the management is similar to the one already described in the processes "Entry of BPC cards at distributors", "Transmission of BPC cards to the sales network" with additional information about the following:

a. Specify the item destination (Parent company, Distributor, other PoS)
b. Specify the transfer reason
c. Enter any notes 3. Assumed Solution—Customer The next chapter describes the assumed solution for the end customer.

Figure 91:
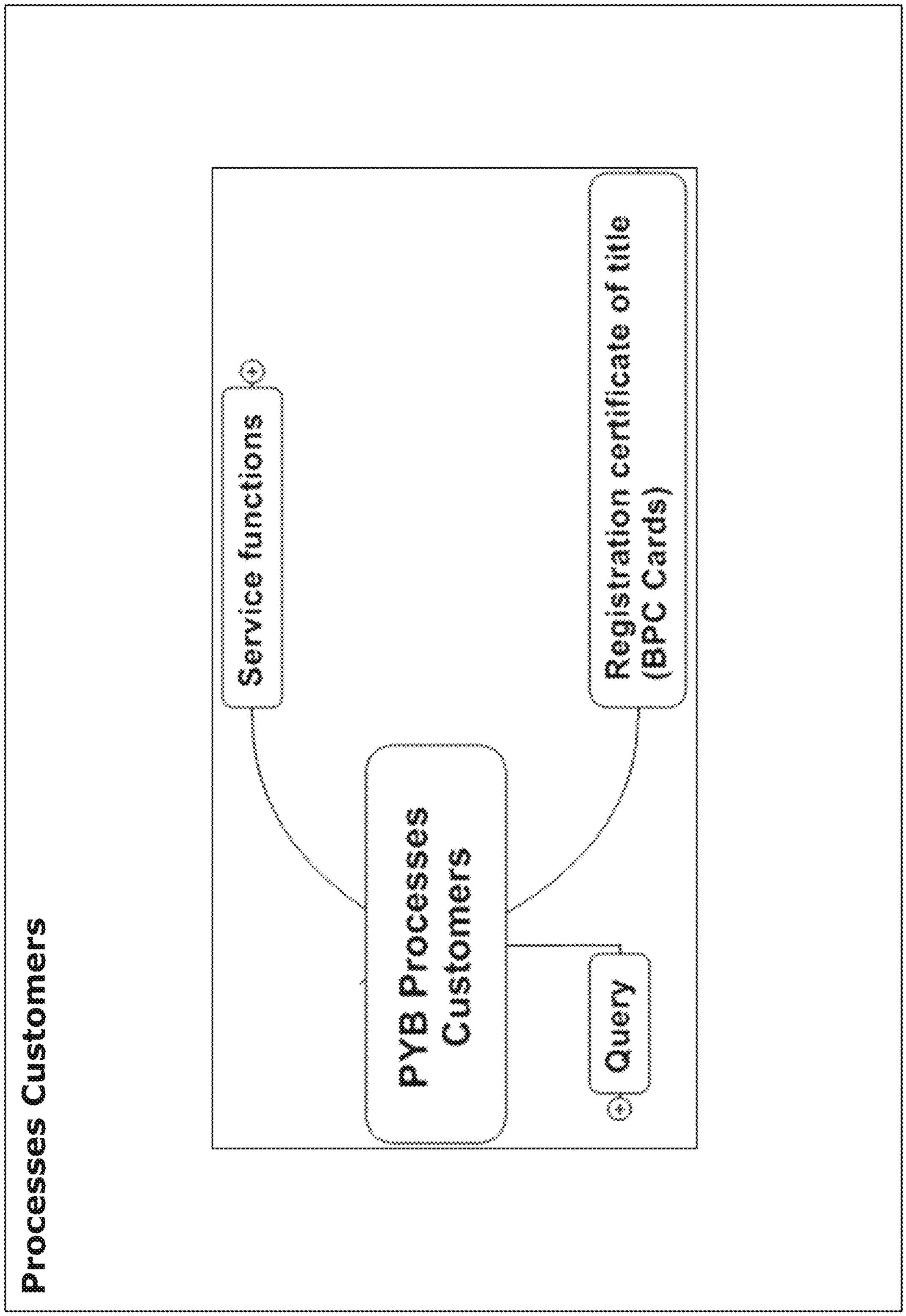
FIG. 91 shows customer processes in accordance with a preferred embodiment of the present invention.

3.1 General Process Customer (FIG. 91)

The customer processes have been divided into the following areas; Service function, Registration certificate of title (BPC Cards), Query.

FIG. 91

The paragraphs below of this section outline in order for each area the processes in graphic form (where deemed necessary) and in descriptive form, the master data (e.g., the organizational structure master data, customer master data, store master data) and the main data required to support the process.

The processes supported through IT functions have been marked with ** in the name of the process.

The application functions identified that are targeted to support the process at IT level appear as the last parameter (in this first phase, there is only a list of functions; while, during the in-depth analysis phase, the main screens, the description and any reports are shown with regard to the functions to be confirmed).

Figure 92:
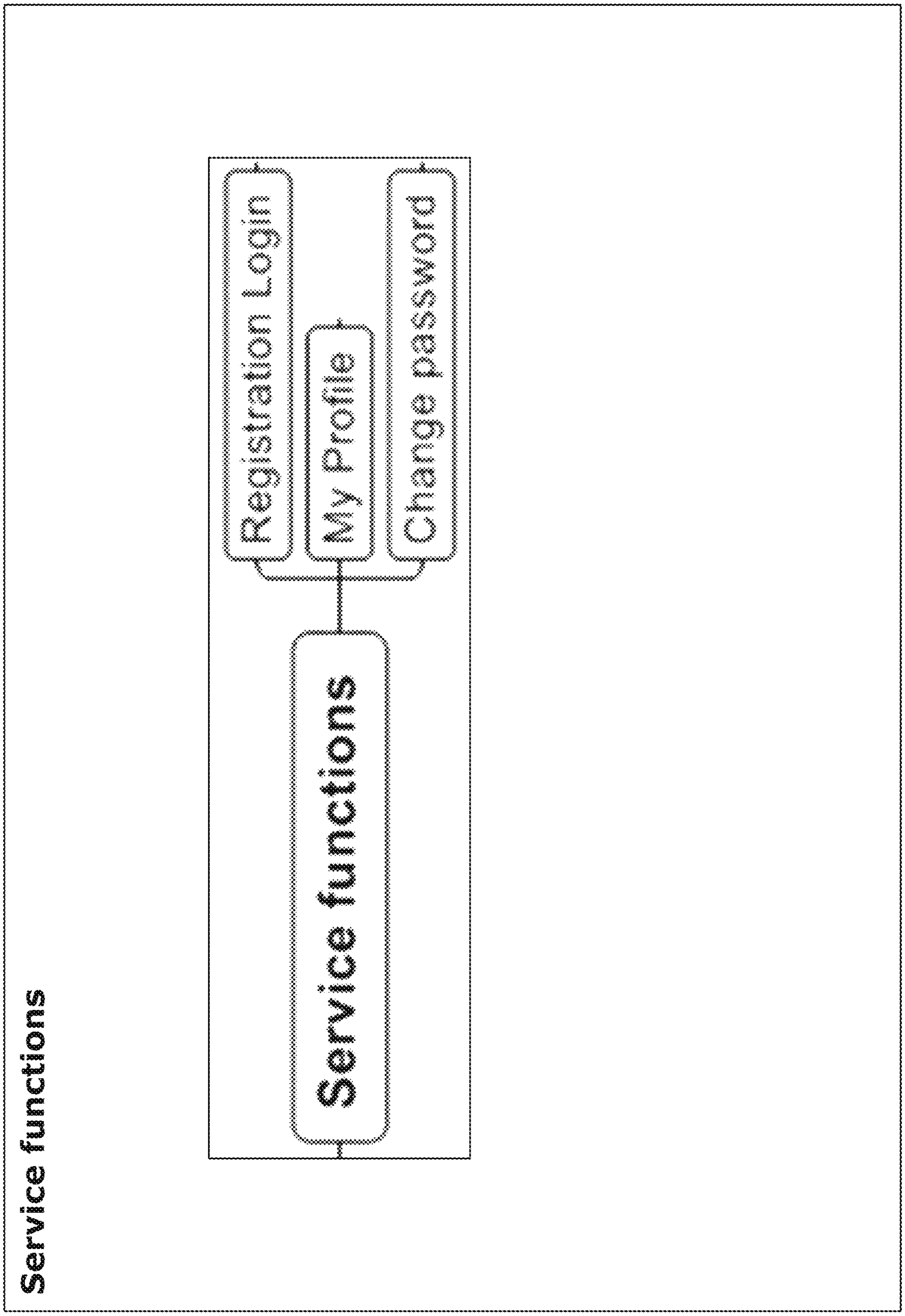
FIG. 92 shows service functions in accordance with a preferred embodiment of the present invention.

General Definition:

1. Who will make some general questions about PYB to acquire points must be registered with Login and password.
2. The user to access the system will be an email, a password will be generated in the initial step by PYB then can be varied from brand Friend.
3. Customer purchaser/owner:
   a. The customer buyer may or may not be equal to the possessor, we have two registries that of the client (possibly acquired at the time of sale) and the holder's final. This age was called the Friend and Brand will be created upon completion of a sale or regardless of the presence or absence of sales (example: a person who has not purchased but queries the system PYB).
   b. will retain both master data.
   c. Publish their data on the portal PYB:
      i. The brand friend will publish its data, only to himself (will be confidential data) or make them public.
      ii. The published data will be brought to the DB General 3.2 Service Functions FIG. 92: Scheme macro.

Figure 93:
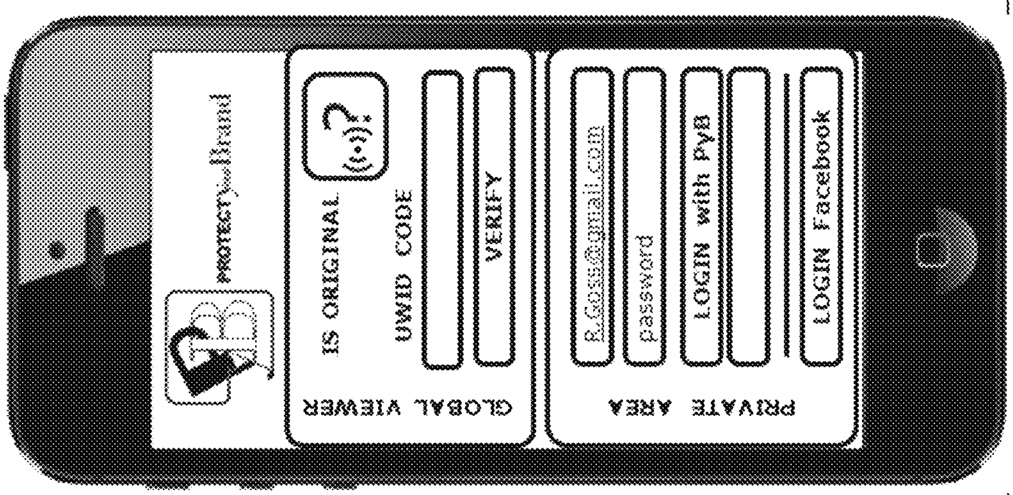
FIGS. 93-94 shows mobile app user interface display screens for log in and menu selection in accordance with a preferred embodiment of the present invention.
Figure 94:
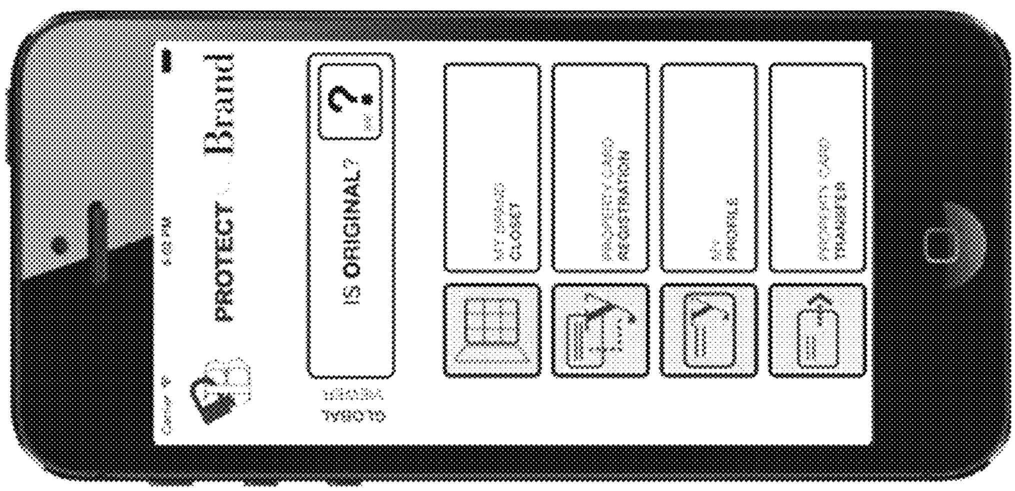

3.2.1 Registration Login (FIGS. 93, 94).

Description of the Process

1. In the process of registration to the portal (login) has been assumed that the recording is made on PYB general, certainly for the data of user, password and name. The other more detailed data may be handled only at the level of the Company (for reasons of privacy and various permissions).
2. Registration on the login PYB General has the advantage of knowing all utilities connected to the system and what company.
3. The registration of the login can be performed either by people who bought the items from the company adhering to PYB, both by people who only want to use the query services made available by the system (in this case the registration is not mandatory).
4. Anyone who is registered to the portal PYB (both customers and people who question items) are called Brand Friend.
5. The registration of login is required in order to register on the portal their certificates of ownership (BPC card). Similarly, it will be mandatory in order to collect points and take advantage of the capabilities offered by PYB marketing.
6. Step registration login:
   a. On the card or BPC shows the url of the portal that can be turned on PYB or a Company, alternatively you can use the access via the App.
   b. User Registration
      i. Registration personal data
         A. The identifier will be the email, system-level PYB will still generate an internal code, this will allow us to handle cases where a user decides to change the address.
         B. Other information:
            or name (Man)
            or Surname (Man)
            Date of birth (Man)
            or Place of birth (Man)
            or sex (Man)
            or Nationality (Man)
            or Address (Fac)
            or Tax ID (required if Italian nationality)
            or Mobile (Fac)
            Privacy or Data (Man)
      ii. Upon receipt of the registration request (new login), the system sends a password to the email that has been shown.
      iii. The completion of the registration will be made in response to the received link when requesting new login.

3.2.2 My Profile.

The function of the "My profile" will allow you to edit all of the information handled at the level of PY registry, including information such as: hobbies, preferences, information about what to make public and private sectors.

3.2.3 Change Password.

The password change will allow you to change the password of the members portal PYB (Members of the company, brand friend).

1. For users of the company will be to manage the password via LDAP.
2. The password of the brand friend will not expire.
3. In the function "change password" will be understood even the password recovery feature.

3.3 Registration Certificate

Figure 95:
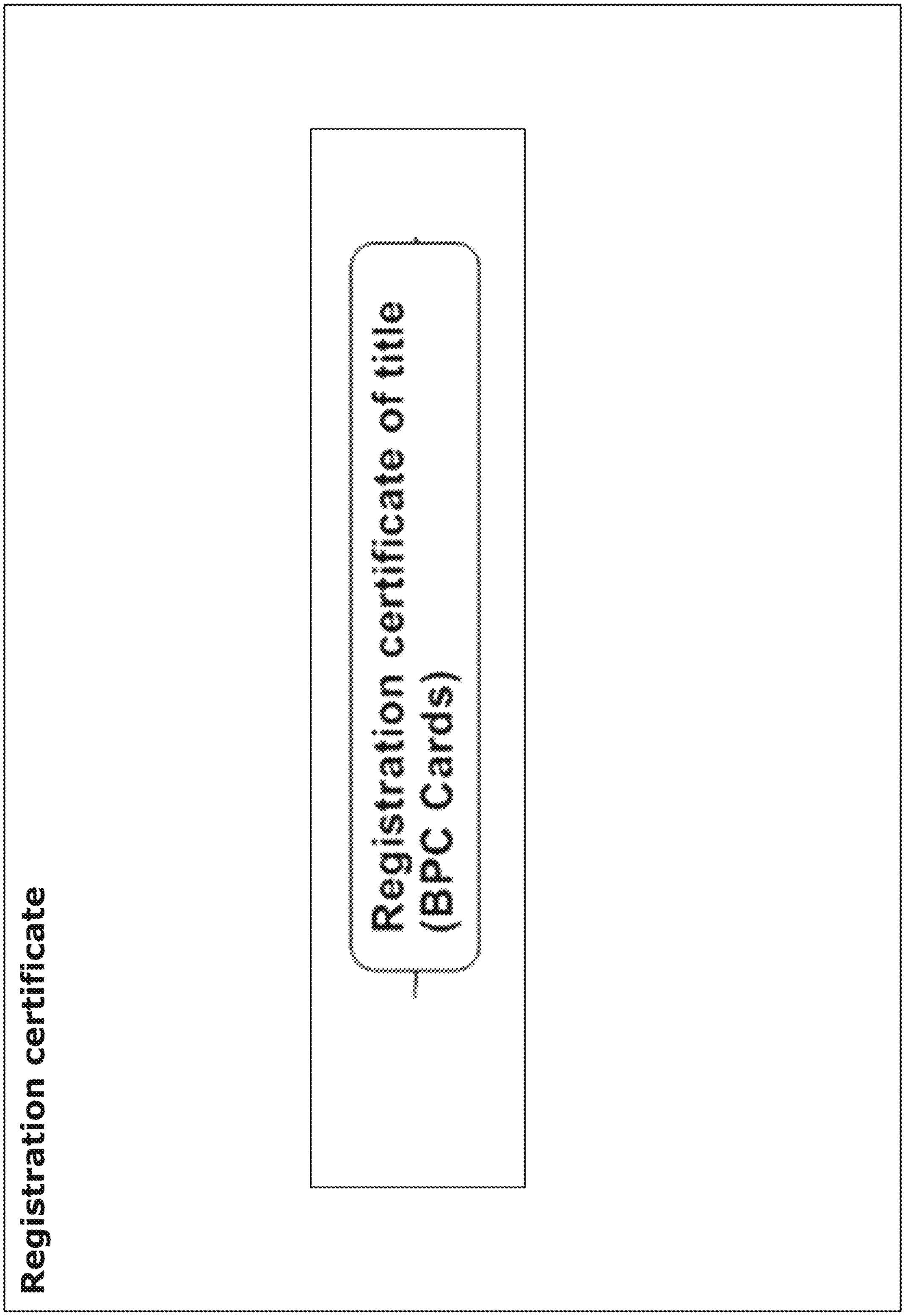
FIG. 95 shows a certificate registration process in accordance with a preferred embodiment of the present invention.
Figure 96:
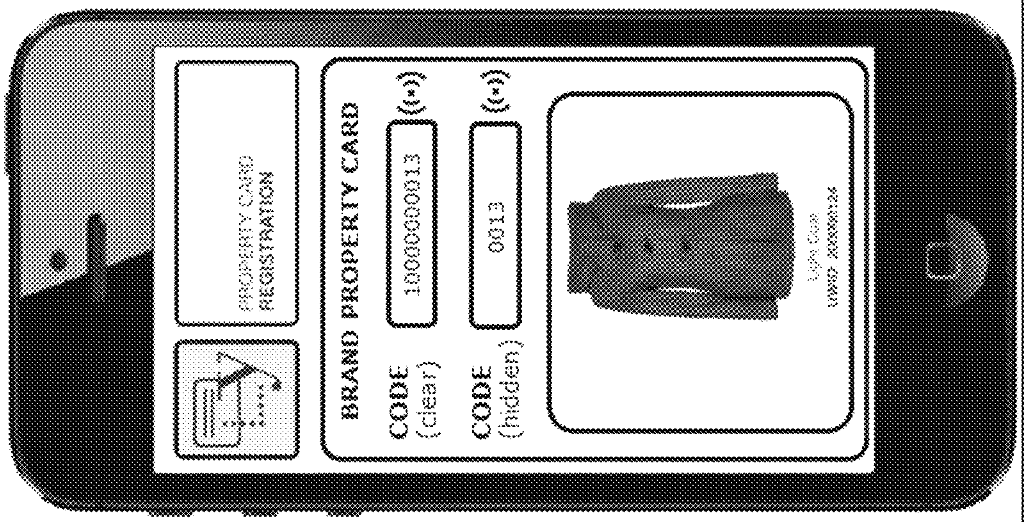
FIG. 96 shows a mobile app user interface display screen for certificate registration in accordance with a preferred embodiment of the present invention.

FIG. 95: Macro-process 3.3.1 Registration Certificate of Title. (FIG. 96)

The process allows the holder of the purchased item to match its profile PYB the certificate of ownership that has been given by the operator of the store ATO purchase of the asset.

The process is a prerequisite to registration of your personal data on PYB (registration login) Description of the process:

1. The user (brand friend) to put the codes on the video card (BPC code in clear and hidden code). Data entry is made via a customer terminal, which may be a browser of the customer's home computer or mobile device.
2. After passing the validation checks, the system displays the article (previously matched by the operator point of sale to the BPC card at the time of sale).

The system will perform the following controls:

Checks:

1. Existing
2. Card that is valid in the state in order to make the pairing via the portal (the card was sold from the point of sale, the card must be in the shop next to the combination done).
3. Valid Code Viewing item description or manufacturer, promotional message of greeting, and the like
4. Wrong Code or non-aligned status of the card BPC
   a. The outputs the messages like "Errors have been detected on the data entered, contact your help desk or re-enter the required fields"
   b. The system keeps track of the hidden code that has been made an attempt to record the final stage of the sale.
   c. If the customer is trying to register for the second time a card BPC may issue a targeted message that the card has already been carried out.

In the case of wrong code or the message goes to the Company.
   d. State of the BPC card at the end of the assignment with the label UWID at the end or the assignment status of the card will be the: Match made by the holder final status card=combined.

3.4 Query

Figure 97:
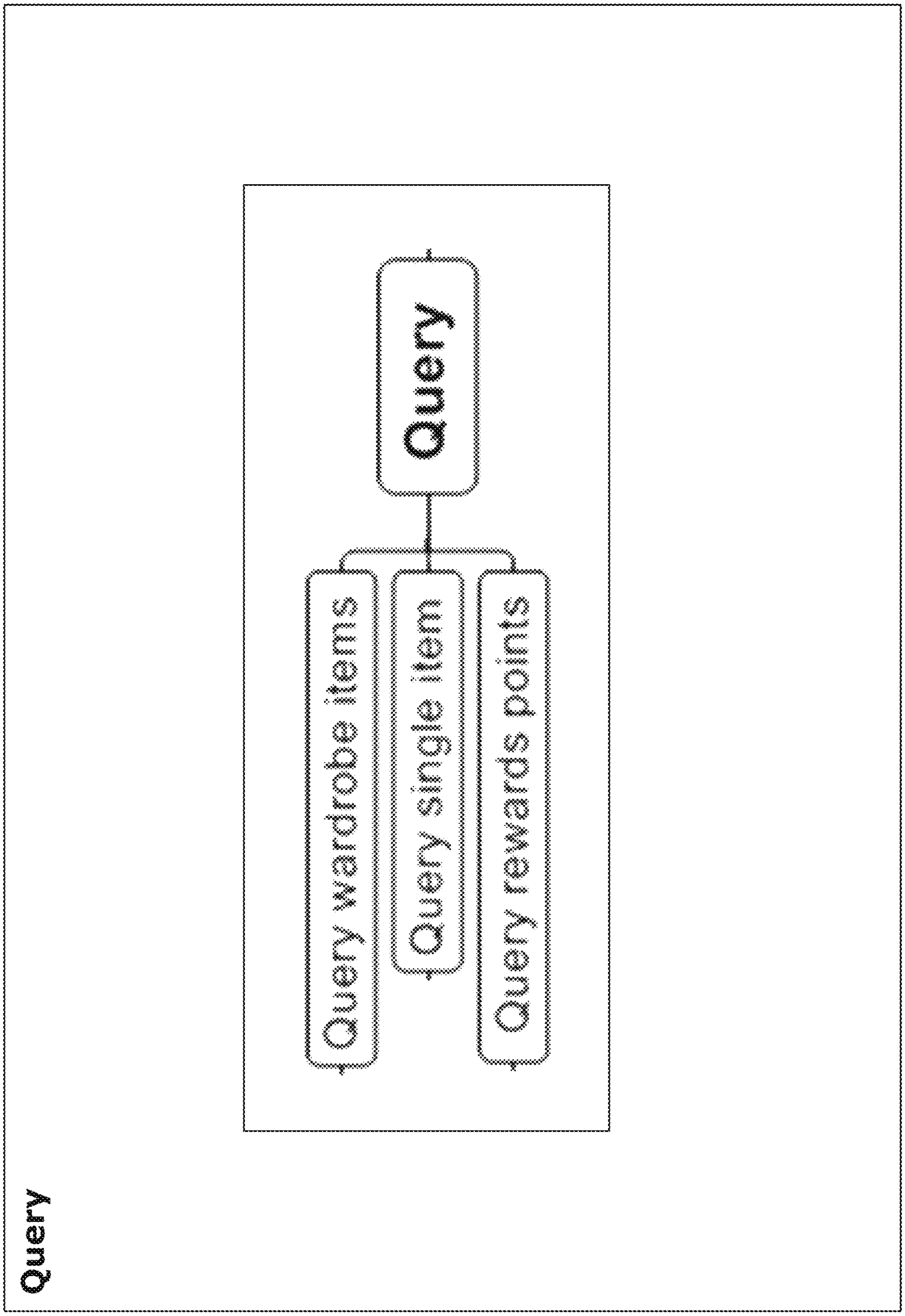
FIG. 97 shows query processes in accordance with a preferred embodiment of the present invention.

FIG. 97: Scheme macro.

3.4.1 Query Wardrobe Item.

With this process you will have a chance to interrogate its portfolio items recorded on PYB (on all company operated out of PYB).

Figure 98:
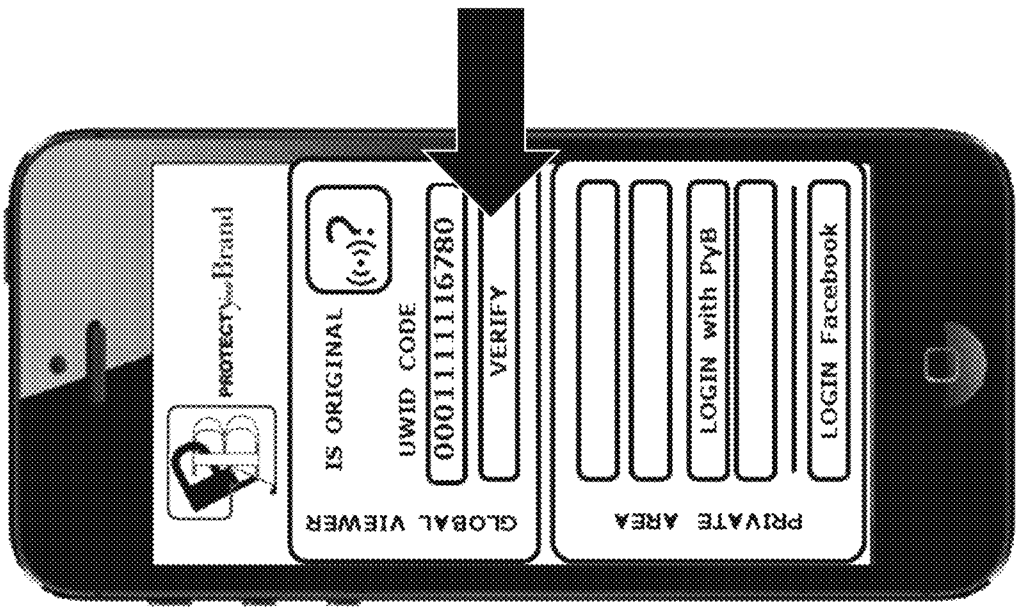
FIGS. 98-99 shows mobile app user interface display screens for item checking and item querying in accordance with a preferred embodiment of the present invention.
Figure 99:

3.4.2 Query Single Item. (FIGS. 98, 99)

The goal of this process is to make available to the public the opportunity to verify the originality of the articles of the company that adhered to PYB.

The question of the individual article is one of the pillars of PYB as it allows the audience to become a sort of "controller" on the market.

Anyone can verify by phone if an article is original by searching the label UWID (e.g., 0001111116780).

Table of Contents

Figure 100:
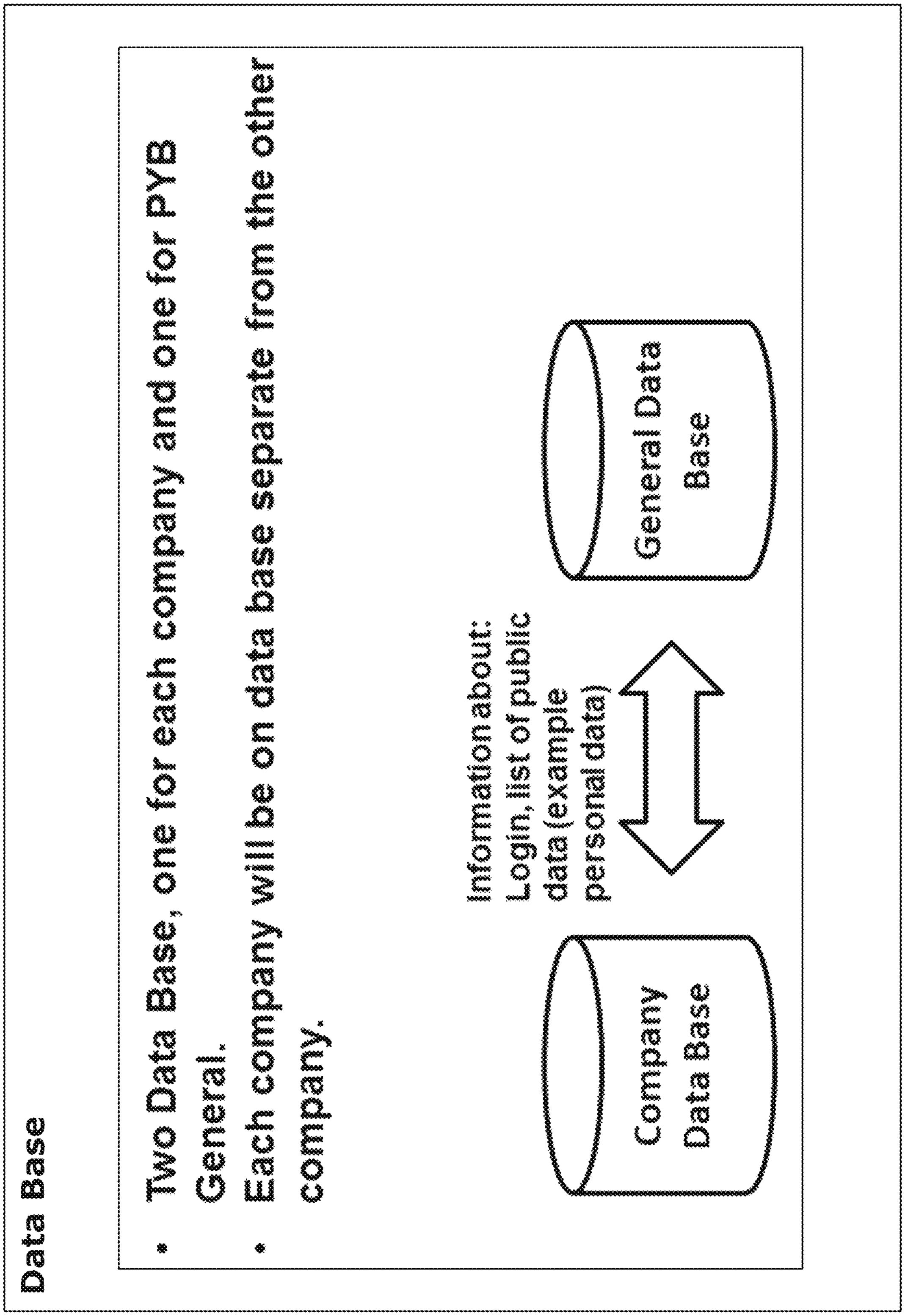
FIG. 100 shows a database view in accordance with a preferred embodiment of the present invention.

1. ENTITY RELATIONSHIP DIAGRAM
1.1 Data Base
1.2 Organization
1.3 Purchase UWID label
1.4 UWID label to network
1.5 Purchase BPC Cards
1.6 BPC to Network
1.7 Sales and registration certificate BPC
1.8 Other processes 1. Entity Relationship Diagram 1.1 Data Base (FIG. 100)

The application PYB spans across multiple databases:

General Database:

1. Contains the login information (e.g., email, password) to all members of PYB and an indication of the data that the user wants to make public.
2. The data base is powered directly by the general members of PYB (real-time alignment of personal data shared between the two systems) or via the online Profile Management function performed at PYB.

Database company
3. Contains all the files of the company. There is a different database for each company.

Figure 101:
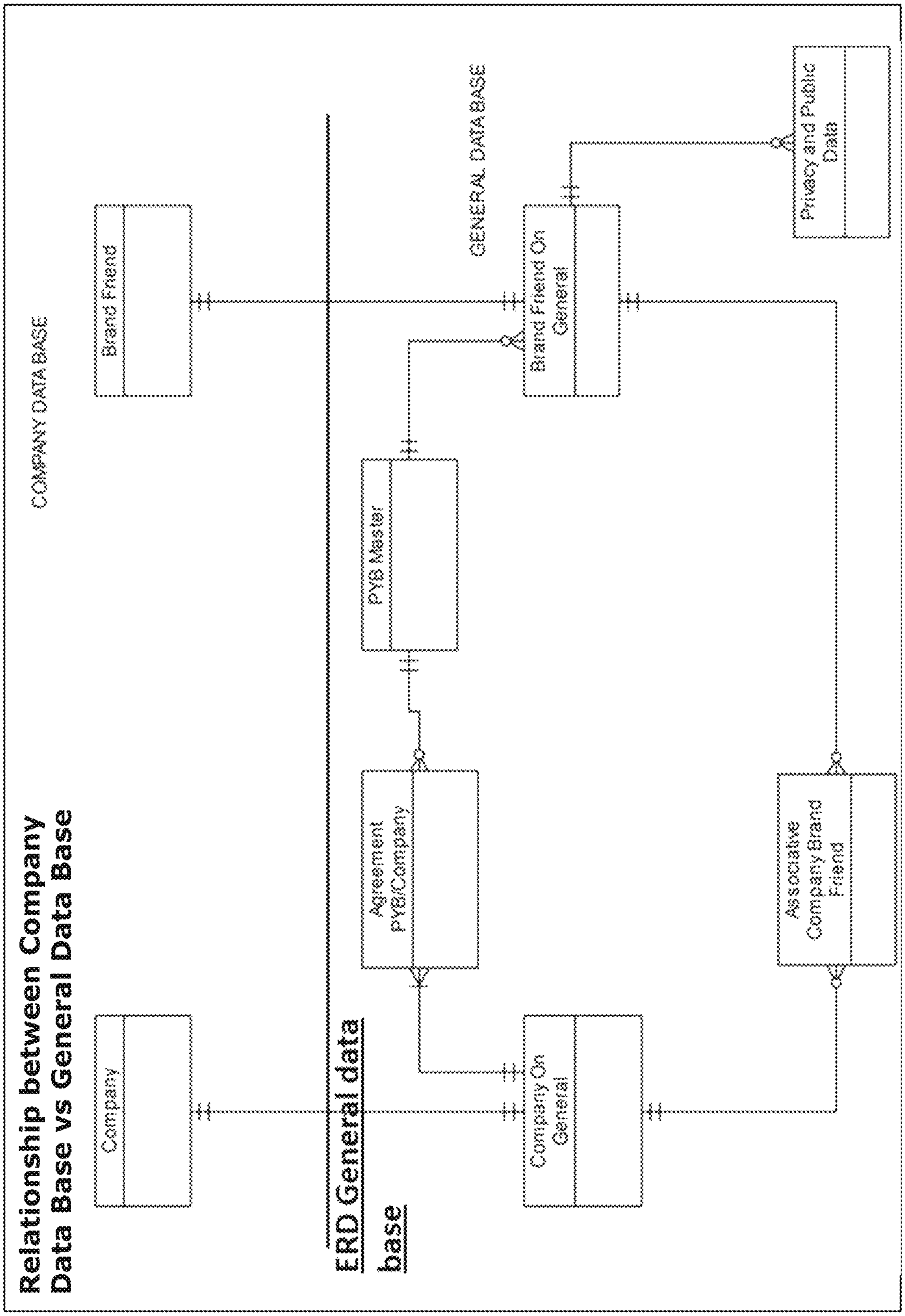
FIGS. 101-107 are entity relationship diagrams (ERDs) in accordance with a preferred embodiment of the present invention.
Figure 102:
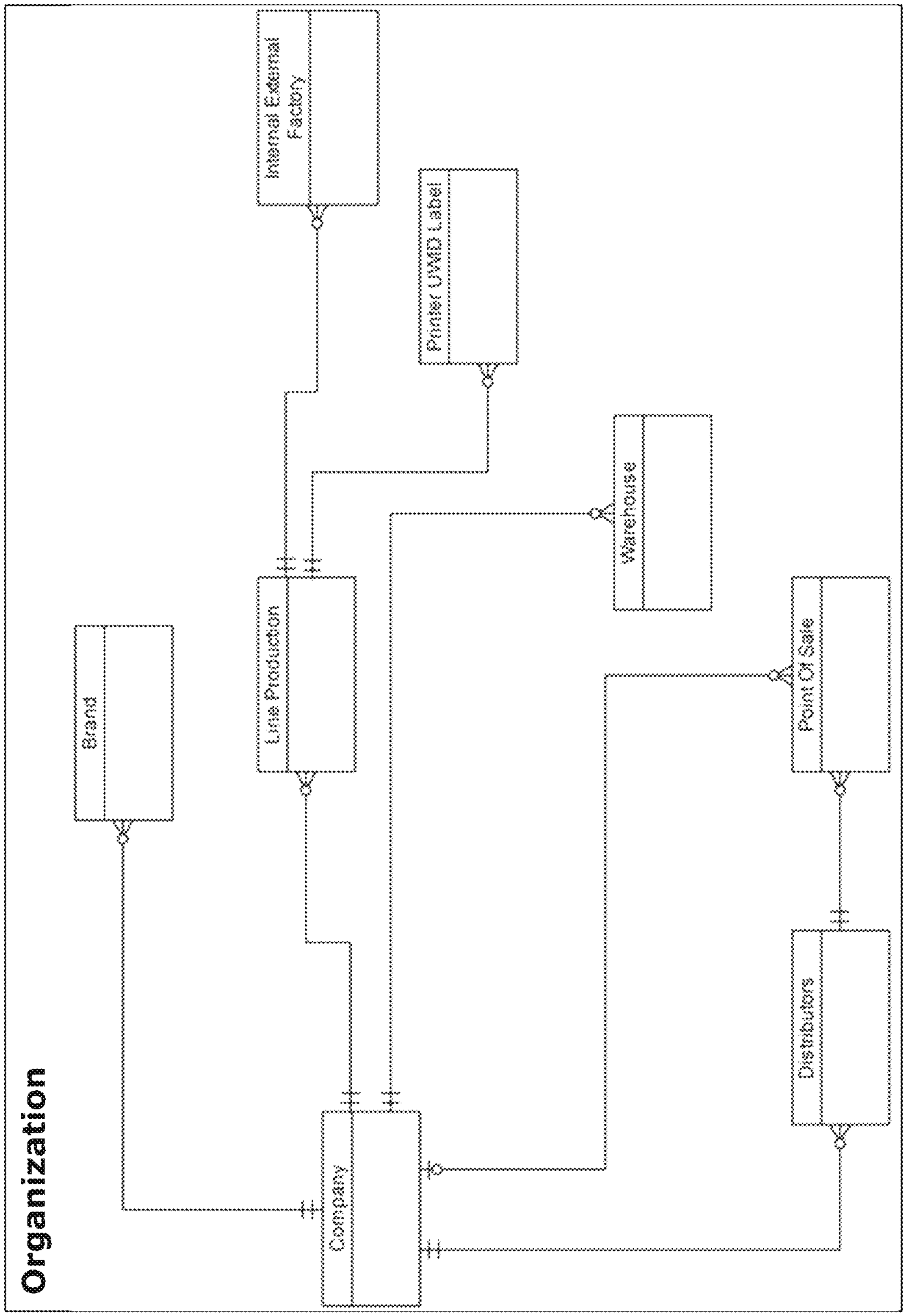

FIG. 101 is a model Entity relationship diagram of the entities in the data base of the company to the general data base 1.2 Organization FIG. 102 is a model Entity Relationship Diagram of the organizational design of the company.

1.3 Purchase UWID Label

Figure 103:
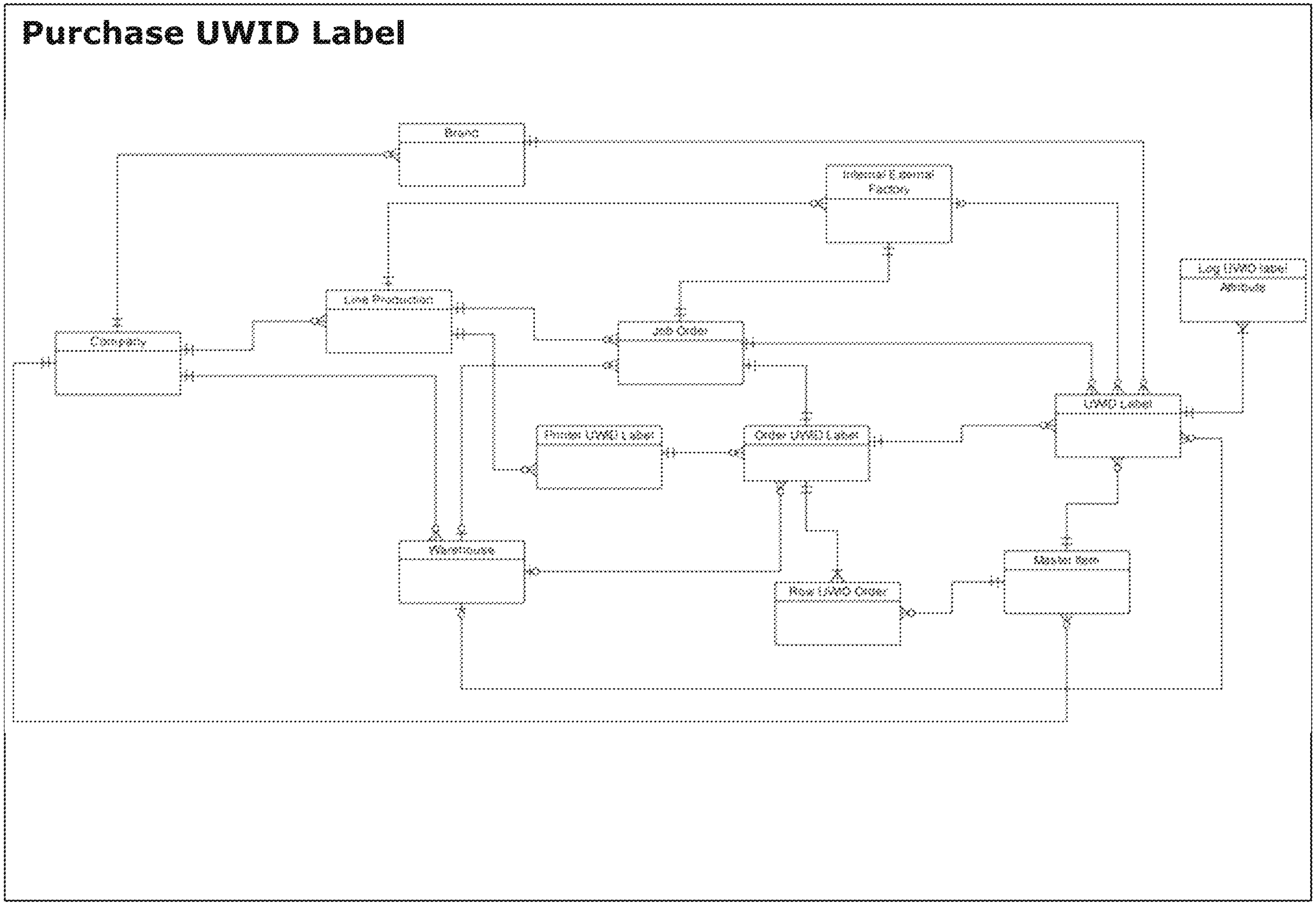

FIG. 103 is a model Entity Relationship Diagram of the entities involved in the purchasing process data labels UWID.

1.4 UWID Label to Network

Figure 104:
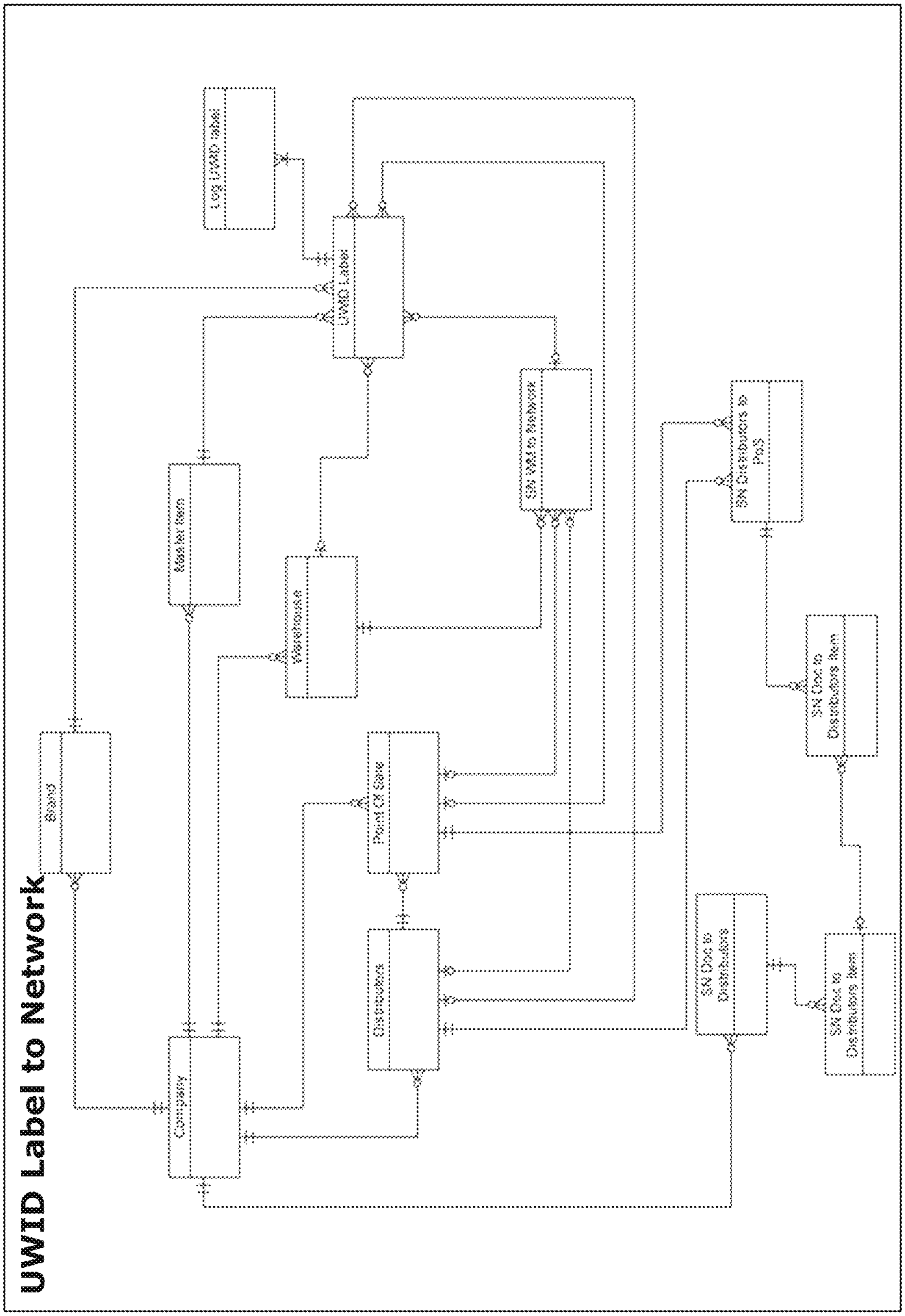

FIG. 104 is a model Entity Relationship Diagram of the entities involved in the process of sending data labels UWID the sales network and input labels UWID at the sales network (Distributors, Points of sale).

1.5 Purchase BPC Cards

Figure 105:
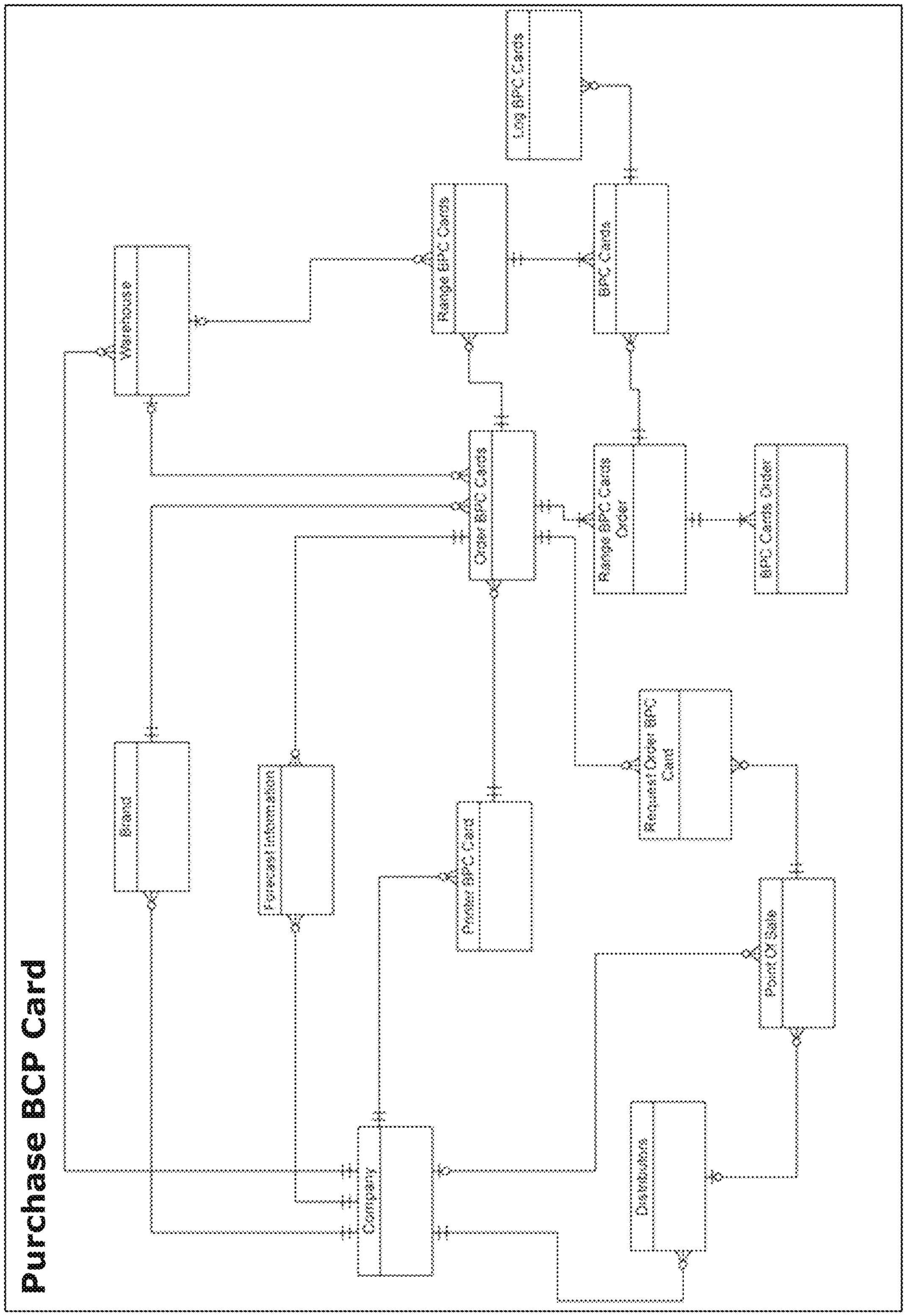

FIG. 105 is a model Entity Relationship Diagram of the entities involved in the process of data acquisition of the Property Card Brand (BPC).

1.6 BPC to Network

Figure 106:
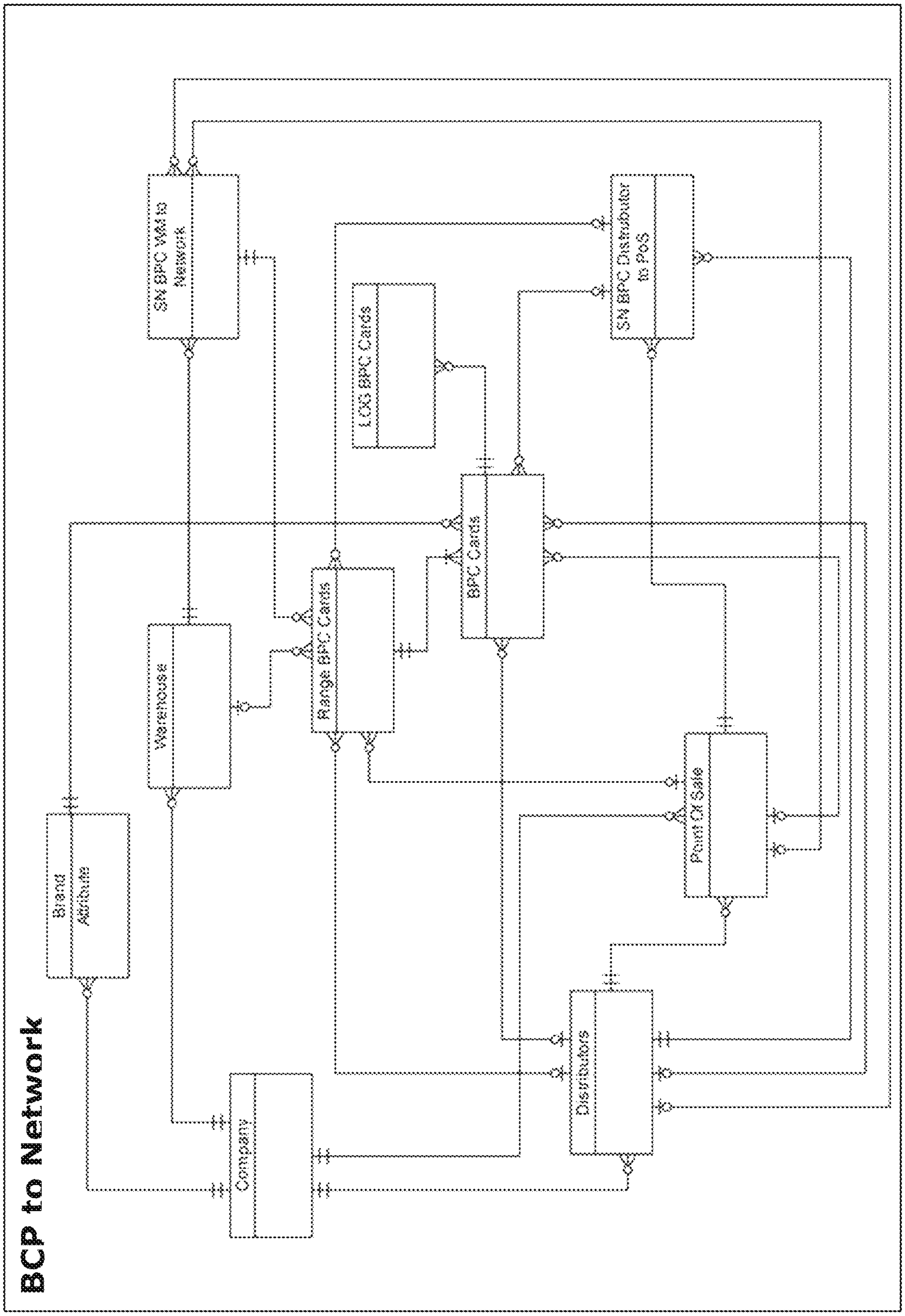

FIG. 106 is a model Entity Relationship Diagram of the data entities involved in the process of sending Brand Property Card to the sales network and the input of the Brand Property Card at the sales network (Distributors, Points of sale).

1.7 Sales and Registration Certificate BPC

Figure 107:
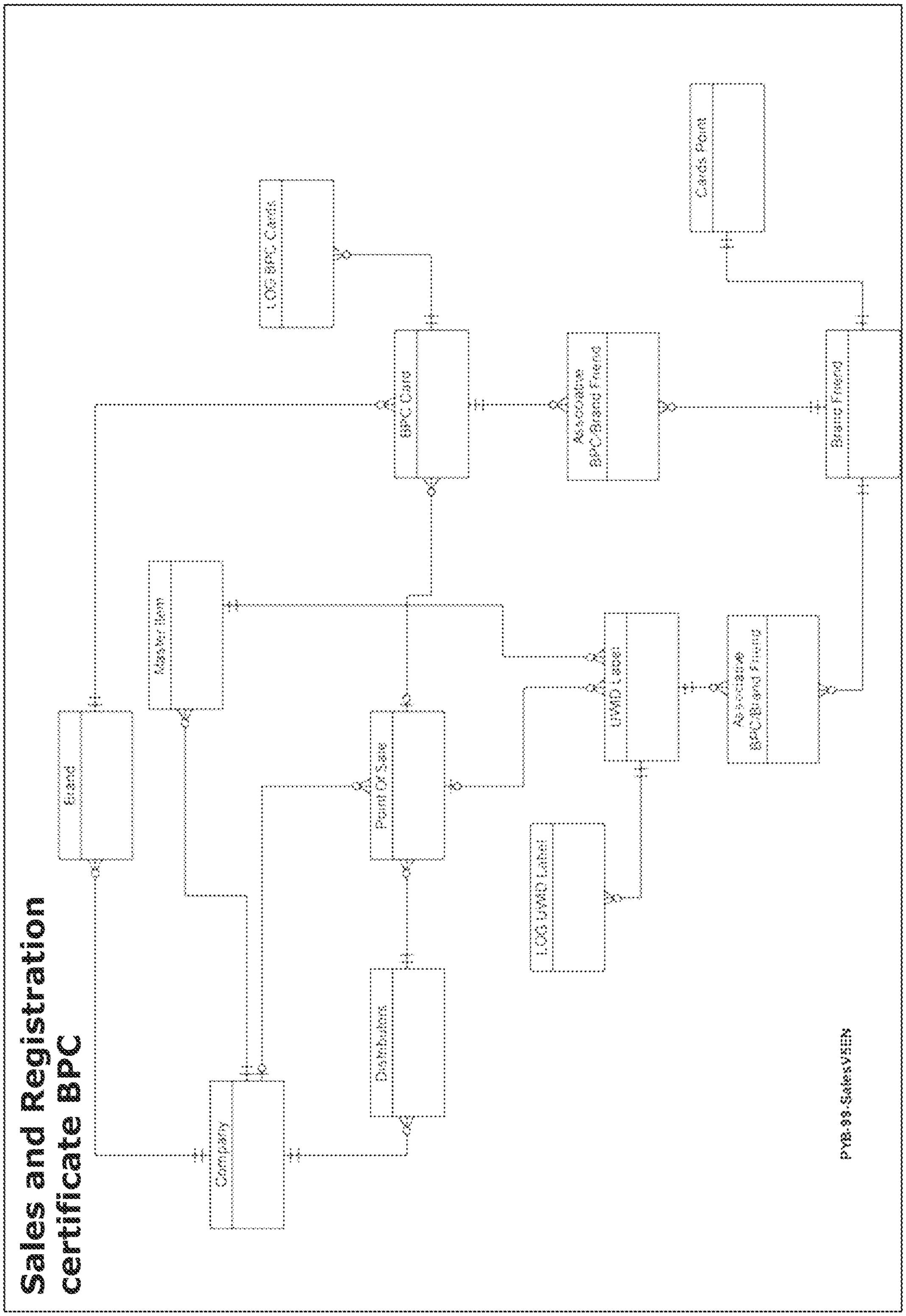

FIG. 107 is a model Entity Relationship Diagram of the data entities involved in the sale and registration of certificates BPC.

1.8 Other Processes

The other processes described in this document functional PYB rely on these entities.

Table of Contents

1. DATA FIELD
1.1 Entity List
1.2 Data Field

1. Data Field 1.1 Entity List

FIGS. 108 and 109 show a list of the application entity Protect Your Brand.

1.2 Data Field

FIGS. 110-129 show the application entity Protect Your Brand with an indication of the fields and their characteristics.

These data fields relate to the ERD's shown in FIGS. 100-107

Table of Contents

Hardware & Software
1.1 Hardware
1.2 Software

Hardware & Software 1.1 Hardware

In the following figures for each area is a summary of the main processes and the hardware used.

Figure 130:
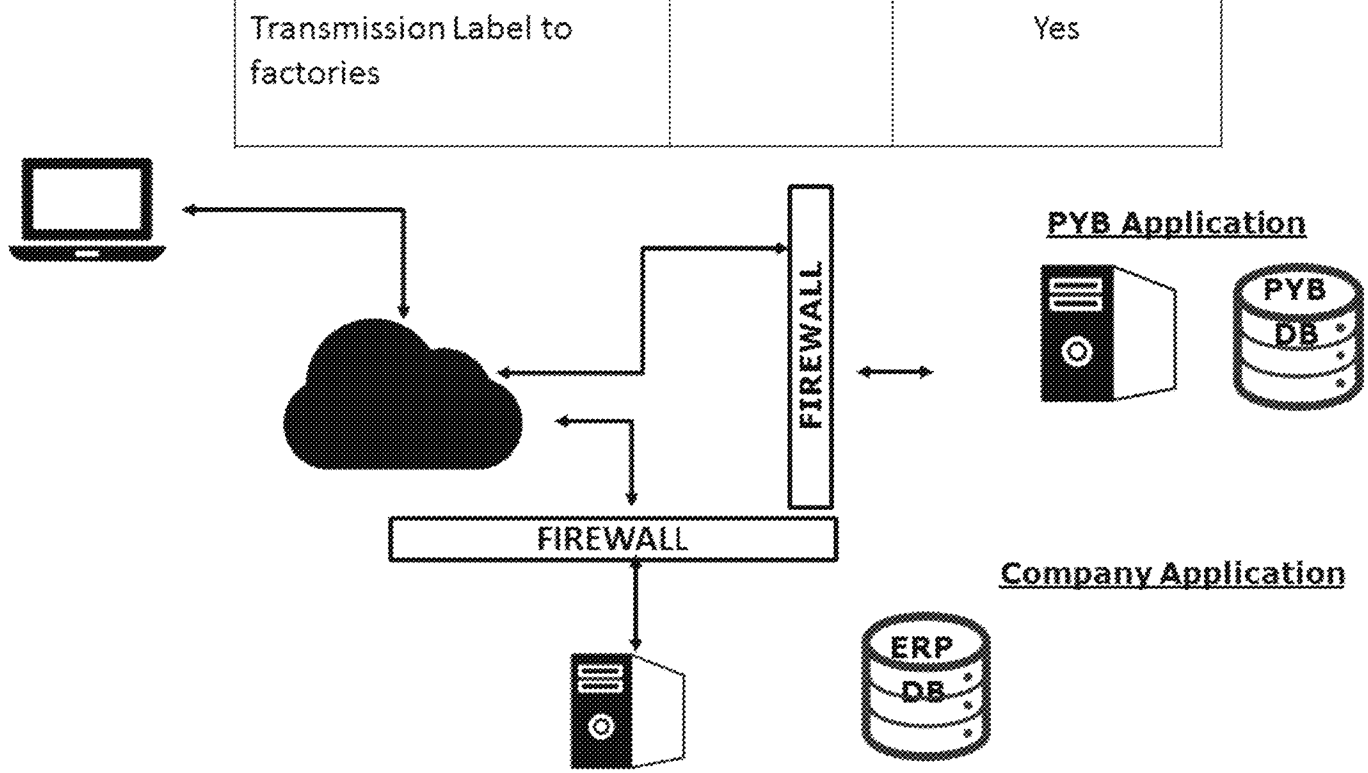
FIGS. 130-135 show hardware/software components and related network architecture in accordance with preferred embodiments of the present invention.

FIG. 130: Production

Figure 131:
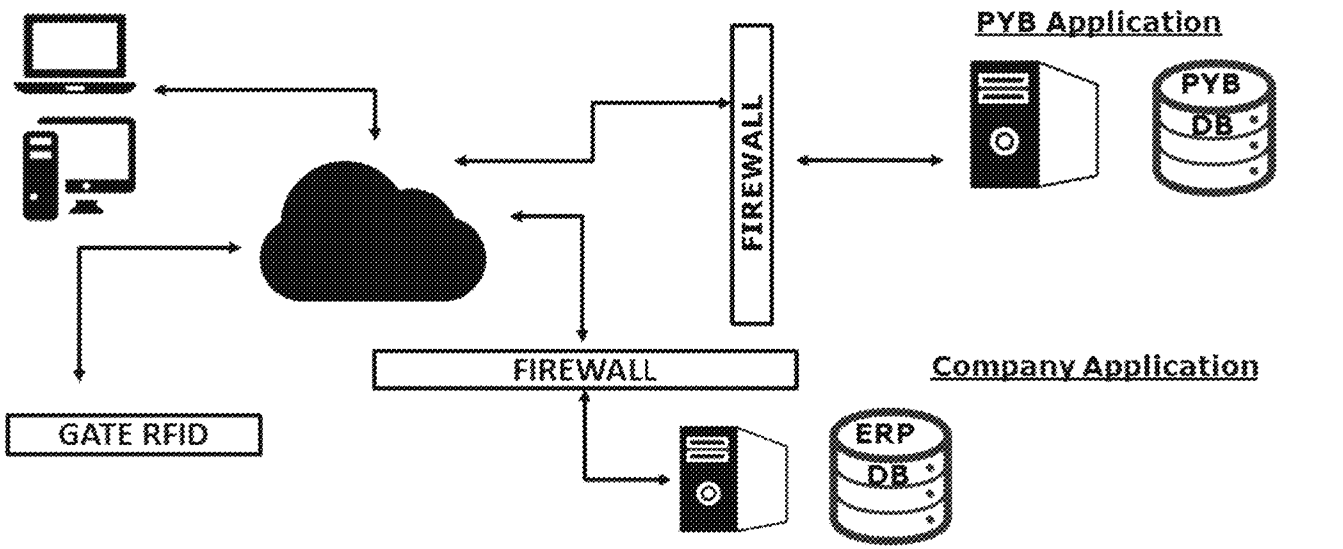

FIG. 131: Warehouse and Printer BPC Cards

Figure 132:
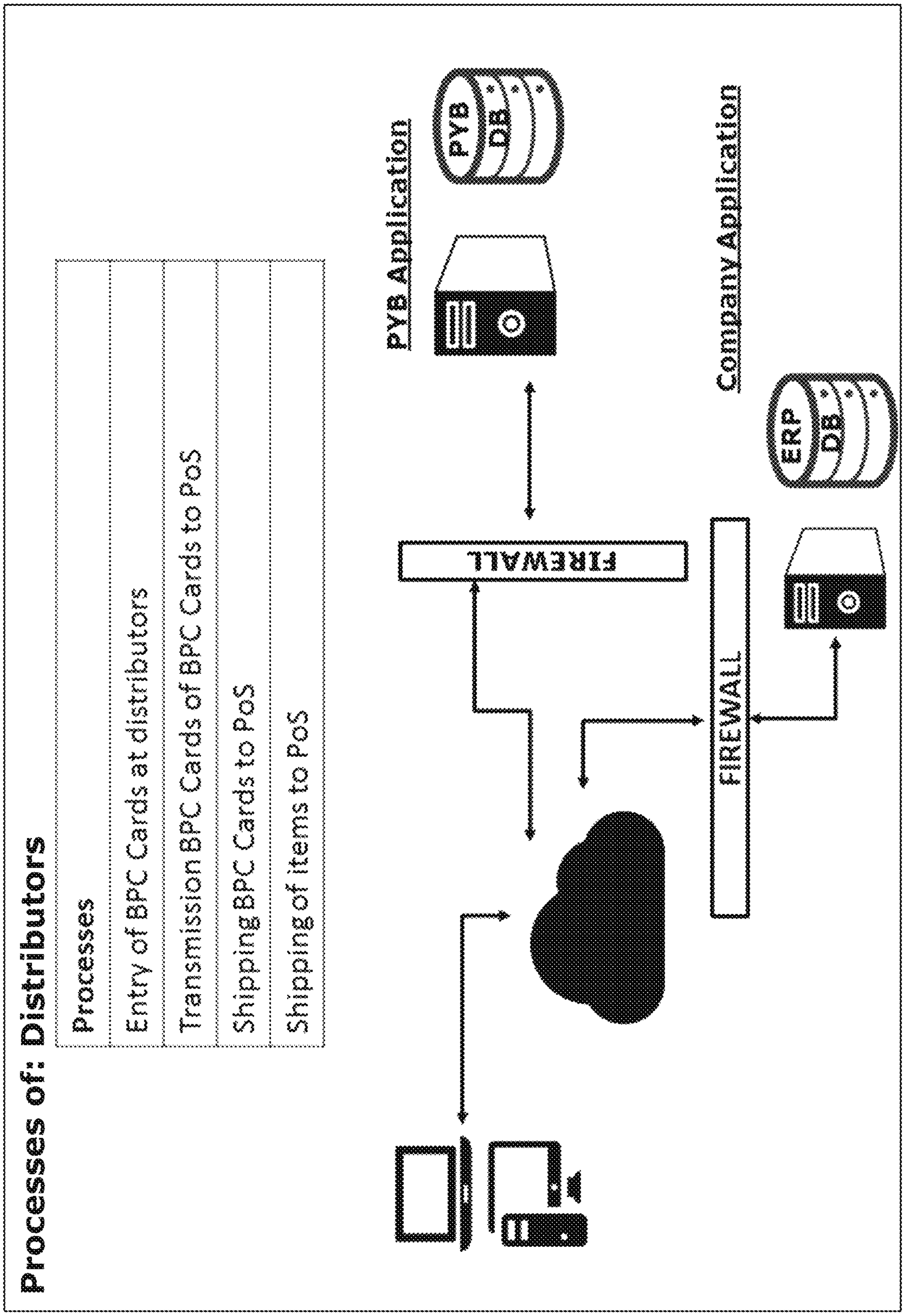

FIG. 132: Distributors

Figure 133:
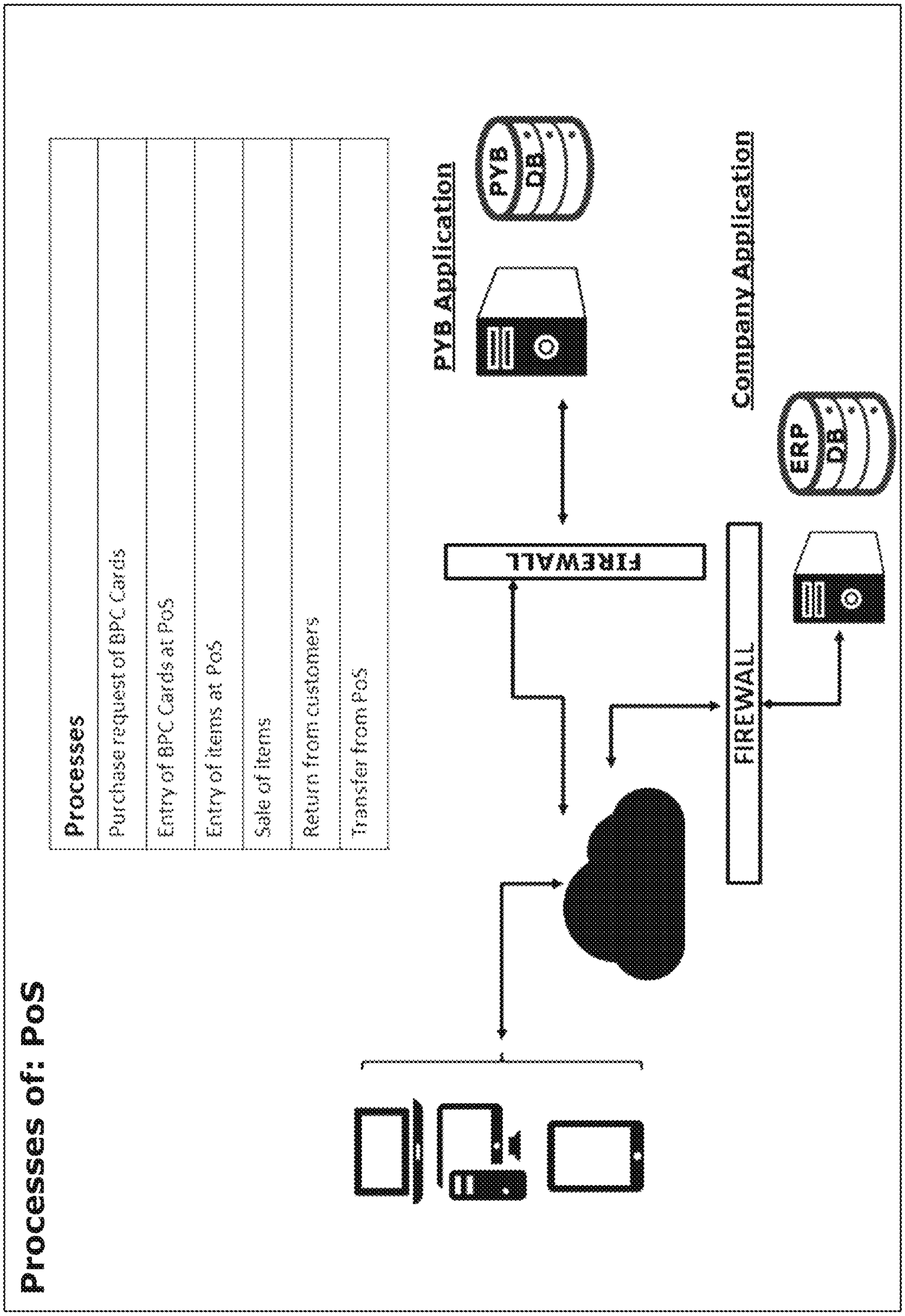

FIG. 133: Point of Sale (PoS)

Figure 134:
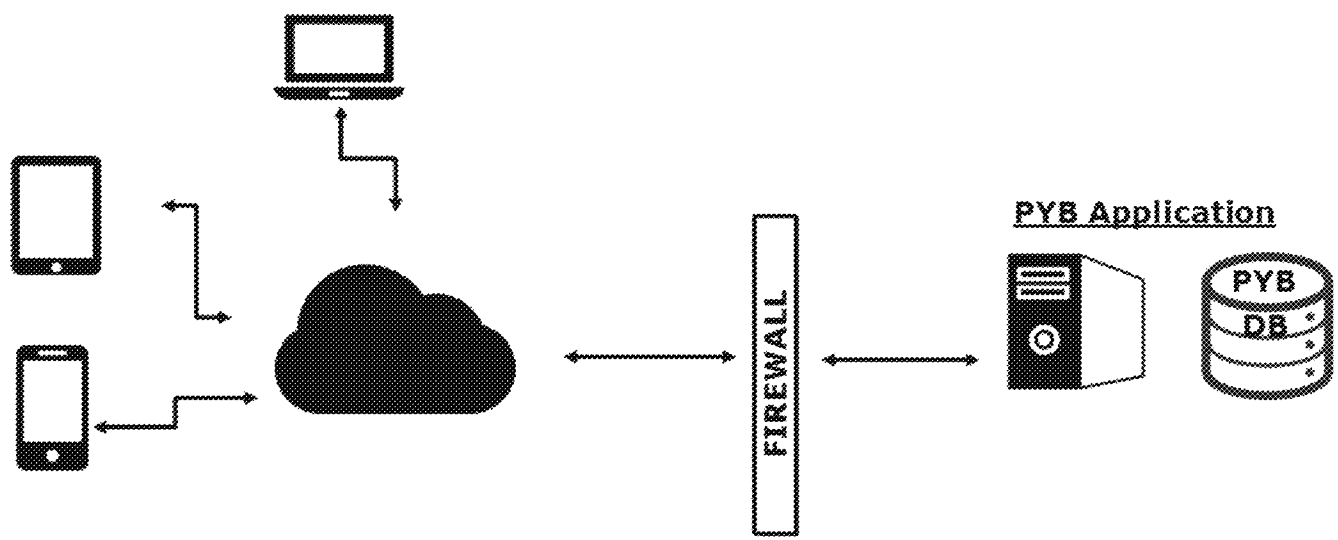
Figure 135:
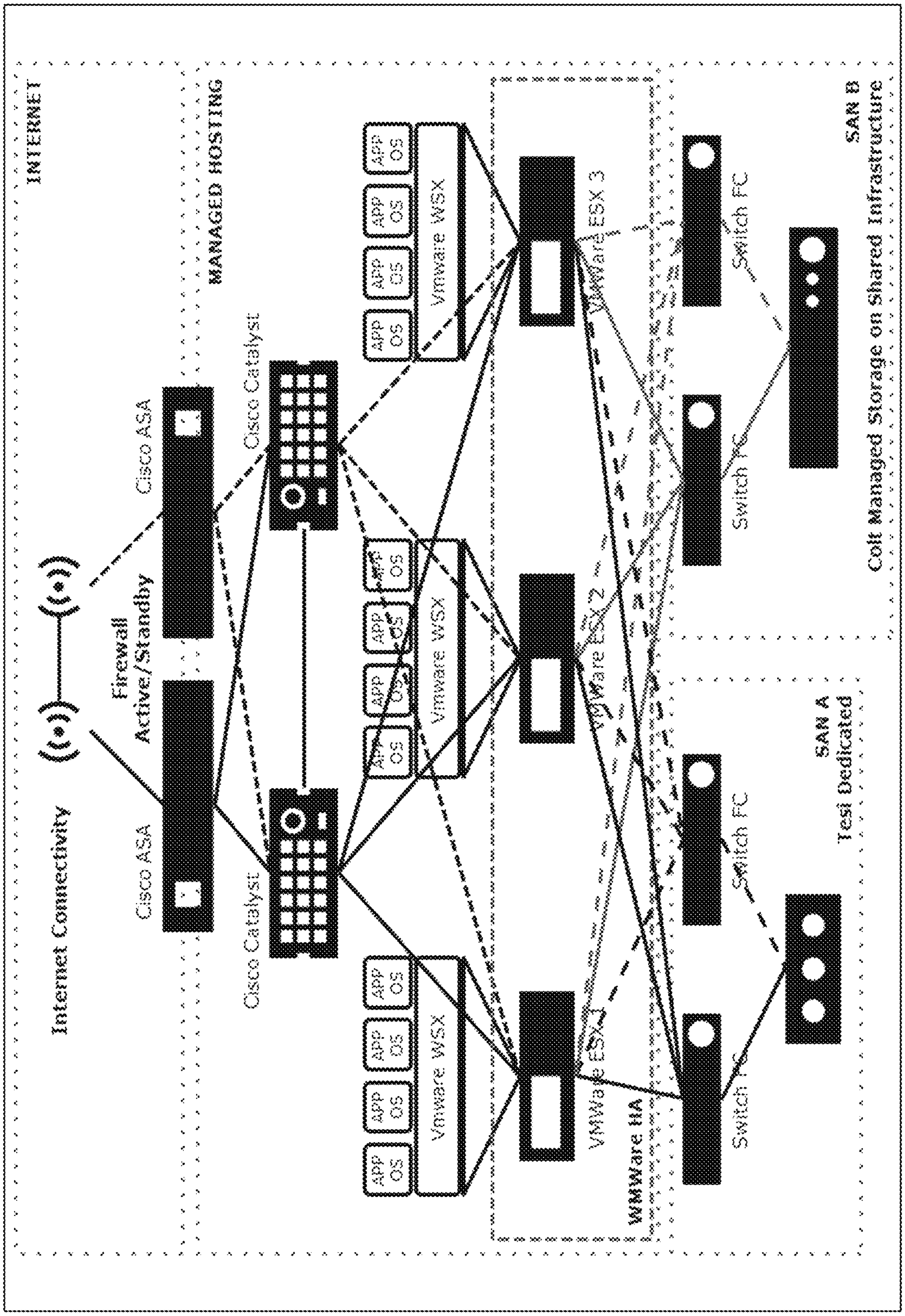

FIG. 134: Clients, brand friends and anyone who desires to query the database of PYB FIG. 135: Design of the hardware architecture hosted by a third-party company on which the application PYB will be installed.

Physical Infrastructure Hardware Requirements

Application Server (Also, Referred to Herein as an "Administration Computer")

| | |
|---|---|
| CPU | 64-bit × 64 processors featured by cutting-edge technology |
| Number of CPU (socket) | 1 |
| Number of CPU cores | 4 (or higher) |
| Memory | at least 1 Gb for CF instance + 2 Gb O.S.<br>if heavy transactions are expected, more RAM may be required |
| Disk layout | C:\40 GB (O.S.)<br>D:\30 GB (Application binary)<br>E:\to define depending on number of managed documents and retention, at least 30 GB<br>RAID protection according to desired company policy |
| Network controller | at least 1 Gbit/s |

DB Server

| | |
|---|---|
| CPU | 64-bit × 64 processors featured by cutting-edge technology |
| Number of CPU (socket) | 2 |
| Number of CPU cores | 4 (or higher) |
| Memory | 4 Gb |
| Disk layout | C:\40 GB (O.S.)<br>D:\100 GB (Application binary + backup DB)<br>M:\(datafile) depending on number of managed documents and retention, at least 100 GB<br>L: (log file) 100 GB depending on transaction number<br>RAID protection according to desired company policy |
| Network controller | at least 1 Gbit/s |

Virtual Infrastructure HW Requirements

If server that will host the PYB Application will be on virtual infrastructure, requirements specified in previous chapter have to be RESERVED for each VM and not globally shared.

Application Server

-continued

| | |
|---|---|
| CPU | 64-bit × 64 processors featured by cutting-edge technology |
| VCPU | 2 (or higher) |
| Memory | at least 1 Gb for CF instance + 2 Gb O.S.<br>if heavy transactions are expected, more RAM may be required |
| Disk layout | C:\40 GB (O.S.)<br>D:\30 GB (Application binary)<br>E:\to define depending on number of managed documents and retention, at least 30 GB<br>RAID protection according to desired company policy |
| Network controller | at least 1 Gbit/s |

DB Server

| | |
|---|---|
| CPU | 64-bit × 64 processors featured by cutting-edge technology |
| VCPU | 4 (or higher) |
| Memory | 4 Gb |
| Disk layout | C:\40 GB (O.S.)<br>D:\100 GB (Application binary + backup DB)<br>M:\(datafile) depending on number of managed documents and retention, at least 100 GB<br>L: (log file) 100 GB depending on transaction number<br>RAID protection according to desired company policy |
| Network controller | at least 1 Gbit/s |

Virtual Infrastructure HW Requirements

If the server that will host the NET Application will be on virtual infrastructure, requirements specified in the previous section have to be RESERVED for each VM and not globally shared.

Application Server

| | |
|---|---|
| CPU | 64-bit × 64 processors featured by cutting-edge technology |
| VCPU | 2 (or higher) |
| Memory | at least 1 Gb for CF instance + 2 Gb O.S.<br>if heavy transactions are expected, more RAM may be required |
| Disk layout | C:\40 GB (O.S.)<br>D:\30 GB (Application binary)<br>E:\to define depending on number of managed documents and retention, at least 30 GB<br>RAID protection according to desired company policy |
| Network controller | at least 1 Gbit/s |

DB Server

| | |
|---|---|
| CPU | 64-bit × 64 processors featured by cutting-edge technology |
| VCPU | 4 (or higher) |
| Memory | 4 Gb |
| Disk layout | C:\40 GB (O.S.)<br>D:\100 GB (Application binary + backup DB)<br>M:\(datafile) depending on number of managed documents and retention, at least 100 GB<br>L: (log file) 100 GB depending on transaction number<br>RAID protection according to desired company policy |
| Network controller | at least 1 Gbit/s |

1.2 Software
Software Requirements

| | Suitable infrastructure | Compatibility |
|---|---|---|
| Mobile O.S. | Android<br>Windows Phone<br>IOS 7<br>IOS 8 | |
| Server O.S. | Windows Server 2012 R2 Enterprise Edition (64 bit) | Windows 32 bit/64 bit<br>Windows Server 2008 Web, Standard, Enterprise Edition with Service Pack 2<br>Windows Server 2008 R2 Web, Standard, Enterprise Edition<br>Windows Server 2012 R2 Enterprise Edition (64 bit)<br>Linux 32 bit/64 bit<br>Red Hat Enterprise Linux 5.6, 6.1<br>SUSE Linux Enterprise Server 11<br>Ubuntu 13.04, 13.10<br>Other S.O. if requested |
| Web Browser | Mozilla Firefox 10 or higher<br>MS Internet Explorer 9, 10<br>Chrome 18 or higher | MS Internet Explorer 8, 9, 10<br>Mozilla Firefox 4 or higher<br>Chrome 10 or higher |
| Web Server | IIS 7.5, 8, 8.5 (depending on O.S.) | IIS 7, 7.5, 8, 8.5<br>Apache<br>Web server IBM |
| Application Server | Tomcat | Jboss<br>Websphere |
| Data Base Management System | Microsoft SQL Server 2014<br>Oracle 11g R2 | Microsoft SQL Server 2008 R2<br>Microsoft SQL Server 2012<br>Microsoft SQL Server 2014<br>Oracle 10g R1-R2 including RAC support<br>Oracle 11g R1-R2 including RAC support<br>Other Data Base if requested |
| LDAP Directory Server | Open LDAP<br>Active Directory | Open LDAP<br>Active Directory<br>Other LDAP if requested |
| Other Software | Adobe ColdFusion 11 (Java Application Server) | |

E-COMMERCE Embodiment

For selling on an eCommerce channel, the eCommerce platform management is entrusted to a specialized operator.

Three organization models regarding outsourcing level are described that a producer can adopt in logistics and sales (on the eCommerce platform) processes:

1. Model 1 Global outsourcing
2. Model 2 Intermediate outsourcing
3. Model 3 Light outsourcing For each of the organizational models above, the main activities of various parts involved are described below.

Model 1 Global Outsourcing

Producer entrusts to a global Outsourcer, the management of eCommerce platform, logistic processes regarding items sales and BPC cards delivery to the final customer.

Main Roles:

1. Producer:
   a. Generate items and BPC cards
   b. Dispatch items and BPC cards to global Outsourcer
2. Global Outsourcer
   a. Manage items and BPC cards on own warehouse
   b. Manage eCommerce platform (customer orders and payments)
   c. Manage order processing and items and BPC cards delivery
   d. Manage possible returns
   e. Forward to producer, customer personal data and orders historical Steps

| Step | Part | Activities |
|---|---|---|
| Step 1 for each Outsourcer material request | Producer | Dispatch to global Outsourcer:<br>1. Items<br>2. BPC cards |
| Step 2 | Customer | 1. Generate purchase order on eCommerce platform<br>2. Make purchase order payment |
| Step 3 | Global Outsourcer | 3. Processing order<br>4. Through PYB application functions, joins BPC card clear code to item UWID label code<br>5. Organize shipment package containing:<br>a. Cover letter about PYB initiative and steps customer has to do for "Registration |

-continued

| Step | Part | Activities |
|---|---|---|
| | | certificate of title"<br>b. Item<br>c. BPC card previously joined to item UWID label code<br>6. Dispatch package to final customer |
| Step 4 | Customer | 1. Receive package containing goods and BPC card<br>2. Make login on PYB platform<br>3. Registration certificate of title on PYB platform<br>a. Insert on PYB, the clear code and hidden BPC card code |

Possible returns are sent to Global Outsourcer.

Model 2 Intermediate Outsourcing

Producer entrusts to an Outsourcer, the management of eCommerce platform and logistic processes regarding item purchase but, delivery of the BPC cards to the final customer is still made by Producer (or company designated by Producer)

Main Roles:

1. Producer:
   a. Generate BPC card and items
   b. Dispatch only items to the Outsourcer
   c. Manage order processing and BPC cards delivery to the customer
2. Outsourcer
   a. Manage own warehouse and items
   b. Manage eCommerce platform (customer orders and payments)
   c. Send to producer sale orders, customer personal data and UWID code of sold item
   d. Manage order processing and item delivery to the customer
   e. Manage possible returns Steps

| | | |
|---|---|---|
| Step 1 to each outsourcer material request | Producer | Dispatch to Outsourcer Items |
| Step 2 | Customer | 1. Generate order on eCommerce platform<br>2. Make purchased order payment |
| Step 3 | Outsourcer | 1. Take from the warehouse items to send to the customer<br>2. Send to Producer:<br>a. Customer personal data<br>b. Item UWID label code for the customer |
| Step 4 | Producer | 1. Take from the warehouse the BPC card that will be sent to the final customer<br>2. Through PYB application functions, joins BPC card clear code to item UWID label code, indicated by the Outsourcer.<br>3. Prepare an envelope containing:<br>a. Cover letter about PYB initiative and steps customer has to do to for "Registration certificate of title"<br>b. BPC card previously joined to item UWID label code<br>4. Send envelope to the final customer |
| Step 5 | Outsourcer | 1. Prepare package containing:<br>a. Cover letter about PYB initiative and steps customer has to do to for "Registration certificate of title"<br>b. Item<br>2. Send package to final customer |
| Step 6 | Customer | 3. Receive package containing goods<br>4. Receive envelope with BPC card<br>5. Make login on PYB platform<br>6. Registration certificate of title on PYB platform<br>Insert on PYB the clear code and hidden BPC card code |

Possible returns are sent to Global Outsourcer.

Model 3 Light Outsourcer

Producer entrusts to an Outsourcer the management of eCommerce platform, all other processes rest in charge to producer (or to another company designated by producer).

Main Roles:

1. Producer:
   a. Generate item and BPC cards
   b. Manage order processing and delivery of items and BPC card to customer c. Manage possible returns 2. Outsourcer and eCommerce platform a. Manage eCommerce platform (customer orders and payments)

b. Communicate to producer sale orders and customer personal data)

Steps

| Step | Parts | Activities |
|---|---|---|
| Step 1 | Customer | 1. Generates purchase order on eCommerce platform<br>2. Make payment of acquired order |
| Step 2 | eCommerce platform Outsourcer | 1. Send to producer purchase order and customer personal data) |
| Step 3 | Producer | 2. Order processing<br>3. Using PYB application functions, joins BPC card clear code to item UWID label code<br>4. Prepare shipment package containing:<br>a. Cover letter about PYB initiative and steps the customer has to do to for "Registration certificate of title"<br>b. Item<br>c. BPC card previously joined to item UWID label code<br>5. Send package to final customer |
| Step 4 | Customer | 1. Receive package containing goods and BPC card<br>2. Make login on PYB platform<br>3. Registration certificate of title on PYB platform Insert on PYB the clear code and hidden BPC card code |

Possible returns are going to be send to producer.

The present invention may be implemented with any combination of hardware and software. If implemented as a computer-implemented apparatus, the present invention is implemented using means for performing all of the steps and functions described above.

When implemented in software, the software code for the servers discussed above can be executed on any suitable processor or collection of processors, whether provided in a single computer or distributed among multiple computers.

The present invention can also be included in an article of manufacture (e.g., one or more non-transitory, tangible computer program products) having, for instance, computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s) used herein for the Server(s) may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

The computer(s) may have one or more input and output devices. These devices can be used, among other things, to present a user interface. Examples of output devices that can be used to provide a user interface include printers or display screens for visual presentation of output and speakers or other sound generating devices for audible presentation of output.

Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags, or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A method of authenticating physical articles, comprising:

(a) attaching a label to each physical article or to the packaging of the physical article, the label having a unique identifier code (UWID);

(b) producing numbered cards (BPC), each having a unique number that is printed thereon prior to being distributed to merchants, wherein the numbered cards and the labels are physically separate documents;

(c) entering in a database associated with an administration computer (i) the unique identifier codes of the labels, and (ii) the unique numbers of the numbered cards, the unique numbers of the numbered cards being initially entered in the database and printed without being associated with particular physical articles or with any particular customer, wherein the labels and the numbered cards are distinct from one another, and the unique identifier codes of the labels and the unique numbers of the numbered cards are distinct from one another;

(d) at a point of sale, a merchant providing a customer with a numbered card and sending an electronic registration request for pairing the card number with the physical article's unique identifier code in the database through a merchant terminal, the physical article being the physical article that the customer wishes to purchase;

(e) receiving the request at the administration computer and performing registration during purchase of the physical article that the customer wishes to purchase only when:

(i) the unique identifier code associated with the physical article that the customer wishes to purchase and the card number that the merchant gives to the customer with the physical article of the electronic registration request respectively match a unique identifier code and a card number that are in the database, and (ii) the unique identifier code associated with the physical article that the customer wishes to purchase and the card number that the merchant gives to the customer with the physical article of the electronic registration request are both not associated with a sold physical article or a currently registered physical article, wherein the registration includes changing a status to an indicator that the unique identifier code of the label and the unique number of the numbered card are now both associated with a sold physical article; and (f) subsequently proving the authenticity and ownership of the physical article when a query is sent to the database using the physical article's unique identifier code.

2. The method of claim 1 wherein each of the numbered cards further includes a code that is initially hidden from plain view before the numbered cards are associated with particular physical articles, and wherein step (c) further includes entering in the database associated with the administration computer:

(iii) the hidden codes for each of the numbered cards, the hidden codes of the numbered cards being initially entered in the database before the numbered cards are associated with particular physical articles, and wherein step (e) further comprises registering customer identification information in the database that is electronically received from a customer terminal in association with a previously registered ownership of a physical article only when the card number of the electronic registration request and the hidden code received from the customer terminal both match a card number and associated hidden code that are in the database, and the card number is associated with a sold physical article.

3. The method of claim 2 wherein the hidden code is hidden from plain view using a scratch-off opaque layer.

4. The method of claim 1 further comprising:

(g) electronically sending a communication from the administration computer to the merchant terminal that sent the electronic registration request that registration cannot be performed when either the unique identifier code or the card number are either not in the database, or when either the unique identifier code or the card number are associated with a sold physical article.

5. The method of claim 1 wherein the merchant has one of a physical and virtual presence.

* * * * *

UNITED STATES PATENT AND TRADEMARK OFFICE

CERTIFICATE OF CORRECTION

PATENT NO. : 10,789,601 B2
APPLICATION NO. : 14/940986
DATED : September 29, 2020
INVENTOR(S) : Pacotto et al.

It is certified that error appears in the above-identified patent and that said Letters Patent is hereby corrected as shown below:

In the Specification

Column 5, Line 20: after “warehouse.” delete “)”

Column 14, Line 64 (in the Table): change “Ordes” to --Orders--

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*